US007031655B2

(12) United States Patent
Nomura et al.

(10) Patent No.: US 7,031,655 B2
(45) Date of Patent: Apr. 18, 2006

(54) TRANSMISSION SYSTEM AND CODING COMMUNICATION METHOD FOR A TRANSMISSION SYSTEM

(75) Inventors: Noboru Nomura, Kyoto (JP); Takashi Yoshida, Ikoma (JP); Joji Kane, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 711 days.

(21) Appl. No.: 09/953,085

(22) Filed: Sep. 14, 2001

(65) Prior Publication Data

US 2003/0050082 A1 Mar. 13, 2003

Related U.S. Application Data

(62) Division of application No. 08/901,017, filed on Jul. 25, 1997, now Pat. No. 6,310,561.

(30) Foreign Application Priority Data

Jul. 25, 1996 (JP) .................................. 8-229201
Jul. 25, 1996 (JP) .................................. 8-229203

(51) Int. Cl.
*H04B 7/00* (2006.01)

(52) U.S. Cl. .............................. 455/7; 455/15; 455/21

(58) Field of Classification Search ............ 455/414.2, 455/456.1, 456.2, 456.3, 456.5, 7, 9, 11.1, 455/524, 569.2, 525.9, 90.1, 90.2, 90.3
See application file for complete search history.

(56) References Cited

U.S. PATENT DOCUMENTS 4,350,970 A 9/1982 Von Tomkewitsch
5,133,081 A 7/1992 Mayo
5,152,002 A * 9/1992 Leslie et al. ........... 455/11.1 X
5,187,810 A 2/1993 Yoneyama et al.
5,289,183 A 2/1994 Hassett et al.
5,317,311 A 5/1994 Martell et al.
5,416,711 A * 5/1995 Gran et al. ................. 701/117
5,418,537 A * 5/1995 Bird ...................... 342/357.09
5,444,742 A 8/1995 Grabow et al.
5,546,188 A * 8/1996 Wangler et al. ............ 356/5.01
5,548,802 A 8/1996 Barnes et al.
5,613,216 A 3/1997 Galler
5,739,774 A 4/1998 Olandesi
5,847,663 A 12/1998 Chasek
6,108,555 A * 8/2000 Maloney et al. ......... 455/456.2

FOREIGN PATENT DOCUMENTS

EP 0416692 3/1991

(Continued)

OTHER PUBLICATIONS

Japanese Office Action for Patent Application No. 1996-229203, dated Aug. 31, 2004 (with partial English translation).

*Primary Examiner*—Nay Maung
*Assistant Examiner*—Philip J. Sobutka
(74) *Attorney, Agent, or Firm*—RatnerPrestia

(57) ABSTRACT

The conventional combination cannot realize an efficient road traffic system as a whole. A transmission system has a plurality of modules installed at different positions along a predetermined road. Each of the plurality of the modules includes a receiving section for receiving an input signal and a transmission section for transmitting an output signal on the basis of the input signal according to a predetermined radio scheme. Each of the plurality of the modules receives and transmits a signal, whereby the whole or part of the information contained in the signal is transmitted along the whole or part of the predetermined road. This transmission system can construct an efficient integrated road traffic system as a whole.

14 Claims, 89 Drawing Sheets

FOREIGN PATENT DOCUMENTS

| | | |
|---|---|---|
| FR | 2559930 | 8/1985 |
| JP | 57-182899 | 11/1982 |
| JP | 63-313085 | 12/1988 |
| JP | 03-152592 | 6/1991 |
| JP | 05-030000 | 2/1993 |
| JP | 5-168059 | 7/1993 |
| JP | 06-053891 | 2/1994 |
| JP | 6-237212 | 8/1994 |
| JP | 07-128420 | 5/1995 |
| JP | 07-334789 | 12/1995 |
| JP | 08-077489 | 3/1996 |
| JP | 8-293095 | 11/1996 |
| WO | 9313510 | 7/1993 |

* cited by examiner

Fig. 7
(a)
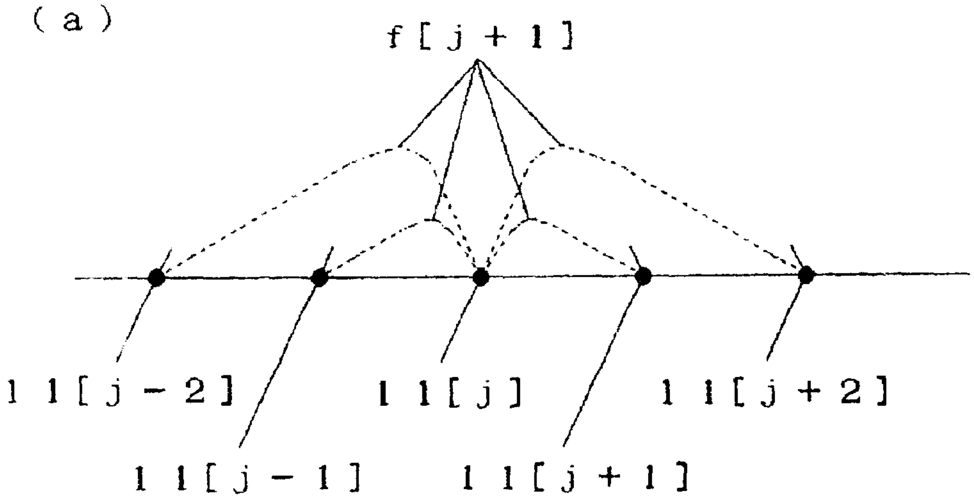
(b)
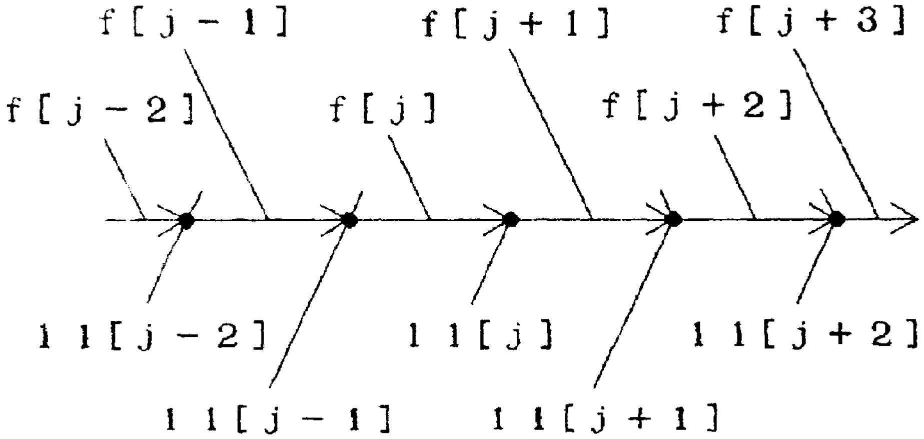

Detection source detection and information collection

Detection source detection and information supply

Detection source detection and display (drive support)

Detection source detection, display (drive support) and information collection

Detection source detection, information supply and display (drive support)

Detection source detection and automatic drive

Detection source detection, automatic drive and information collection

Detection source detection, information supply and automatic drive

Information supply, detection source detection and display

Fig. 35 Information supply, detection source detection, and automatic drive

Fig. 37 Information supply, detection source detection, display and information collection

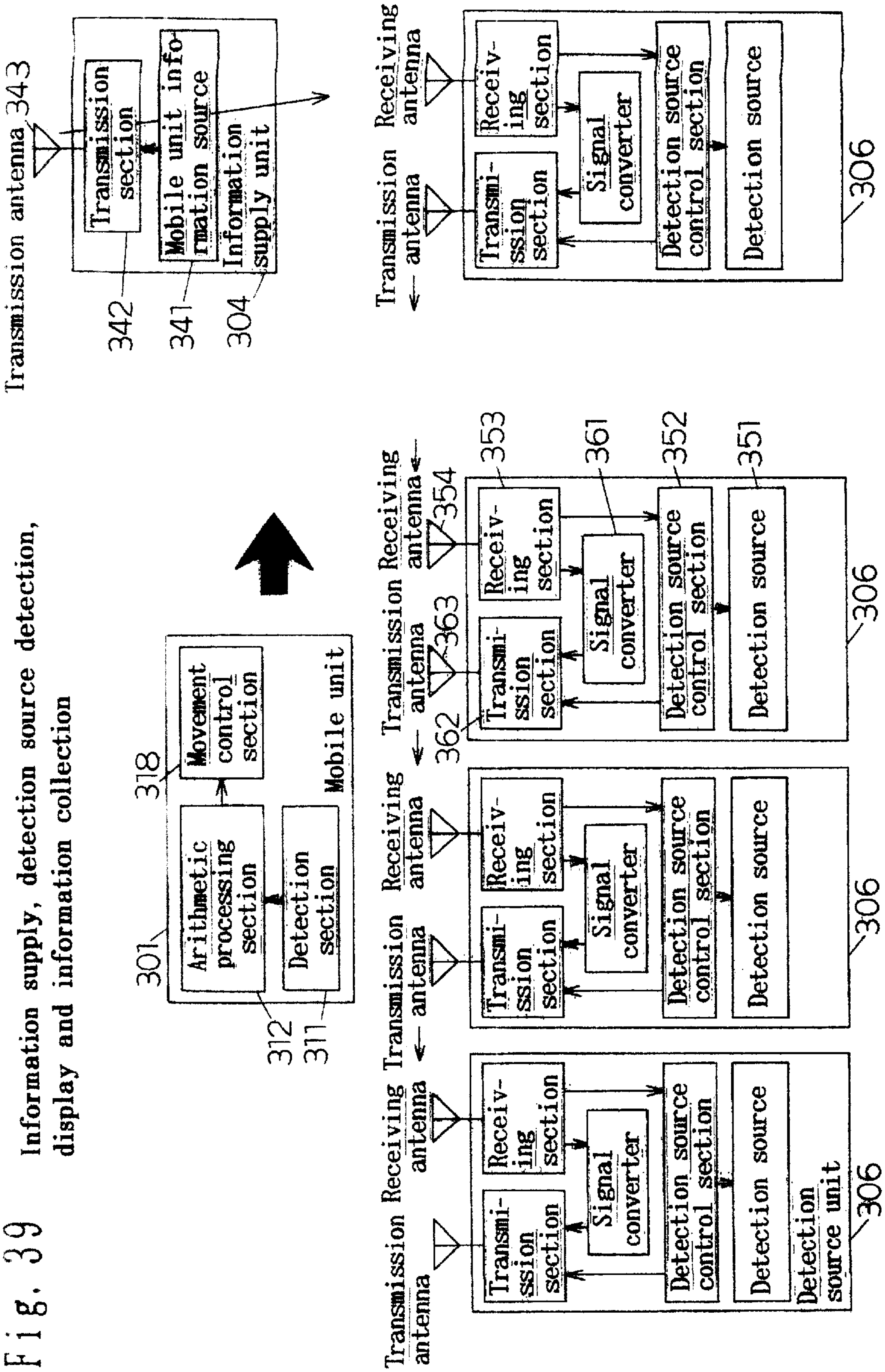
Fig. 39 Information supply, detection source detection, display and information collection

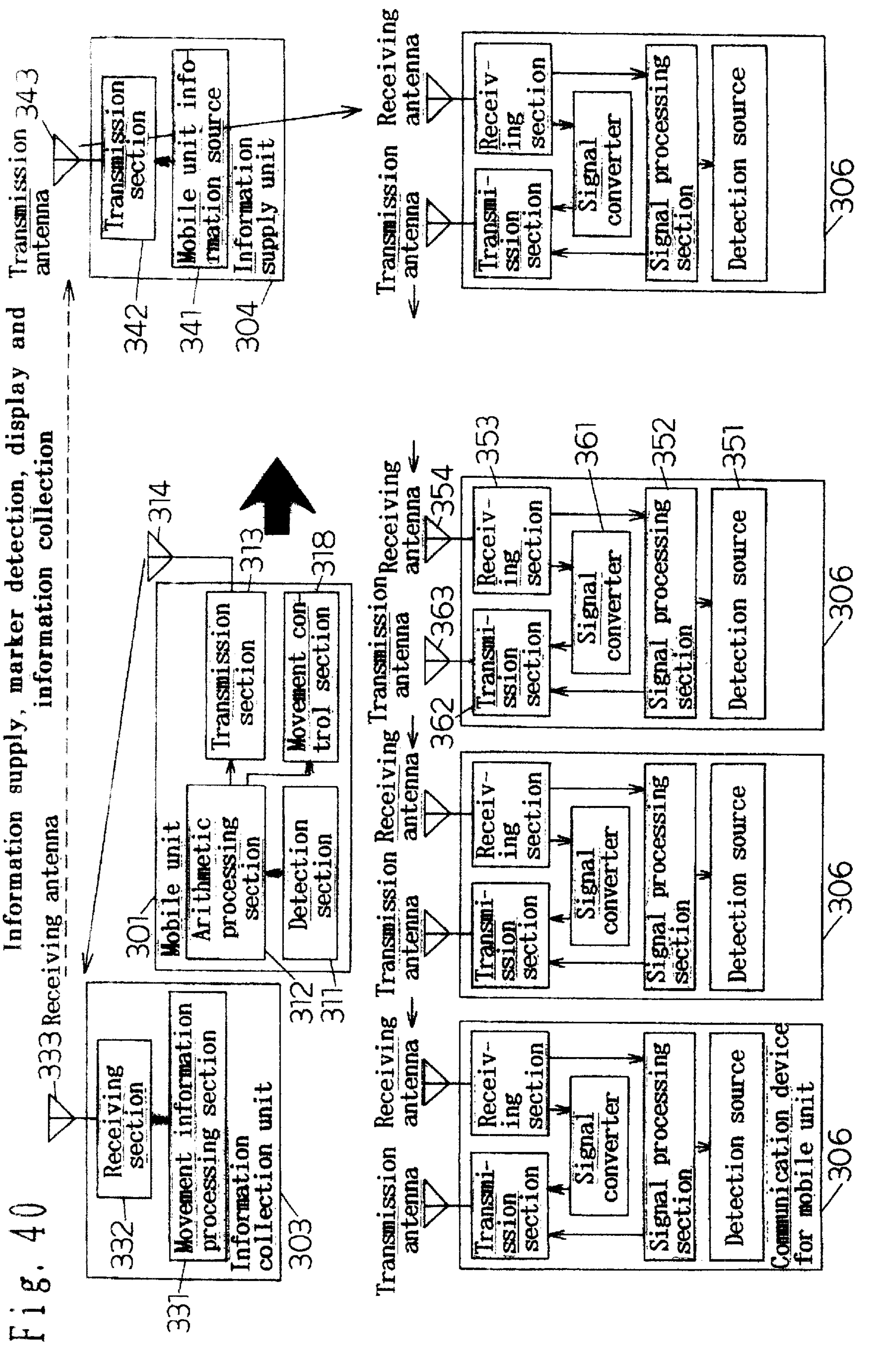
Fig. 40
Information supply, marker detection, display and information collection
Receiving antenna
Transmission antenna
333
332
331
Receiving section
Movement information processing section
Information collection unit
303
301
Mobile unit
Arithmetic processing section
Detection section
312
311
Transmission section
Movement control section
313
318
314
342
341
304
343
Transmission section
Mobile unit information source
Information supply unit
Transmission antenna
Receiving antenna
Transmission section
Receiving section
Signal converter
Signal processing section
Detection source
Communication device for mobile unit
306
362
363
354
353
361
352
351

Relay-type communication method (asynchronous)

Device ID assigned to each device-wise data frame (applicable to the following description)

Relay-type communication method (synchronous between device and external unit)

Relay-type communication method (synchronous between device and external unit)

Relay-type communication method (synchronous)

(A) In-zone communication base (B) Out-of-zone communication base (C) External infrastructure (E) Traffic control (F) Navigation (J) Automatic drive

TRANSMISSION SYSTEM AND CODING COMMUNICATION METHOD FOR A TRANSMISSION SYSTEM

This application is a division of application Ser. No. 08/901,017, filed Jul. 25, 1997 now U.S. Pat. No. 6,310,561.

BACKGROUND OF THE INVENTION

1. Field of the Invention

The present invention relates to a transmission system and coding communication method for a transmission system, capable of transmitting information by transmitting and receiving signals between a plurality of modules installed at different positions.

2. Related Art of the Invention

For a practical and optimum sophisticated road traffic system to be realized, the following five factors are considered crucial.

1. Possibility of measuring the following distance of vehicles
2. Possibility of drive support
3. Possibility of automatic drive
4. Possibility of communication from the vehicle
5. Possibility of inter-vehicle communication The situation of the prior art for each of the above-mentioned five factors will be explained.

As to a vehicle for which the following distance is measurable as in (1) above, though not currently available, provision of a laser measuring instrument, an ultrasonic measuring instrument or the like would make it possible to measure the following distance. The measurement of the following distance is indispensable for the factors (2) and (3).

As to the items (2) and (3) above relating to the drive support and the automatic drive, respectively, there is not any means currently available. Research is under way in each organization for a drive support or an automatic drive system with a computer mounted on a vehicle using a method unique to each organization. Details of the research, however, are unknown.

The use of a portable telephone or the like can realize the factors (4) and (5). Also, the radio or the like equipment permits acquisition of information on traffic congestion or the like.

The above-mentioned methods, however, require realization of the five factors separately from each other, and it is impossible to realize an overall efficient road traffic system.

Especially, the factor (4) has no relation with the factors (1) to (3), and it seem that they can be processed independently of each other. If information to be communicated is of the type used with a navigator, however, the factor (4) may be related to the factors (1) to (3). It is not efficient, therefore, to realize the above-mentioned five factor independently of each other but an overall integrated system is desirably built up. By doing so, the road conditions can be accurately grasped, and the information used with the navigator can be generated based on the road conditions, thereby making it possible to supply information much more useful than the information obtained from the CD ROM or the like.

Also, in the case where a vehicle performs a communication, or especially, in the case where information on automatic drive or the like is transmitted or received between the vehicle and other stations, a multiplicity of vehicles running on a road undesirably transmit a high-output radio wave.

SUMMARY OF THE INVENTION

Taking this problem into consideration, the object of the present invention is to provide a transmission system capable of realizing the above-mentioned five factors in a single system.

One aspect of the present invention for solving this problem comprises a plurality of modules installed at different positions along a predetermined road, and is characterized in that each of the plurality of said modules includes a receiving means of receiving an input signal and a transmission means of transmitting an output signal based on said input signal in accordance with a predetermined radio scheme, and each of the plurality of said modules receives and transmits a signal thereby to transmit the whole or part of the information contained in said signal along the whole or part of said predetermined road.

By the way, said predetermined radio scheme can be the one for radio communication using radio wave, light, laser, sound wave or ultrasonic wave.

Another aspect of the present invention comprises a plurality of modules installed at different positions along a predetermined route, and is characterized in that each of the plurality of said modules includes receiving means of receiving an input signal in accordance with a radio wave communication scheme and a transmission means of transmitting an output signal receivable only by at least one another module based on said input signal in accordance with a radio wave communication scheme, and each of the plurality of said modules receives and transmits a signal thereby to transmit the whole or part of the information contained in said signal along the whole or part of said predetermined route.

Still another aspect of the present invention comprises a plurality of modules installed at different positions along a predetermined route, and is characterized in that each of the plurality of said modules includes a receiving means for receiving an input signal of a radio wave having a predetermined carrier frequency and a transmission means for transmitting an output signal of a radio wave having a carrier frequency different from said predetermined carrier frequency based on said input signal in accordance with a radio wave communication scheme, and each of the plurality of said modules receives and transmits a signal thereby to transmit the whole or part of the information contained in said signal along the whole or part of said predetermined route.

A further aspect of the present invention comprises a plurality of modules installed at different positions along a predetermined route, and is characterized in that each of the plurality of said modules includes a receiving means of receiving an input signal and a transmission means of transmitting an output signal based on said input signal in accordance with a predetermined radio scheme, each of the plurality of said modules receives and transmits a signal thereby to transmit the whole or part of the information contained in said signal along the whole or part of said predetermined route, and each of the plurality of said modules further includes a mobile unit detection means of detecting the presence or absence of a mobile unit moving along said predetermined route.

By the way, an arrangement can be made in which the receiving means of each of the plurality of said modules can receive as said input signal the output signal transmitted from the transmission means of another module adjacent to said first module having said receiving means, and the transmission means of each of the plurality of said modules can transmit said output signal in such a manner as to be received by the receiving means of at least still one another module adjacent to said first module having said transmission means and different from the module having the transmission means that has transmitted the output signal received as an input signal by the receiving means of said first module.

Also, an arrangement can be made in which the receiving means of each of the plurality of modules can receive, as said input signal, the output signal transmitted from the transmission means of another module adjacent to said module having said receiving means and the output signal transmitted from the transmission means of at least still another module adjacent to said first module and different from said another module, and the transmission means of each of the plurality of said modules can transmit said output signal in such a manner as to be received by the receiving means of at least still another module adjacent to said first module and different from the module having the transmission means that has transmitted the output signal received as an input signal by the receiving means of said first module.

Further, an arrangement can be made in which said transmission means or said receiving means of each of the plurality of said modules can have such a directivity as to transmit said output signal to a predetermined transmission range or receive said input signal from a predetermined receiving range.

A still further aspect of the present invention comprises a plurality of modules installed at different positions along a predetermined route, and is characterized in that each of the plurality of said modules includes a first receiving means of receiving a first input signal from another module and a first transmission means of transmitting a first output signal based on said first input signal in accordance with a first radio scheme, each of the plurality of said modules receives and transmits a signal thereby to transmit the whole or part of the information contained in said signal along the whole or part of said predetermined route, and each of the plurality of said modules further includes a second receiving means of receiving a second input signal from a mobile unit moving along said predetermined route and/or a second transmission means of transmitting a second output signal to said mobile unit according to a second radio scheme.

By the way, each of said first and second radio schemes can be the one for radio communication using radio wave, light, laser, sound wave or ultrasonic wave.

Also, an arrangement can be made in which the first receiving means of each of the plurality of said modules can receive, as said first output signal, the first output signal transmitted from the first transmission means of another module adjacent to said first module having the first receiving means, and in which the first transmission means of each of the plurality of said modules can transmit said first output signal in such a manner as to be received by the first receiving means of at least still one another module adjacent to said first module having the first transmission means and different from the module having the first transmission means that has transmitted the first output signal received as the first input signal by the first receiving means of said first module.

Also, an arrangement can be made in which the first receiving means of each of the plurality of said modules can receive, as said first input signal, the first output signal transmitted from the first transmission means of another module adjacent to said first module having the first receiving means and the first output signal transmitted from the first transmission means of at least still one another module adjacent to said module and different from said another module, and in which the first transmission means of each of the plurality of said modules can transmit said first output signal in such a manner as to be received by the first receiving means of at least still one another module adjacent to said first module having the first transmission means and different from the module having the first transmission means that has transmitted the first output signal received as the first input signal by the first receiving means of said first module.

Also, an arrangement can be made in which the second transmission means of each of the plurality of said modules can transmit said second output signal based on the first input signal received by the first receiving means of said first module having the second transmission means, and in which the first transmission means of each of the plurality of said modules can transmit said first output signal based on the first and second input signals received by the first and second receiving means, respectively, of said first module having the first transmission means.

Also, an arrangement can be made in which the first output signal transmitted by the first transmission means of each of the plurality of said modules can contain a module identifier for identifying said module that has transmitted said first output signal.

Also, an arrangement can be made in which the second input signal received by the second receiving means of each of the plurality of said modules can contain a mobile unit identifier for identifying a mobile unit that has transmitted the second input signal.

Also, an arrangement can be made in which each of the plurality of said modules further comprises a transfer synchronizing means for generating a sync signal based on a sync clock or a reference signal contained in the first input signal received by said first receiving means, and in which the first transmission means of each of the plurality of said modules can transmit said first output signal in accordance with the sync signal generated by said transfer synchronizing means.

Also, an arrangement can be made in which said mobile unit further comprises a communication synchronizing means for generating a sync signal based on said sync clock or said reference signal contained in said second output signal, and in which the transmission means of said mobile unit can transmit said second input signal in accordance with the sync signal generated by said communication synchronizing means.

Also, an arrangement can be made in which each of the plurality of said modules further comprises a priority information detection means for detecting predetermined priority information from the first and/or second input signal received by the first and/or second receiving means, respectively, of said module, and in which the first transmission means of said module can further transmit said first output signal based on the result of the detection by said priority information detection means.

Also, each of the plurality of said modules can be installed along said predetermined route in such a manner that at least one of them is located for each length of said mobile unit in the direction of movement thereof.

Also, each of the plurality of said modules can be installed equidistantly along said predetermined route.

Also, said mobile unit can include a transmission means and/or a receiving means communicable with one of the plurality of said modules located between the forward end and the rear end of said mobile unit.

Also, an arrangement can be made in which said mobile unit further include an extraction means for extracting the information addressed to said mobile unit from the second output signal transmitted from said second transmission means and received by the receiving means of said mobile unit, the second input signal transmitted to said second receiving means from the transmission means of said mobile unit can contain the extracted information by which the specific information extracted by said extraction means can be identified, and the first transmission means of each of the plurality of said modules can further transmit said first output signal based on said extracted information.

Also, an arrangement can be made in which the first receiving means of each of the plurality of said modules can receive said first input signal of a radio wave of a predetermined carrier frequency in accordance with a radio wave communication scheme, and the first transmission means of each of the plurality of said modules can transmit said first output signal of a radio wave of a carrier frequency different from said predetermined carrier frequency in accordance with a radio wave communication scheme.

Also, an arrangement can be made in which the first receiving means of each of the plurality of said modules is a first radio receiving means connected with a first receiving antenna having such a directivity as to receive said first input signal in accordance with a radio wave communication scheme, in which the second receiving means of each of the plurality of said modules is a second radio receiving means connected with a second receiving antenna having such a directivity as to receive said second input signal in accordance with a radio wave communication scheme, in which the first transmission means of each of the plurality of said modules is a first radio transmission means connected with a first transmission antenna having such a directivity as to transmit said first output signal in accordance with a radio wave communication scheme, and in which the second transmission means of each of the plurality of said modules is a second radio transmission means connected with a second transmission antenna having such a directivity as to transmit said second output signal in accordance with a radio wave communication scheme.

Also, an arrangement can be made in which the first and second receiving means of each of the plurality of said modules can share a radio receiving means for receiving said first and second input signals, respectively, in accordance with a radio wave communication scheme, and in which the first and second transmission means of each of the plurality of said modules can share a radio transmission means for transmitting said first and second output signals, respectively, in accordance with a radio wave communication scheme.

Also, each of the plurality of said modules can further include a mobile unit detection means for detecting the presence or absence of said mobile unit within a predetermined range from said module.

Also, each of the plurality of said modules or said mobile unit can further include an inter-mobile unit distance measuring section for measuring the distance between mobiles units including said mobile unit based on the result of detection by said mobile unit detection means.

Also, said predetermined route can be a road, a corridor in a building, a route in a factory, a railway, a route in a parking lot, a route in a room, a route in a warehouse, a course of a ship or a route in an airport.

Further, said mobile unit can be an automotive vehicle, a person having a portable telephone, an automatic cart in a factory, a train or an airplane.

Further taking the above-mentioned problems into consideration, the object of another present invention is to provide a coding communication method for a transmission system capable of realizing the above-mentioned five factors with high accuracy and precision with a single system.

For solving the above problems the another present invention offers such a communication coding method for a transmission system comprising a plurality of modules installed at different positions along a predetermined route, each of said plurality of the modules including a receiving means for receiving an input signal and a transmission means for transmitting an output signal on the basis of said input signal in accordance with a predetermined radio scheme, characterized in that each of said plurality of the modules receives and transmits a signal asynchronously or synchronously thereby to transmit the whole or part of the information contained in said signal along the whole or part of said predetermined route.

Figure 1:
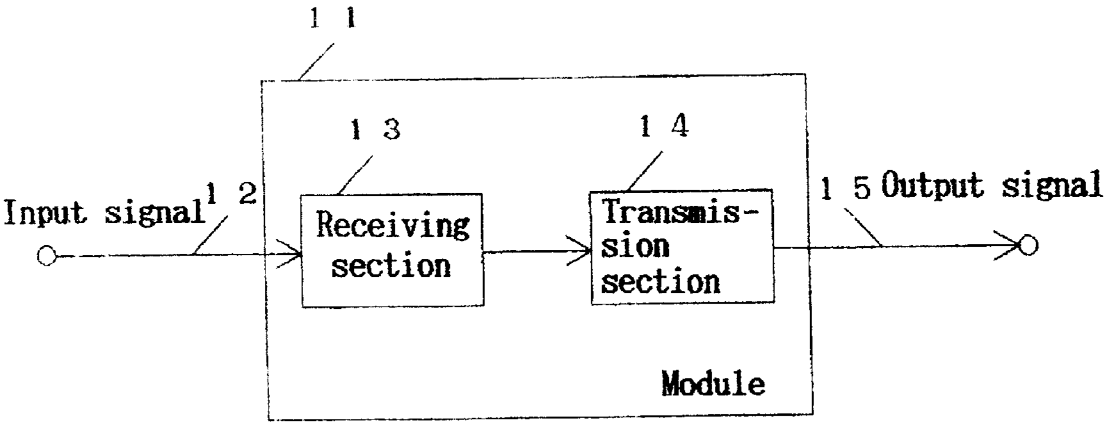
[FIG. 1]

A diagram showing a configuration of a module used in a transmission system according to a first embodiment of the present invention.

[FIG. 2]

(*a*) is a diagram showing an example of a transmission system according to the first embodiment, and (*b*) is a diagram for explaining the operation of the same system.

[FIG. 3]

A diagram showing an example of installation of a plurality of modules 11.

[FIG. 4]

A diagram showing a configuration of a module used in a transmission system according to a second embodiment of the present invention.

[FIG. 5]

A diagram for explaining the operation of a transmission system according to the same embodiment.

[FIG. 6]

A diagram showing a configuration of a module used in a transmission system according to a third embodiment of the present invention.

[FIG. 7]

A diagram for explaining the manner in which the number of types of modules 11[*i*] and the carrier frequency are set.

[FIG. 8]

A diagram showing a configuration of a module used in a transmission system according to a fourth embodiment of the present invention.

[FIG. 9]

A diagram for explaining the operation of a transmission system according to the same embodiment.

[FIG. 10]

A diagram showing a partial configuration of a transmission system according to a fifth embodiment of the invention.

[FIG. 11]

A diagram showing an installation example of a plurality of modules 11*c* according to the same embodiment.

[FIG. 12]

A diagram showing another example installation of a plurality of modules 11*c* according to the same embodiment.

[FIG. 13]

A diagram showing a partial configuration of a transmission system according to a sixth embodiment of the invention.

[FIG. 14]

A diagram showing a configuration of a transmission system according to a seventh embodiment of the invention.

[FIG. 15]

A diagram showing an example time zone according to a scheme in which each module communicates with a mobile unit during the same communication time zone.

[FIG. 16]

A diagram showing an example time zone according to a scheme in which each module communicates with a mobile unit during a specific communication time zone.

[FIG. 17]

A diagram for explaining a scheme in which the destination modules are limited by the limitation of the output of the radio wave radiated from a mobile unit 23*b*.

[FIG. 18]

A diagram showing a partial configuration of a transmission system according to an eighth embodiment of the invention.

[FIG. 19]

A diagram showing a partial configuration of a transmission system according to a ninth embodiment of the invention.

[FIG. 20]

A diagram showing a partial configuration of a transmission system according to a tenth embodiment of the invention.

[FIG. 21]

A diagram showing a partial configuration of a transmission system according to an 11th embodiment of the invention.

[FIG. 22]

A diagram showing a configuration example of a mobile unit detection section 75.

[FIG. 23]

A diagram showing a partial configuration of a transmission system according to a 12th embodiment of the invention.

[FIG. 24]

A diagram for explaining the operation of measuring the following distance between vehicles.

[FIG. 25]

A diagram showing a configuration of a mobile unit support system according to a 13th embodiment of the invention.

[FIG. 26]

A diagram showing a configuration of a mobile unit support system according to a 14th embodiment of the invention.

[FIG. 27]

A diagram showing a configuration of a mobile unit support system according to a 15th embodiment of the invention.

[FIG. 28]

A diagram showing a configuration of a mobile unit support system according to a 16th embodiment of the invention.

[FIG. 29]

A diagram showing a configuration of a mobile unit support system according to a 17th embodiment of the invention.

[FIG. 30]

A diagram showing a configuration of a mobile unit support system according to an 18th embodiment of the invention.

[FIG. 31]

A diagram showing a configuration of a mobile unit support system according to a 19th embodiment of the invention.

[FIG. 32]

A diagram showing a configuration of a mobile unit support system according to a 20th embodiment of the invention.

[FIG. 33]

A diagram showing a configuration of a mobile unit support system according to a 21st embodiment of the invention.

[FIG. 34]

A diagram showing a configuration of a mobile unit support system according to a 22nd embodiment of the invention.

[FIG. 35]

A diagram showing a configuration of a mobile unit support system according to a 23rd embodiment of the invention.

[FIG. 36]

A diagram showing a configuration of a mobile unit support system according to a 24th embodiment of the invention.

[FIG. 37]

A diagram showing a configuration of a mobile unit support system according to a 25th embodiment of the invention.

[FIG. 38]

A diagram showing a configuration of a mobile unit support system according to a 26th embodiment of the invention.

[FIG. 39]

A diagram showing a configuration of a mobile unit support system according to a 27th embodiment of the invention.

[FIG. 40]

A diagram showing a configuration of a mobile unit support system according to a 28th embodiment of the invention.

[FIG. 41]

A diagram showing a configuration of a mobile unit detection device according to a 29th embodiment of the invention.

[FIG. 42]

A diagram showing a configuration of a mobile unit detection device according to a 30th embodiment of the invention.

[FIG. 43]

A diagram showing a configuration of a mobile unit detection device according to a 31st embodiment of the invention.

[FIG. 44]

A diagram showing a configuration of a mobile unit detection device according to a 32nd embodiment of the invention.

[FIG. 45]

A diagram for explaining the measurement of the following distance according to the 32nd embodiment of the invention.

[FIG. 46]

A diagram showing a configuration of a mobile unit detection device according to a 33rd embodiment of the invention.

[FIG. 47]

A diagram for explaining the measurement of the speed and the following distance of a mobile unit according to the 33rd embodiment of the invention.

[FIG. 48]

A diagram showing a configuration of a mobile unit detection device according to a 34th embodiment of the invention.

[FIG. 49]

A diagram showing a configuration of a mobile unit detection device according to a 35th embodiment of the invention.

[FIG. 50]

A diagram for explaining the measurement of the speed and the following distance of a mobile unit according to the 35th embodiment of the invention.

[FIG. 51]

A diagram showing a configuration of a mobile unit detection device according to a 36th embodiment of the invention.

[FIG. 52]

A diagram showing a configuration of a mobile unit detection device according to a 37th embodiment of the invention.

[FIG. 53]

A diagram showing a configuration of a mobile unit detection device according to a 38th embodiment of the invention.

[FIG. 54]

A diagram showing a configuration of a mobile unit detection device according to a 39th embodiment of the invention.

[FIG. 55]

A diagram showing a configuration of a mobile unit detection device according to a 40th embodiment of the invention.

[FIG. 56]

A diagram showing a configuration of another example of the above-mentioned 29th embodiment.

[FIG. 57]

A diagram showing a configuration of another example of the above-mentioned 29th embodiment.

[FIG. 58]

A diagram showing a configuration of another example of the above-mentioned 30th embodiment.

[FIG. 59]

A diagram showing a configuration of another example of the above-mentioned 31st embodiment.

[FIG. 60]

A diagram showing a configuration of another example of the above-mentioned 34th embodiment.

[FIG. 61]

A diagram showing a configuration of another example of the above-mentioned 36th embodiment.

[FIG. 62]

A diagram showing a configuration of another example of the above-mentioned 37th embodiment.

[FIG. 63]

A diagram showing a configuration of another example of the above-mentioned 38th embodiment.

[FIG. 64]

A diagram showing a configuration of another example of the above-mentioned 39th embodiment.

[FIG. 65]

A diagram showing a configuration of still another example of the above-mentioned 39th embodiment.

[FIG. 66]

A diagram for explaining the essential points of the present invention using magnetism as the detection energy.

[FIG. 67]

A diagram for explaining a communication coding method according to a 42nd embodiment of the invention.

[FIG. 68]

A diagram for explaining a communication coding method according to a 43rd embodiment of the invention.

[FIG. 69]

A diagram for explaining a communication coding method according to a 44th embodiment of the invention.

[FIG. 70]

A diagram for explaining a communication coding method according to a 45th embodiment of the invention.

[FIG. 71]

A diagram for explaining a communication coding method according to a 46th embodiment of the invention.

[FIG. 72]

A diagram for explaining a communication coding method according to a 47th embodiment of the invention.

[FIG. 73]

A diagram for explaining a communication coding method according to a 48th embodiment of the invention.

[FIG. 74]

A diagram for explaining a communication coding method according to a 49th embodiment of the invention.

[FIG. 75]

A diagram for explaining a communication coding method according to a 50th embodiment of the invention.

[FIG. 76]

A diagram for explaining a communication coding method according to a 51st embodiment of the invention.

[FIG. 77]

A diagram showing an example of a frame structure for a synchronous scheme according to the invention.

[FIG. 78]

A diagram showing another example of a frame structure for a synchronous scheme according to the invention.

[FIG. 79]

A diagram showing another example of a frame structure for a synchronous scheme according to the invention.

[FIG. 80]

A diagram showing another example of a frame structure for a synchronous scheme according to the invention.

[FIG. 81]

A diagram showing another example of a frame structure for a synchronous scheme according to the invention.

[FIG. 82]

A diagram showing another example of a frame structure for a synchronous scheme according to the invention.

[FIG. 83]

A diagram showing an example of a frame structure for a synchronous coding scheme according to the invention.

[FIG. 84]

A diagram showing another example of a frame structure for a synchronous scheme according to the invention.

[FIG. 85]

A diagram showing another example of a frame structure for a synchronous scheme according to the invention.

[FIG. 86]

A diagram showing another example of a frame structure for a synchronous scheme according to the invention.

[FIG. 87]

A diagram showing another example of a frame structure for a synchronous scheme according to the invention.

[FIG. 88]

Figure 87:
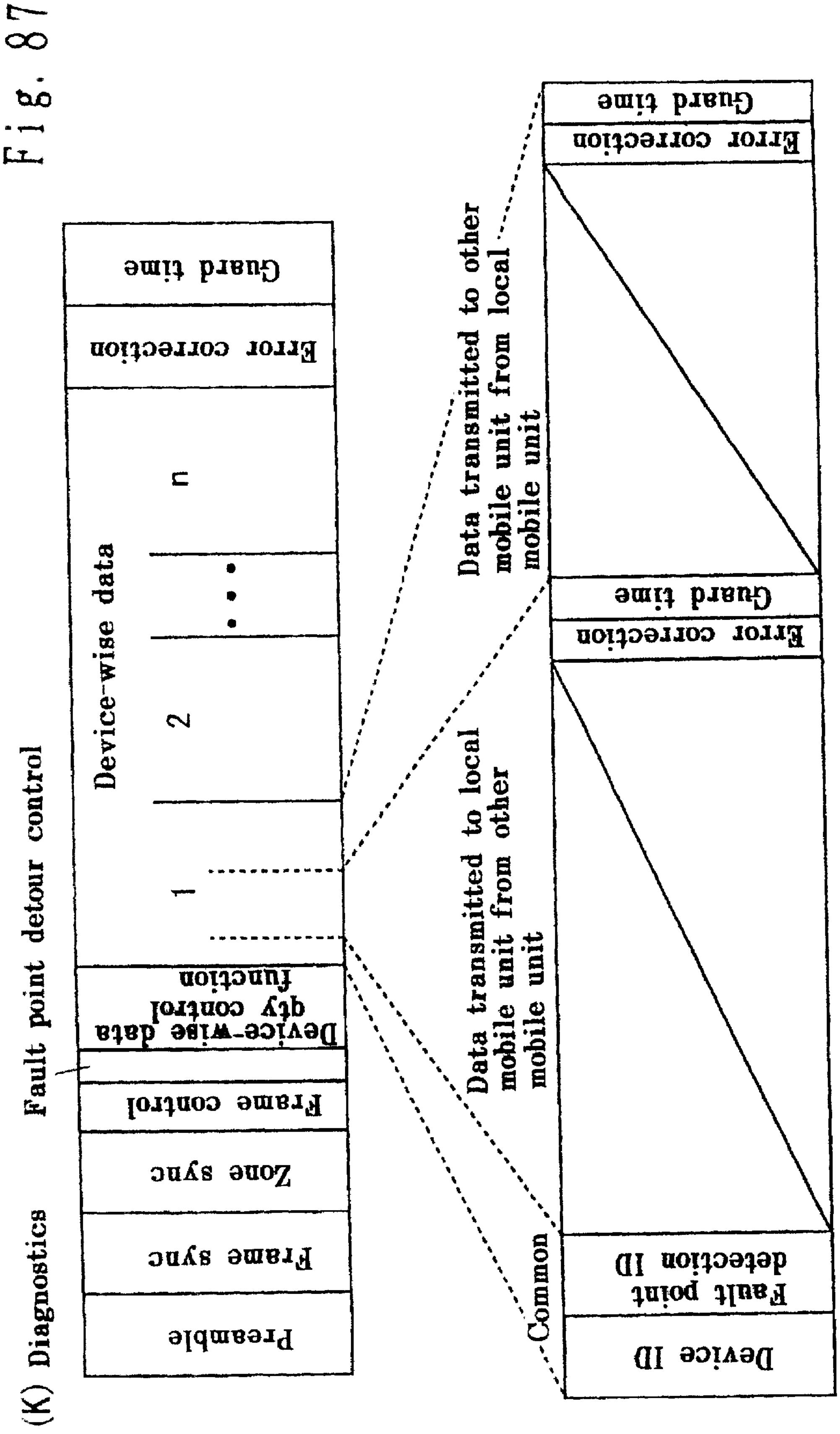

A diagram showing an example method of changing the communication route using the data of FIG. 87 upon detection of a faulty module.

[FIG. 89]

A diagram showing another example method of changing the communication route using the data of FIG. 87 upon detection of a faulty module.

DESCRIPTION OF REFERENCE NUMERALS

11, 11_a_, 11[_i_], 11_b_, 11_c_, 11_a_[_i_], 11_d_, 11_e_, 11_f_, 11_g_, 11_h_, 11_i_, 11_j_, 11_k_ . . . . Modules
12, 12[1] to 12[_i_], 12_b_ . . . . Input signals
13, 13_a_, 13_b_ . . . . Receiving sections
14, 14_a_, 14_b_ . . . . Transmission sections
15, 15[1] to 15[_j_], 15_b_ . . . . Output signals
16 . . . . One lane (of road)
17 . . . . Center line (of a lane of road)
18, 18[_i_] . . . . Receiving antennas
19, 19[_i_] . . . . Input signals
20, 20[_i_] . . . . Receiving sections
21, 21[_i_] . . . . Transmission sections
22, 22[_i_] . . . . Output signals
23, 23[_i_] . . . . Transmission antennas
24 . . . . Transmission area
25, 25_a_, 25_b_, 25_c_, 25_d_, 25_e_ . . . . First receiving sections
26, 26_a_, 26_b_, 26_c_, 26_d_, 26_e_ . . . . First input signals
27, 27_a_, 27_b_, 27_c_, 27_d_, 27_e_ . . . . Second transmission sections
28, 28_a_, 28_b_, 28_c_, 28_d_, 28_e_ . . . . Second output signals
29, 29_a_, 29_b_, 29_c_, 29_d_, 29_e_ . . . . Second receiving sections
30, 30_a_, 30_b_, 30_c_, 30_d_, 30_e_ . . . . Second input signals
31, 31_a_, 31_b_, 31_c_, 31_d_, 31_e_ . . . . First transmission sections
32, 32_a_, 32_b_, 32_c_, 32_d_, 32_e_ . . . . First output signals
33, 33_a_, 33_b_, 33_c_, 33_d_, 33_e_, 33_f_, 33_g_ . . . . Mobile units
34, 34_a_, 34_b_, 34_c_, 34_d_ . . . . Receiving sections
35, 35_a_, 35_b_, 35_c_, 35_d_ . . . . Input signals
36, 36_a_, 36_b_, 36_c_, 36_d_ . . . . Transmission sections
37, 37_a_, 37_b_, 37_c_, 37_d_ . . . . Output signals
38[_i_], 38_a_ . . . . First receiving antennas
39[_i_], 39_a_ . . . . First receiving sections
40[_i_], 40_a_ . . . . First input signals
41[_i_], 41_a_ . . . . Second transmission sections
42[_i_], 42_a_ . . . . Second output signals
43[_i_] . . . . Second transmission antenna
44[_i_] . . . . Second receiving antenna
45[_i_], 45_a_ . . . . Second receiving sections
46[_i_], 46_a_ . . . . Second input signals
47[_i_], 47_a_ . . . . First transmission sections
48[_i_], 48_a_ . . . . First output signals
49[_i_], 49_a_ . . . . First transmission antennas
50 . . . . Receiving antenna
51, 51_a_ . . . . Receiving sections
52, 52_a_ . . . . Input signals
53 . . . . Frequency switching section
54, 54_a_ . . . . Transmission sections
55, 55_a_ . . . . Output signals
56 . . . . Transmission antenna
57 . . . . Reference signal generating section
58 . . . . Sync signal
59 . . . . Reference signal
60, 60_a_ . . . . Sync signal generating sections
61 . . . . Discrimination section
62 . . . . Output section
63 . . . . Input/output signal
64 . . . . Priority information detection section
65 . . . . Priority information adding section
66 . . . . Transmission/receiving antenna
67 . . . . Transmission/receiving antenna
68 . . . . Mobile unit-destined signal extraction section
70 . . . . Received information deletion section
71 . . . . Module ID adding section
72 . . . . Global information extraction section
73 . . . . Local information extraction section
74 . . . . Mobile unit ID adding section
75 . . . . Mobile unit detection section
76 . . . . Mobile unit detection information generating section
77 . . . . Weight measuring section
78, 78_a_, 78_b_ . . . . Decision sections
79 . . . . Laser radiation section
80 . . . . Laser detection section
81 . . . . Magnetic field generating section
82 . . . . Magnetic field change detection section
83 . . . . Mobile unit ID transmission section
84 . . . . Mobile unit ID receiving section
85 . . . . ID detection section
86 . . . . Following distance measuring section
301 . . . . Mobile unit
302, 351 . . . . Detection sources
303 . . . . Information collection unit
304 . . . . Information supply unit
305, 306 . . . . Detection source units
311 . . . . Detection section
312 . . . . Arithmetic processing section
317 . . . . Display section
318 . . . . Movement control section
331 . . . . Movement information processing section
341 . . . . Mobile unit information source
352 . . . . Detection source control section
401 . . . . Energy collection section
402 . . . . Energy conversion section
403 . . . . Energy conversion control section
404 . . . . Energy radiation section
405 . . . . Energy emission section
411 . . . . Mobile unit detection section
412 . . . . Data write section
415 . . . . Clock
431 . . . . Communication mode conversion section
445 . . . . ID generating section
462 . . . . Mobile unit information generating section
501 . . . . Module
502, 506 . . . . Receiving antennas
503, 511 . . . . Transmission antennas
505 . . . . Receiving unit
507 . . . . Receiving section
508 . . . . Discrimination section
510 . . . . Transmission unit
512 . . . . Transmission section
513 . . . . ID adding section
514 . . . . Information source
515 . . . . Mobile unit
516 . . . . Transmission/receiving antenna
530 . . . . Base station

PREFERRED EMBODIMENTS OF THE INVENTION

Now, embodiments of the present invention will be explained with reference to the drawings.

First Embodiment

A transmission system according to a first embodiment of the invention will be explained first with reference to FIG. 1 providing a diagram showing a configuration of a module used in the particular system. In FIG. 1, a receiving section 13 of a module 11 is a receiving unit for receiving an input signal 12 in accordance with a predetermined radio scheme. A transmission section 14 is a transmission unit for transmitting an output signal 15 in accordance with a predetermined radio scheme based on the input signal 12 received by the receiving section 13.

In this connection, the predetermined radio scheme is defined as a scheme for radio communication using radio wave, light (infrared ray, etc.), laser, sound wave or ultrasonic wave. In the case of a radio scheme using the radio wave, the receiving section 13 is a receiving unit configured of a receiving circuit connected with a receiving antenna (receiving-end conversion section), and the transmission section 14 is a transmission unit configured of a transmission circuit connected with a transmission antenna (transmitting-end conversion section). In the case of a radio scheme using light (infrared ray or the like) or laser, the receiving section 13 is a receiving unit configured of a receiving circuit connected with a photo-electric conversion circuit (receiving-end conversion section), and the transmission section 14 is a transmission unit configured of a transmission circuit connected with an electro-optic conversion circuit (transmitting-end conversion section). In the case of a radio scheme using sound wave or ultrasonic wave, on the other hand, the receiving section 13 is a receiving unit configured of a receiving circuit connected with a microphone or a sound collector (receiving-end conversion section), and the transmission section 14 is a transmission unit configured of a transmission circuit connected with a speaker (transmitting-end conversion section). In short, the only difference lies in the receiving-end or the transmitting-end conversion section for converting radio wave, light (infrared ray or the like), laser, sound or ultrasonic wave into electric energy or converting electric energy into radio wave, light (infrared ray or the like), laser, sound wave or ultrasonic wave, respectively, whereas the associated receiving circuit or the associated transmission circuit, as the case may be, is configured based on a common operation mode.

Figure 2:
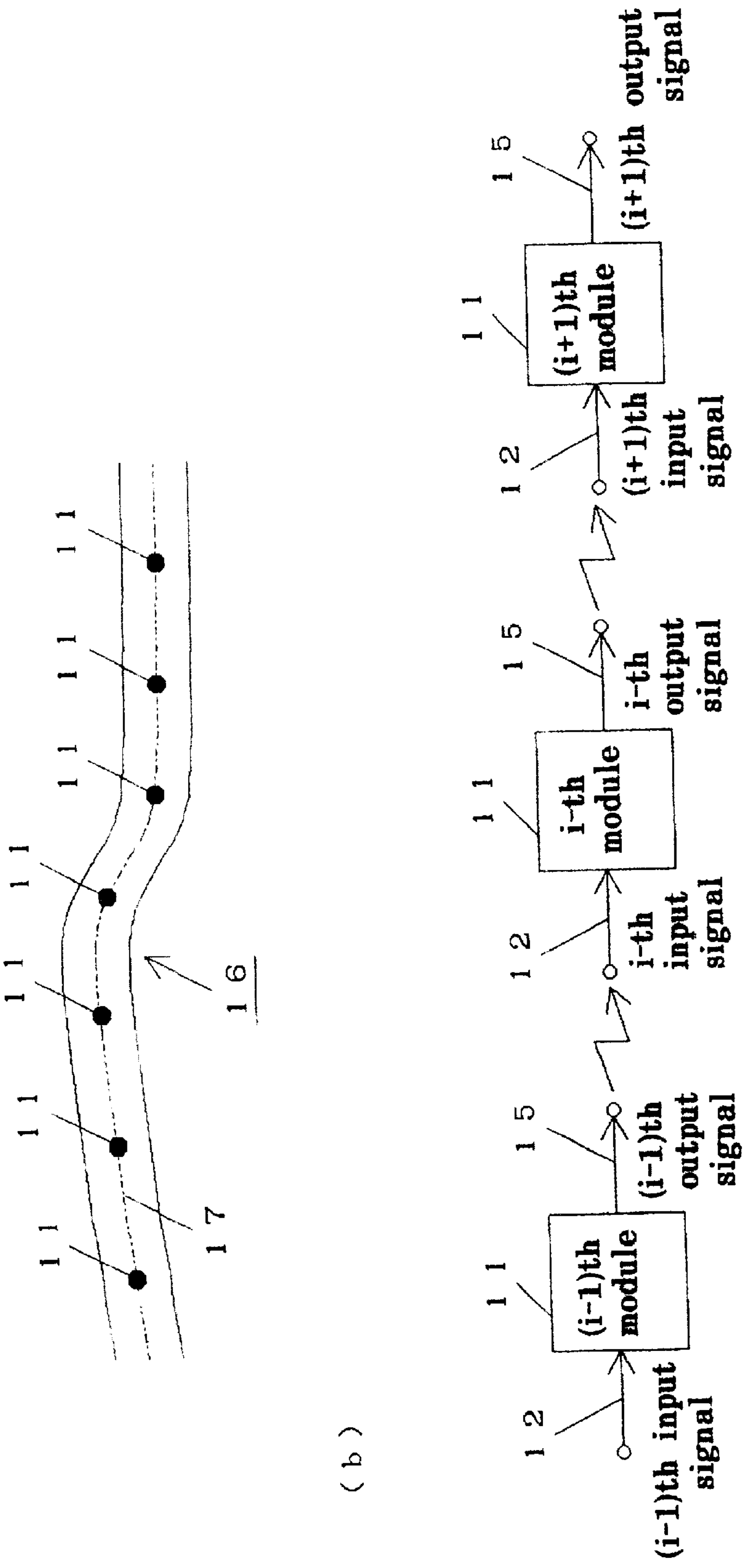

A configuration of a transmission system according to this embodiment will be explained with reference to FIG. 2(*a*) making up a diagram showing an example thereof. A transmission system according to this embodiment is configured by installing a plurality of modules 11 in spaced relation with each other along a center line 17 of a one-lane road 16.

Then, what kind of information is transmitted by the plurality of the modules 11 installed in spaced relation along the center line 17 of the one-lane road 16 will be explained with reference to FIG. 1 and FIG. 2(*b*) making up a diagram for explaining the operation of a transmission system according to this embodiment.

(1) Operation of i-th Module 11

The receiving section 13 receives an (i−1)th output signal 15 transmitted from the transmission section 14 of the (i−1)th module 11 as an i-th input signal 12 in accordance with a predetermined radio scheme.

The transmission section 14 transmits an i-th output signal 15 based on the i-th input signal 12 received from the receiving section 13 in accordance with a predetermined radio scheme. Specifically, the transmission section 14 transmits an i-th output signal 15 containing the information contained in the i-th input signal 12.

(2) Operation of (i+1)th Module 11

The receiving section 13 receives the i-th output signal 15 transmitted from the transmission section 14 of the i-th module 11 as the (i+1)th input signal 12 in accordance with a predetermined radio scheme.

The transmission section 14 transmits the (i+1)th output signal 15 containing the information contained in the (i+1)th input signal 12 received by the receiving section 13 in accordance with a predetermined radio scheme.

In the foregoing description, however, there are n modules 11 (an integer of 2 or more), and i is assumed to be an integer satisfying the relation $1<i<n$.

In this way, the receiving section 13 and the transmission section 14 of each of the plurality of the modules 11 installed along a road receive the input signal 12 and transmit the output signal 15, respectively, in accordance with a predetermined radio scheme, thereby making it possible to transmit the information contained in the particular signals along the particular road.

Figure 3:
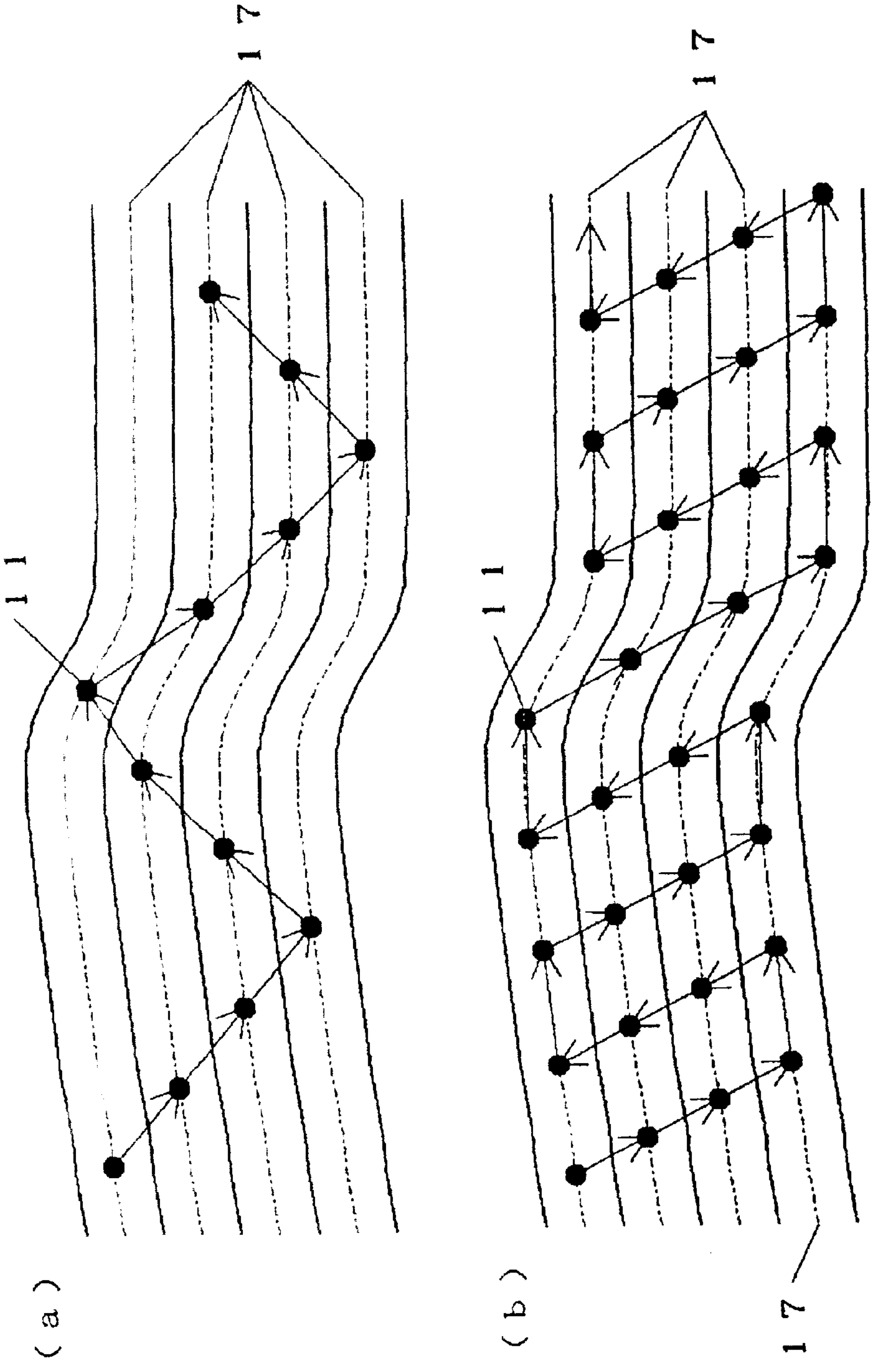

By the way, although the plurality of the modules 11 are installed in spaced relation with each other along the center line 17 of the one-lane road 16 according to this embodiment, the invention is not necessarily limited to this configuration, but the modules can alternatively be installed along either end of the one-lane road 16. As another alternative, in the case where there is a guard rail formed along one of the lanes of the one-lane road 16, the modules 11 can be installed along such a guard rail. As still another alternative, as shown in FIG. 3(*a*) or (*b*), the plurality of the modules 11 can be installed in such a manner that the information transmitted transverse a plurality of lanes. In short, each of the plurality of the modules can be installed at a different position on a road.

Also, although information is transmitted to a destination along a road by transmitting each output signal 15 to an adjacent module 11 according to this embodiment, the invention is not necessarily limited to such a configuration. Instead, the signal can be transmitted, for example, from the i-th module 11 to the (i−1)th module 11, from the (i−1)th module 11 to the (i+2)th module 11, from the (i+2)th module 11 to the (i+1)th module 11, and from the (i+1)th module to the (i+4)th module, so that the information contained in the signal may be transmitted along the road. In short, each of the plurality of the modules is adapted to receive and transmit a signal thereby to transmit the information contained in the signal by relay along the whole or part of the road.

Second Embodiment

Figure 4:
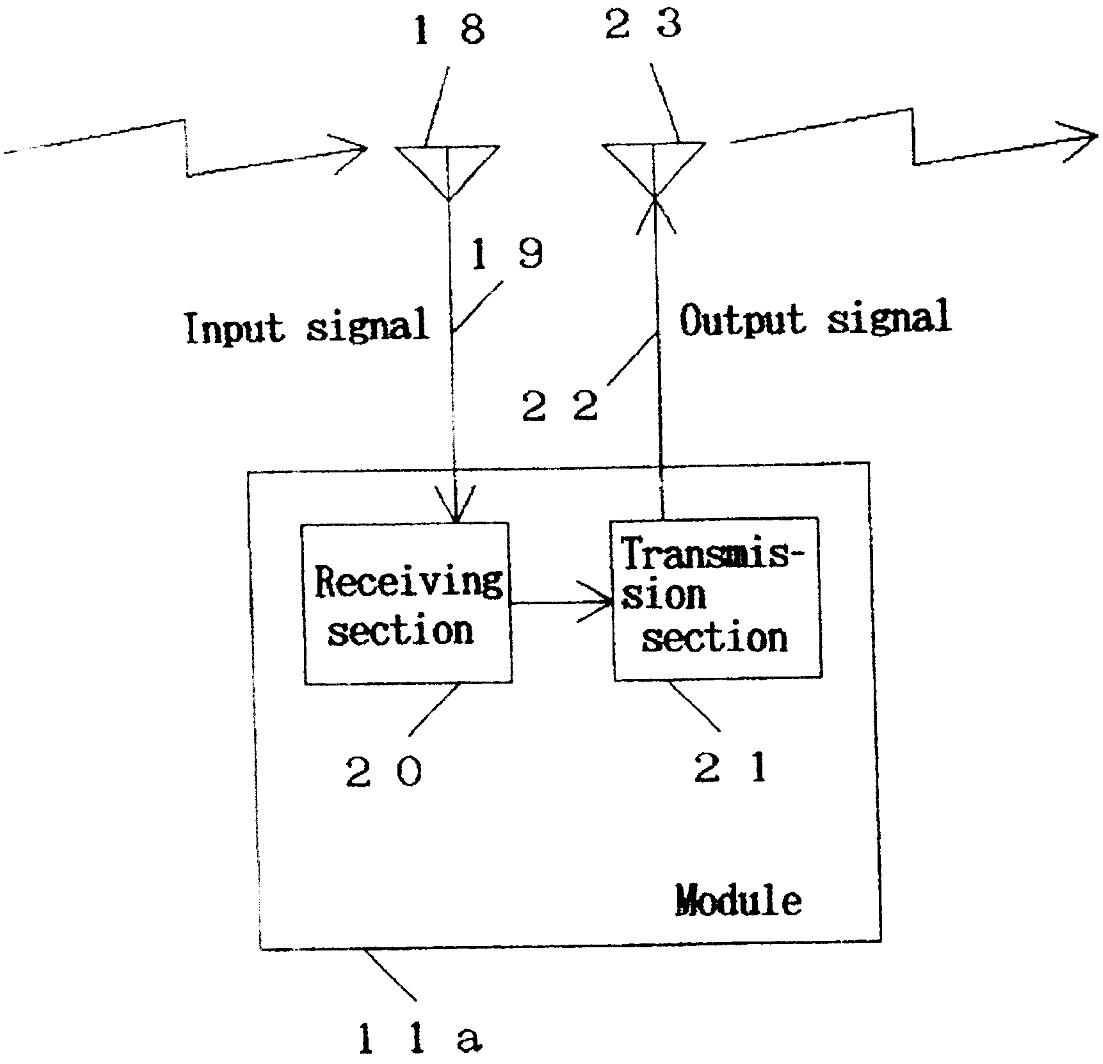

A transmission system according to a second embodiment of the present invention will be explained first with reference to FIG. 4 making up a diagram showing a configuration of a module used in the system. In FIG. 4, a receiving antenna 18 is a receiving antenna for catching a radio wave radiated into space and arriving as electric power. A receiving section 20 is a radio receiving circuit for receiving as an input signal 19 a modulated high-frequency current making up a high-frequency current of a predetermined frequency (hereinafter called also a carrier frequency) modulated by a signal wave current containing the information to be transmitted, and demodulating the signal wave current from the particular input signal 19. By the way, the receiving circuit 20 or the transmission section 21 described later can include an amplifier circuit (not shown) for amplifying the signal wave current with a predetermined amplification factor.

The transmission section 21 is a radio transmission circuit in which a high-frequency current having the same frequency as said predetermined frequency is modulated by the signal wave current demodulated by the receiving section 20 thereby to generate a modulated high-frequency current (output signal 22). The transmission antenna 23 is an antenna for radiating a radio wave into space by the output signal 22 generated by the transmission section 21.

A transmission system according to this embodiment is configured by installing a plurality of modules 11*a* in spaced relationship with each other along a predetermined route. The predetermined route may be a road (roadway or walkway), a corridor in a building, a route in a factor, a railway, a route in a parking lot, a route in a room, a route in a warehouse, a course of a ship, a route in an airport or the like.

In this connection, the radio wave arriving by being caught as an input signal 19 by the receiving antenna 18 corresponds to the input signal or the first input signal received by the receiving means or the first receiving means, respectively, of each module in a transmission system according to this invention. Also, the radio wave radiated into space from the transmission antenna 23 corresponds to the output signal or the first output signal transmitted by the transmission means or the first transmission means, respectively, according to the present invention. And, the receiving antenna 18 and the receiving means 20 correspond to the receiving means or the first receiving means according to the invention, while the transmission section 21 and the transmission antenna 23 correspond to the transmission means or the first transmission means according to the present invention.

Figure 5:
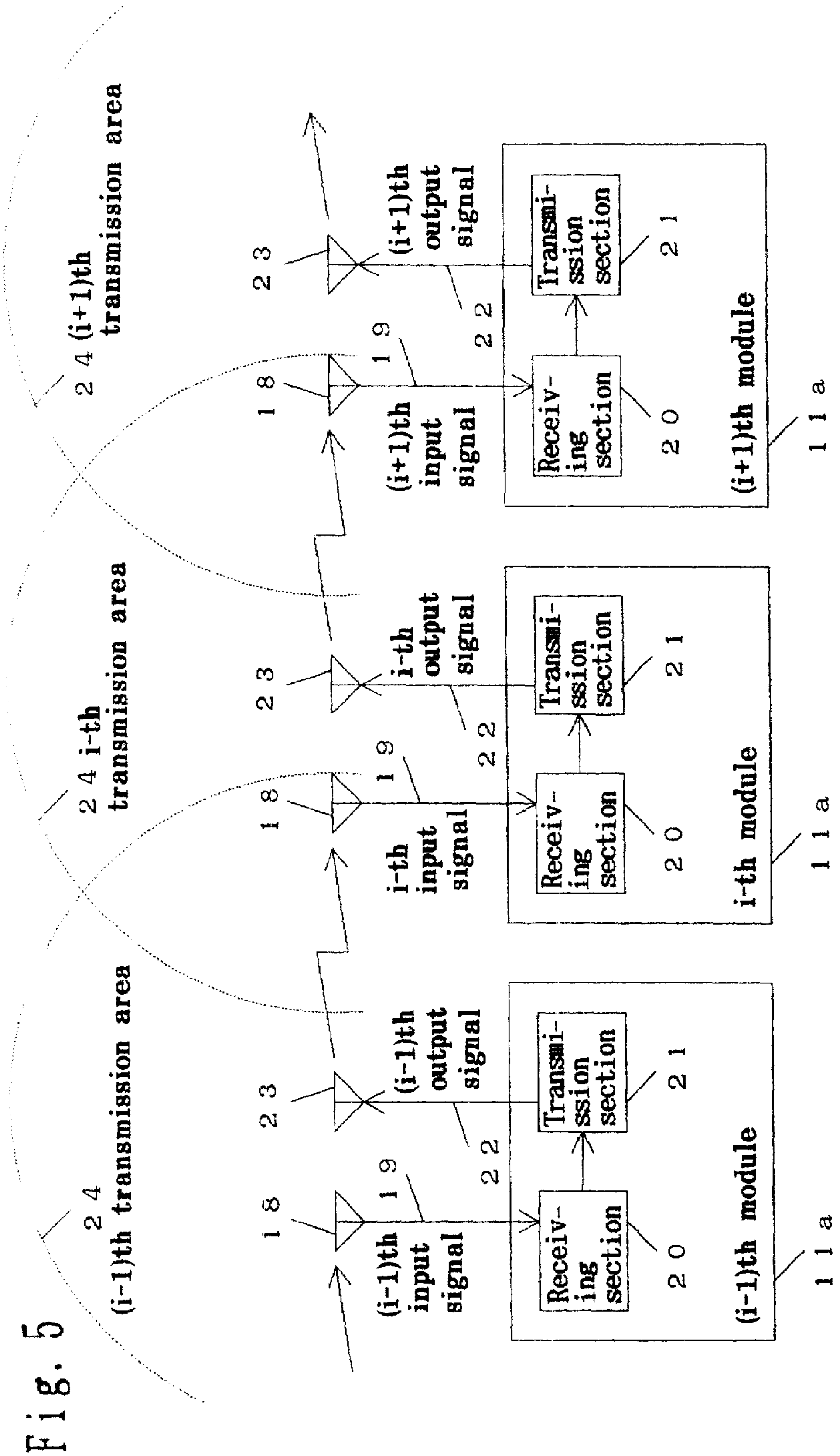

Next, what kind of information is transmitted by a plurality of the modules 11*a* installed along a predetermined route will be explained with reference to FIG. 5 constituting a diagram for explaining the operation of a transmission system according to this embodiment.

(1) Operation of i-th Module 11*a*

The receiving antenna 18 catches the arriving radio wave radiated into spaced as electric power. The receiving section 20 receives as an i-th input signal 19 a modulated high-frequency current which is a high-frequency current of a predetermined frequency modulated by a signal wave current containing the information to be transmitted, from the power caught by the receiving antenna 18. As a result, the i-th module 11*a* receives the radio wave arriving thereat out of all the radio waves radiated from the transmission antenna 23 of the (i−1)th module 11*a* by the (i−1)th output signal 22. And, the receiving section 20 demodulates the signal wave current from the i-th input signal 19.

The transmission section 21 generates a modulated high-frequency current (i-th output signal 22) in such a manner that the high-frequency current having the same frequency as the predetermined frequency of the high-frequency current contained in the i-th input signal is modulated by the signal wave current demodulated by the receiving section 20. The transmission antenna 23 radiates a radio wave into space by the i-th output signal 22.

In this connection, the radio wave output radiated from the transmission antenna 23 of each of the plurality of the modules 11*a* is the output caught only by the receiving antenna 18 of another module 11*a* adjacent thereto. Specifically, each of the plurality of the modules 11*a* is installed in spaced relation along a predetermined route in such a manner that the radio wave radiated from the transmission antenna 23 may be received only by an adjacent one module. In the process, in each module 11*a,* the receiving antenna 18 is located on the side at which the transmitted information arrives, and the transmission antenna 23 is located on the side from which the information is transmitted. The receiving antenna 18 and the transmission antenna 23 are in predetermined spaced relation with each other. The predetermined distance of space is set on the basis of the radio wave output radiated from the transmission antenna 23 and the inter-module distance. As a result, according to this embodiment, as shown in FIG. 5, the range in which the radio waves radiated from the transmission antennas 23 of the (i−1)th, i-th and (i+1)th modules 11*a* can be received is limited to the (i−1)th, i-th and (i+1)th transmission areas 24, respectively.

By setting in this way, the radio wave radiated from the transmission antenna 23 of the i-th module 11*a* is caught only by the receiving antenna 18 of the (i+1)th module 11*a*.

(2) Operation of (i+1)th Module 11*a*

Specifically, the receiving antenna 18 catches the arriving radio wave radiated into space as electric power. The receiving section 20 receives a modulated high-frequency current as the (i+1)th input signal 19 which is a high-frequency current of a predetermined frequency modulated by a signal wave current containing the information to be transmitted, from the electric power caught by the receiving antenna 18. By doing so, the (i+1)th module 11*a* receives the radio wave arriving at the (i+1)th module 11*a* from among all the radio waves radiated from the transmission antenna 23 belonging to the i-th module 11*a*. And, the receiving section 20 demodulates the signal wave current from the (i+1)th input signal 19.

The transmission section 21 generates a modulated high-frequency current ((i+1)th output signal 22) in such a manner that a high-frequency current having the same frequency as the predetermined frequency of the high-frequency current contained in the (i+1)th input signal 19 is modulated by the signal wave current demodulated by the receiving section 20. The transmission antenna 23 radiates a radio wave into space by the (i+1)th output signal 22.

In the foregoing description, there are n (an integer not less than 2) modules 11*a,* and i is assumed to be an integer satisfying the relation $1<i<n$.

As a result, the receiving section 20 and the transmission section 21 belonging to each of the plurality of the modules 11*a* installed along a predetermined route receives the input signal 19 and transmits the output signal 22, respectively, in accordance with a radio wave communication scheme, thereby making it possible to transmit the information contained in the particular signals along the particular predetermined route.

By the way, although a radio wave communication scheme is used as a radio scheme according to this embodiment, the invention is not necessarily limited to such a scheme, but can employ a radio scheme using light, laser, sound wave or ultrasonic wave.

In the case of a radio scheme using light or laser, for example, a photo-electric conversion circuit for catching the arriving light or laser as electric energy is used in place of the receiving antenna 18, and an electro-optic conversion circuit for emitting light or laser into space by an output signal is used in place of the transmission antenna 23. In such a cases, the receiving section extracts the information from the electric energy caught by the photo-electric conversion circuit, and the transmission section generates an output signal containing the information extracted by the receiving section and applies the output signal thus generated to the electro-optic conversion circuit.

In the case of a radio scheme using sound wave or ultrasonic wave, on the other hand, a microphone or a sound collector for catching the arriving sound wave or ultrasonic wave as electric energy is used in place of the receiving antenna 18, and a speaker for transmitting sound wave or ultrasonic wave into space by an output signal is used in place of the transmission antenna 23. In the process, the receiving section extracts the information from the electric energy caught by the microphone or the sound collector, while the transmission section generates an output signal containing the information extracted by the receiving section and applies the output signal thus generated to the speaker.

Third Embodiment

Figure 6:
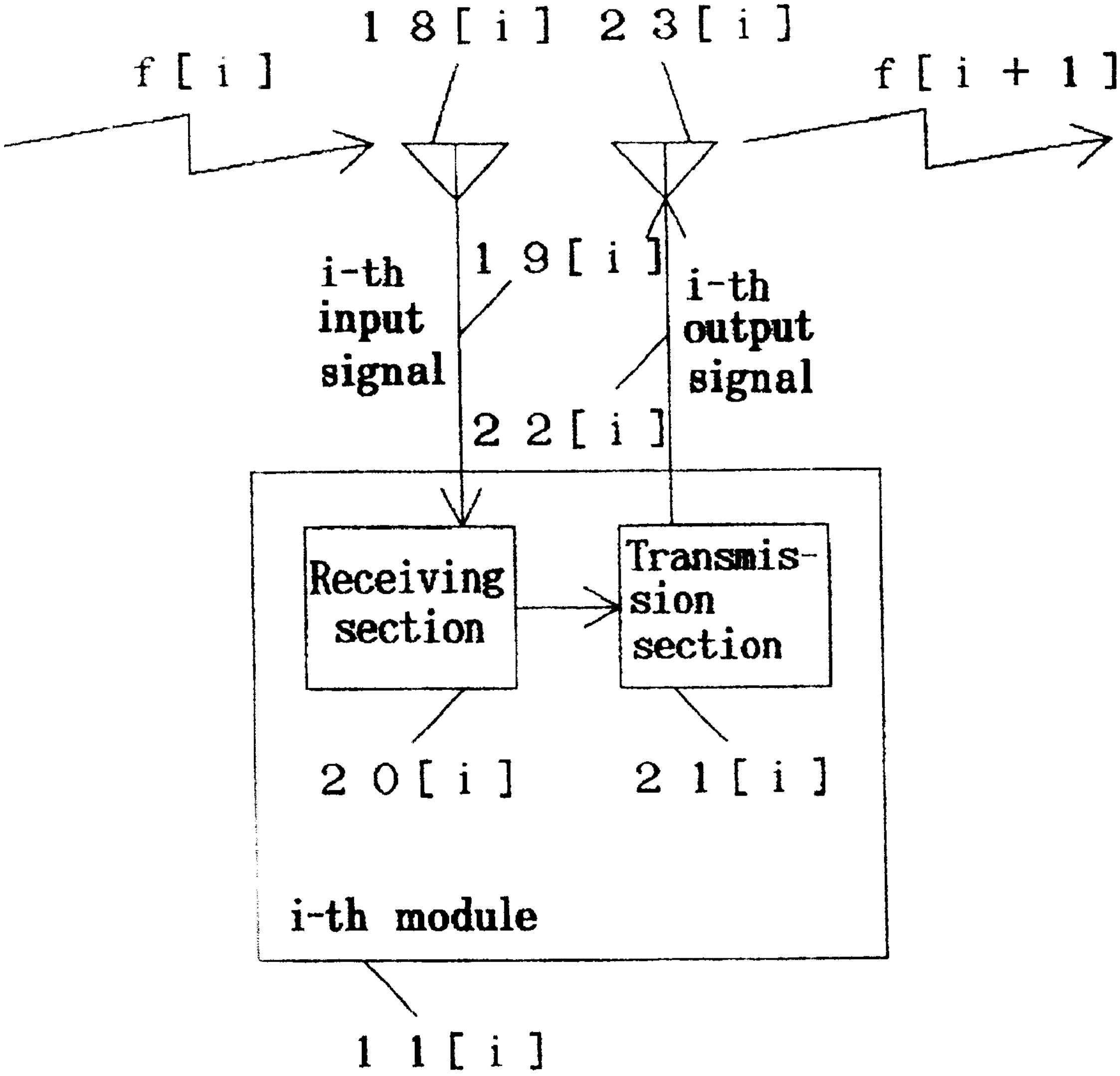

A transmission system according to a third embodiment of the present invention will be explained with reference to FIG. 6 constituting a diagram showing a configuration of a module used in the system. According to this embodiment, a module 11[*i*] is used among i types of modules 11[*i*], where i is an integer not less than 2.

Now, explanation will be made about a configuration of each of i types of modules with reference to a module 11[*i*] as a typical case thereof. In FIG. 6, a receiving antenna 18[*i*] is for catching the arriving radio wave radiated into space as electric power. A receiving section 20[*i*] is a radio receiving circuit for receiving, as an i-th input signal 19[*i*], a modulated high-frequency current which is a high-frequency current having a frequency f[i] modulated by a signal wave current containing the information to be transmitted, from the electric power caught by the receiving antenna 18[*i*], and for demodulating the signal wave current from the i-th input signal 19[*i*]. By the way, the receiving section 20[*i*] or the transmission section 21[*i*] described later can include an amplifier circuit (not shown) for amplifying the signal wave current with a predetermined amplification factor.

The transmission section 21[*i*] is a radio transmission circuit for modulating a high-frequency current having a frequency f[i+1] different from f[i] by a signal wave current demodulated by the receiving section 20[*i*], and for generating a modulated high-frequency current (i-th output signal 22[*i*]). The transmission antenna 23[*i*] is for radiating a radio wave having a carrier frequency f[i+1] by the i-th output signal 22[*i*].

In this connection, the arriving radio wave caught as the input signal 19[*i*] by the receiving antenna 18[*i*] corresponds to the input signal or the first input signal received by the receiving means or the first receiving means, respectively, belonging to each module of a transmission system according to the present invention. Also, the radio wave radiated into space from the transmission antenna 23[*i*] corresponds to the output signal or the first output signal transmitted by the transmission means or the first transmission means, respectively, according to the invention. And, the receiving antenna 18[*i*] and the receiving section 19[*i*] correspond to the receiving means or the first receiving means, respectively, according to the invention, while the transmission section 21[*i*] and the transmission antenna 23[*i*] correspond to the transmission means or the first transmission means, respectively, according to the present invention.

Next, the manner in which the number i of the types of the modules 11[*i*] and the carrier frequency are set will be explained with reference to FIG. 6 and FIG. 7 making up a diagram for explanation thereof. Assume, for example, that n modules including a first module, a second module, a third module, . . . , a j-th module . . . , a n-th module are installed in that order along a predetermined route, where j and n are integers and the predetermined route can be similar to the corresponding one in the transmission system according to the second embodiment of the invention. Also, for the sake of simplicity, assume that the radio wave radiated from the transmission antenna of each of the n modules is a radio wave of an output that can be received by up to the second module before and behind the module having the transmission antenna radiating the particular radio wave. Specifically, as shown in FIG. 7(*a*), assume that the radio wave radiated from the transmission antenna 23[*j*] belong to the j-th module 11[*j*] can be received only by the modules 11[*j*−2], 11[*j*−1], 11[*j*+1] and 11[*j*+2].

In the process, for an interference to be prevented even if the transmission and receiving are started by any of the modules 11[*j*−2], 11[*j*−1], 11[*j*+1] and 11[*j*+2] when a radio wave is radiated from the transmission antenna 23[*i*] belonging to the j-th module 11[*j*], it is at least necessary that each of the modules 11[*j*−2], 11[*j*−1], 11[*j*+1] and 11[*j*+2] receives a radio wave having a carrier frequency different from the carrier frequency f[j+1] of the radio wave radiated from the transmission antenna 23[*j*] belonging to the j-th module 11[*j*].

In view of this, if the modules 11[*j*−2], 11[*j*−1], 11[*j*], 11[*j*+1] and 11[*j*+2] have carrier frequencies respectively related to each other as shown in FIG. 7(*b*), then no interference occurs even if the transmission or receiving is started by these modules at the same time. By setting the frequency relation f[j−2]=f[j+3] and determining [j−2] as [1], it is seen that five types of modules including 11[1], 11[2], 11[3], 11[4] and 11[5] can be provided.

As a result, if i types of modules are prepared, the carrier frequency f[1] of the radio wave caught by the receiving antenna 18[1] belonging to the first module 11[1] installed at an end of the i types of modules is equalized to the carrier frequency f[i+1] of the radio wave radiated from the transmission antenna 23[*i*] belonging to the i-th module 11[*i*] installed at the other end of the i types of modules, then, by installing a plurality of groups each including the i types of modules along a predetermined route of the desired length, information can be transmitted along the particular predetermined route.

Although the present embodiment uses a radio wave communication scheme as a radio scheme, the invention is not necessarily confined to such a scheme, but can employ a radio scheme using light, laser, sound wave or ultrasonic wave with equal effect.

In the case of a radio scheme using light or laser, for example, an optical demultiplexer for catching the light or laser of wavelength λ[i] and converting it into electrical energy can be used instead of the receiving antenna 18[*i*], and a light source for emitting light or laser of wavelength λ[i+1] by an output signal can be used in place of the transmission antenna 23[*i*]. In such a case, the receiving section extracts the information from the electric energy converted by the optical demultiplexer, while the transmission section generates an output signal containing the information extracted by the receiving section and applies the output signal thus generated to the light source thereof.

As an alternative method, an O/E converter for catching the light or laser of wavelength λ and converting it into electrical energy can be used in place of the receiving antenna 18[*i*], and an E/O converter for converting the output signal into the light or laser of wavelength λ in place of the transmission antenna 23[*i*]. In such a case, the receiving section extracts a modulated signal which is a signal of frequency f[i] modulated by a signal containing the information to be transmitted, from the electric energy converted by the O/E converter, and demodulates from the demodulated signal a signal containing the information to be transmitted. The transmission section, on the other hand, modulates the signal of frequency f[i+1] with the signal demodulated by the receiving section and containing the information to be transmitted, and applies the particular demodulated signal as an output signal to the above-mentioned E/O converter.

Also, in the case of a radio scheme using sound wave or ultrasonic wave, a microphone or a sound collector for catching the arriving sound wave or ultrasonic wave as electric energy is used in place of the receiving antenna 18[*i*], and a speaker for radiating a sound wave or an ultrasonic wave into space by an output signal can be used instead of the transmission antenna 23[*i*]. In the process, the receiving section extracts a demodulated signal which is an analog signal of an audio frequency band centered around the frequency f[i] modulated by a signal containing the information to be transmitted, from the electric energy caught by the microphone or the sound collector, and demodulates the signal containing the information to be transmitted.

The transmission section, on the other hand, modulates the analog signal of the audio frequency band centered around the frequency f[i+1] with the signal demodulated by the receiving section, and applies the modulated signal as an output signal to the speaker.

Fourth Embodiment

Figure 8:
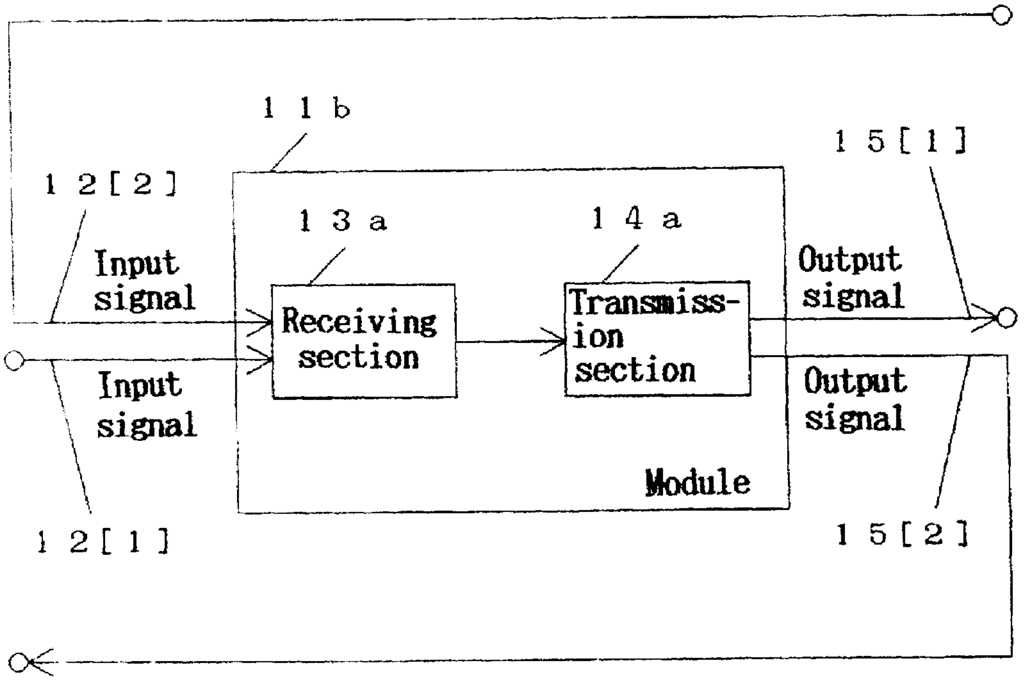

A transmission system according to a fourth embodiment of the present invention will be explained first with reference to FIG. 8 constituting a diagram showing a configuration of a module used with the system. In FIG. 8, a receiving section 13*a* belonging to a module 11*b* is a receiving unit for receiving two types of input signals 12[1], 12[2] in accordance with a predetermined radio scheme. The predetermined radio scheme can be similar to the predetermined radio scheme used with the transmission system according to the first embodiment of the invention.

The transmission section 14*a* is a transmission unit for transmitting two types of output signals 15[1], 15[2] in accordance with a predetermined radio scheme on the basis of the two types of input signals 12[1], 12[2] received by the receiving section 13*a*.

A transmission system according to this embodiment is configured by installing a plurality of modules 11*b* in spaced relationship with each other along a predetermined route. The predetermined route can be similar to the counterpart of the transmission system according to the second embodiment of the invention. In the process, depending on the radio scheme employed, it is necessary to install the plurality of the modules 11*b* along the predetermined route in such a manner that one of the input signals constituting the output signal 15[1] transmitted from the transmission section 14*a* belonging to each of the plurality of the modules 11*b* is received as the input signal 12[1] by the receiving section 13*a* belonging to an adjacent module 11*b* and that the other output signal 15[2] transmitted from the transmission section 14*a* belonging to each of the plurality of the modules 11*b* is received as the input signal 12[2] by the receiving section 13*a* belonging to the other adjacent module 11*b*.

Figure 9:
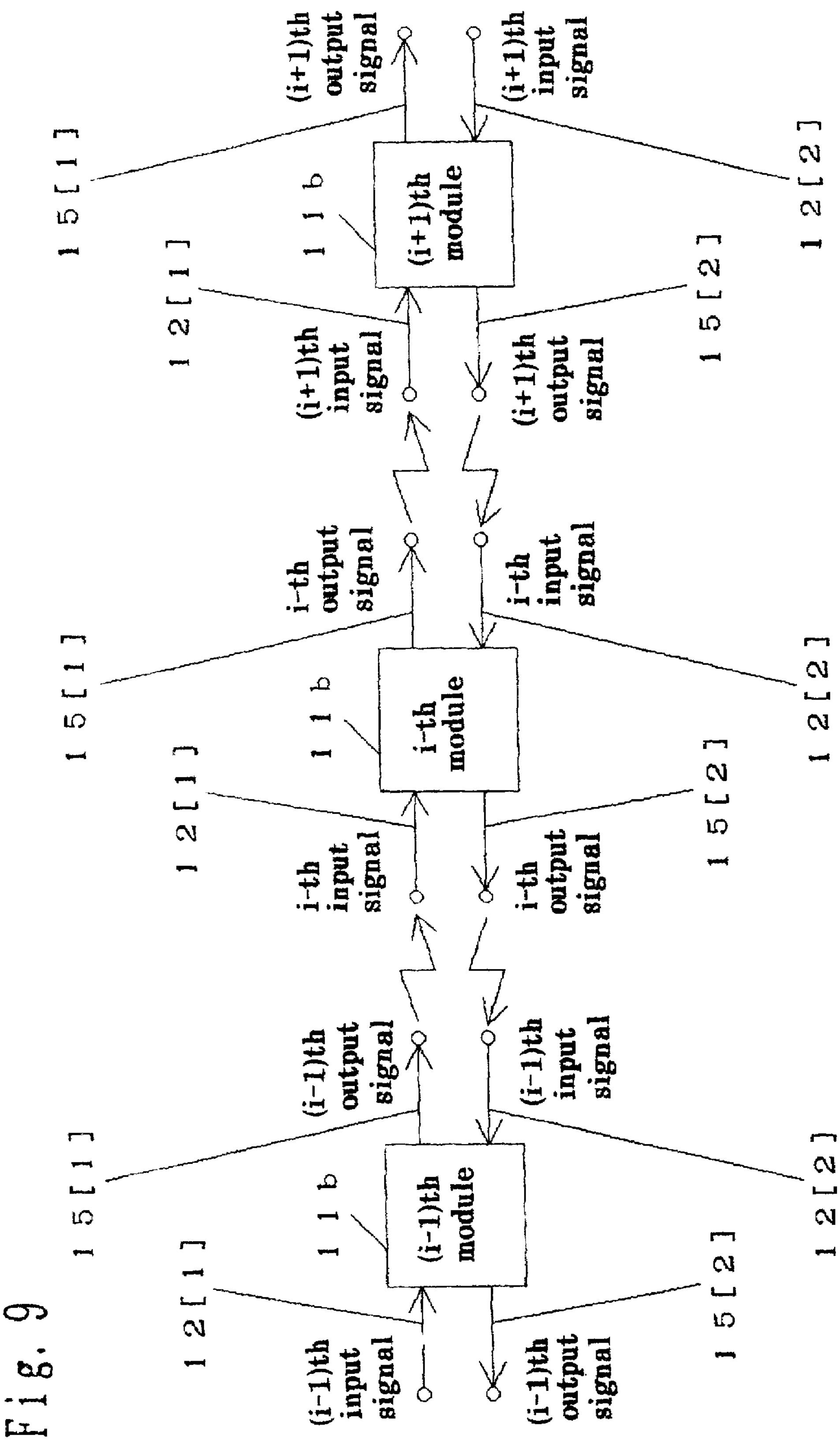

Next, the manner in which information is transmitted by the plurality of the modules 11*b* installed in spaced relation to each other along a predetermined route as described above will be explained with reference to FIG. 8 and FIG. 9 constituting a diagram for explaining a transmission system according to this embodiment.

(1) Operation of i-th Module 11*b*

A receiving section 13*a* receives the (i−1)th output signal as an i-th input signal 12[1] transmitted from a transmission section 14*a* belonging to the (i−1)th module 11*b* in accordance with a predetermined radio scheme. Also, the receiving section 13*a* receives the (i+1)th output signal 15[2] as an i-th input signal 12[2] transmitted from a transmission section 14*a* belonging to the (i+1)th module 11*b* in accordance with a predetermined radio scheme.

The transmission section 14*a* transmits the i-th output signal 15[1] containing the information contained in the i-th input signal 12[1] received by the receiving section 13*a* in accordance with a predetermined radio scheme. Also, the transmission section 14*a* transmits the i-th output signal 15[2] containing the information contained in the i-th input signal 12[2] received by the receiving section 13*a* in accordance with a predetermined radio scheme.

(2) Operation of (i+1)th Module 11*b*

The receiving section 13*a* receives the i-th output signal 15[1] as the (i+1)th input signal 12[1] transmitted from a transmission section 14*a* belonging to the i-th module 11*b* in accordance with a predetermined radio scheme. Also, the receiving section 13*a* receives the (i+2)th output signal 15[2] (not shown) as the (i+1)th input signal 12[2] transmitted from the transmission section 14*a* belonging to the (i+2)th module 11*b* in accordance with a predetermined radio scheme.

The transmission section 14*a,* on the other hand, transmits the (i+1)th output signal 15[1] containing the information contained in the (i+1)th input signal 12[1] received by the receiving section 13*a* thereof in accordance with a predetermined radio scheme. Also, the transmission section 14*a* transmits the (i+1)th output signal 15[2] containing the information contained in the (i+1)th input signal 12[2] received by the receiving section 13*a* in accordance with a predetermined radio scheme.

In the foregoing description, it is assumed that there are n (an integer not less than 2) modules 11*b,* and that i is an integer satisfying the relation 1<i<n.

As a result, the receiving section 13*a* and the transmission section 14*a* belonging to each of the plurality of the modules 11*b* installed along a predetermined route receive the input signals 12[1], 12[2] and transmit the output signals 15[1], 15[2], respectively, in accordance with a predetermined radio scheme, so that the information contained in the particular signals can be transmitted bidirectionally along the predetermined route.

According to the present embodiment, as described above, each of the plurality of the modules 11*b* includes the the receiving section 13*a* for receiving the two types of the input signals 12[1], 12[2] and the transmission section 14*a* for transmitting the two types of the output signals 15[1], 15[2]. The invention, however, is not necessarily confined to such a configuration. Instead, each of the plurality of the modules can include a receiving section for receiving i types of input signals 12[1], . . . , 12[2] (i: natural number) and a transmission section for transmitting j types of output signals 15[1], . . . , 15[*j*] (j: natural number) on the basis of the i types of the input signals 12[1], . . . , 12[*i*] received by the receiving section. Also, i may be equal to j. In short, the receiving means belonging to each of the plurality of the modules in a transmission system according to this invention receives, as input signals thereto, the output signal transmitted from the transmission means belonging to another module adjacent thereto having the particular receiving means, and the output signal transmitted from the transmission means belonging to at least still another module adjacent thereto and different from said another module. The transmission means belonging to each of the plurality of the modules, on the other hand, transmits an output signal in such a manner as to be received by the receiving means belonging to at least still another module adjacent to the first module having the first receiving means and different from the module having the transmission means that has transmitted the output signal received as an input signal by the receiving means belonging to the first module.

Fifth Embodiment

A transmission system according to a fifth embodiment of the invention will be explained with reference to FIG. 10 providing a diagram showing a configuration of a part of the system.

First, a configuration of a module 11$c$ will be explained. A first receiving section 25 is a receiving unit for receiving a first input signal 26 in accordance with a predetermined radio scheme. The predetermined radio scheme may be similar to the predetermined radio scheme used in the transmission system according to the first embodiment of the invention.

A second transmission section 27 is a transmission unit for transmitting a second output signal 28 in accordance with a predetermined radio scheme on the basis of the first input signal received by the first receiving section 25. A second receiving section 29 is a receiving unit for receiving a second input signal 30 in accordance with a predetermined radio scheme. A first transmission section 31 is a transmission unit for transmitting a first output signal 32 in accordance with a predetermined radio scheme on the basis of the first input signal received by the first receiving section 25 and the second input signal 30 received by the second receiving section 29.

Next, a configuration of a mobile unit 33 will be explained. The mobile unit 33 is an automotive vehicle. A receiving section 34 is a receiving unit for receiving a second output signal 28 as an input signal 35 transmitted from the second transmission section 27 belonging to the module 11$c$ in accordance with a predetermined radio scheme. A transmission section 36 is a transmission unit for transmitting an output signal 37 containing the information to be transmitted in accordance with a predetermined radio scheme. The output signal 37 is received as the second input signal 30 by the second receiving section 29 belonging to the module 11$c$.

Figure 11:
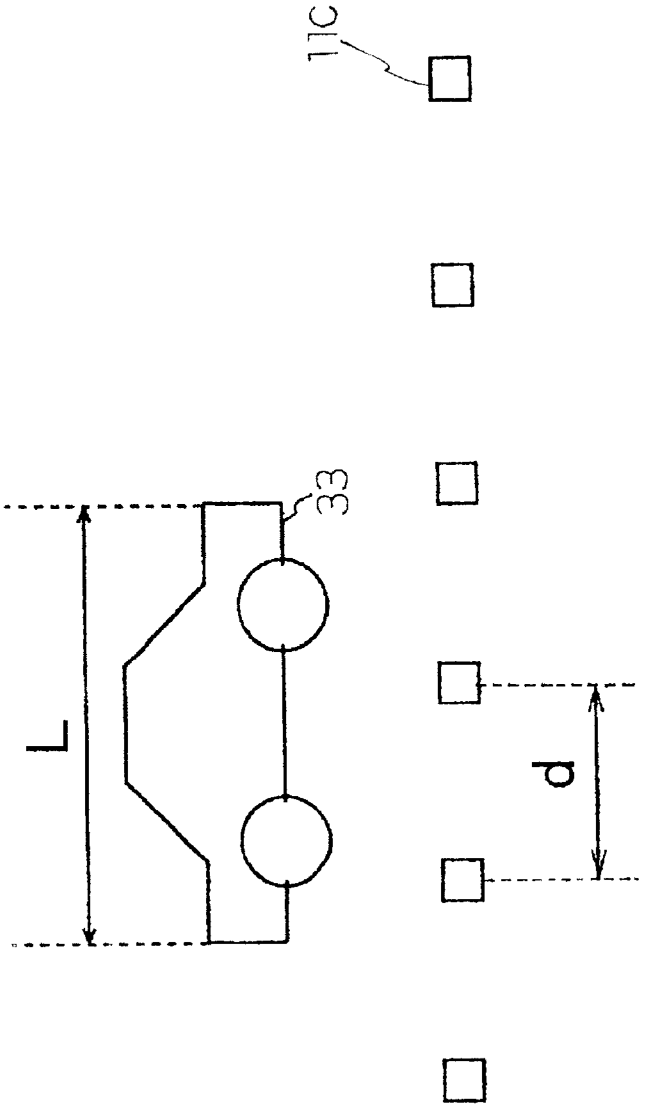

A transmission system according to this embodiment, like that of the first embodiment of the invention, is configured of a plurality of the modules 11$c$ installed in spaced relationship with each other along a road. In such a case, as shown in FIG. 11, let the length of the mobile unit 33 along the direction of movement thereof be L, and the distance between adjacent ones of the plurality of the modules 11$c$ be d. Then, the plurality of the modules 11$c$ are installed along the road in such a manner as to satisfy the relation $L>d$. In other words, each of the plurality of the modules 11$c$ is installed with an equal distance d apart from each other along the road in such a manner that at least one of the modules 11$c$ is located within the length of the mobile unit 33 along the direction of movement thereof.

Next, the operation of this embodiment will be explained.

(1) Operation of Module 11$c$

Figure 10:
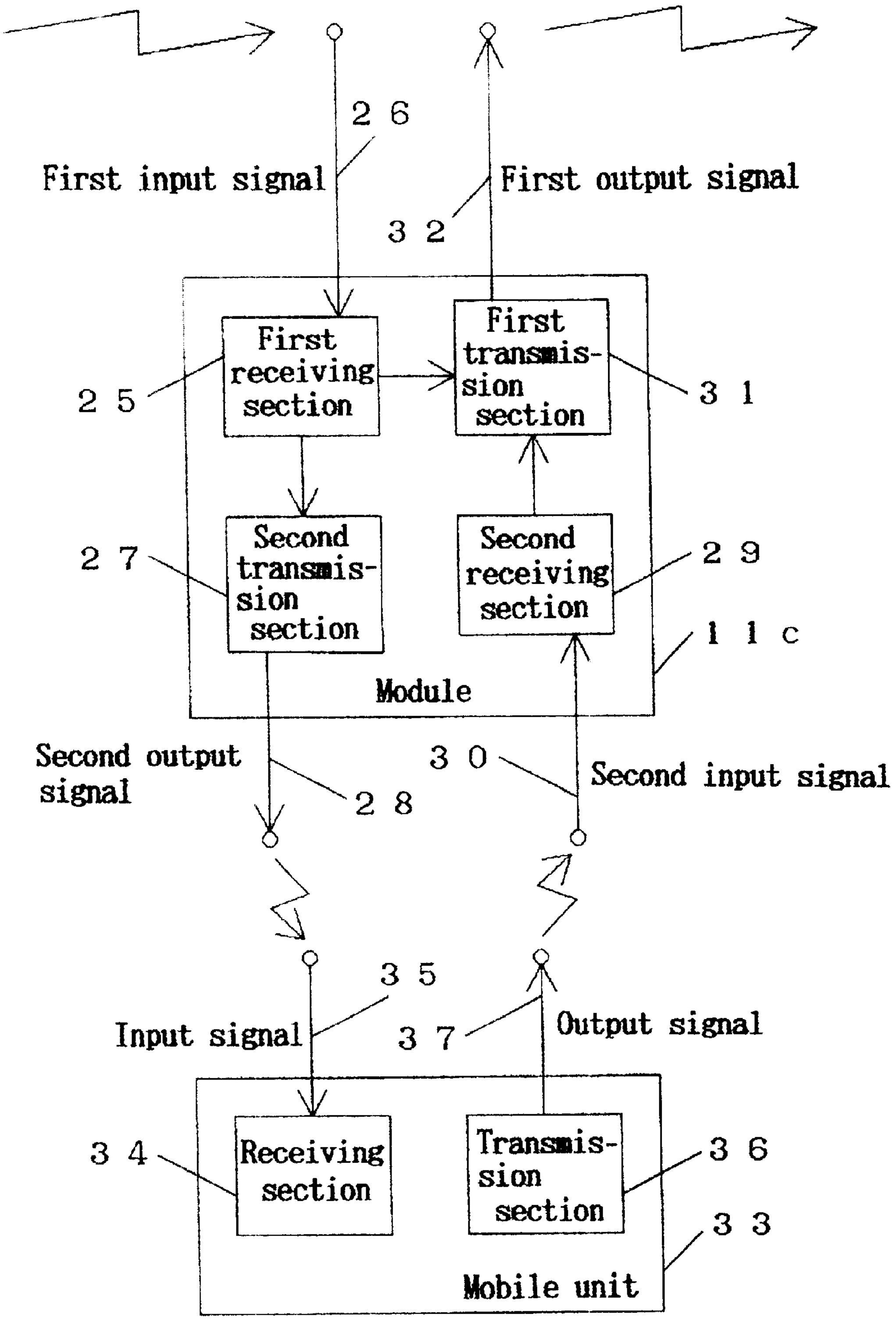

In FIG. 10, the first receiving section 25 receives a first output signal 32 (not shown) as a first input signal 26 transmitted from a first transmission section 31 belonging to another module 11$c$ adjacent to the transmitting end in accordance with a predetermined radio scheme. A second transmission section 27 transmits a second output signal 28 in accordance with a predetermined radio scheme on the basis of the first input signal 26 received by the first receiving section 25. Specifically, the second transmission section 27 transmits the second output signal 28 containing the entire information contained in the first input signal 26 received by the first receiving section 25. The second receiving section 29, on the other hand, receives the second input signal 30 in accordance with a predetermined radio scheme. The first transmission section 31 transmits in accordance with a predetermined radio scheme the first output signal 32 containing the information contained in the first input signal 26 received by the first receiving section 25 and/or the information contained in the second input signal 30 received by the second receiving section 29. The first output signal 32 is received as the first input signal 26 by the first receiving section 25 belonging to still another module 11$c$ (not shown) adjacent to the transmitting end.

(Operation of Mobile Unit 33)

1. Receiving Operation

A receiving section 34 receives the second output signal 28 as an input signal 35 transmitted from the second transmission section 27 belonging to the module 11$c$. By doing so, the mobile unit 33 can receive the information transmitted along the road.

2. Transmission Operation

In the presence of information to be transmitted, the transmission section 36 belonging to the mobile unit 33 transmits an output signal 37 containing the particular information to be transmitted in accordance with a predetermined radio scheme. This output signal 37 is received as the second input signal 30 by the second receiving section 29 belonging to the module 11$c$. As a result, the information to be transmitted is transmitted along the particular route as the necessary information.

As described above, each of the plurality of the modules 11$c$ installed along a road transfers the information transferred from another module 11$c$ to still another module 11$c$. In this way, the particular information can be transmitted along the road, while at the same time making it possible to transmit along the same road the information received from the moving mobile unit 33. Further, the information transmitted along the road can be retransmitted to the mobile unit 33.

By the way, the operation of the first receiving section 25 and the first transmission section 31 belonging to a module 11$c$ with respect to another module 11$c$ may be similar to the operation of the receiving means (the receiving section 13 in FIG. 1, the receiving antenna 18 and the receiving section 20 in FIG. 4, the receiving antenna 18[$i$] and the receiving section 20[$i$] in FIG. 6 or the receiving section 13$a$ in FIG. 8) and the transmission means (the transmission section 14 in FIG. 1, the transmission section 21 and the transmission antenna 23 in FIG. 4, the transmission section 21[$i$] and the transmission antenna 23[$i$] in FIG. 6, or the transmission section 14$b$ in FIG. 8), respectively, in the first to fourth embodiments.

Also, although the mobile unit 33 equipped with the receiving section 34 and the transmission section 36 according to the present embodiment is an automotive vehicle, the invention is not necessarily limited to it, but is equally applicable to a person having a portable telephone, an automatic cart in a factory, a train, a ship or an airplane. In short, the invention is applicable to any mobile unit comprising the receiving section 34 and the transmission section 36.

Also, although the plurality of the modules 11*c* are installed along a road according to the present embodiment, they may alternatively be installed along a predetermined route as in the transmission system according to the second embodiment of the invention.

Figure 12:
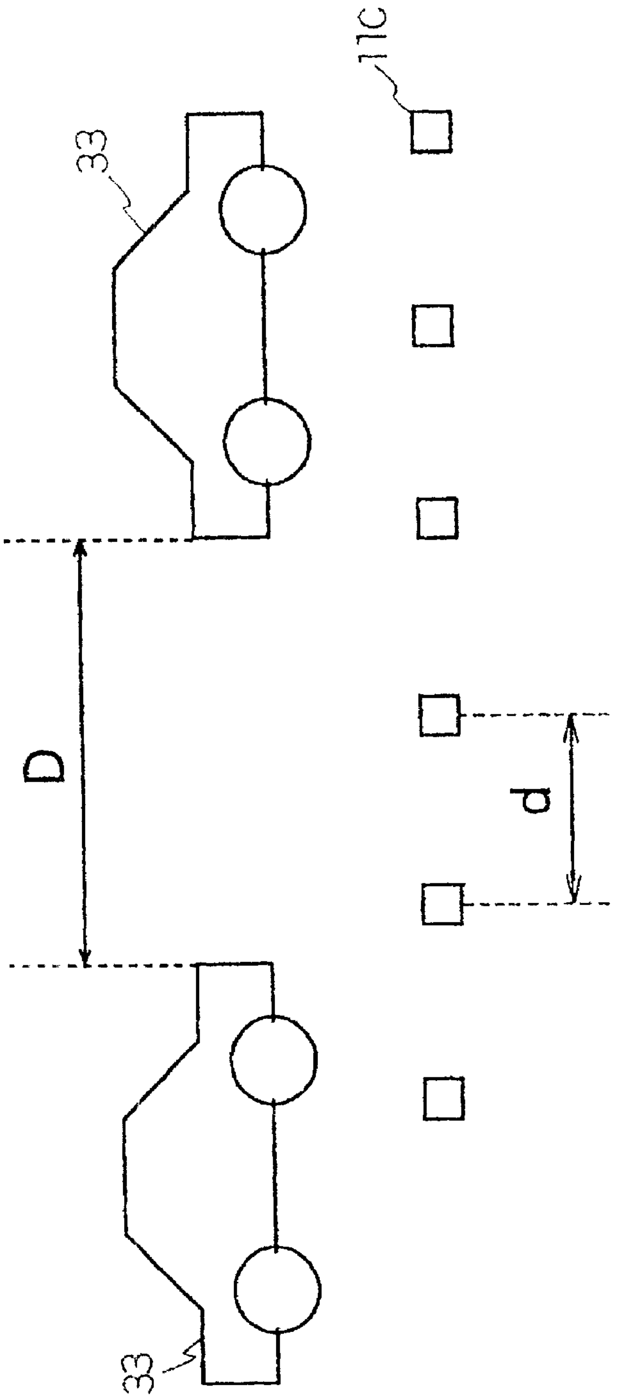

Also, unlike in the present embodiment in which each of the plurality of the modules 11*c* is installed along a road in such a manner as to hold the relation L>d, each of the plurality of the modules 11*c* can alternatively be installed in a manner to satisfy the relation D>d where D is the minimum following distance between the automotive vehicles running automatically as shown in FIG. 12.

Also, although the second transmission section 27 transmits the second output signal 28 containing the entire information contained in the first input signal 26 received by the first receiving section 25 according to the present embodiment, the invention is not necessarily limited to such a case, but is equally applicable to a case in which the module 11*c* further includes an extraction section (not shown) for extracting the information on the mobile unit 33 from the information contained in the first input signal received by the first receiving section 25, so that the second transmission section 27 may transmit the second output signal 28 containing the information extracted by the extraction section. In short, the second transmission section 27 can transmit the second output signal 28 containing the whole or part of the information contained in the first input signal 26 received by the first receiving section 25.

Further, the first receiving section 25 and the second receiving section 29 can share a receiving unit of a common design. In similar fashion, the first transmission section 31 and the second transmission section 27 may share a transmission unit of a common design.

Sixth Embodiment

Figure 13:
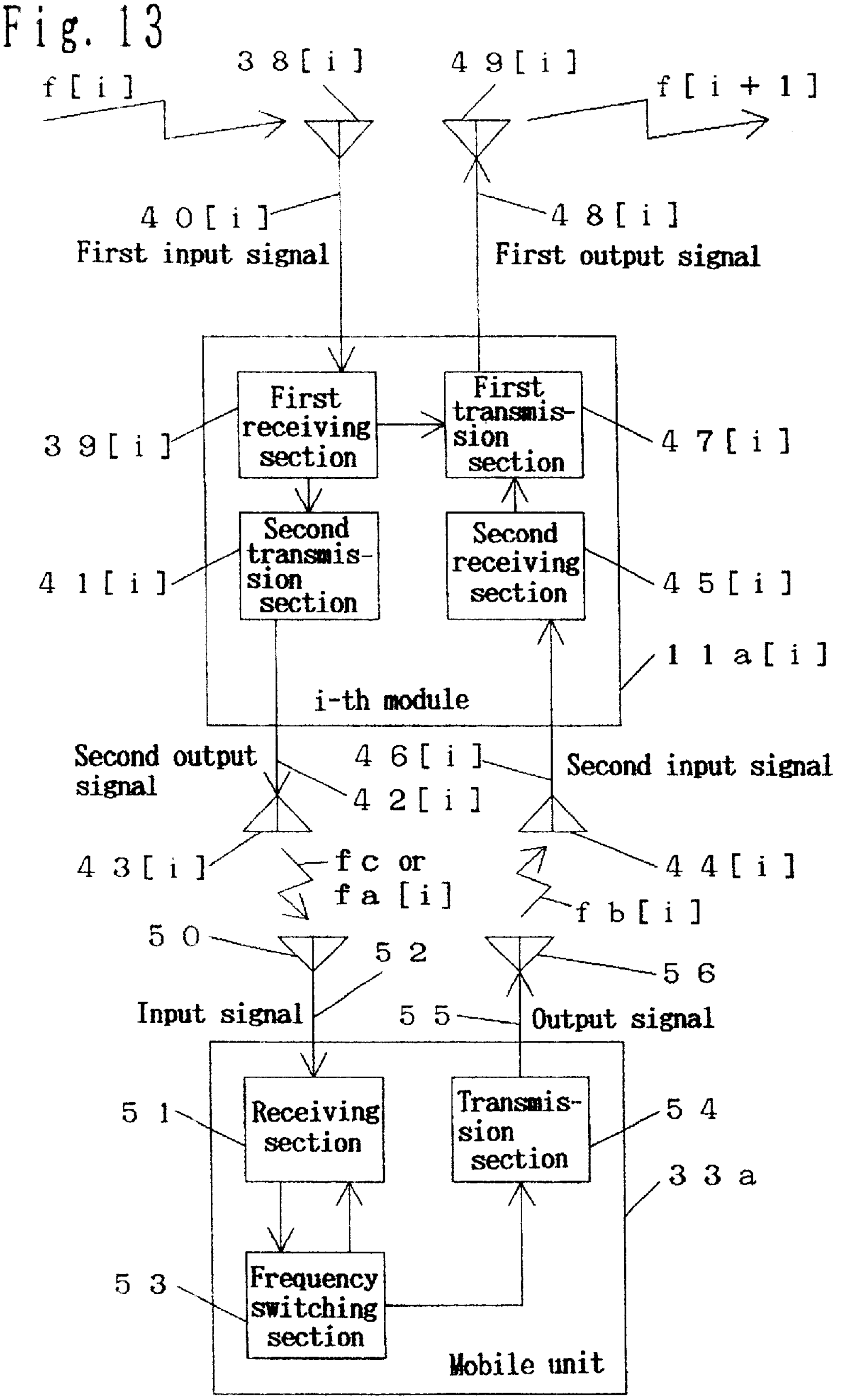

A transmission system according to a sixth embodiment of the present invention will be explained below with reference to FIG. 13 constituting a diagram showing a partial configuration thereof. This embodiment is similar to the third embodiment of the transmission system according to the invention, except for the mobile unit and the functions with respect to the mobile unit. Specifically, the transmission system according to this embodiment uses i types of modules 11*a*[1] to 11*a[i]*.

First, a configuration of a module 11*a[i]* as a representative one of the modules will be explained. In FIG. 13, a first receiving antenna 38[*i*] is for catching the arriving radio wave radiated into space as electric power. A first receiving section 39[*i*] is a radio receiving circuit for receiving a modulated high-frequency current as the i-th first input signal 40[*i*] which is a high-frequency current of frequency f[i] modulated by a signal wave current containing the information to be transmitted, from the electric power caught by the first receiving antenna 38[*i*], and for demodulating the signal wave current from the i-th first input signal 40[*i*]. By the way, the first receiving section 39[*i*] or the first transmission section 47[*i*] described later can include an amplifier circuit (not shown) for amplifying the signal wave current with a predetermined amplification factor.

The second transmission section 41[*i*] is a radio transmission circuit for modulating a high-frequency current of frequency fa[i] different from f[i] and f[i+1] with a signal wave current demodulated by the first receiving section 39[*i*] thereby to generate a modulated high-frequency signal (i-th second output signal 42[*i*]), and/or for modulating a high-frequency current of frequency fc with a signal wave current of a pilot signal described later thereby to generate a modulated high-frequency current (i-th second output signal 42[*i*]). The pilot signal is the one containing the information on the carrier frequency fa[i] of the radio wave radiated from the second transmission antenna 43[*i*] and the carrier frequency fb[i] of the radio wave caught by the second receiving antenna 44[*i*] and processed as the second input signal 46[*i*] by the second receiving section 4[*i*]. The second transmission antenna 43[*i*] is for radiating a radio wave into space by the second output signal 42[*i*]. The frequency fc, however, is shared by all the i-type modules, and the output of the radio wave of the frequency fc can be received only by a single mobile unit 33*a* located in the neighborhood of the module radiating the particular radio wave. Also, fc is assumed to be a unique frequency different from any the frequencies of the first group including f[1], f[2], . . . , f[i+1], the second group including fa[1], fa[2], . . . , fa[i+1], and the third group including fb[1], fb[2], . . . , fb[i+1]. Further, each frequency of the first, second and third groups is assumed to be different from each other.

The second receiving antenna 44[*i*] is for catching the arriving radio wave radiated into space as electric power. The second receiving section 45[*i*] is a radio receiving circuit for receiving a modulated high-frequency current as the i-th second input signal 46[*i*] which is a high-frequency current of frequency fb[i] modulated with a signal wave current containing the information to be transmitted, from the electric power caught by the receiving antenna 44[*i*], and for demodulating the signal wave current from the i-th second input signal 46[*i*]. By the way, the second receiving section 45[*i*] or the first transmission section 47[*i*] described layer may include an amplifier circuit (not shown) for amplifying the signal wave current with a predetermined amplification factor. The first transmission section 47[*i*] is a radio transmission circuit for modulating a high-frequency current having a frequency f[i+1] with the signal wave current demodulated by the first receiving section 39[*i*] thereby to generate a modulated high-frequency current (i-th first output signal 48[*i*]), and/or for modulating the high frequency current of frequency f[i+1] with the signal wave current demodulated by the second receiving section 45[*i*] thereby to generate a modulated high-frequency current (i-th first output signal 48[*i*]). The first transmission antenna 49[*i*] is for radiating the radio wave of carrier frequency f[i+1] by the i-th first output signal 48[*i/*.

Now, a configuration of the mobile unit 33*a* will be explained. The mobile unit 33*a* is an automotive vehicle. The receiving antenna 50 is for catching the arriving radio wave radiated into space as electric power. The receiving section 51 is a radio receiving circuit for receiving a modulated high-frequency current as an input signal 52 which is a high-frequency current of frequency fc modulated by a signal wave current of a pilot signal and/or a modulated high-frequency current which is a high-frequency current having a frequency fa[i] modulated with a signal wave current containing the information to be transmitted, from the electric power caught by the receiving antenna 50, and for demodulating the pilot signal and/or the signal wave current from the input signal 52. A frequency switching section 51 is a circuit for switching the frequency of the receiving section 51 and/or the transmission section 54 on the basis of the pilot signal demodulated by the receiving section 51. A high-frequency current having frequency fb[i] switched by the frequency switching section 53 is modulated by the signal wave current containing the information to be transmitted thereby to generate a modulated high-frequency current (output signal 55). The transmission antenna 56 is for radiating a radio wave of the carrier frequency fb[i] by the output signal 55 thereof.

A transmission system according to this embodiment, like the corresponding ones according to the first and third embodiments of the invention, is configured of a plurality of groups of i types of modules installed in spaced relationship with each other along a road.

Now, the operation of this embodiment will be explained. The number of types i of the modules 11*a*[i] and the carrier frequency are set in a manner similar to the one in the transmission system according to the third embodiment of the invention. Also, the inter-module transfer is can be accomplished in a manner similar to that in the embodiments described above.

Now, explanation will be made about the operation of communication between the mobile unit 33*a* and the module 11*a[i]*.

(1) Operation for Starting Communication

A radio wave having a carrier frequency fc is radiated at regular time intervals from a second antenna belonging to each of the plurality of the modules installed along a road.

A receiving section 51 belonging to the mobile unit 33*a* moving along the road receives a modulated high-frequency current as an input signal 52 which is a high-frequency current of frequency fc modulated by a signal wave current containing a pilot signal, from the power caught by the receiving antenna 50, and demodulates the pilot signal from the input signal 52. In the process, the mobile unit 33*a* catches the radio wave transmitted by the mobile nearest from the receiving antenna 50 thereof by the output of the radio wave which has transmitted the input signal 52 received by the receiving section 51. Assume that such a module is 11*a[i]* and that the pilot signal contains the information relating to the carrier frequency fa[i] of the radio wave radiated from the second transmission antenna 43[*i*] belonging to the module 11*a[i]* and the carrier frequency fb[i] of the radio wave caught by the second receiving antenna 44[*i*] and processed by the second receiving section 45[*i]*.

(2) Operation of Mobile Unit 33*a* for Starting Transmission

The frequency switching section 53 of the mobile unit 33*a* sets the frequency of the transmission section 54 to fb[i] on the basis of the pilot signal demodulated by the receiving section 51. The transmission section 54 modulates a high-frequency current having a frequency fb[i] set by the frequency switching section 53 with the signal wave current containing the information to be transmitted, thereby generating a modulated high-frequency current (output signal 55). The transmission antenna 56 radiates a radio wave having a carrier frequency fb[i] by the output signal 55.

The second receiving antenna 44[*i*] belonging to the i-th module 11*a[i*] catches an arriving radio wave as electric power among those radio waves radiated from the transmission antenna 56. The second receiving section 45[*i*] receives a modulated high-frequency current as the second input signal 46[*i*] which is a high-frequency current of frequency fb[i] modulated by a signal wave current containing the information to be transmitted, from the electric power caught by the receiving antenna 44[*i*], and demodulates the signal wave current from the second input signal 46[*i*]. The first transmission section 47[*i*] modulates a high-frequency current of frequency f[i+1] by the signal wave current demodulated by the first receiving section 39[*i*] thereby to generate a modulated high-frequency current (i-th first output signal 48[*i*]), and/or modulates a high-frequency current of frequency f[i+1] with a signal wave current demodulated by the second receiving section 45[*i*] thereby to generate a modulated high-frequency current(i-th first output signal 48[*i*]) by. The transmission antenna 49[*i*] radiates a carrier frequency f[i+1] by the i-th first output signal 48[*i*] thereof.

As a result, in the case where the mobile unit 33*a* has information to be transmitted, the information to be transmitted can be transmitted along a road as the necessary information.

(3) Operation of Mobile Unit 33*a* for Starting the Receiving

The frequency switching section 53 of the mobile unit 33*a* sets the frequency of the receiving section 51 to fa[i] on the basis of the pilot signal demodulated by the receiving section 51. The receiving section 51 receives a modulated high-frequency current as an input signal 52 which is a high-frequency current of frequency fa[i] set by the frequency switching section 51 and modulated by a signal wave current containing the information to be transmitted, from the electric power caught by the receiving antenna 50, and demodulates the signal wave current from the input signal 52.

As a result, each of the plurality of the modules installed along a road can transmit the information arriving from another module along the road by transferring it to still another module. At the same time, the information to be transmitted which is received from the mobile unit 33*a* moving along the road can be transmitted along the road as the information to be transmitted. Further, the information arriving along the road can be transmitted to the mobile unit 33*a*.

According to this embodiment, the pilot signal is assumed to contain the information on the carrier frequency fa[i] of the radio wave radiated from the second transmission antenna 43[*i*] and the carrier frequency fb[i] of the radio wave caught by the second receiving antenna 44[*i*] and processed by the second receiving section 45[*i*]. In addition, however, the radio wave radiated with the carrier frequency of fa[i] can also contain the information on the carrier frequency fb[i] of the particular radio wave and the carrier frequency fa[1] of the radio wave radiated from the second transmission antenna 43[1] belonging to the next module 11*a*[1] (11*a[i]* is followed by 11*a*[1]). As a result, the communication, once established between the mobile unit 33*a* and a module by the pilot signal, can be continued without any requirement for reading the pilot signal again. Also, a communication with a normal module can be resumed even in the presence of a broken module midway Also, according to this embodiment, the first transmission section 47[*i*] modulates a high-frequency current of frequency f[i+1] by a signal wave current demodulated by the first receiving section 39[*i*] thereby to generate the i-th first output signal 48[*i*], and/or modulates a high-frequency current of frequency f[i+1] by a signal wave current demodulated by the second receiving section 45[*i*] thereby to generate the i-th first output signal 48[*i*]. The invention, however, is not necessarily limited to this configuration, but the first transmission section 47[*i*] can generate the i-th first output signal 48[*i*] containing the information contained in the signal wave current demodulated by the first receiving section 39[*i*] and/or the information contained in the signal wave current demodulated by the second receiving section 45[*i*].

Also, the first and second receiving sections can share a radio receiving circuit of a common design. In similar fashion, the first and second transmission sections can share a radio receiving circuit of a common design.

Further, the first and second receiving antennas can share a common receiving antenna specification. In similar fashion, the first and second transmission antennas can share a common transmission antenna specification. As another alternative, the first and second receiving antennas and the first and second transmission antennas can be transmission-receiving antennas of a common specification.

Seventh Embodiment

Figure 14:
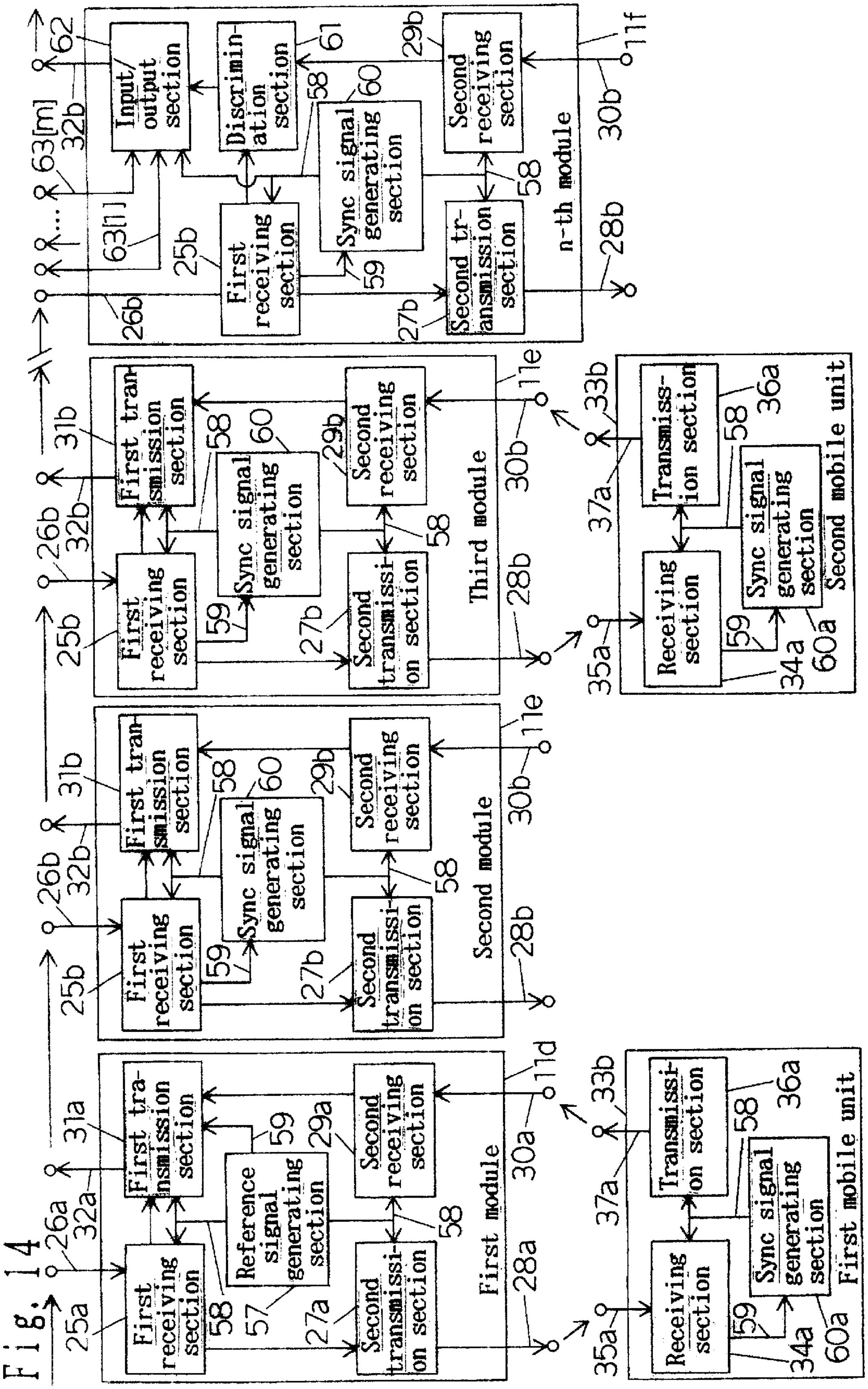

A transmission system according to a seventh embodiment of the present invention will be explained with reference to FIG. 14 showing a configuration thereof. The first to n-th modules in this embodiment include three types of modules of 11*d*, 11*e* and 11*f*, where n is an integer not less than 3.

First, a configuration of a module 11*d* used as the first module will be explained. A reference signal generating section 57 has a clock (not shown) for generating a sync signal 58. On the basis of the sync signal 58, this circuit generates a reference signal 59 by which the timing of receiving or transmitting the signal for the second to the n-th modules and the mobile unit 33*b* is synchronized with the timing of receiving or transmitting the signal for the first module 11*d*.

A first receiving section 25*a* is a receiving unit for receiving a first input signal in accordance with the sync signal 58 transmitted from the reference signal generating section 57. The second transmission section 27*a* is a transmission unit for transmitting a second output signal 28*a* in accordance with the sync signal 58 generated by the reference signal generating section 57 on the basis of the first input signal 26*a* received by the first receiving section 25*a*. The second receiving section 29*a*, on the other hand, is a receiving unit for receiving a second input signal 30*a* in accordance with the sync signal 58 generated by the reference signal generating section 57.

The first transmission section 31*a* is a transmission unit for transmitting a first output signal 32*a* in accordance with the sync signal 58 generated by the reference signal generating section 57 on the basis of the first input signal 26*a* received by the first receiving section 25*a*, the second input signal 30*a* received by the second receiving section 29*a* and the whole or part of the reference signal 59 generated by the reference signal generating section 57.

Next, explanation will be made about a configuration of a module 11*e* used as the second to the (n−1)th modules. A sync signal generating section 60 is a circuit for generating a sync signal 58 on the basis of a reference signal 59 contained in the first input signal 26*b* received by the first receiving section 25*b*.

The first receiving section 25*b* is a receiving unit for receiving the first input signal 26*b* in accordance with the sync signal 58 sent from the sync signal generating section 60. The second transmission section 27*b* is a transmission unit for transmitting the second output signal 28*b* in accordance with the sync signal 58 generated by the sync signal generating section 60 on the basis of the first input signal 26*b* received by the first receiving section 25*b*. The second receiving section 29*b* is a receiving unit for receiving the second input signal 30*b* in accordance with the sync signal 58 generated by the sync signal generating section 60.

The first transmission section 31*b* is a transmission unit for transmitting the first output signal 32*b* in accordance with the sync signal 58 generated by the sync signal generating section 60 on the basis of the first input signal 26*b* received by the first receiving section 25*b* and/or the second input signal 30*b* received by the second receiving section 29*b*.

Now, explanation will be made about a configuration of the module 11*f* used as the n-th module. The first receiving section 25*b*, the second transmission section 27*b*, the second receiving section 29*b* and the sync signal generating section 60 can be similar to the corresponding ones of the module 11*e*.

A discrimination section 61 is a unit for discriminating the information contained in the first input signal 26*b* received by the first receiving section 25*b* and/or the second input signal 30*b* received by the second receiving section 29*b* on the basis of the destination of the particular information. An input/output section 62 is a transmission unit for transmitting to the destination the information discriminated on the basis of the destination by the discrimination section 6, and at the same time it is a receiving unit for receiving the information sent from the particular destination.

Further, a configuration of the mobile unit 33*b* will be explained. The sync signal generating section 60*a* is a circuit for generating a sync signal 58 on the basis of a reference signal 59 contained in the input signal 35*a* received by the receiving section 34*a*. The receiving section 34*a* is a receiving unit for receiving the input signal 35*a* in accordance with the sync signal 58 generated by the sync signal generating section 60*a*. The transmission section 36*a* is a transmission unit for transmitting the output signal 37*a* in accordance with the sync signal 58 generated by the sync signal generating section 60*a*.

A transmission system according to this embodiment, like the transmission system according to the first embodiment of the invention, is configured of a plurality of modules installed in spaced relation to each other along a road. In the case of the present embodiment, however, a plurality of groups each including first to n-th modules are assumed to be installed along a road. Also, the number of automotive vehicles constituting the mobile units running along the road installed with the first to n-th modules varies with the prevailing situation. By way of explanation, however, assume that two mobile units including the first and second mobile units 33*b* are running.

According to this embodiment, it is also assumed that the first and second receiving sections of the module and the receiving section 34*a* of the mobile unit 33*b* receive a signal in accordance with a predetermined radio scheme, while the first and second transmission sections of the module and the transmission section 36*a* of the mobile unit 33*b* transmit a signal in accordance with a predetermined radio scheme. The predetermined radio scheme can be similar to the predetermined radio scheme for the transmission system according to the first embodiment of the invention.

Now, the operation of this embodiment will be explained.

(1) Scheme in which each Module Communicates with a Mobile Unit in the Same Communication Time Zone In the case of this scheme, a predetermined communication time zone t[0] is assigned to the communication between the first to the n-th modules and the mobile units (two mobiles units according to this embodiment) moving along the road installed with the first to the n-th modules.

According to this scheme, one module is preferably set for communication with one mobile unit 33*b* during the communication time zone t[0].

An example of such a setting in the radio wave communication scheme providing a predetermined radio scheme will be explained with reference to FIG. 17 constituting a diagram for explaining a scheme in which the modules making up communication destinations are limited due to the output limitation of the radio wave radiated from the mobile unit 33*b*.

First, the output of the radio wave radiated from each mobile unit 33*b* and the distance between contiguous modules are determined in such a way that the radio wave radiated from each mobile unit 33*b* moving along a road installed with the first to n-th modules can be caught by one of the modules. The transmission section 36*a* belonging to each mobile unit 33*b* is designed to radiate a radio wave having an output determined in such a way. Also, the first to n-th modules are installed at spatial intervals thus determined.

Figure 17:
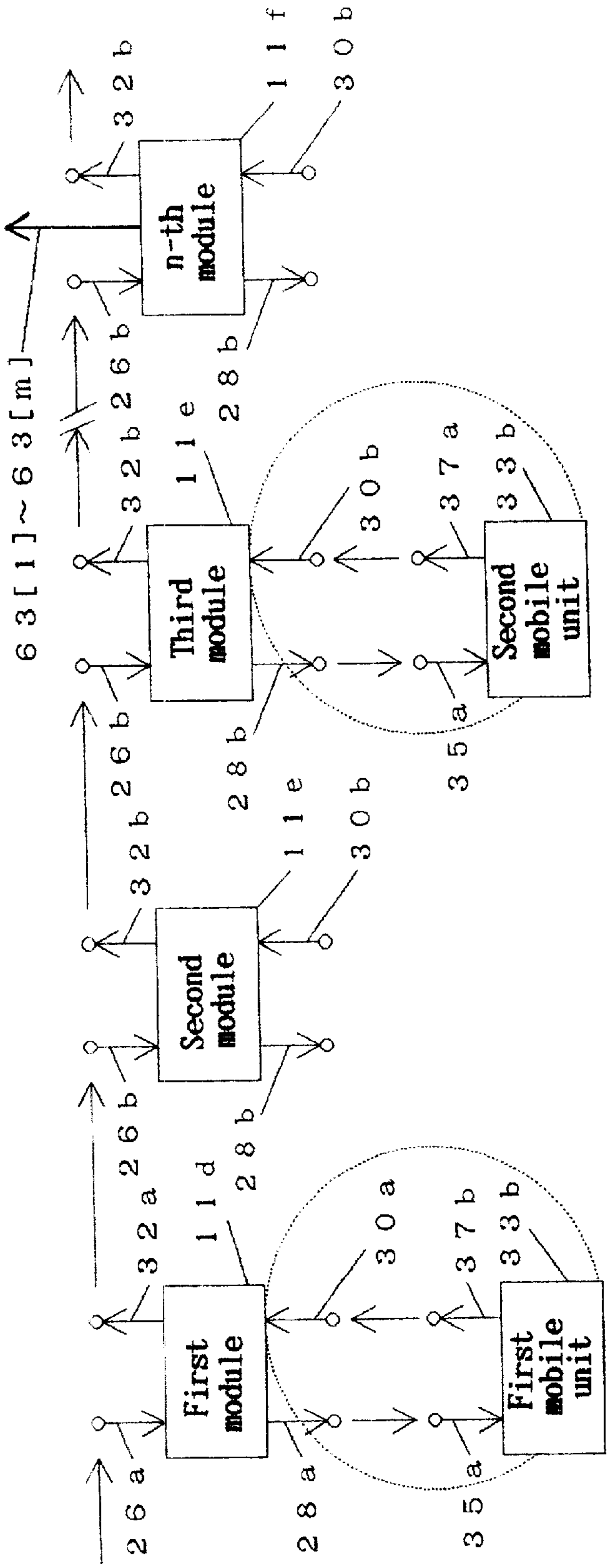

As a result, as shown in FIG. 17, only the first module 11*d* can catch the radio wave radiated from the first mobile unit 33*b*, and only the third module 11*e* can catch the radio wave radiated from the second mobile unit 33*b*. The areas defined by dashed lines in FIG. 17 conceptually represent the transmission areas of the output signal 37*a* transmitted from the transmission section 36*a* of the mobile units 33*b*.

As far as a scheme is employed in which each mobile unit 33*b* can communicate in one-to-one relation with a module, any schemes according to other embodiments or conventional schemes other than that shown in FIG. 17 can be employed with equal effect. Also, the scheme of FIG. 17 can be used with other embodiments as well as this embodiment.

Figure 15:
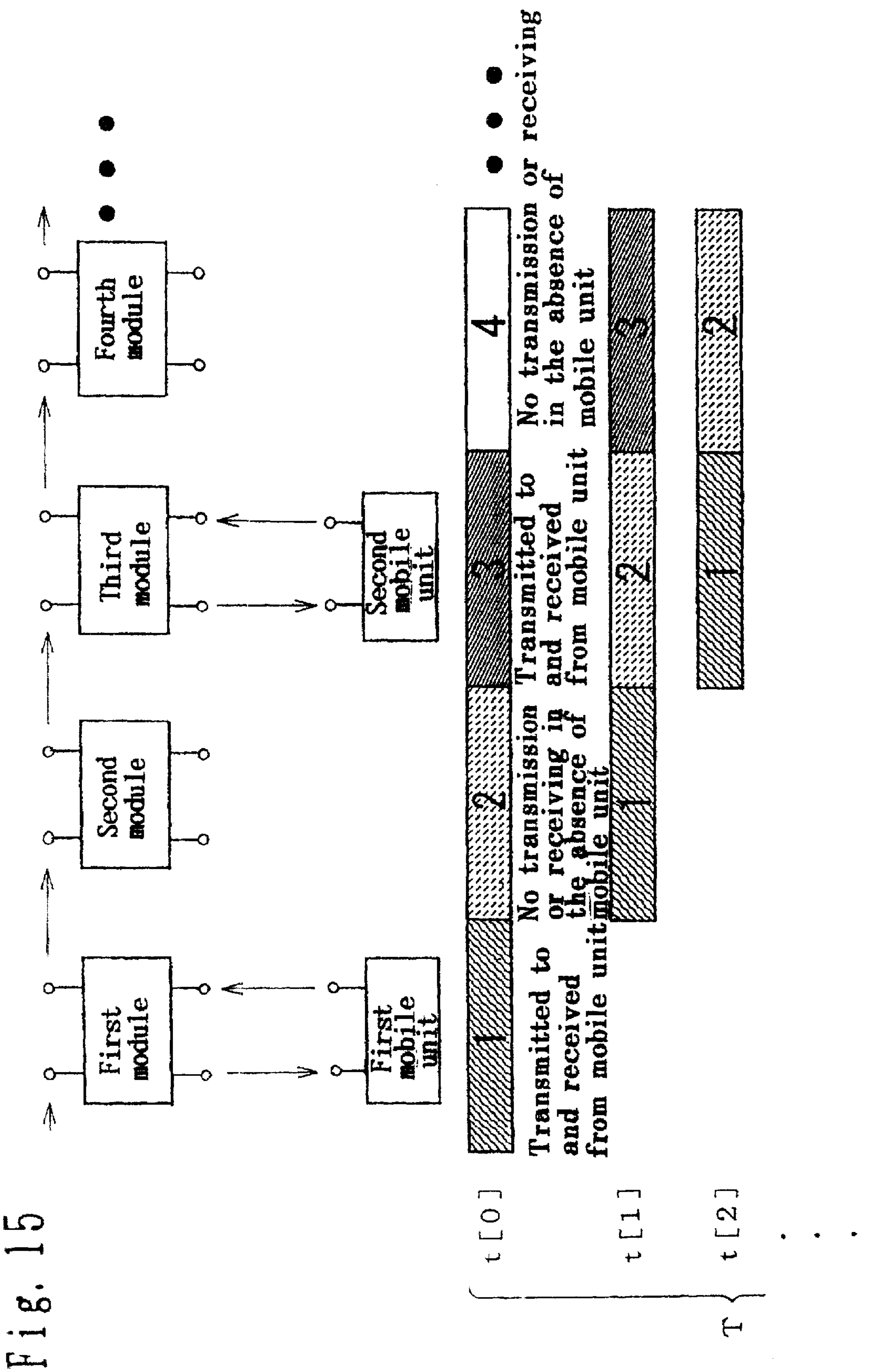

Now, the manner in which information is transmitted by the first to n-th modules will be explained with reference to FIG. 14 and FIG. 15 constituting a diagram showing an example of time zone according to this scheme.

1. Operation During Communication Time Zone t[0] between Mobile Unit and Modules The second transmission section 27*a* of the first module 11*d* transmits a second output signal 28*a* during the communication time zone t[0] in accordance with a sync signal 58 generated by a reference signal generating section 57. In order to respond to this signal, the receiving section 34*a* of the first mobile unit 33*b* receives the second output signal as an input signal 35*a* transmitted from the second transmission section 27*a* of the first module 11*d* during the particular communication time zone t[0] in accordance with the sync signal 58 generated by the sync signal generating section 60*a*.

The transmission section 36*a* of the first mobile unit 33*b*, on the other hand, transmits the output signal 37*a* containing the information to be transmitted, during the communication time zone t[0] in accordance with the sync signal 58 generated by the sync signal generating section 60*a*. In order to respond to this signal, the second receiving section 29*a* of the first module 11*d* receives as the second input signal 30*a* the output signal 37*a* transmitted from the transmission section 36*a* of the first mobile unit 33*b* during the particular communication time zone t[0] in accordance with the sync signal 58 generated by the reference signal generating section 57.

The second transmission section 27*b* of the second module 11*e* transmits the second output signal 28*b* during the communication time zone t[0] in accordance with the sync signal 58 generated by the sync signal generating section 60. In view of the fact that the mobile unit 33*b* for receiving the second output signal 28*b* is not present in the case of FIG. 14, however, the second output signal 28*b* is left transmitted. Also, the second receiving section 29*b* of the second module 11*e*, though it executes the receiving process during the particular communication time zone t[0] in accordance with the sync signal 58 generated by the sync signal generating section 60, fails to receive the second input signal 30*b* in the absence of the mobile unit 33*b* intended to be a receiving unit.

The second transmission section 27*b* of the third module 11*e* transmits the second output signal 28*b* during the communication time zone t[0] in accordance with the sync signal 58 generated by the sync signal generating section 60. In order to respond to this signal, the receiving section 34*a* of the second mobile unit 33*b* receives as an input signal 35*a* the second output signal 28*b* transmitted by the second transmission, section 27*b* of the third module 11*e* during the particular communication time zone t[0] in accordance with the sync signal 58 generated by the sync signal generating section 60*a*.

The transmission section 36*a* of the second mobile unit 33*b*, on the other hand, transmits the output signal 37*a* containing the information to be transmitted, during the communication time zone[0] in accordance with the sync signal 58 generated by the sync signal generating section 60*a*. In order to respond to this signal, the second receiving section 29*b* of the third module 11*d* receives as a second input signal 30*b* the output signal 37*a* transmitted by the transmission section 36*a* of the second mobile unit 33*b* during the particular communication time zone t[0] in accordance with the sync signal 58 generated by the sync signal generating section 60.

The operation of the other modules is the same as the operation of the second module 11*e* described above.

The operation explained above refers to a predetermined radio scheme. Nevertheless, in the case of the radio wave communication scheme, for example, it is necessary that at least the carrier frequency of the radio wave radiated from the second transmission section is different from the carrier frequency of the radio wave radiated from the transmission section 36*a*. In spite of this, the same carrier frequency can be used if the communication time zone t[0] is divided into a first communication time zone during which the second transmission section radiates a radio wave and a second communication time zone during which the transmission section 36*a* radiates a radio wave.

2. Operation During Time Zone for Transfer between Modules

The first transmission section 31*a* of the first module 11*d* transmits the first output signal 32*a* during the first transfer time zone t[1] in accordance with the sync signal 58. In order to respond to this signal, the first receiving section 25*b* of the second module 11*e* receives as a first input signal 26*b* the first output signal 32*a* transmitted by the first transmission section 31*a* of the first module 11*d* during the particular first transfer time zone t[1] in accordance with the sync signal 58.

In similar fashion, the first transmission section 31*b* of each of the second to the (n−2)th modules transmits the first output signal 32*b* during the first transfer time zone t[1] in accordance with the sync signal 58. In order to respond to this signal, the first receiving section 25*b* of each of the third to (n−1)th modules 11*e* receives as a first input signal 25*b* the first output signal 32*b* during the particular first transfer time zone t[1] in accordance with the sync signal 58.

The first transmission section 31b of the (n−1)th module 11e transmits the first output signal 32b during the first transfer time zone t[1] in accordance with the sync signal 58. In order to respond to this signal, the first receiving section 25b of the n-th module 11f receives as a first input signal 26b the first output signal 32b transmitted by the first transmission section 31b of the (n−1)th module 11e during the particular first transfer time zone t[1] in accordance with the sync signal 58.

Now, explanation will be made about the operation after the first receiving section 25b of the n-th module 11f receives the first input signal 26b. A discrimination section 61 discriminates, according to the destination, the information contained in the first input signal 26b received by the first receiving section 25b and/or the second input signal 30b received by the second receiving section 29b. An input/output section 62 transmits to the particular destination the information thus discriminated by the discrimination section 61 according to the particular destination. In the presence of information to be transmitted further along the road, for example, the input/output section 62 transmits a signal containing such information as a first output signal 32b to the first module 11d (not shown) of another group adjacent to the destination.

The input/output section 62 further transmits and receives m types of input/output signals (63[1], . . . , 63[m]), where m is an integer not less than 1. The m types of input/output signals can be transmitted or received by a predetermined radio scheme or by cable. Further, in the case of the radio communication scheme, the output of the radio wave can be larger than that of the radio wave of other modules. Now, an example of the m types of input/output signals will be explained. Assume that the input/output section 62 has received an input/output signal 63[1] containing the traffic information, etc. transmitted to each mobile unit 33b from a traffic information center. The input/output signal 63[1] is transmitted as a first output signal 32b to the first module 11d of another group adjacent to the destination. Also, assume that the first input signal 26b received by the first receiving section 25b of the module 11f contains the information on the number of the mobile units 33b moving along the road, for example. The input/output section 62 transmits the signal containing the particular information to the traffic information center as the input/output signal 63[1]. Any other organizations (such as a police station, a fire department, an ambulance, a telephone exchange, or the like) having the function similar to that of this traffic information center can be an object of transmission and receiving of various information.

The first receiving section 25a of the first module 11d receives as a first input signal 25a the first output signal 32b transmitted from the n-th module 11f (not shown) in a similar fashion to the manner described above about the group adjacent to the transfer destination during the first transfer time zone t[1] in accordance with the sync signal 58.

Now, explanation will be made about the second transfer time zone t[2] to the n-th transfer time zone t[n]. The above-mentioned first transfer time zone t[1] is followed by similar transfer time zones including the second transfer time zone t[2] to the n-th transfer time zone t[n]. Specifically, n transfer time zones are included as the overall transfer time zone from the first transfer time zone t[1] to the n-th transfer time zone t[n]. As a result, all the information received by the first to n-th modules during the communication time zone t[0] can be discriminated by the n-th module 11f.

As described above, according to "a scheme in which each module communicates with a mobile unit during the same communication time zone", each of the first to n-th modules can transmit the information along a particular road by alternating the communication and transfer during a period T including the communication time zone t[0] and the overall transfer time zone. At the same time, it is possible to transfer along the road the information received from the mobile unit 33b moving along the road. Further, the information that has been transmitted along the road can be transmitted to the mobile unit 33b.

(2) Scheme in which each Module Communicates with a Mobile Unit During a Specific Communication Time Zone The basic operation according to this scheme is similar to "the scheme in which each module communicates with a mobile unit during the same communication time zone" of (1) above. Therefore, only the difference with the above-mentioned scheme will be explained. In the scheme under consideration, the period T is assumed to include the time zones t[0], t[1], t[2], . . . , t[n].

First, the first module 11d uses t[0] as a communication time zone and each of the time zones t[1] to t[n] as a transfer time zone during the period T. The operation of the first module 11d, therefore, is similar to that in "the scheme in which each module communicates with a mobile unit during the same communication time zone" in (1).

Figure 16:
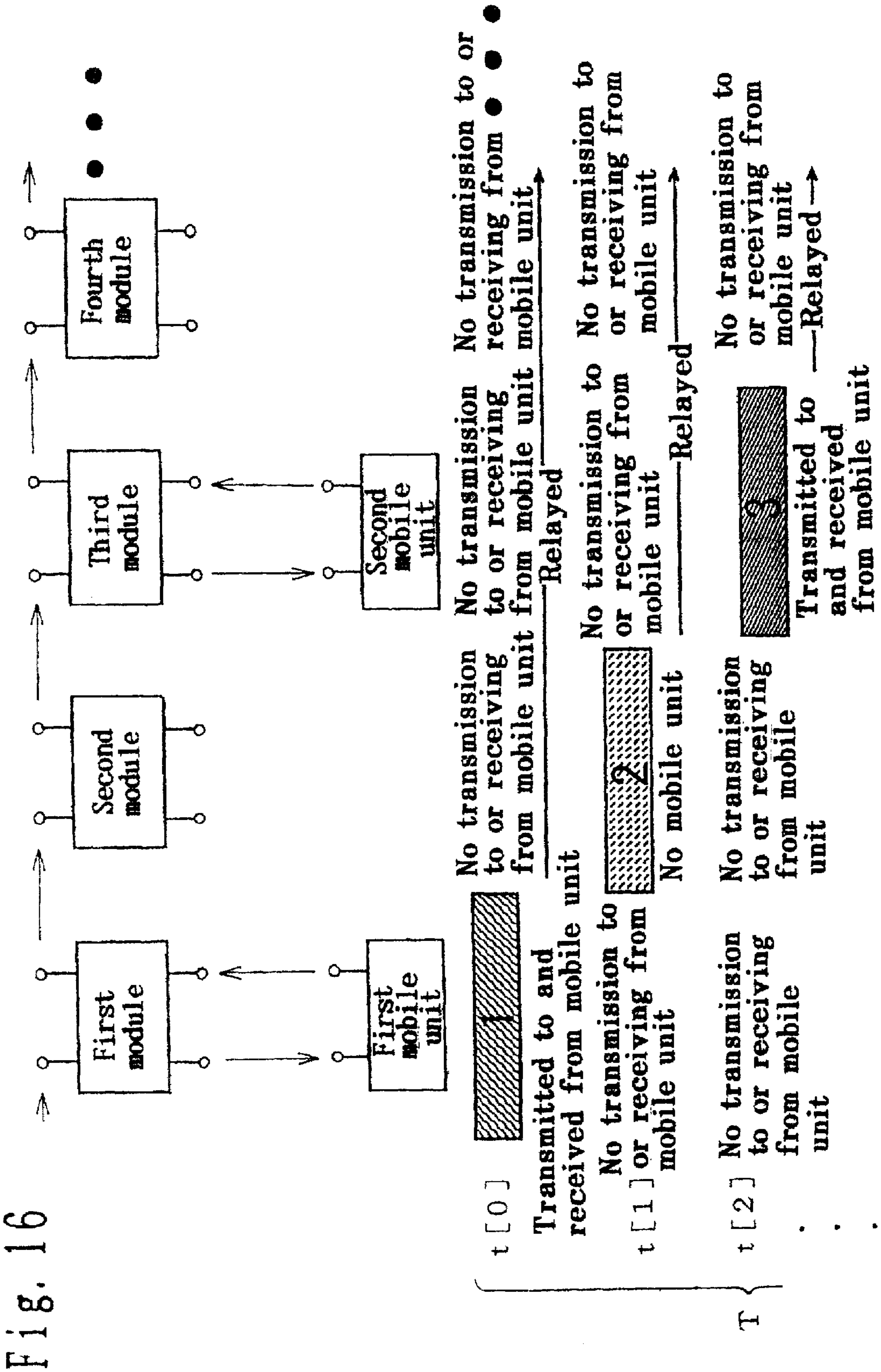

The second module 11e uses t[1] as a communication time zone and the remaining time zones as a transfer time zone during the period T. The third module 11e uses t[2] as a communication time zone and the remaining time zones as a transfer time zone during the period T. This is also the case with the fourth to n-th modules. Specifically, let i be an integer satisfying the relation $0<i<n$. Then, the i-th module uses t[i−1] as a communication time zone and the remaining time zones as a transfer time zone during the period T. An example of time zones according to this scheme is shown in FIG. 16.

As a result, each of the first to n-th modules alternates between communication and transfer during the period T including a specific communication time zone and n transfer time zones. In this way, the information can be transmitted along a particular road. At the same time, the information received from a mobile unit 33b moving along the same road can be transmitted along the road. Further, the information that has been transmitted along the road can be transmitted to the mobile unit 33b. Also, in the case where the predetermined radio scheme is the radio wave communication scheme, the carrier frequency of the radio wave radiated to the transmission section 36a or the receiving section 34a of each of the mobile units 33b is identical to that of the other mobile units 33b, and therefore no interference occurs between the mobile units 33b even if they are adjacent to each other.

By the way, the discrimination section 61 and the input/output section 62 are applicable also to other embodiments but not confined to the present embodiment.

Also, the second transmission section 27b and the second receiving section 29b included in the module 11f according to this embodiment may be done without.

Also, although the module 11d is used as the first module and the module 11f as the n-th module in this embodiment, the invention is not necessarily limited to such a configuration. Instead, as for the groups other than at the trailing end of the unidirectional transmission described above, the module 11f can be used as the first module and the module 11e as the n-th module with equal effect. In such a case, the sync signal generating section 60 of the module 11*f* can be replaced with the reference signal generating section 57. As for the group at the starting end, however, it is necessary to replace the sync signal generating section 60 of the module 11*f* with the reference signal generating section 57.

Also, although the first module 11*d* includes the reference signal generating section 57 according to this embodiment, the reference signal generating section 57 can be replaced with the sync signal generating section 60 in the case where the first output signal transmitted from the n-th module of another group includes the reference signal 59.

Also, according to this embodiment, the module 11*d* includes the reference signal generating section 57, the modules 11*e*, 11*f* include the sync signal generating section 60 and each mobile unit 33*b* includes the sync signal generating section 60*a*. The invention is not necessarily limited to such a configuration, but the modules 11*d*, 11*e*, 11*f* and the mobile unit 33*b* can each include sync clocks in phase for securing a sync signal.

Also, in spite of the fact that according to “the scheme in which each module communicates with a mobile unit during a specific communication time zone”, a specific communication time zone is assigned to the first to n-th modules in that order, the invention is not necessarily limited to such a configuration, but each module can be assigned a specific communication time zone in any order.

Also, the mobile unit 33*b*, which is an automotive vehicle according to this embodiment, can be a person having a portable telephone, an automatic cart in a factory, a train, a ship or an airplane.

Also, although a plurality of modules are installed along a road according to this embodiment, they can alternatively be installed along a predetermined route as in the transmission system according to the second embodiment of the invention.

Further, the first and second receiving sections can share a receiving unit of a common design. In similar fashion, the first and second transmission sections can share a transmission unit of a common design.

Eighth Embodiment

Figure 18:
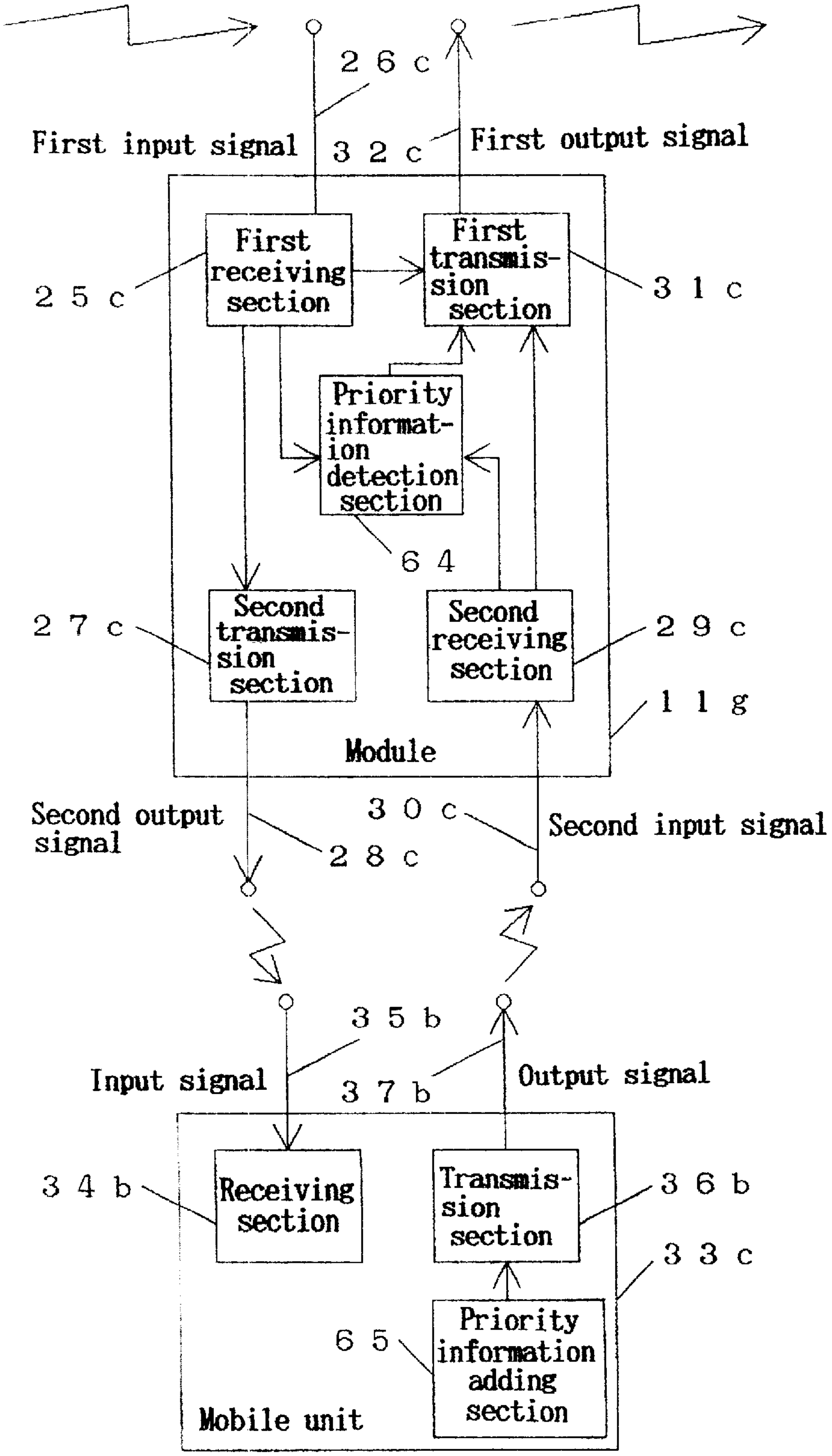

A transmission system according to an eighth embodiment of the present invention will be explained with reference to FIG. 18 making up a diagram showing a configuration of a part thereof.

First, a configuration of a module 11*g* will be explained. A first receiving section 25*c* is a receiving unit for receiving a first input signal 26*c* in accordance with a predetermined radio scheme. The predetermined radio scheme may be similar to the predetermined radio scheme for the transmission system according to the first embodiment of the invention.

A second transmission section 27*c* is a transmission unit for transmitting a second output signal 28*c* in accordance with a predetermined radio scheme on the basis of the first input signal 26*c* received by the first receiving section 25*c*. A second receiving section 29*c* is a receiving unit for receiving a second input signal 30*c* in accordance with a predetermined radio scheme.

A priority information detection section 64 is a detection circuit for detecting priority information from the information contained in the first input signal 26*c* received by the first receiving section 25*c* and the information contained in the second input signal 30*c* received by the second receiving section 29*c*.

The first transmission section 31*c* is a transmission unit for transmitting a first output signal 32*c* in accordance with the result of detection by the priority information detection section 64 on the basis of the first input signal 26*c* received by the first receiving section 25*c* and the second input signal 30*c* received by the second receiving section 29*c*.

Now, a configuration of a mobile unit 33*c* will be explained. The mobile unit 33*c* is an automotive vehicle. A receiving section 34*b* is a receiving unit for receiving as an input signal 35*b* a second output signal 28*c* transmitted from a second transmission section 27*c* of the module 11*g* in accordance with a predetermined radio scheme. A priority information adding section 65 is a circuit for adding the priority information assigned in advance to the mobile unit 33*c* to the information to be transmitted, if any. A transmission section 36*b* is a transmission unit for transmitting an output signal 37*b* containing the information to be transmitted with the priority information added thereto by the priority information adding section 65 in accordance with a predetermined radio scheme.

The transmission system according to this embodiment, like the transmission system according to the first embodiment of the invention, is configured of a plurality of modules 11*g* installed in spaced relationship with each other along a road.

Now, the operation of this embodiment will be explained.

First, assume that the mobile unit 33*c* is an ambulance, a patrol car or the like emergency vehicle having a predetermined priority. Explanation will be made about the operation performed when the mobile unit 33*c* transmits the output signal 37*b* in case of emergency. In transmitting the audio information on an emergency speech caught by a microphone (not shown) along the road, for example, the priority information adding means 65 adds the priority information for emergency application to the particular audio information. The transmission section 36*b* transmits the output signal 37*b* containing the audio information with the priority information added thereto by the priority information adding means 65 in accordance with a predetermined radio scheme.

Now, explanation will be made about the operation of the module 11*g* for receiving the output signal 37*b* as a second input signal 30*c*. Specifically, the second receiving section 29*c* belonging to the module 11*g* receives as a second input signal 30*c* the output signal 37*b* transmitted from the transmission section 36*b* of the mobile unit 33*c* in accordance with a predetermined radio scheme. A priority information detection section 64 detects the priority information from the information contained in the first input signal 26*c* received by the first receiving section 25*c* and the information contained in the second input signal 30*c* received by the second receiving section 29*c*. In this case, the priority information detection section 64 detects the priority information for emergency application from the information contained in the second input signal 30*c*. The first transmission section 31*c* transmits, in top priority, the first output signal containing the audio information with the priority information for emergency application added thereto on the basis of the result of detection by the priority information detection section 64.

Now, explanation will be made about the operation of the next module 11*g* adjacent to the transfer destination for receiving the the first output signal 32*c* as the first input signal 26*c*. The priority information detection section 64 detects the priority information from the information contained in the first input signal 26*c* received by the first receiving section 25*c* and the information contained in the second input signal 30*c* received by the second receiving section 29*c*. In such a case, the priority information detection section 64 detects the priority information for emergency application from the information contained in the first input signal 26*c*. The first transmission section 31*c* transmits the first output signal 32*c*, in top priority, containing the audio information with the priority information for emergency application added thereto.

In this way, the information with the priority information for emergency application added thereto is processed in top priority. Even in the case where the line is congested, therefore, the required information can be transmitted in priority. Also, assume that the second transmission section 27*c* of the module 11*g* transmits the second output signal 28*c* containing the information contained in the first input signal 26*c* received by the first receiving section 25*c*, and that the mobile unit 33*c* having the receiving section 34*b* for receiving the second output signal 28*c* as the input signal 35*b* is an emergency vehicle or the like at the receiving end. Then, the mobile unit 33*c* can receive the audio information transmitted thereto with the priority information for emergency application added thereto.

By the way, although the present embodiment has such a configuration as to process the information with the priority information added thereto in software fashion, the invention is not necessarily limited to such a configuration. Instead, an arrangement can be made that an emergency vehicle employing a radio communication scheme is allowed to exclusively use a radio wave of a carrier frequency (a carrier frequency for emergency application) different from the one used by ordinary vehicles. Specifically, an arrangement may be made in which the transmission section and the receiving section belonging to a mobile unit constituting an emergency vehicle can transmit and receive a carrier frequency for emergency application, and the first and second receiving sections and the first and second transmission sections of the module 11*g* can transmit and receive a radio wave of a carrier frequency for emergency application exclusively used by the emergency vehicle, in addition to the radio wave of a carrier frequency (a carrier frequency for ordinary application) used by ordinary vehicles. A plurality of the modules having such a function are installed to form both an ordinary transmission line and an emergency transmission line along a road. The emergency line, therefore, can be used as a dedicated line free of congestion by the ordinary information.

Also, the mobile 33*c*, which is an automotive vehicle according to this embodiment, may be a person having a portable telephone, an automatic cart in a factory, a train or an airplane.

Also, a plurality of the modules, which are installed along a road according to the present embodiment, may alternatively be installed along a predetermined route as in the transmission system according to the second embodiment of the invention.

Further, the first receiving section 25*c* and the second receiving section 29*c* can share a receiving unit of a common design. In similar manner, the first transmission section 31*c* and the second transmission section 27*c* can share a transmission unit of a common design.

Ninth Embodiment

A transmission system according to a ninth embodiment of the invention will be explained with reference to FIG. 19 making up a diagram showing a configuration of a part thereof.

First, a configuration of a module 11*h* will be explained. A first receiving antenna 38*a* is a receiving antenna having such a directivity as to catch the radio wave arriving from space in the range Ra as electric power. A first receiving section 39*a* is a radio receiving circuit for receiving as a first input signal 40*a* a modulated high-frequency current making up a high-frequency current of a first frequency f1 modulated by a signal wave current containing the information to be transmitted, from the electric power caught by the first receiving antenna 38*a*, and demodulating the particular signal wave current from the first input signal 40*a*. The first receiving section 39*a* or the first transmission section 47*a* described later can include an amplifier circuit (not shown) for amplifying the signal wave current with a predetermined amplification factor.

A second transmission section 41*a* is a transmission circuit for modulating a high-frequency current of first frequency f1 by the signal wave current demodulated by the first receiving section 39*a* thereby to generate a modulated high-frequency current (second output signal 42*a*).

A transmission/receiving antenna 66 is a transmission antenna having such a directivity as to radiate a radio wave of the carrier frequency f1 into space in the range Rc and at the same time functions as a receiving antenna having such a directivity as to catch the radio wave arriving from the range Rc as electric power.

A second receiving section 45*a* is a radio receiving circuit for receiving as a second input signal 46*a* a modulated high-frequency current making up a second high-frequency current f2 modulated by a signal wave current containing the information to be transmitted, from the electric power caught by the transmission/receiving antenna 66, and for demodulating the signal wave current from the second input signal 46*a*. By the way, the second receiving section 45*a* or the first transmission section 47*a* described later can include an amplifier circuit (not shown) for amplifying the signal wave current with a predetermined amplification factor.

The first transmission section 47*a* is a radio transmission circuit for modulating the high-frequency current of first frequency f1 with the signal wave current demodulated by the first receiving section 39*a* thereby to generate a modulated high-frequency current (first output signal 48*a*), and/or for modulating the high-frequency current of first frequency f1 by the signal wave current demodulated by the second receiving section 45*a* thereby to generate a modulated high-frequency current (first output signal 48*a*). The transmission antenna 49*a* is the one which has such a directivity as to radiate a radio wave of the carrier frequency f1 into space in the range Rb by the first output signal 48*a*.

Now, a configuration of the mobile unit 33*d* will be explained. A transmission/receiving antenna 67 is the one for catching the radio wave arriving from the range Rd and having such a directivity as to radiate a radio wave into space in the range Rd. The receiving section 51*a* is a radio receiving circuit for receiving as an input signal 52*a* a modulated high-frequency current making up the high-frequency current of first frequency f1 modulated by a signal wave current containing the information to be transmitted, from the electric power caught by the transmission/receiving antenna 67, and for demodulating the signal wave current from the input signal 52*a*. By the way, the receiving section 51*a* may include an amplifier circuit (not shown) for amplifying the signal wave current with a predetermined amplification factor.

A transmission section 54*a* is a radio transmission circuit for modulating a high-frequency current of second frequency f2 by the signal wave current containing the information to be transmitted thereby to generate a modulated high-frequency current (output signal 55*a*). The output signal 55*a* is radiated as a radio wave of the carrier frequency f2 into the space in the range Rd by the transmission/receiving antenna 67 described above.

The transmission system according to this embodiment is configured of a plurality of modules 11*h* installed in spaced relation with each other along a predetermined route. This predetermined route may be similar to the predetermined route in the transmission system according to the second embodiment of the invention. ALso, the mobile unit 33*d* can be an automotive vehicle, a person having a portable telephone, an automatic cart in a factory, a train, a ship or an airplane.

Now, the operation of this embodiment will be explained.

Figure 19:
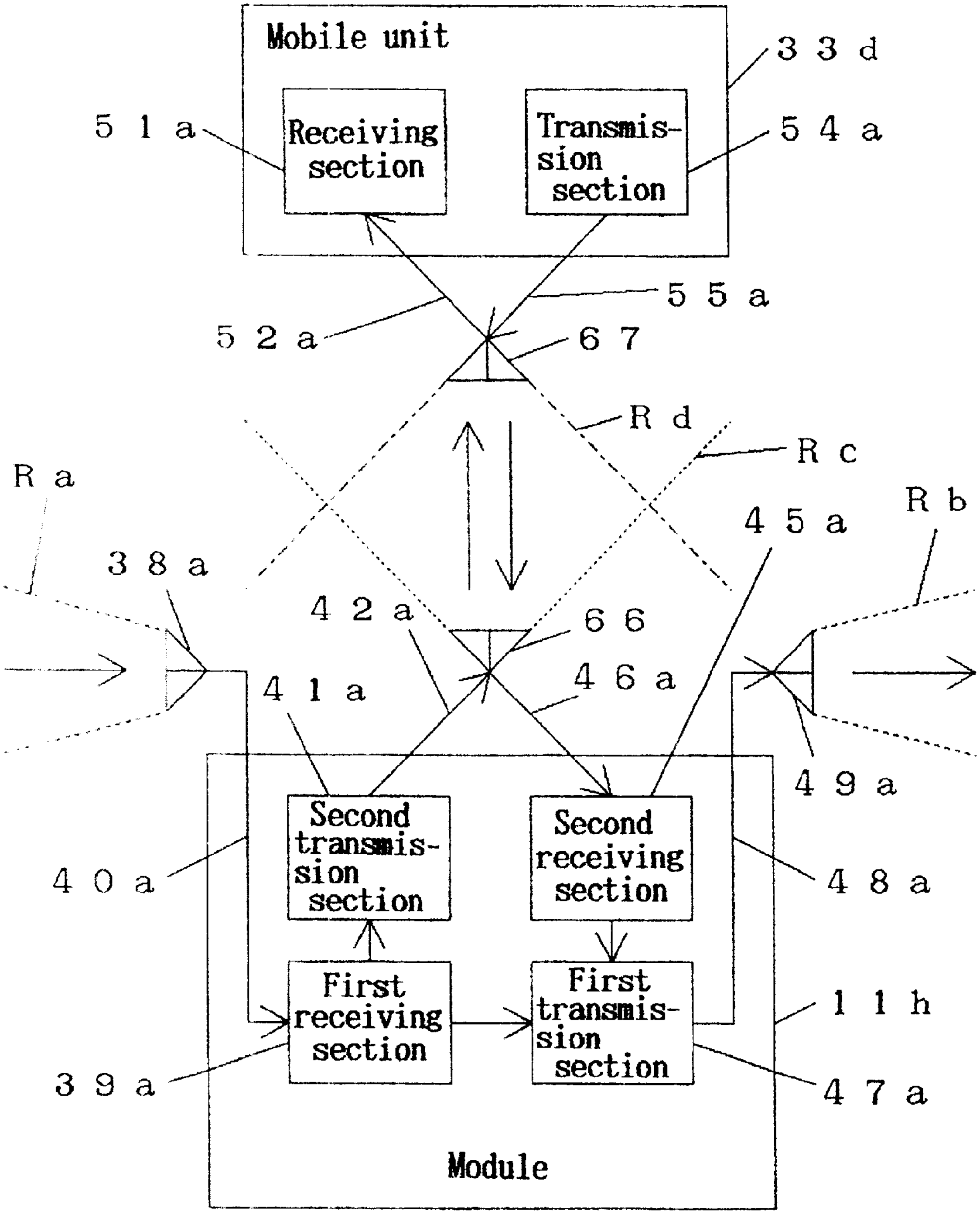

In FIG. 19, a first receiving antenna 38*a* catches the radio wave radiated from a first transmission antenna 49*a* (not shown) of another module 11*h* adjacent to the transmitting end and arriving from the space in the range Ra as electric power. A first receiving section 39*a* receives as a first input signal 40*a* a modulated high-frequency current constituting the high-frequency current of first frequency f1 modulated by a signal wave containing the information to be transmitted, from the electric power caught by the first receiving antenna 38*a*, and demodulates the signal wave current from the first input signal 40*a*. A second transmission section 41*a* modulates the high-frequency current of first frequency f1 with the signal wave current demodulated by the first receiving section 39*a* thereby to generate a modulated high-frequency current (second output signal 42*a*). A transmission/receiving antenna 66 radiates a radio wave of carrier frequency f1 into space in the range Rc by the second output signal 42*a*.

In the presence of a mobile unit 33*d* having a transmission/receiving antenna 67 located in the range Rc of the transmission/receiving antenna 66 radiating the radio wave, the transmission/receiving antenna 67 catches the radio wave of carrier frequency f1 arriving from the space in the range Rd as electric power. The receiving section 51*a* receives as an input signal 52*a* a modulated high-frequency current constituting the high-frequency current of first frequency f1 modulated by a signal wave current containing the information to be transmitted, from the electric power caught by the transmission/receiving antenna 67, and demodulates the signal wave current from the input signal 52*a*. As a result, the mobile unit 33*d* can receive the desired information from the information transmitted along the predetermined route installed with a plurality of the modules 11*h*.

Also, in the case where the mobile unit 33*d* has information to be transmitted, the transmission section 54*a* belonging to the mobile unit 33*d* modulates a high-frequency current of second frequency f2 with a signal wave current containing the particular information to be transmitted thereby to generate a demodulated high-frequency current (output signal 55*a*). The transmission/receiving antenna 67 radiates a radio wave of the carrier frequency f2 into the space in the range Rd by the output signal 55*a*.

In the module 11*h* having the transmission/receiving antenna 66 located in the range Rd of the transmission/receiving antenna 67 radiating the particular radio wave, the transmission/receiving antenna 66 catches the radio wave of carrier frequency f2 arriving from the range Rc as electric power. The second receiving section 45*a* receives as a second input signal 46*a* a modulated high-frequency current constituting a second high-frequency current f2 modulated by a signal wave current containing the information to be transmitted, from the electric power caught by the transmission/receiving antenna 66, and demodulates the particular signal wave current from the second input signal 46*a*. The first transmission section 47*a* modulates the high-frequency current of first frequency f1 with the signal wave current demodulated by the first receiving section thereby to generate a modulated high-frequency current (first output signal 48*a*), and/or modulates the high-frequency current of first frequency f1 with the signal wave current demodulated by the second receiving section 45*a* thereby to generate a modulated high-frequency current (first output signal 48*a*). The transmission antenna 49*a* radiates a radio wave of carrier frequency f1 into the space in the range Rb by the first output signal 48*a*. The radio wave of the carrier frequency f1 is caught by the first receiving antenna 38*a* (not shown) of still another module 11*h* adjacent to the transmission destination.

As a result, the information to be transmitted can be transmitted along the predetermined route, while the information received from the mobile unit 33*d* moving along the particular route can also be transmitted along the same route at the same time. Further, the information transmitted along the route can be transmitted to the mobile unit 33*d*. Especially, if a directional antenna is used for communication between the mobile unit 33*d* and the module 11*h*, the communication between the mobile unit 33*d* and the module 11*h* can be easily set to a one-to-one communication. Also, if the radio wave output is adjusted as shown in FIG. 5, the same carrier frequency can be secured for the radio wave transmitted and received by each of the plurality of the modules 11*h*. Further, the carrier frequency of the radio wave used for transmission and receiving between the modules 11*h* can be equalized with the carrier frequency of the radio wave used for communication between the modules 11*h* and the mobile unit 33*d*.

By the way, according to the present embodiment, the first transmission section 47*a* modulates the high-frequency current of first frequency f1 with the signal wave current demodulated by the first receiving section 39*a* thereby to generate the first output signal 48*a*, and/or modulates the high-frequency current of first frequency f1 with the signal wave current demodulated by the second receiving section 45*a* thereby to generate the first output signal 48*a*. The invention, however, is not necessarily limited to such a configuration. Instead, the high-frequency current of first frequency f1 may be modulated by a signal wave current containing the information contained in the signal wave current demodulated by the first receiving section 39*a* and/or the information contained in the signal wave current demodulated by the second receiving section 45*a* thereby to generate the first output signal 48*a*.

Also, the first receiving section 39*a* and the second receiving section 45*a* may share a receiving unit of a common design. In similar fashion, the first transmission section 47*a* and the second transmission section 41*a* can share a transmission unit of a common design.

Tenth Embodiment

A transmission system according to the tenth embodiment of the invention will be explained below with reference to FIG. 20 making up a diagram showing a part of a configuration thereof.

First, a configuration of a module 11*i* will be explained. The first receiving section 25*d* is a receiving unit for receiving the first input signal 26*d* in accordance with a predetermined radio scheme. The predetermined radio scheme may be similar to the predetermined radio scheme for the transmission system according to the first embodiment of the invention. A mobile unit-destined information extraction section 68 is a circuit for extracting the information destined for the mobile unit 33*e* from the information contained in the first input signal 26*d* received by the first receiving section 25*d*. The information destined for the mobile unit 33*e* may include the information destined for a plurality of mobile units 33*e* as well as for a single mobile unit 33*e*. In short, the information destined for the mobile unit 33*e* may be the information destined for the whole or part of the mobile units 33*e* involved in the transmission system according to the invention. The second transmission section 27*d* is a transmission unit for transmitting the second output signal containing the information extracted by the mobile unit-destined information extraction section 68 in accordance with a predetermined radio scheme.

The second receiving section 29*d* is a receiving unit for receiving the second input signal 30*d* in accordance with a predetermined radio scheme. A received notice extraction section 69 is a circuit for extracting the information on a received notice from the information contained in the second input signal 30*d* received by the second input signal 29*d*. A received information deletion section 70 is a circuit for deleting the information corresponding to the information on the received notice extracted by the received notice extraction section 69 from the information contained in the first input signal 26*d* received by the first receiving section 25*d*. A module identifier adding section 71 is a circuit for adding a module identifier assigned in advance to the module 11*i* to the information to be transmitted contained in the second input signal received by the second receiving section 29*d*. By the way, the module identifier adding section 71 may include a storage section for storing a particular module identifier. The first transmission section 31*d* is a transmission section for transmitting the first output signal 32*d* containing the information output from the received information deletion section 70 and/or the module identifier adding section 71 in accordance with a predetermined radio scheme.

Now, a configuration of the mobile unit 33*e* will be explained. The mobile unit 33*e* is an automotive vehicle. The receiving section 34*c* is a receiving unit for receiving as an input signal 35*c* the second output signal 28*d* transmitted by the second transmission section 27*d* of the module 11*i* in accordance with a predetermined radio scheme. A general information extraction section 72 is a circuit for extracting the information from the input signal 35*c* received by the receiving section 34*c* in compliance with an instruction from the operator. A local information extraction section 73 is a circuit for extracting the information transmitted to a local mobile unit 33*e* and the information identifier added to the particular information from the input signal 35*c* received by the receiving section 34*c*.

A mobile unit identifier adding section 74 is a circuit for adding a mobile unit identifier assigned in advance to the mobile unit 33*e* to the information identifier thereby to generate the information on a received notice in the case where the information identifier is extracted by the local information extraction section, and/or for adding a mobile unit identifier to the information to be transmitted, if any. By the way, the mobile unit identifier adding section 74 may include a storage section for storing the particular mobile unit identifier. The transmission section 36*c* is a transmission unit for transmitting the output signal 37*c* containing the information on a received notice generated by the mobile unit identifier adding section 74 and/or the information to be transmitted with the mobile unit identifier added thereby by the mobile unit identifier adding section 74, in accordance with a predetermined radio scheme.

A transmission system according to the present embodiment, like the transmission system according to the first embodiment of the invention, is configured of a plurality of modules 11*i* installed in spaced relationship with each other along a road.

Now, the operation of this embodiment will be explained.

(1) Operation of mobile unit 33*e* receiving information

Figure 20:
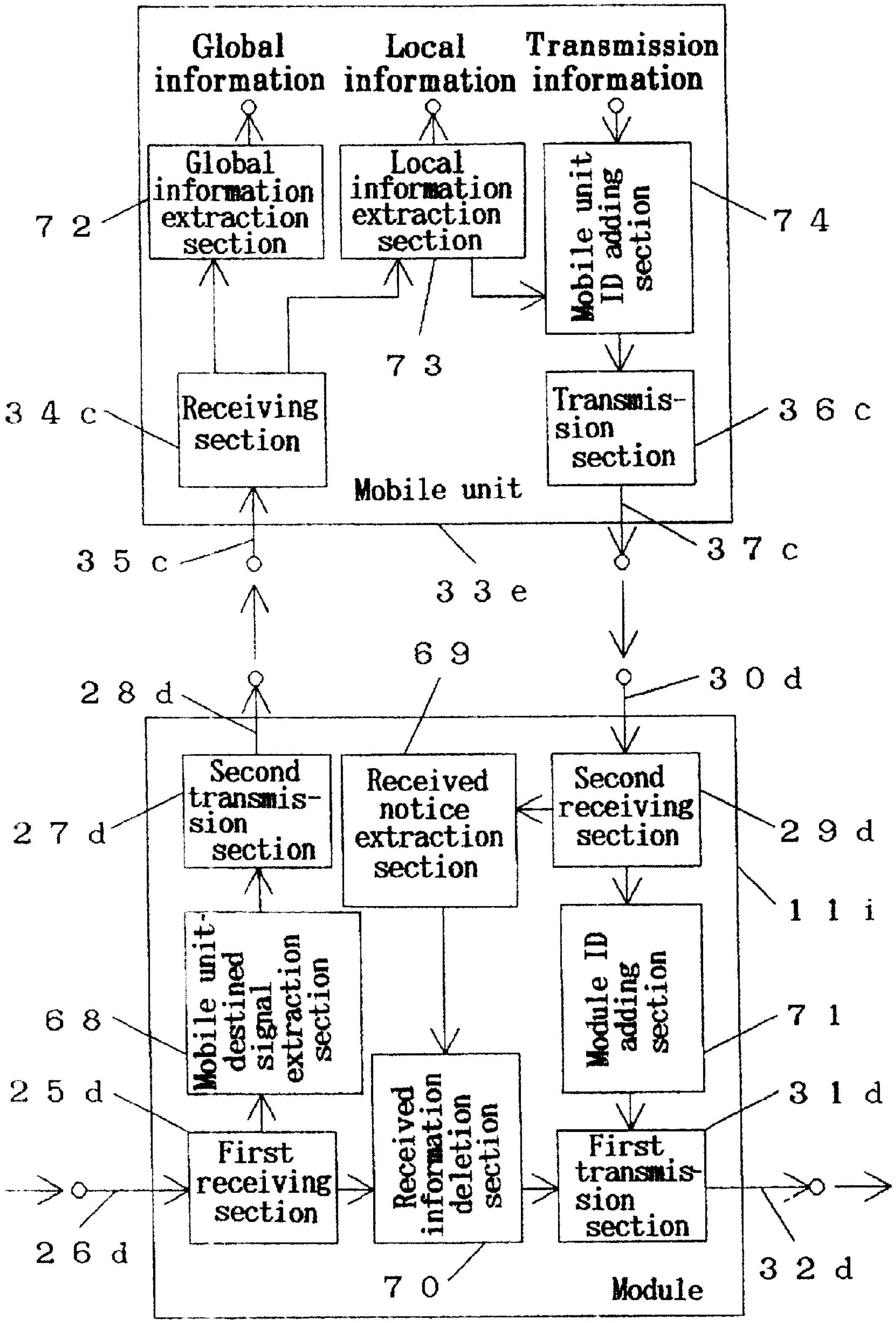

In FIG. 20, the first receiving section 25*d* of a module 11*i* receives as a first input signal 26*d* the first output signal 32*d* transmitted by the first transmission section 31*d* of another module 11*i* (not shown) adjacent to the transmitting end in accordance with a predetermined radio scheme. A mobile unit-destined information extraction section 68 extracts the information destined for the mobile unit 33*e* from the information contained in the first input signal 26*d* received by the first receiving section 25*d*. The second transmission section 27*d* transmits the second output signal 28*d* containing the information extracted by the mobile unit-destined information extraction section 68 in accordance with a predetermined radio scheme.

Now, assume that the second output signal 28*d* is received by the mobile unit 33*e* as shown in FIG. 20. Specifically, the receiving section 34*c* receives the second output signal 28*d* as an input signal 35*c* transmitted by the second transmission section 27*d* of the module 11*i* in accordance with a predetermined radio scheme.

A general information extraction section 72 extracts the information from the input signal 35*c* received by the receiving section 34*c* in compliance with an instruction of the operator. With regard to the input signal 35*c*, assume that the desired one of a plurality of channels such as TV programs can be selected and that a selection acceptance section (not shown) for accepting a selection is connected with the general information extraction section 72. Then, in compliance with the select instruction issued by the operator and accepted by the selection acceptance section, the information on the channel desired by the operator can be extracted. In the case where the information so extracted is audio information, however, a sound is output from an audio amplifier circuit, a speaker or the like (not shown) connected to the general information extraction section 72, or if video information is involved, a picture is displayed on a display section (not shown) connected to the general information extraction section 72.

A local information extraction section 73 extracts the information transmitted with the mobile unit identifier of the mobile unit 33*e* added thereto and the information identifier added to the particular information, from the input signal 35*c* received by the receiving section 34*c*. The information transmitted with the mobile unit identifier added thereto is imparted to the operator. In the case where the information is audio one, for example, a sound is output by the audio amplifier circuit, the speaker or the like (not shown) connected to the local information extraction section 73, or if video information is involved, a picture is displayed on a display section (not shown) connected to the local information extraction section 73. Also, the information identifier thus extracted is delivered to the mobile unit identifier adding section 74.

The mobile unit identifier adding section 74, upon receipt of an information identifier sent from the local information extraction section 73, adds a mobile unit identifier assigned in advance to the mobile unit 33*e* to the information identifier thereby to generate information on a received notice. The transmission section 36*c* transmits the output signal 37*c* containing the received-notice information generated by the mobile unit identifier adding section 74 in accordance with a predetermined radio scheme.

The output signal 37*c* containing the received-notice information is transmitted to the module 11*i* that has transmitted the second output signal 28*d* received as the input signal signal 35*c* by the receiving section 34*c* of the mobile unit 33*e* transmitting the particular output signal 37*c*. Specifically, the second receiving section 29*d* of the module 11*i* receives the output signal 37*c* as the second input signal 30*d* in accordance with a predetermined radio scheme. The received-notice extraction section 69 extracts the received-notice information from the information contained in the second input signal 30*d* received by the second receiving section 29*d*. A received-information deletion section 70 deletes the information corresponding to the received-notice information (the mobile unit identifier and the information identifier) extracted by the received-notice extraction section 69 from among the information contained in the first input signal 26*d* received by the first receiving section 25*d*. The first transmission section 31*d* transmits the first output signal 32*d* containing the information output from the received-information deletion section 70 in accordance with a predetermined radio scheme. The first output signal 32*d* thus transmitted is received as the first input signal 26*d* by the first receiving section 25*d* of still another module 11*i* (not shown) adjacent to the transmitting end.

As a result, the transmission of the unnecessary information that has already been received can be eliminated, and an optimum inter-module transmission can be attained.

(2) Operation of mobile unit 33*e* transmitting information

In the case where the information to be transmitted is generated, the mobile unit identifier adding section 74 of the mobile unit 33*e* adds a mobile unit identifier to the information to be transmitted. It is assumed according to the present embodiment, however, that the information to be transmitted has added thereto an information identifier to identify the particular information and an identifier of the receiving party. In the case where the receiving party is another mobile unit 33*e*, for example, the identifier of the receiving party is a mobile unit identifier assigned in advance to the particular another mobile unit 33*e*. In the case where the receiving party is an organization like a traffic information service center or the like, on the other hand, the identifier is the one assigned in advance to the particular organization. If a microphone and an amplifier circuit or the like (not shown) for amplifying the output signal of the microphone is connected to the mobile unit identifier adding circuit 74, the audio information can be used as the information to be transmitted. Also, in the case where an apparatus like a computer or the like (not shown) is connected with the mobile unit identifier adding section 74, on the other hand, picture information can be used as the information to be transmitted. The transmission section 36*c* transmits the output signal 37*c* containing the information to be transmitted with the mobile unit identifier added thereto by the mobile unit identifier adding section 74, in accordance with a predetermined radio scheme. The output signal 37*c* can contain the transmission time thereof.

The output signal 37*c* is received as the second input signal 30*d* in accordance with a predetermined radio scheme by the second receiving section 29*d* of the module 11*i*. The module identifier adding section 71 adds the module identifier assigned in advance to the module 11*i* to the information to be transmitted contained in the second input signal 30*d* received by the second receiving section 29*d*.

The first transmission section 31*d* transmits the first output signal 32*d* containing the output information of the received-information deletion section 70 and/or the output information of the module identifier adding section 71 in accordance with a predetermined radio scheme.

Consequently, even in the case where a response is required to the information transmitted by the mobile unit 33*e*, the responding party can send a response with the mobile unit identifier added thereto.

Also, in the case where the information to be transmitted contains the transmission time, provision of a predetermined time lapse information deletion section (not shown) in each module 11*i* for deleting the information to be transmitted that has elapsed a predetermined time from the transmission time thereof can delete any information to be transmitted, which has failed to reach the destination and has gone astray for some reason or other.

According to this embodiment, the received-notice information is assumed to contain the mobile unit identifier and the information identifier. The invention, however, is not necessarily limited to such a configuration, but the received-notice information can also contain the mobile unit identifier with equal effect. In such a case, the received-information deletion section 70 deletes all the information with the mobile identifier added thereto contained in the received-notice information. As an alternative, the received-notice information can contain the information identifier. In such a case, the received-information deletion section 70 deletes the information carrying the information identifier contained in the received-notice information.

Also, although the transmission system according to this embodiment is adapted to transmit information unidirectionally, the transmission system according to the invention is not necessarily confined to such a configuration, but like in the transmission system according to the fourth embodiment, can transmit the information bidirectionally. In such a case, the information to be transmitted can further contain an identifier (such as a module identifier) for specifying the position of the receiving end. In addition, each module 11*e* can be equipped with a transmission direction decision section (not shown) for deciding the direction in which the information to be transmitted is transmitted on the basis of the identifier thereof. As a result, the information to be transmitted is transmitted in the direction specified by the identifier for specifying the position of the receiving end.

Also, the mobile unit 33*e*, which is an automotive vehicle according to the present embodiment, may alternatively be a person carrying a portable telephone, an automatic cart in a factory, a train, a ship or an airplane.

Also, the plurality of the modules, which are installed along a road according to this embodiment, may alternatively be installed along a predetermined route like in the transmission system according to the second embodiment of the invention.

Further, the first receiving section 25*d* and the second receiving section 29*d* can share a receiving unit of a common design. In similar manner, the first transmission section 47*a* and the second transmission section 41*a* can share a transmission unit of a common design.

11th Embodiment

Figure 21:
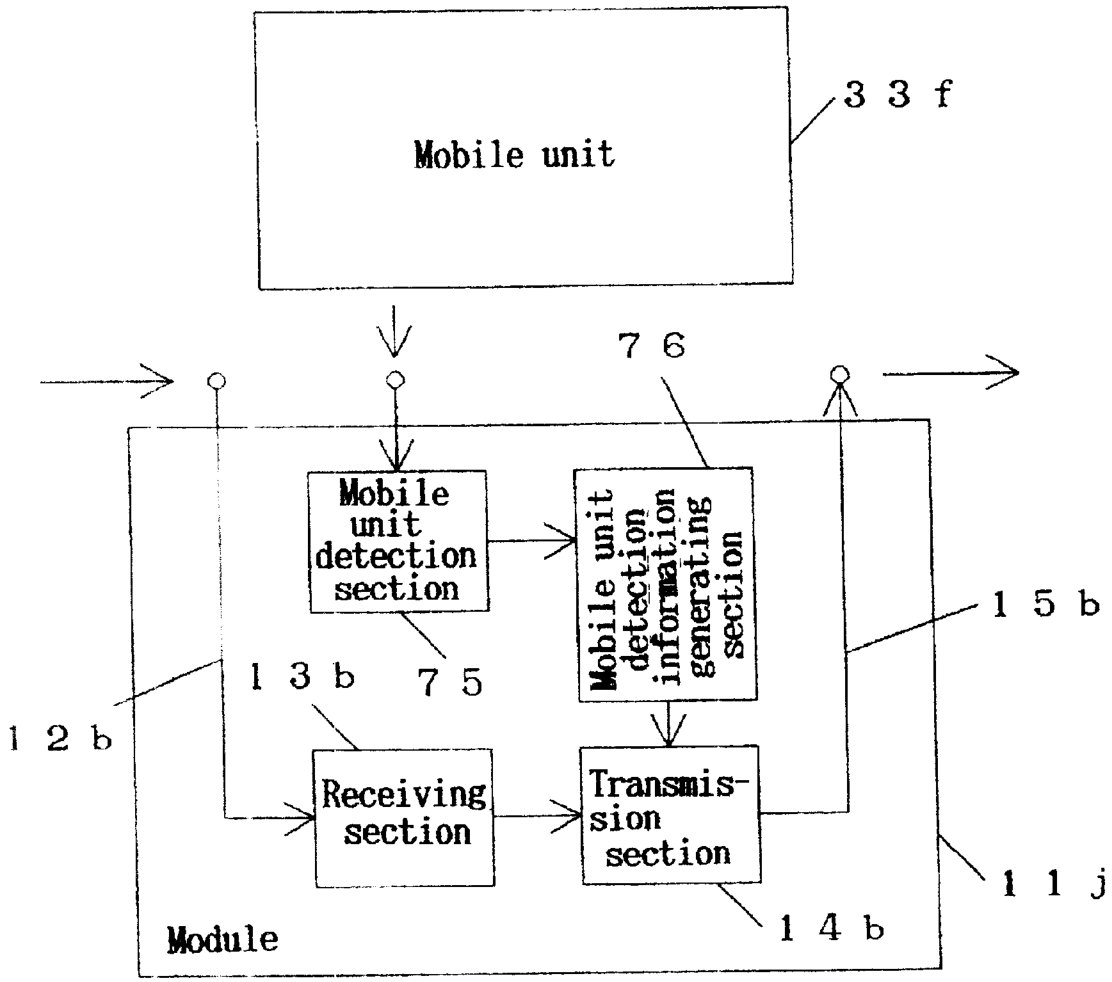

A transmission system according to an 11th embodiment of the present invention will be explained with reference to FIG. 21 constituting a diagram showing a partial configuration thereof. First, the mobile unit 33*f* is an automotive vehicle. Also, the transmission system according to this embodiment is configured of a plurality of modules 11*j* installed at spatial intervals d with each other along a road in the same manner as in FIG. 11.

A mobile unit detection section 75 of a module 11*j* is a circuit for detecting a mobile unit 33*f* passing above the module 11*j*. A mobile unit detection information generating section 76 is a circuit for generating mobile unit detection information on the basis of the result of detection by the mobile unit detection section 75. A receiving section 13*b* is a receiving unit for receiving the input signal 12*b* in accordance with a predetermined radio scheme. This predetermined radio scheme may be similar to the predetermined radio scheme in the transmission system according to the first embodiment of the invention. A transmission section 14*b* is a transmission unit for transmitting the output signal 15*b* containing the information contained in the input signal 12*b* received by the receiving section 13*b* and/or the mobile unit detection information generated by the mobile unit detection information generating section 76 in accordance with a predetermined radio scheme.

Now, the operation of this embodiment will be explained itemwise with reference to FIG. 22 constituting a diagram showing an example configuration of the mobile unit detection section 75.

(1) Detection by Weight Measurement

Figure 22:
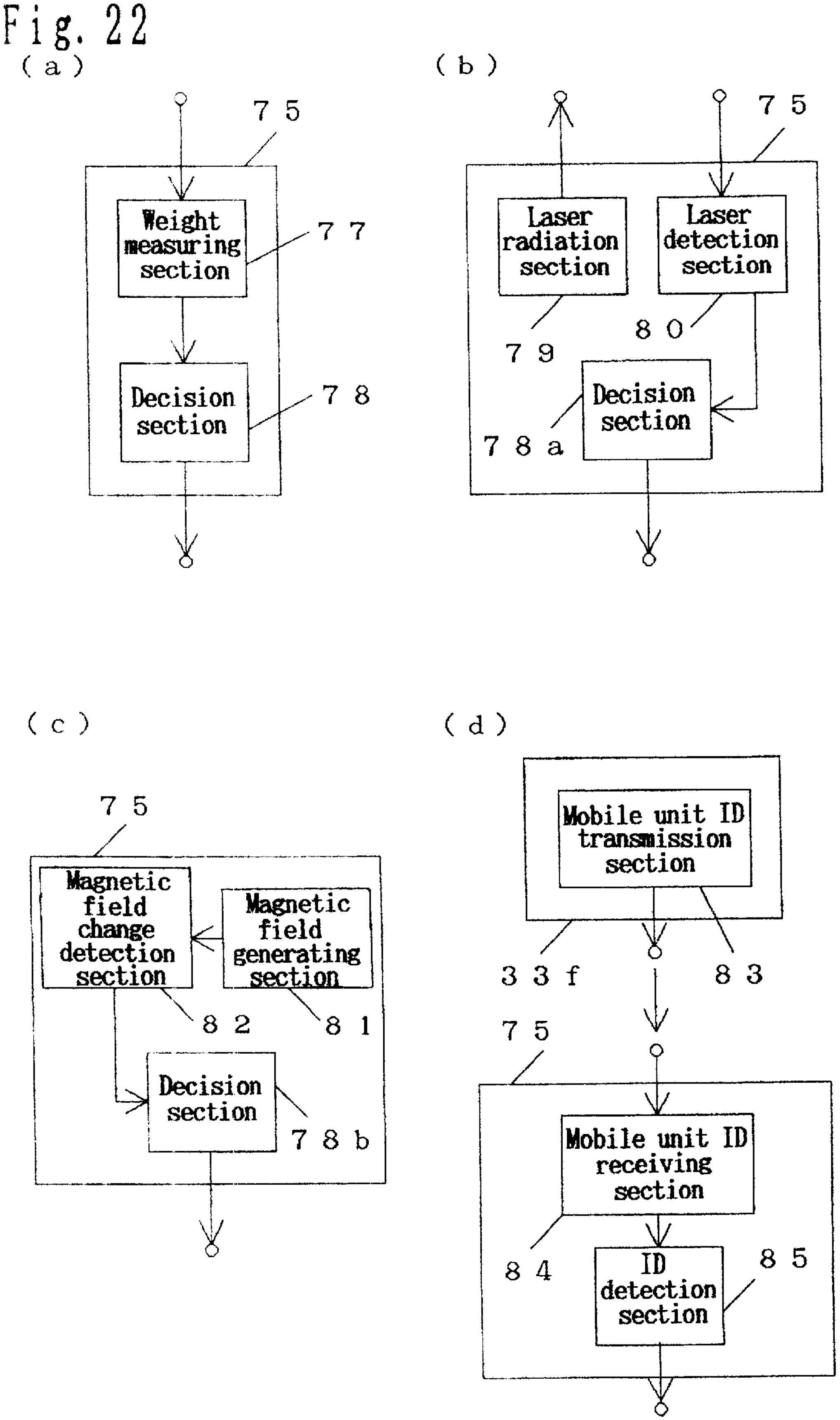

As shown in FIG. 22(*a*), the mobile unit detection section 75 includes a weight measuring section 77 and a decision section 78. In this case, the weight measuring section 77 is for measuring the weight of the mobile unit 33*f* passing above the module 11*j*. When the weight measured by the measuring section 77 is not less than a predetermined value or included in a predetermined range, the decision section 78 regards the weight measurement as the weight of the mobile unit 33*f* passing above the module 11*j* and thereby detects the mobile unit 33*f*. In the case where the mobile unit 33*f* is detected by the moving unit detection section 75, the mobile unit detection information generating section 76 adds a module identifier assigned in advance to the module 11*j* to the information indicating the detection of the mobile unit 33*f* thereby to generate the mobile unit detection information. The mobile unit detection information generating section 76 may include a storage section (not shown) for storing the module identifier.

The receiving section 13*b* receives as an input signal 12*b* the output signal 15*b* transmitted thereto from the transmission section 15*b* of another module (not shown) adjacent to the transmitting end in accordance with a predetermined radio scheme. The transmission section 14*b*, on the other hand, transmits according to a predetermined radio scheme the output signal 15*b* containing the information contained in the input signal 12*b* received by the receiving section 13*b* an/or the mobile unit detection information generated by the mobile unit detection information generating section 76. The output signal 15*b* is received in accordance with a predetermined radio scheme as an input signal 12*b* by the receiving section 13*b* of still another module 11*j* (not shown) adjacent to the transmitting end (2) Detection by Reflected Laser As shown in FIG. 22(*b*), the mobile unit detection section 75 includes a laser radiation section 79, a laser detection section 80 and a decision section 78*a*. In such a case, the laser radiation section 79 radiates the laser upward. The laser detection section 80 detects the laser thus reflected. In the case where the laser reflected by the laser is detected by the laser detection section 80, the decision section 78*a* regards the particular reflected laser as the laser radiated from the laser radiation section 79 and reflected from a mobile unit 33*f*, and thus detects the mobile unit 33*f*. The subsequent operation is similar to the corresponding operation in (1) above.

(3) Detection by Change in Magnetic Field

As shown in FIG. 22(*c*), the mobile unit detection section 75 includes a magnetic field generating section 81, a magnetic field change detection section 82 and a decision section 78*b*. In such a case, the magnetic field generating section 81 has a magnet from which a magnetic field is generated. The magnetic field change detection section 82 includes a Hall element, and the change in the magnetic field which is generated by the magnetic field generating section 81 and passes through the Hall element is detected from a current change. When the change in the current is detected by the magnetic field change detection section 82, the decision section 78*b* regards that the detected change is the result of the iron contained in the mobile unit 33*f* passing above the module 11*i* acting on the magnetic field passing through the Hall element, and thus detects the mobile unit 33*f*. The subsequent operation is similar to (1) above.

(4) Detection by Mobile Unit Identifier

As shown in FIG. 22(*d*), a mobile unit detection section 75 includes a mobile unit identifier receiving section 84 and an identifier detection section 85. In addition, the mobile unit 33*f* includes a mobile unit identifier transmission section 83. In such a case, the mobile unit identifier transmission section 83 constantly transmits a signal containing a mobile unit identifier like in the transmission system according to the tenth embodiment of the invention in such a manner as to be received only by the nearest one of the modules 11*j* in accordance with a predetermined radio scheme.

In the mobile unit detection section 75 of the module 11*j* located nearest from the position wherefrom the signal is transmitted, the mobile unit identifier receiving section 84 receives a signal containing the particular mobile unit identifier in accordance with a predetermined radio scheme. An identifier detection section 85 detects the mobile unit identifier from the signal received by the mobile unit identifier receiving section 84. Specifically, when the mobile unit identifier is detected by the identifier detection section 85, the mobile unit 33*f* having the mobile unit identifier transmission section 83 that has transmitted the signal containing the particular mobile unit identifier can be regarded as located in the neighborhood. In the case where the mobile unit detection section 75 detects the mobile unit 33*f*, the mobile unit detection information generating section 76 adds a module identifier assigned in advance to the module 11*j* to the mobile unit identifier detected by the identifier detection section 85 thereby to generate mobile unit detection information. The subsequent operation is similar to the corresponding operation in (1) described above.

In this way, the output signal 15*b* containing the mobile unit detection information is transmitted from the transmission section 14*b* of each of the plurality of the modules 11*j* installed along a road. As a result, once the mobile unit detection information is collected, the conditions of the particular road can be accurately grasped.

By the way, in each of (1) to (4) above, the module 11*j* can further include a clock, and the mobile unit detection information generating section 76 can generate the mobile unit detection information further containing the time information as to the time when the mobile unit 33*f* is detected by the mobile unit detection section 75.

Also, unlike according to this embodiment, the mobile unit detection information need not contain the module identifier.

Further, although the configuration of the mobile unit detection section 75 is as shown in FIG. 22 according to this embodiment, the invention is not necessarily confined to such a configuration, but is applicable with equal effect to a configuration in which the mobile unit 33*f* moving above or in the neighborhood of the module 11*j* can be detected.

12th Embodiment

Figure 23:
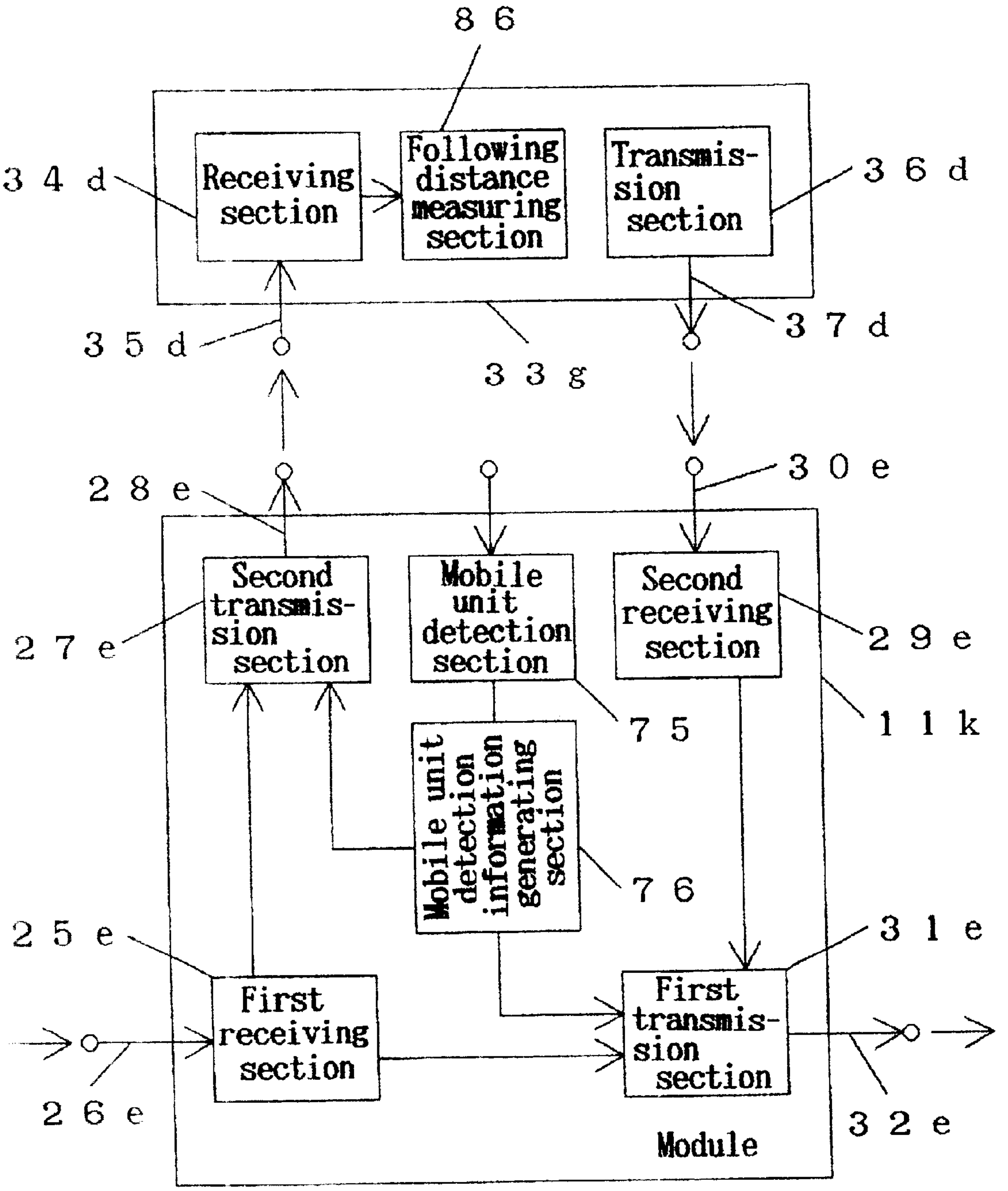

A transmission system according to a 12th embodiment of the invention will be explained with reference to FIG. 23 showing a part of the configuration thereof. First, a mobile unit 33*g* is an automotive vehicle. Also, the transmission system according to this embodiment is configured of a plurality of modules 11*k* installed at spatial intervals d along a road.

First, a configuration of the module 11*k* will be explained. A mobile unit detection section 75 and a mobile unit detection information generating section 76 are similar to the corresponding ones in the transmission system according to the 11th embodiment of the invention. The mobile unit detection information generated by the mobile unit information generating section 76, however, is sent to a first transmission section 31*e* and a second transmission section 27*e*.

The first receiving section 25*e* is a receiving unit for receiving a first input signal 26*e* in accordance with a predetermined radio scheme. This predetermined radio scheme may be similar to the predetermined radio scheme in the transmission system according to the first embodiment of the invention. The second transmission section 27*e* is a transmission unit for transmitting in accordance with a predetermined radio scheme a second output signal 28*e* containing the whole or part of the information contained in the first input signal 26*e* received by the first receiving section 25*e* and/or the mobile unit detection information generated by the mobile unit detection information generating section 76.

The second receiving section 29*e* is a receiving unit for receiving a second input signal 30*e* in accordance with a predetermined radio scheme. The first transmission section 31*e* is a transmission unit for transmitting in accordance with a predetermined radio scheme a first output signal 32*e* containing the information contained in the first input signal 26*e* received by the first receiving section 25*e*, the mobile unit detection information generated by the mobile unit detection information generating section 76 and the whole or part of the information contained in the second input signal 30*e* received by the second receiving section 29*e*.

Now, a configuration of the mobile unit 33*g* will be explained. The receiving section 34*d* is a receiving unit for receiving as an input signal 35*d* the second output signal 28*e* transmitted by the second transmission section 27*e* of the module 11*k* in accordance with a predetermined radio scheme. A following distance measuring section 86 is a circuit for measuring the following distance between mobile units on the basis of the input signal 35*d* received by the receiving section 34*d*. The transmission section 36*d* is a transmission unit for transmitting the output signal containing the information to be transmitted, in accordance with a predetermined radio scheme.

Figure 24:
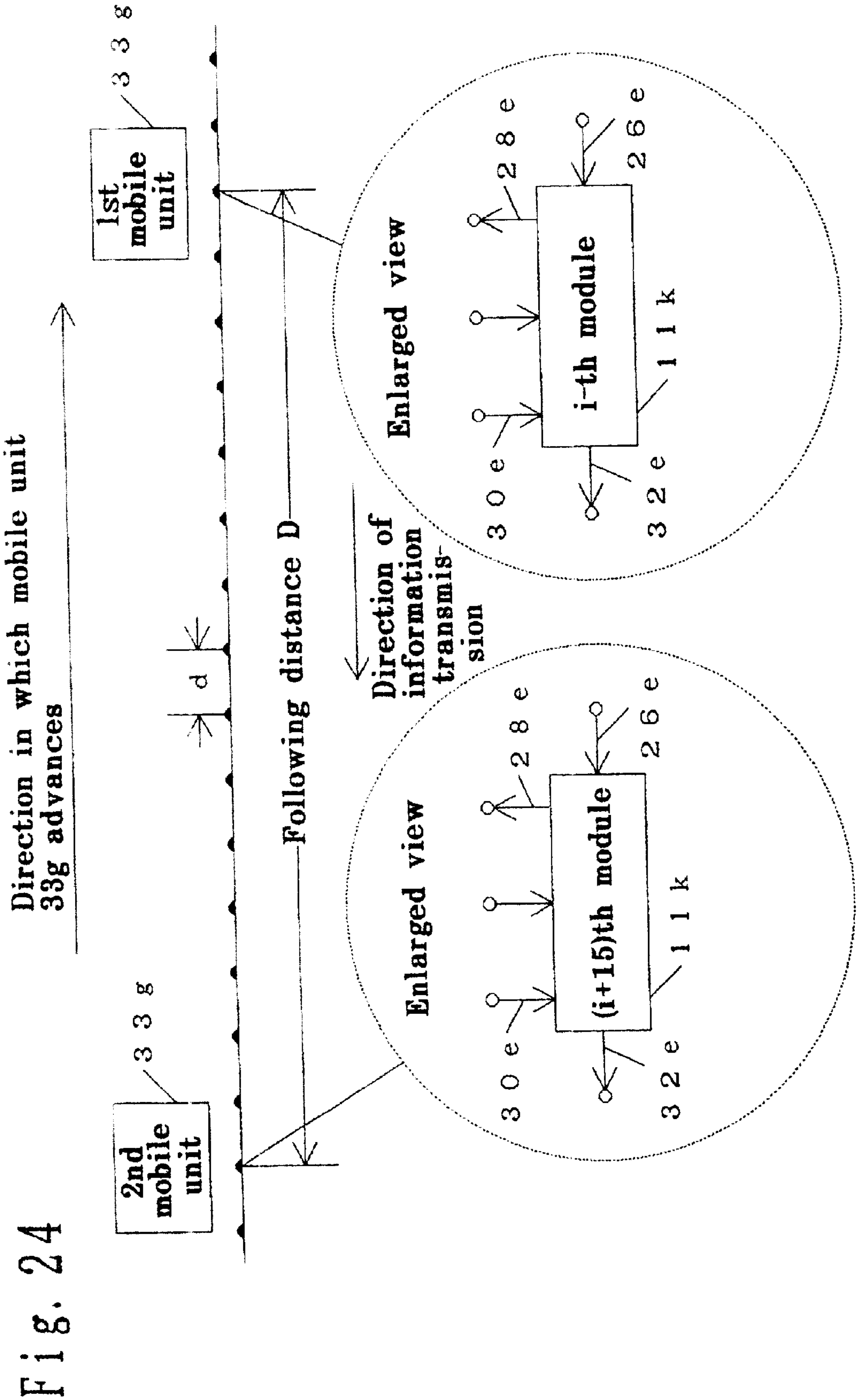

Now, the operation of this embodiment will be explained. The communication between the module 11*k* and the mobile unit 33*g* and the inter-module transmission may be similar to the like communication and the like transmission, respectively, in the transmission system according to the above-mentioned embodiments. Thus, the operation of measuring the following distance will be explained with reference to FIG. 23 and FIG. 24 which is a diagram for explaining the same. As shown in FIG. 24, according to the present embodiment, the direction of information transmission is assumed to opposite to the direction in which the mobile unit 33*g* moves.

(2) Method of Measuring the Following Distance Based on Temporal Information

First, the mobile unit 33*g* includes a mobile unit identifier transmission section 83 of FIG. 22(*d*) (not shown in FIG. 23), and the configuration of the mobile unit detection section 75 of the module 11*k* is assumed to be similar to the corresponding one shown in FIG. 22(*d*). And, the mobile unit detection information is assumed to contain at least the mobile unit identifier of the mobile unit 33*g*, the temporal information as to the time when the mobile unit 33*g* is detected and the module identifier for the module 11*k* detected. Also, the following distance measuring section 86 of the mobile unit 33*g* is assumed to include a storage section (not shown) for storing the mobile unit detection information contained in the input signal 35*d* received by the receiving unit 34*d*.

The mobile unit 33*g* runs along a road installed with a plurality of the modules 11*k* while transmitting a signal containing the identifier of the same mobile unit in accordance with a predetermined radio scheme from the mobile unit identifier transmission section 83 thereof. As shown in FIG. 24, the signal containing the mobile unit identifier transmitted by the second mobile unit 33*g* is assumed to be received in accordance with a predetermined radio scheme by the mobile unit detection section 75 of the (i+15)th module 11*k*. In the (i+15)th module 11*k*, the mobile unit detection section 75 detects a mobile unit identifier from the signal containing the particular mobile unit identifier received. The mobile unit detection information generating section 76 generates the mobile unit detection information containing the mobile unit identifier detected by the mobile unit detection section 75, the detected temporal information t2 [i+15] and the module identifier assigned in advance to the (i+15)th module 11*k*. The first transmission section 31*e* transmits in accordance with a predetermined radio scheme at least the first output signal 32*e* containing the mobile unit detection information generated by the mobile unit detection information generating section 76. The second transmission section 27*e*, on the other hand, transmits in accordance with a predetermined radio scheme the second output signal 28*e* containing at least the mobile unit detection information generated by the mobile unit detection information generating section 76.

The receiving section 34*d* of the second mobile unit 33*g* receives as an input signal 35*d* the second output signal 28*e* transmitted from the second receiving section 27*e* of the (i+15)th module 11*k* in a predetermined radio scheme.

The following distance measuring section 86 extracts the mobile unit detection information from the input signal 35*d* received by the receiving section 34*d*. In the process, the following distance measuring section 86 acquires a local mobile unit identifier, temporal information t2 [i+15] as to the time when the particular mobile unit identifier was detected and a module identifier for the (i+15)th module 11*k*.

The information thus acquired is stored in the storage section of the following distance measuring section 86. Also, the storage section has stored therein the mobile unit detection information for the first mobile unit 33*g* running immediately ahead of the second mobile unit 33*g* (the mobile unit identifier of the first mobile unit 33*g*, the temporal information t1 [j] to t[k] as to the time when the particular mobile unit identifier was detected, and the module identifiers of the j-th to k-th modules 11*k* associated with the detected temporal information), where j, k are integers satisfying the relation $j<k\leqq i$.

As a result, the following distance measuring section 86 of the second mobile unit 33*g* can calculate the velocity V1 of the first mobile unit 33*g* by the following Expression 1 on the basis of the mobile unit detection information generated upon detection of the first mobile unit 33*g* by the 15th and 14th modules 11*k* (the mobile unit identifier of the first mobile unit 33*g*, the temporal information t1[15] and t1[14] as to the time when the particular mobile unit identifier was detected, and the module identifiers of the 15th and 14th modules 11*k* for which the temporal information were detected).

$$V1=d/(t1[14]-t2[15]) \quad \text{[Expression 1]}$$

Thus, the following distance measuring section 86 of the second mobile unit 33*g* can calculate the following distance D with the first mobile unit 33*g* according to the following Expression 2 using the velocity V1.

$$\begin{aligned} D &= V1\times(t2[15]-t1[15]) \\ &= d\times(t2[15]-t[15])/(t[14]-t2[15]) \end{aligned} \quad \text{[Expression 2]}$$

In the foregoing description, the following distance measuring section 86 of the second mobile unit 33*g* calculated the following distance D on the basis of the mobile unit detection information generated by the 15th and 14th modules 11*k*. Alternatively, the following distance D can be calculated on the basis of the mobile unit detection information generated by the j-th and k-th modules 11*k*.

(2) Method of Measuring the Following Distance Based on Module Identifier

A method of measuring the following distance on the basis of the module identifier contained in the mobile unit detection information will be explained with reference to FIGS. 23 and 24. First, the mobile unit detection information is assumed to include at least the information indicating the detection of the mobile unit 33*g* and the module identifier of the module 11*k* that has detected the particular mobile unit 33*g*.

Each time the mobile unit 33*g* passes over each of the plurality of the modules 11*k* installed along a road, the first transmission section 32*e* transmits the first output signal 32*e* containing the mobile unit detection information in accordance with a predetermined radio scheme, and the second transmission section 27*e* transmits the second output signal 28*e* containing the mobile unit detection information at the same time in accordance with a predetermined radio scheme. These operations are performed very fast. Specifically, assume that the i-th module 11*k* detects the first mobile unit 33*g* and has transmitted the mobile unit detection information thereof. Even when the first mobile unit 33*g* is running at maximum speed before the (i+1)th to j-th modules 11*k* receive and transmit the mobile unit detection information sequentially, the particular speed of the first mobile unit 33*g* is at most such that it cannot move to the position detected by the mobile unit detection section 75 of the next (i−1)th module. In the case of FIG. 24, however, j is required to be an integer satisfying the relation J>15.

Under the condition shown in FIG. 24, the first transmission section 32*e* of the i-th module 11*k* transmits the first output signal 32*e* containing the mobile unit detection information for the first mobile unit 33*g* in accordance with a predetermined radio scheme, and the second transmission section 27*e* transmits the second output signal 28*e* containing the same mobile unit detection information in accordance with a predetermined radio scheme at the same time. In the (i+15)th module 11*k*, on the other hand, the first transmission section 32*e* transmits the first output signal 32*e* containing the mobile unit detection information for the second mobile unit 33*g* in accordance with a predetermined radio scheme, and the second transmission section 27*e* transmits the second output signal 28*e* containing the same mobile unit detection information in accordance with a predetermined radio scheme at the same time. Since the mobile unit detection information for the first mobile unit 33*g* is transmitted instantaneously from the i-th module to the (i+15)th module, however, the (i+15)th module 11*k* transmits the second output signal 28*e* containing the mobile unit detection information for the first mobile unit 33*g* instantaneously after transmitting the second output signal 28*e* containing the mobile unit detection information for the second mobile unit 33*g*. Consequently, before the second mobile unit 33*g* is detected by the mobile unit detection section 75 of the (i+14)th module, the receiving section 34*d* of the second mobile unit 33*g* receives as the input signal 35*d* thereto the second output signal 28*e* containing the mobile unit information for the second mobile unit 33*g*. After that, the second output signal containing the mobile unit detection information for the first mobile unit 33*g* is received as the input signal 35 instantaneously.

As a result, the following distance measuring section 86 of the second mobile unit 33*g* can calculate the following distance D on the basis of the mobile unit detection information for the second mobile unit 33*g* (the information indicating that the second mobile unit 33*g* has been detected, and the module identifier of the (i+15)th module that has detected the mobile unit 33*g*) and the mobile unit detection information for the first mobile unit 33*g* (the information indicating that the first mobile unit 33*g* has been detected, and the module identifier of the i-th module that has detected the same mobile unit 33*g*). Specifically, the following distance measuring section 86 first calculates the number n (=i+15−1) of the intervals d between the i-th module 11*k* and the (i+15)th module 11*k* on the basis of the module identifier of the (i+15)th module 11*k* (which is assumed to be the identifier meaning i+15) and the module identifier of the i-th module 11*k* (which is assumed to be the identifier meaning i). Thus the following distance measuring section 86 determines the following distance D from n×d.

As a result, each mobile unit 33*g* moving along a road installed with a plurality of modules 11*k* can measure the velocity of another mobile unit 33*g* and also the following distance thereof on the basis of the mobile unit detection information.

By the way, each module 11*k*, like in the transmission system according to the tenth embodiment of the invention, may further include a deletion section (not shown) for deleting the mobile unit detection information that has passed a predetermined time from the detection time point. Also, each module 11*k* can further include a deletion section (not shown) for deleting the mobile unit detection information that has been transmitted by a predetermined number of modules 11*k*.

13th Embodiment

Figure 25:
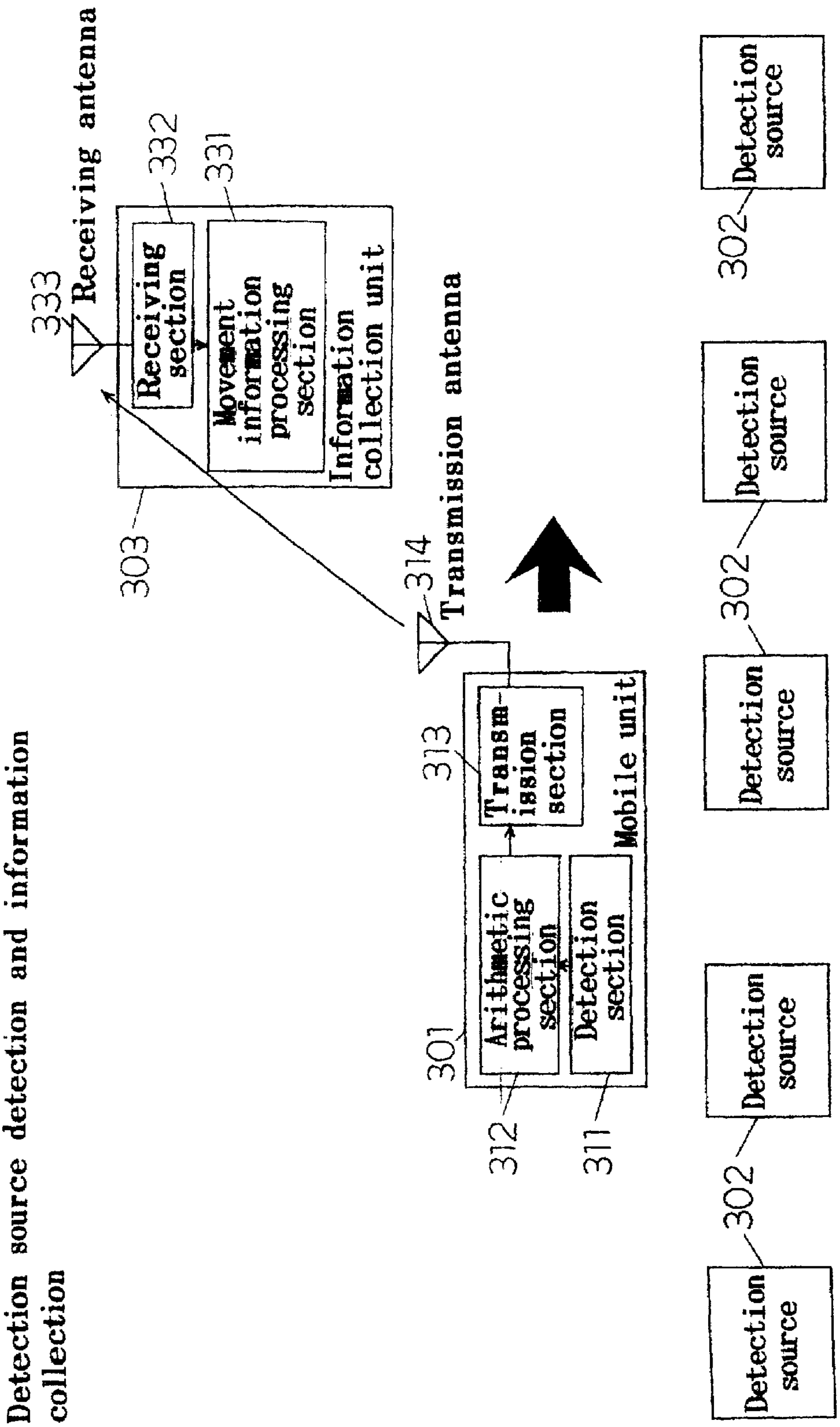

FIG. 25 is a diagram showing a configuration of a mobile unit support system according to a 13th embodiment of the present invention. This mobile unit support system is configured of a mobile unit 301 represented by an automotive vehicle or the like running along a road as a route of movement, a detection source 302 including a plurality of objects to be detected installed in the direction in which the mobile unit 301 is driven on the road, and an information collection unit 303 for receiving the transmission signal from the mobile unit 301 and collecting information on the mobile unit 301 and the like.

In the above-mentioned configuration, the mobile unit 301 is configured of a detection section 311 for detecting the detection source 302, an arithmetic processing section 312 for determining the information such as the velocity of the mobile unit and the position thereof on the road, for example, using the arrangement information such as the intervals and positions of the detection sources 302 stored in advance in a storage section (not shown) built therein on the basis of the detection signal from the detection section 311, and a transmission section 313 and a transmission antenna 34 for transmitting the output information of the arithmetic processing section 312 to the information collection unit 303. Also, the information collection unit 303 is configured of a receiving antenna 333 and a receiving section 332 for receiving the transmission signal from the mobile unit 301 and a movement information processing section 331 for acquiring the moving conditions of the mobile unit 301 from the signal thus received. In this connection, the types of energy applicable for a combination of the detection section 311 and the detection source 302 may include the magnetic field, radio wave, light, heat, sound wave, atmospheric pressure and the like. Especially in the case where the magnetic field is used, a permanent magnet is used as the detection source 302, thus eliminating the need of a drive source, and hence substantially no maintenance is required. Also, the detection sources 302 can be arranged at intervals of, say, about a meter.

Now, the operation of a mobile unit support system according to the 13th embodiment will be described with reference to the drawings.

First, assume that the mobile unit 301 is moving in the direction of arrow on a road installed with a plurality of detection sources 302. Then, the operation of detecting the detection sources 302 by the detection section 311 of the mobile unit 301 proceeds from left to right in the drawing, and the detection signal is output to the arithmetic processing section 312. The arithmetic processing section 312 arithmetically processes the detection signal input thereto with reference to the arrangement information of the detection sources 302 stored in advance in the storage section (not shown) such as a memory. This arithmetic processing is such that if the intervals at which the detection sources 302 are arranged is known, for example, the running speed of the mobile unit 301 can be calculated by measuring the temporal intervals of detection. Also, the present position of the mobile unit 301 can be determined from the position information of the detection sources 302. Then, the mobile unit 301 transmits the information such as the velocity thus obtained through the transmission antenna 314 from the transmission section 313 using a radio wave to the information collection unit 303.

The information collection unit 303 receives the radio wave transmitted from the mobile unit 301 by the receiving antenna 333 and the receiving section 332 and processes the received signal in the movement information processing section 331. In the case under consideration, the moving speed, the present position and the like information of the mobile unit 301 are extracted and the conditions of the mobile unit on the road are grasped, for example.

Also, in the case where another mobile unit is moving ahead of or behind the mobile unit 301, it is possible to measure the distance between said another mobile unit and the mobile unit 301. Specifically, since the intervals at which the detection sources 302 are arranged are known, the distance between the mobile units can be calculated by the mobile unit 301 or by the information collection unit 303 on the basis of the mobile detection information obtained by measuring the temporal intervals of mobile unit detection. By the way, in the case where the distance between mobile units is calculated by the information collection unit 303, the very information on mobile unit detection is transmitted to the information collection unit 303 from the mobile unit 303.

14th Embodiment

Figure 26:
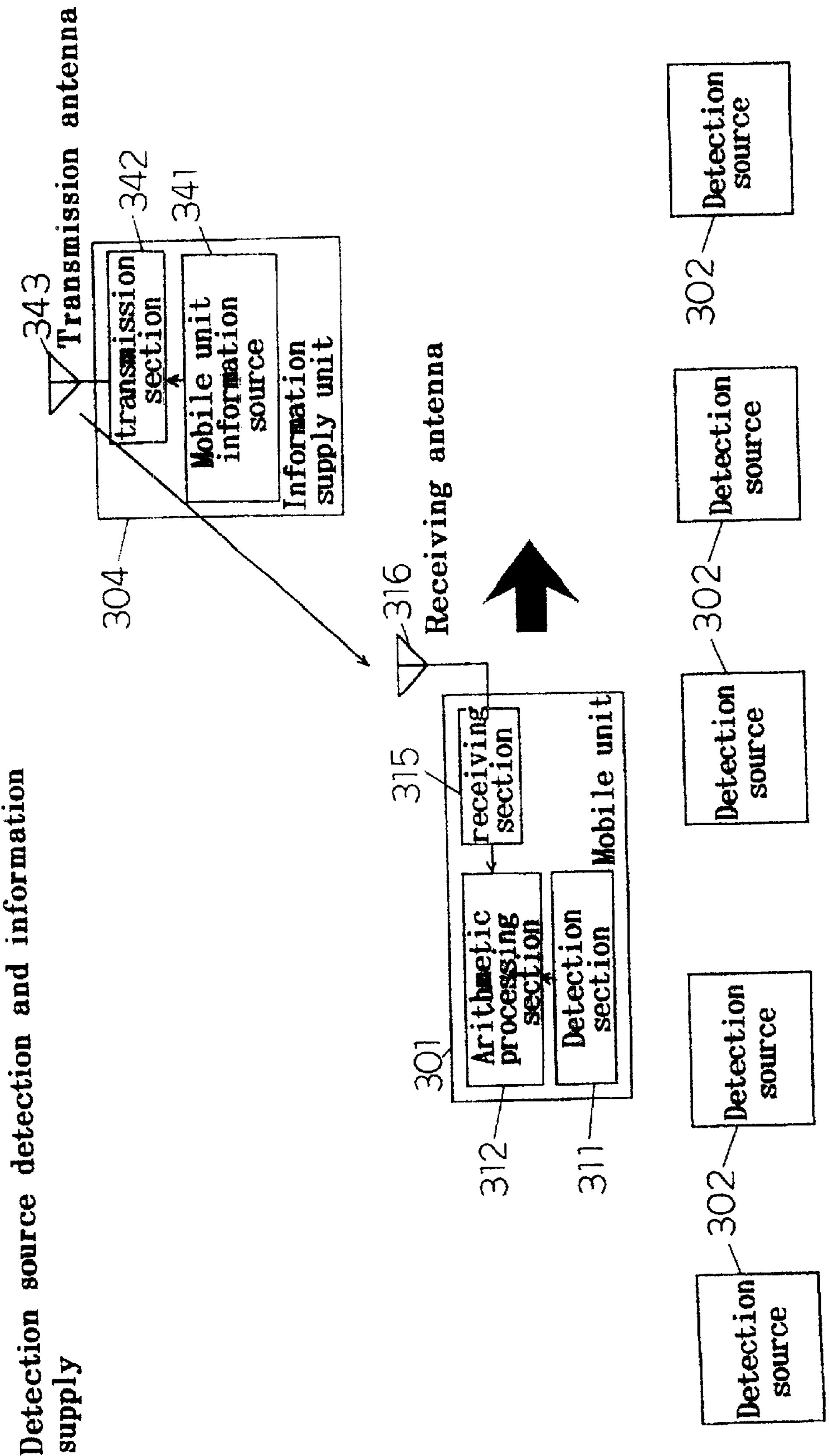

FIG. 26 is a diagram showing a configuration of a mobile unit support system according to a 14th embodiment of the invention. This embodiment is different from the configuration of FIG. 25 in that in this embodiment, an information supply unit 304 is provided in place of the information collection unit 303, in that the mobile unit 301 includes a receiving section 315 and a receiving antenna 316 for receiving the signal from the information supply unit 304 in place of the transmission section 313 and the transmission antenna 314, and in that the arithmetic processing section 312 lacks the arrangement information of the detection sources 302. The information supply unit 304 is configured of a mobile unit information source 341 having information on the arrangement of the detection sources 341 and a transmission section 342 and a transmission antenna 343 for transmitting the information from the mobile unit information source 341 to the mobile unit 301, for example.

According to this embodiment, the mobile unit 301 can determine the moving speed and the present position thereof on its own using the information on the arrangement of the detection sources 302 and the like transmitted from the information supply unit 304.

15th Embodiment

Figure 27:
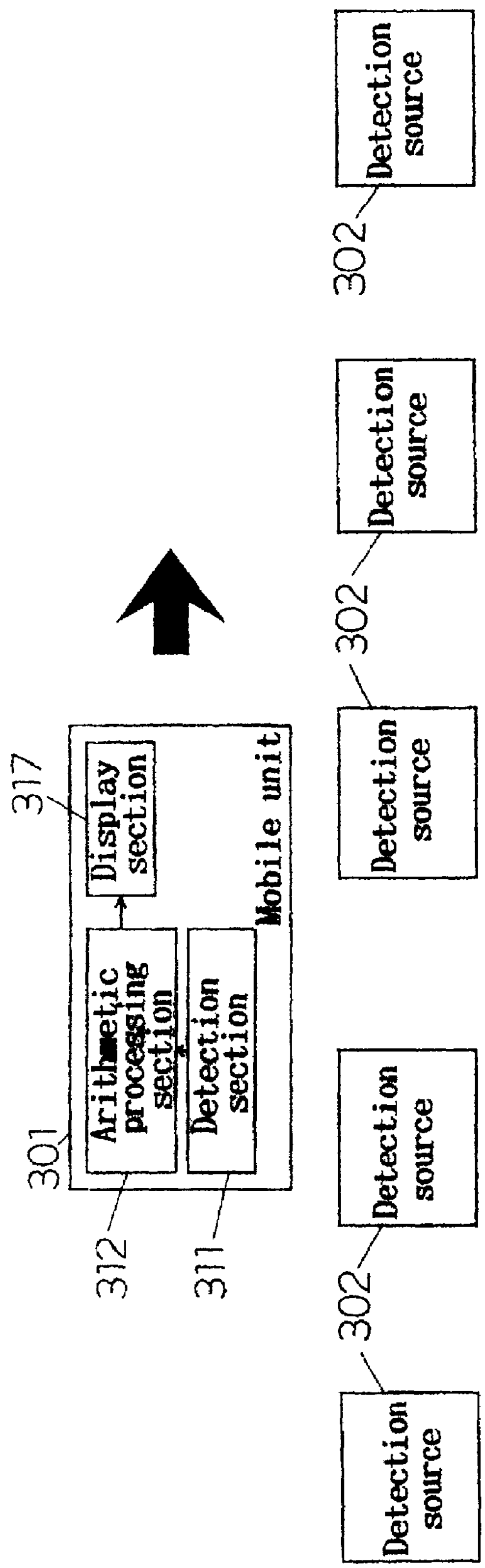

FIG. 27 is a diagram showing a configuration of a mobile unit support system according to a 15th embodiment of the invention. This embodiment is different from the configuration of FIG. 25 shown above in that in this embodiment, the information collection unit 303 is lacking, the mobile unit 301 lacks the transmission section 313 and the transmission antenna 314, and that a display section 317 is provided for displaying the information obtained by the arithmetic processing section 312.

According to this embodiment, the arithmetic processing section 312 causes the information such as the moving speed and the present position of the mobile unit 301 itself obtained in the same manner as in the 13th embodiment described above to be displayed on the display section 317.

16th Embodiment

Figure 28:
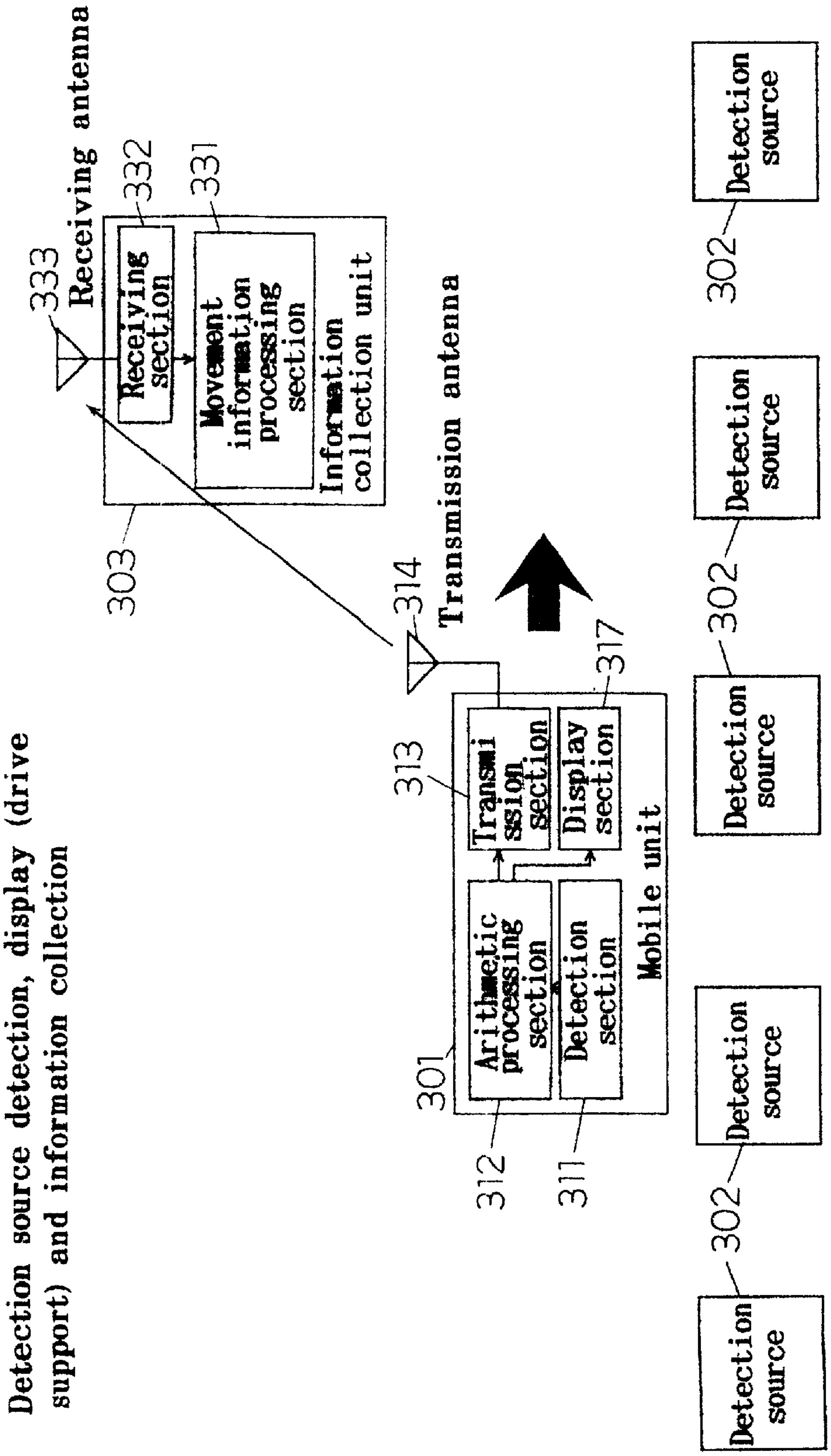

FIG. 28 is a diagram showing a configuration of a mobile unit support system according to a 16th embodiment of the invention. This embodiment is a combination of the configuration of FIG. 25 and that of FIG. 27.

According to this embodiment, therefore, the arithmetic processing section 312 causes the information such as the moving speed and the present position of the mobile unit 301 itself obtained in a manner similar to the embodiment 13 described above to be displayed on the display section 317, while at the same time transmitting the particular information to the information collection unit 303. The subsequent process is similar to that in the case shown in FIG. 25.

17th Embodiment

Figure 29:
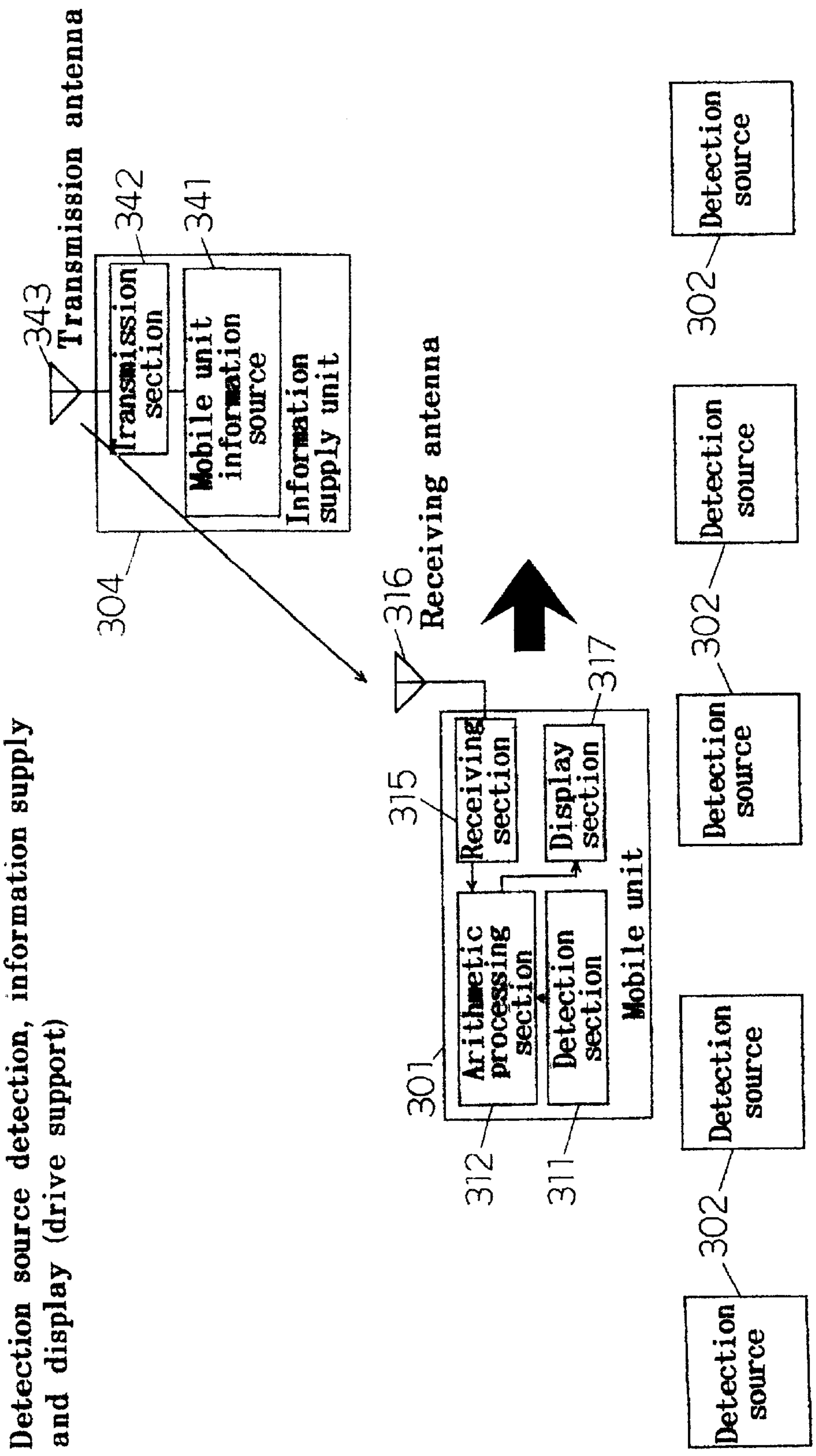

FIG. 29 is a diagram showing a configuration of a mobile unit support system according to a 17th embodiment of the invention. This embodiment is a combination of the configuration of FIG. 26 and that of FIG. 27 described above.

According to this embodiment, therefore, like in the embodiment 14 described above, the information on the arrangement of the detection sources 302 transmitted from the information supply unit 304 and the like are received, and using the information thus received, the information including the moving speed and the present position of the mobile unit 301 itself obtained by the arithmetic processing section 312 is displayed on the display section 317.

18th Embodiment

Figure 30:
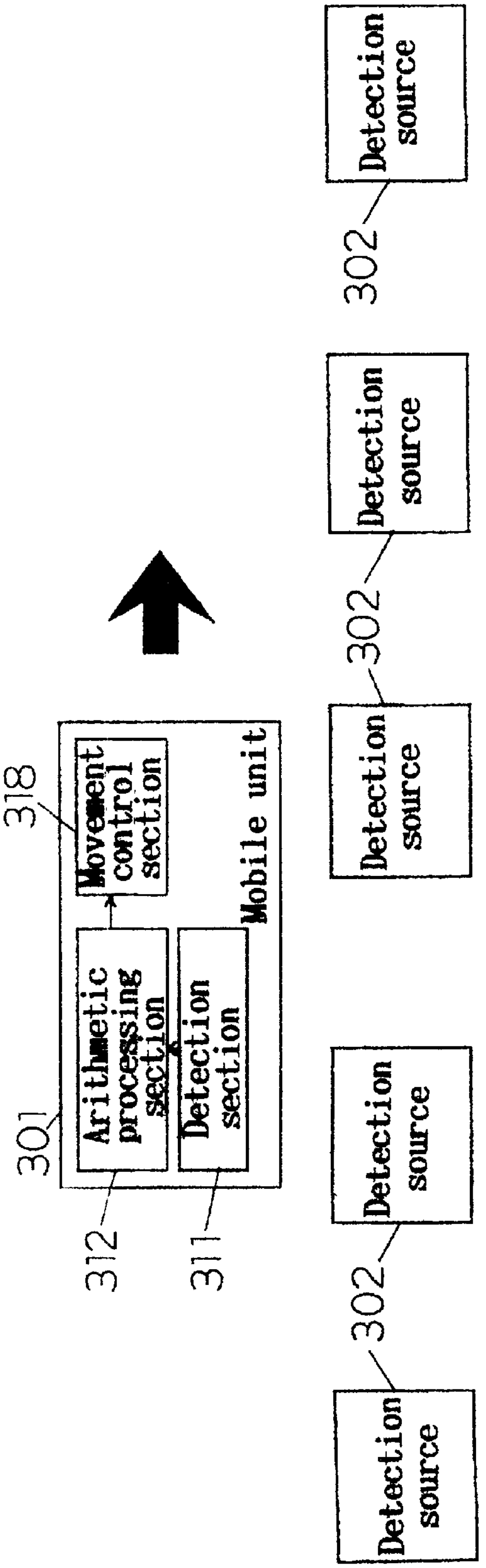

FIG. 30 is a diagram showing a configuration of a mobile unit support system according to an 18th embodiment of the invention. This embodiment includes a movement control section 318 for controlling the movement of the mobile unit 301 in place of the display section 317 shown in FIG. 27.

According to this embodiment, the moving speed can be increased or decreased, the running direction can be changed or other control operations can be performed on the basis of the information such as the moving speed and the present position of the mobile unit 301 itself obtained in the same manner as in the 13th embodiment described above by the arithmetic processing section 312.

19th Embodiment

Figure 31:
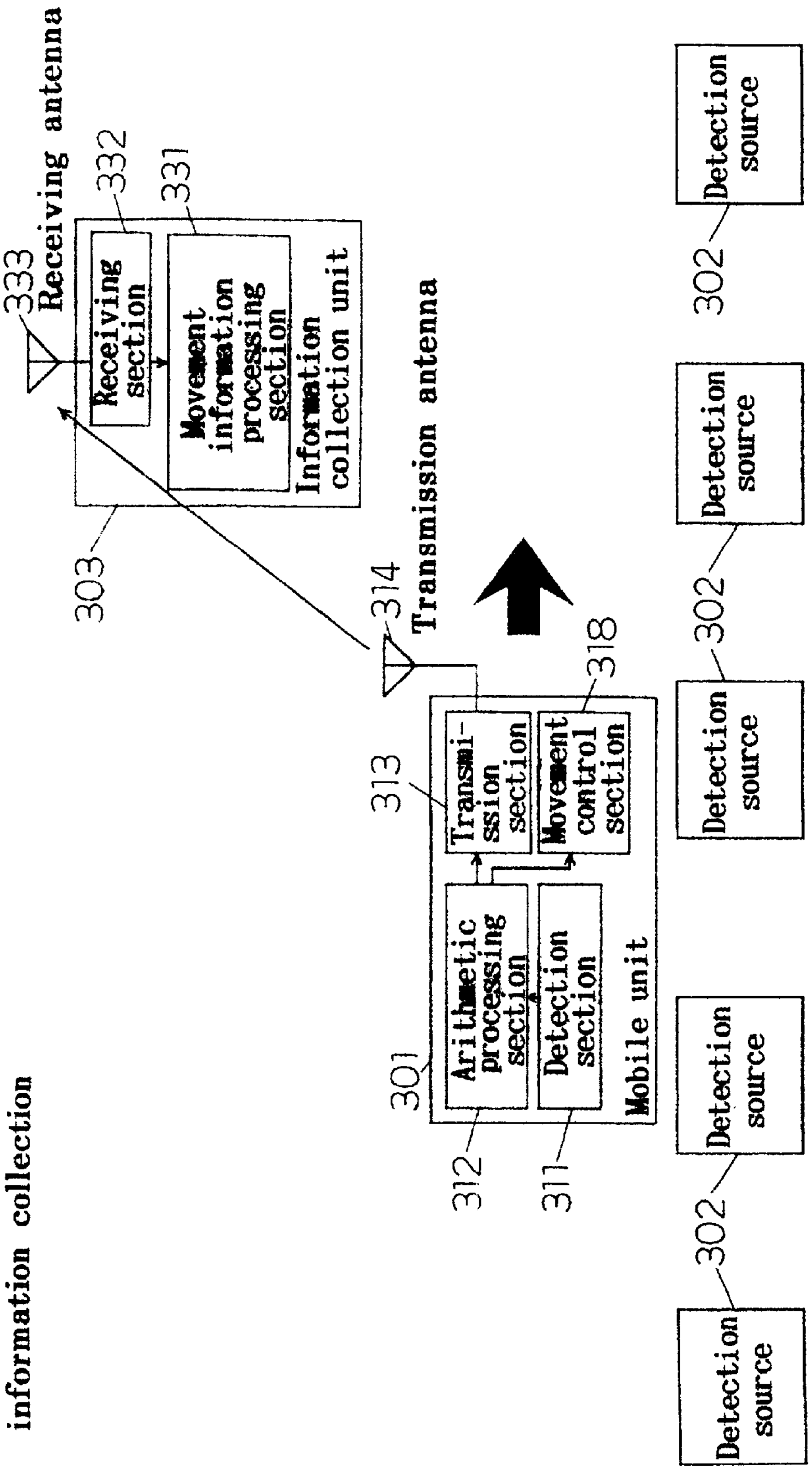

FIG. 31 is a diagram showing a configuration of a mobile unit support system according to a 19th embodiment of the invention. This embodiment is a combination of the configuration of FIG. 25 and that of FIG. 30 shown above.

According to this embodiment, therefore, the arithmetic processing section 312 causes such information as the moving speed and the present position of the mobile unit 301 itself obtained in the same manner as in the embodiment 13 described above to be transmitted to the information collection unit 303. At the same time, the moving speed and the running direction of the mobile unit 301 are controlled by the movement control section 318 on the basis of such information.

20th Embodiment

Figure 32:
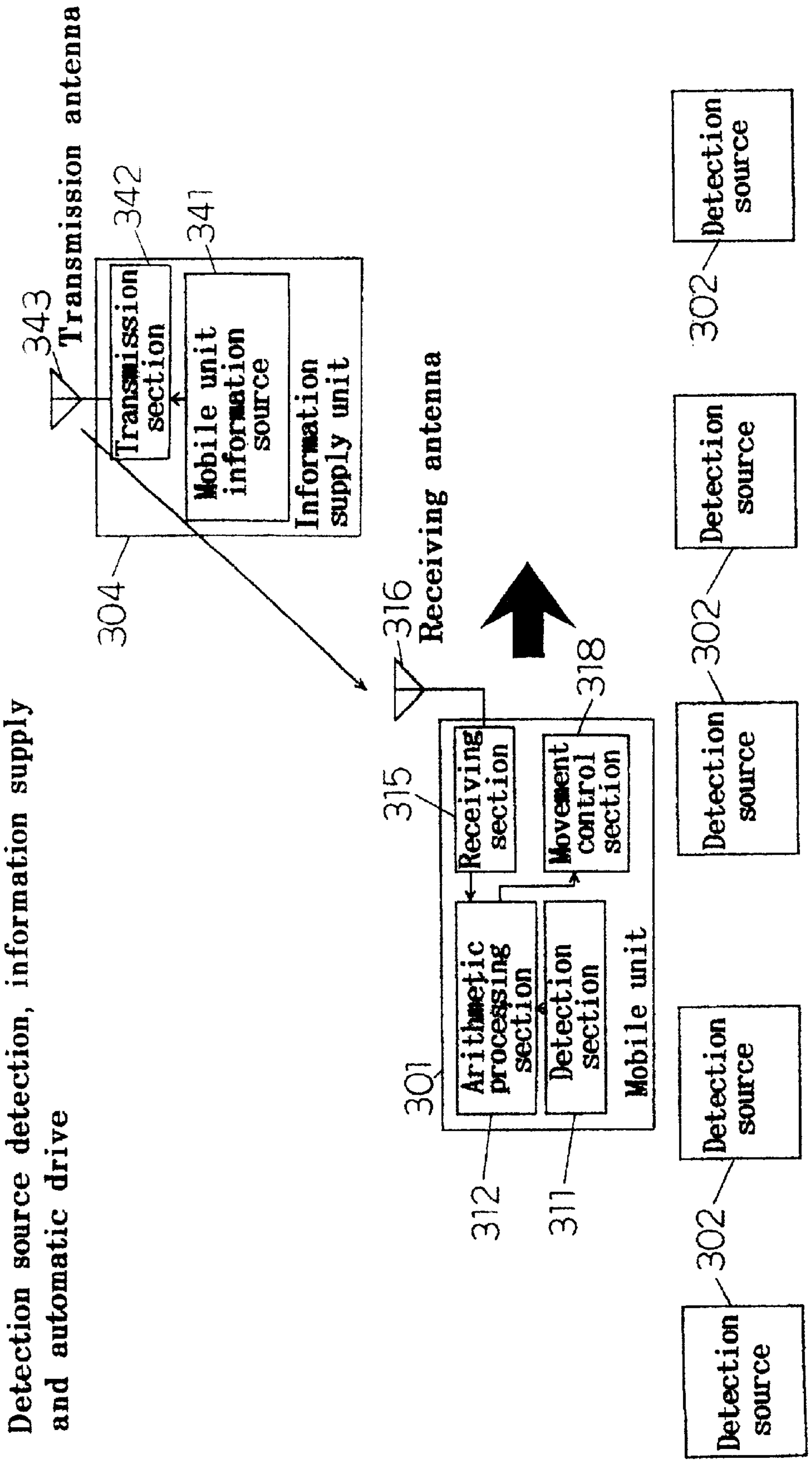

FIG. 32 is a diagram showing a configuration of a mobile unit support system according to a 20th embodiment of the invention. This embodiment is a combination of the configuration of FIG. 26 and that of FIG. 30 shown above.

According to this embodiment, like in the embodiment 14 described above, such information as the arrangement of the detection sources 302 transmitted from the information supply unit 304 is received, and using the information thus received, the moving speed, the running direction, etc. of the mobile unit 301 are controlled by the movement control section 318 on the basis of such information as the moving speed and the present position of the mobile unit 301 itself obtained by the arithmetic processing section 312.

21st Embodiment

Figure 33:
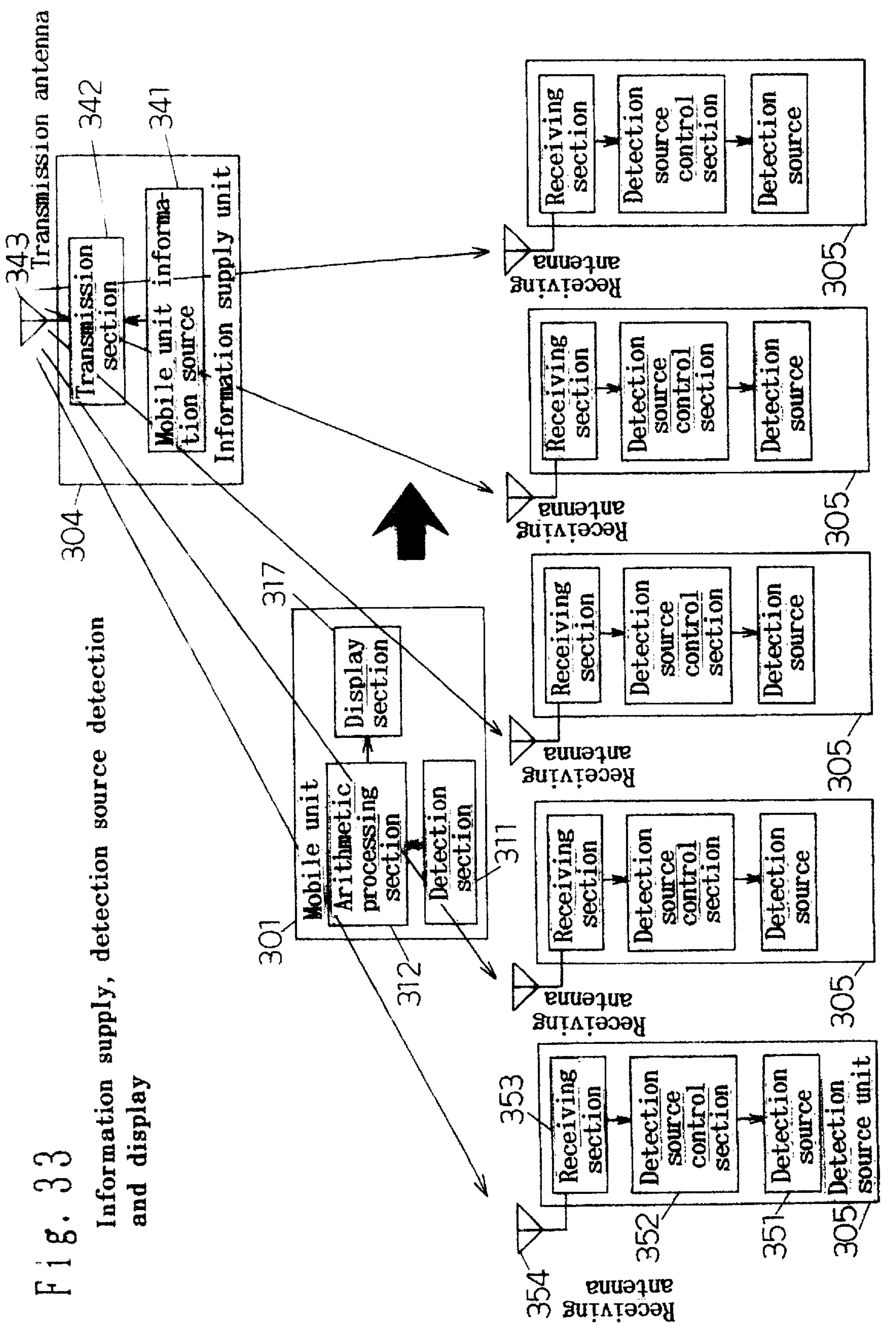

FIG. 33 is a diagram showing a configuration of a mobile unit support system according to a 21st embodiment of the invention. This mobile unit support system is configured of a mobile unit 301 represented by an automotive vehicle or the like running along a road making up a route of movement, a detection source unit 305 constituting a plurality of modules installed along the running direction of the mobile unit 301 on the road, and an information supply unit 304 for transmitting predetermined information to the detection source unit 305, for example. In this case, 300 detection source units 305, for example, are arranged in one zone as an object controlled by each information supply units 304.

In the above-mentioned configuration, the detection source unit 305 is configured of, for example, a detection source 351 constituting a source of detection with the magnetic fluxes thereof controllable as energy generated thereby, a receiving antenna 354 and a receiving section 353 for receiving the information signal from the information supply unit 304, and a detection source control section 352 for controlling the energy of the detection source 351 on the basis of the information thus received. The mobile unit 301, on the other hand, is configured of, for example, a detection section 311 for detecting the detection source 351 of the detection source unit 305, an arithmetic processing section 312 for determining the information such as the speed and the position on the road of the mobile unit using the information on the interval and position of the detection source unit 305 stored in advance in a built-in storage section (not shown) on the basis of the detection signal from the detection section 311, and a display section 317 for displaying the output information of the arithmetic processing section 312. Also, the information supply unit 304 is configured of, for example, a mobile unit information source 341 having such information as a point of accident on the road and a transmission section 342 and a transmission antenna 343 for transmitting the information held in the mobile unit information source 341 to the detection source unit 305. In this case, combinations of the detection section 311 and the detection source 351 are available in terms of the types of energy including the magnetic fluxes, radio wave, light, heat, sound wave or atmospheric pressure, for example. Also, the detection source units 305 are arranged at intervals of about 1 m, for example.

Now, the operation of a mobile unit support system according to the 21st embodiment will be explained with reference to the drawings.

First, suppose the mobile unit 301 is moving along the direction of arrow on a road installed with a plurality of detection source units 305. Then, the detection section 311 of the mobile unit 301 proceeds to detect the detection sources 351 of the detection source units 305 from left to right in the drawing and outputs a detection signal to the arithmetic processing section 312. The arithmetic processing section 312 arithmetically processes the detection signal input thereto with reference to the information on the arrangement of the detection source units 305 stored in advance in a storage section (not shown) such as a memory. The arithmetic processing is such that in the case where the intervals at which the detection source units 305 are arranged are known, for example, the running speed of the mobile unit 301 can be calculated by measuring the detection time intervals. Also, the present position of the mobile unit 301 can be determined from the position information of the detection source units 305. Next, the mobile unit 301 displays the information such as the speed thus obtained on the display section 317.

The information supply unit 304, on the other hand, transmits the information on the mobile unit information source 341 to the detection source units 305 through the transmission section 342 and the transmission antenna 343. The information that can be thus transmitted include the position information on a point of accident, information on a road section closed, information on a slow-down section or information on a congested section. Each detection source unit 305 receives the information transmitted from the information supply unit 304 through the receiving antenna 354 and the receiving section 353, and on the basis of the information thus received, the detection source control section 352 changes the emission energy of the detection sources 351. When the position information on a point of accident is involved, for instance, the energy of the detection source 351 located a predetermined distance on this side from that point is changed. In such a case, the magnetic force, which may constitute the particular energy, or the magnetic polarity thereof is changed, while if the energy is light, the luminescent light is changed from green to red, for example.

Next, the mobile unit 301 detects the change in the detection source 351 by means of the detection section 311 thereof, and arithmetically processes the detection result by means of the arithmetic processing section 312 thereof. After that, the result of the arithmetic operation is displayed on the display section 317. The driver thus can know in advance the conditions ahead of the road on which he is currently running and the action to be taken against it. Further, in such a case, if arrangement is made to change the energy of the detection source 351 in accordance with the type of the road conditions, which is involved, an accident or a congestion, can be determined.

22nd Embodiment

Figure 34:
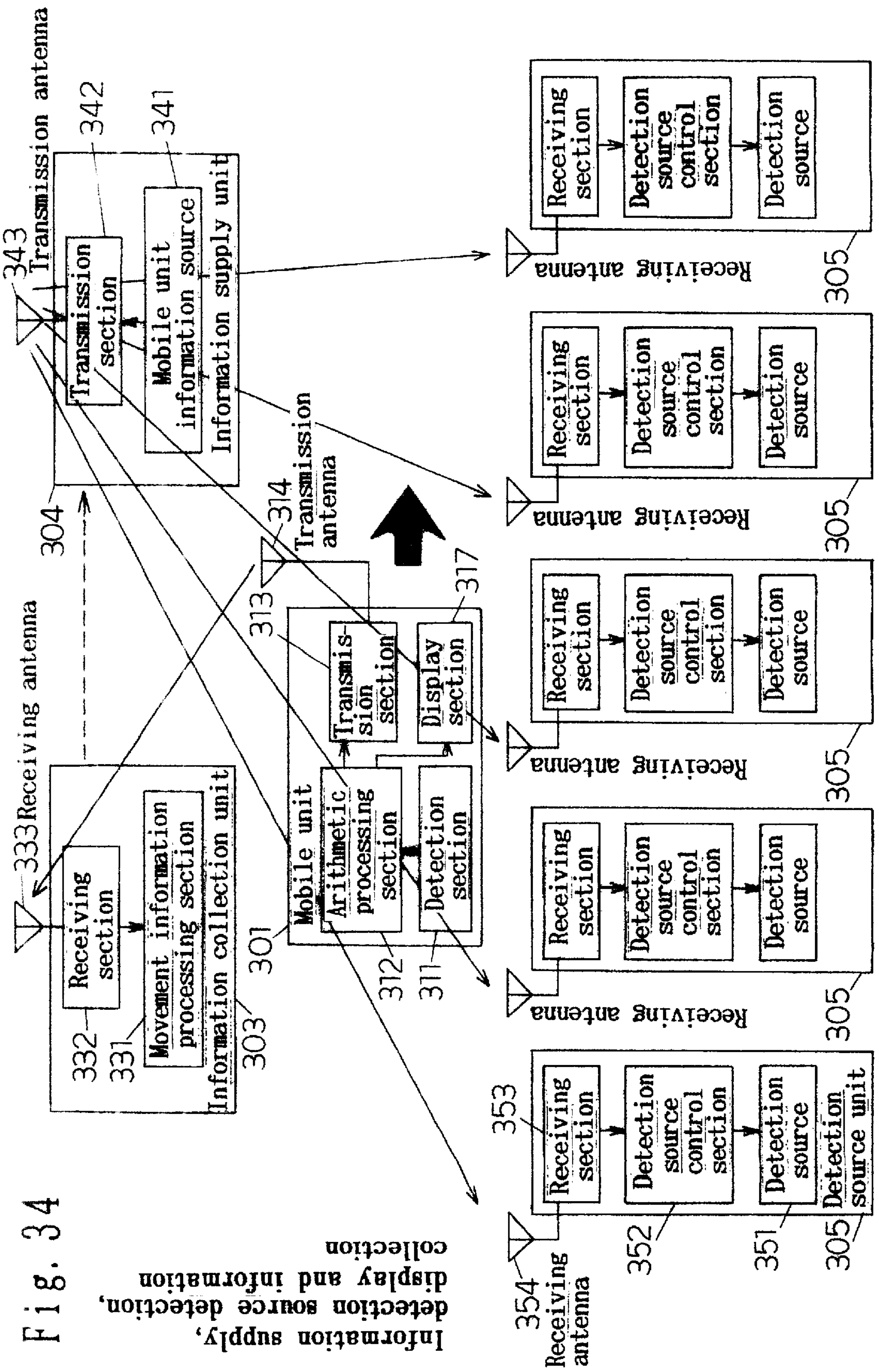

FIG. 34 is a diagram showing a configuration of a mobile unit support system according to a 22nd embodiment of the invention. This embodiment is different from the configuration of FIG. 33 described above in that the present embodiment includes an information collection unit 303, and in that the mobile unit 301 includes a transmission section 313 and a transmission antenna 314 for transmitting the result of processing at the arithmetic processing section 312 to the information collection unit 303. The information collection unit 303, like in FIG. 25, is configured of a receiving antenna 333 and a receiving section 332 for receiving the transmission signal from the mobile unit 301 and a movement information processing section 331 for producing the movement conditions of the mobile unit 301 from the signal thus received. This embodiment can also be configured in such a manner as to be able to transmit information such as the movement conditions of the mobile unit 301 to the information supply unit 304 from the information collection unit 303.

According to this embodiment, on the basis of the information transmitted from the information supply unit 304, the energy of the detection source 351 is controlled, the change in the movement conditions of the mobile unit 301 that has detected it are collected by the information collection unit 303, and further the result of collection is fed back to the information supply unit 304. In this way, the road information or the like can accurately be notified to the mobile unit 301.

23rd Embodiment

Figure 35:
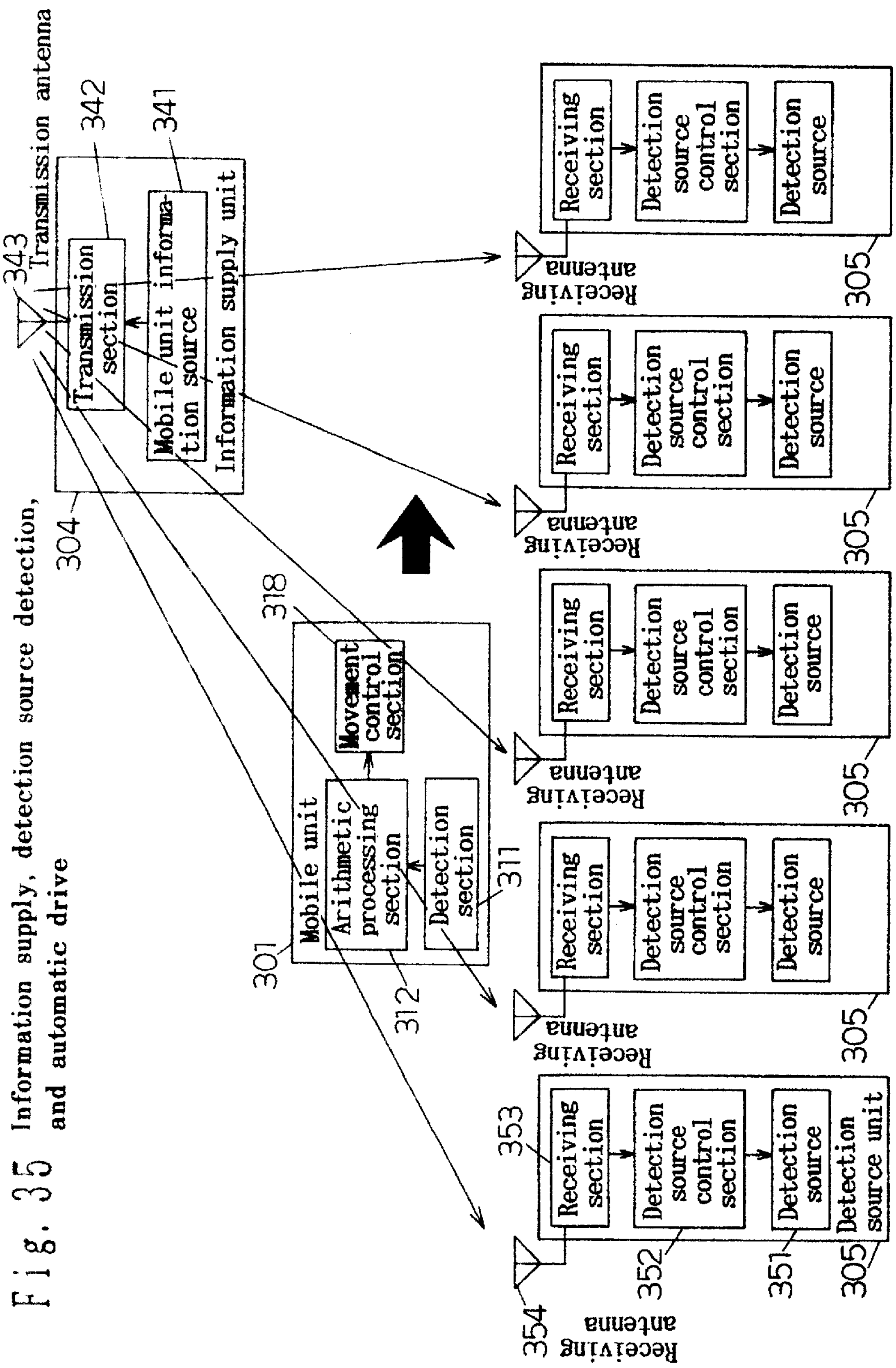

FIG. 35 is a diagram showing a configuration of a mobile unit support system according to a 23rd embodiment of the invention. According to this embodiment, a movement control section 318 for controlling the movement of the mobile unit 301 is provided in place of the display section 317 shown in FIG. 33.

In this case, the process up to the arithmetic processing section 312 is similar to the case shown in FIG. 33 above. According to this embodiment, on the basis of the information obtained from the arithmetic processing section 312, the moving speed of the mobile unit 301 can be increased or decreased, or the running direction thereof or the like can be changed or otherwise controlled automatically. This permits the action meeting the traffic conditions to be quickly to be taken very effectively to secure traffic safety.

24th Embodiment

Figure 36:
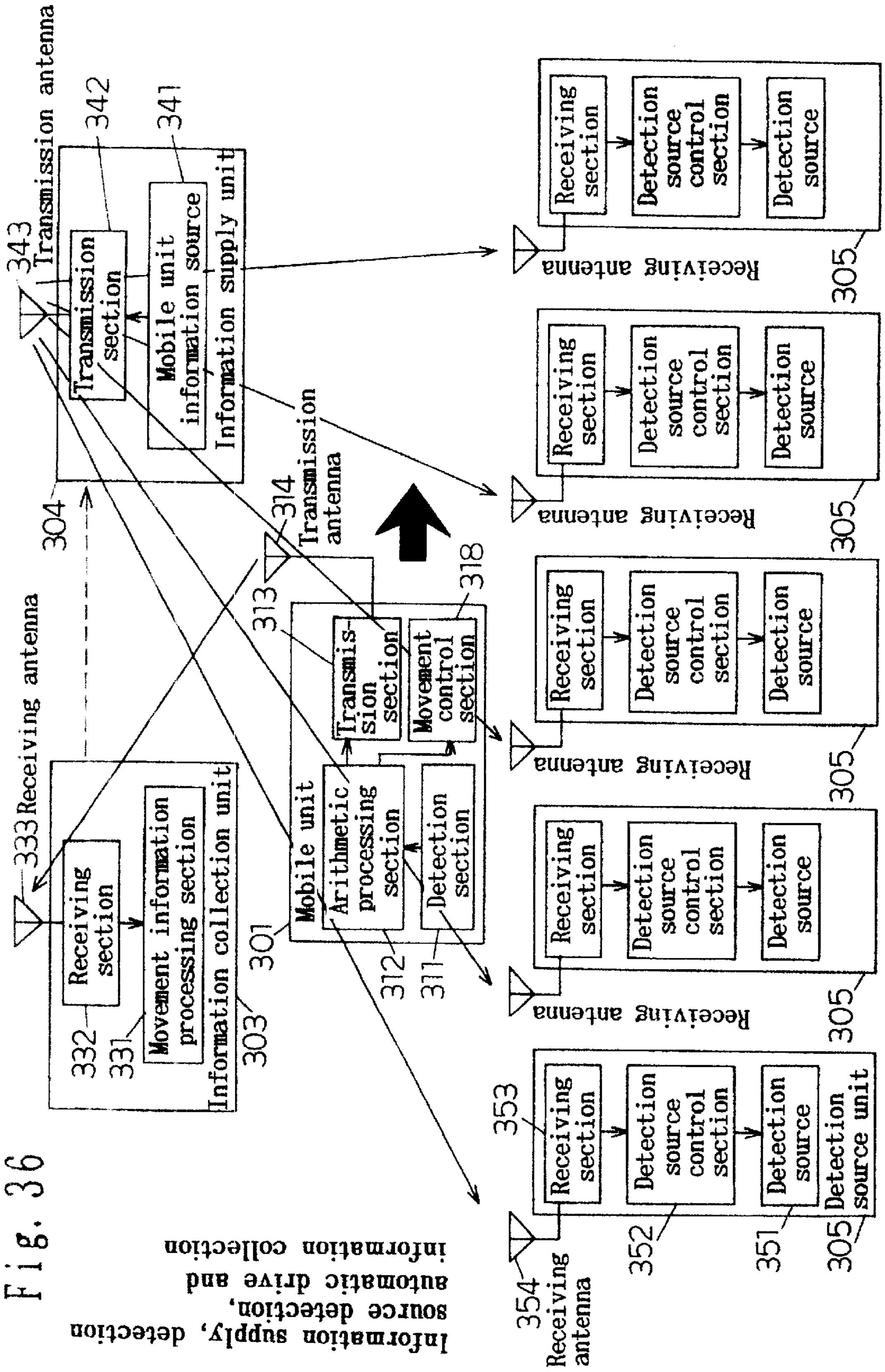

FIG. 36 is a diagram showing a configuration of a mobile unit support system according to a 24th embodiment of the invention. According to this embodiment, a movement control section 318 for controlling the movement of the mobile unit 301 is provided instead of the display section 317 shown in FIG. 34.

In this embodiment, the process up to the arithmetic processing section 312 is similar to the corresponding process in FIG. 34 described above. According to this embodiment, on the basis of the information obtained by the arithmetic processing section 312, the moving speed of the mobile unit 301 can be decreased or increased, or the running direction thereof can be changed or otherwise controlled automatically. As a result, the appropriate action can be taken quickly meeting the traffic conditions, thereby very effectively contributing to traffic safety.

25th Embodiment

Figure 37:
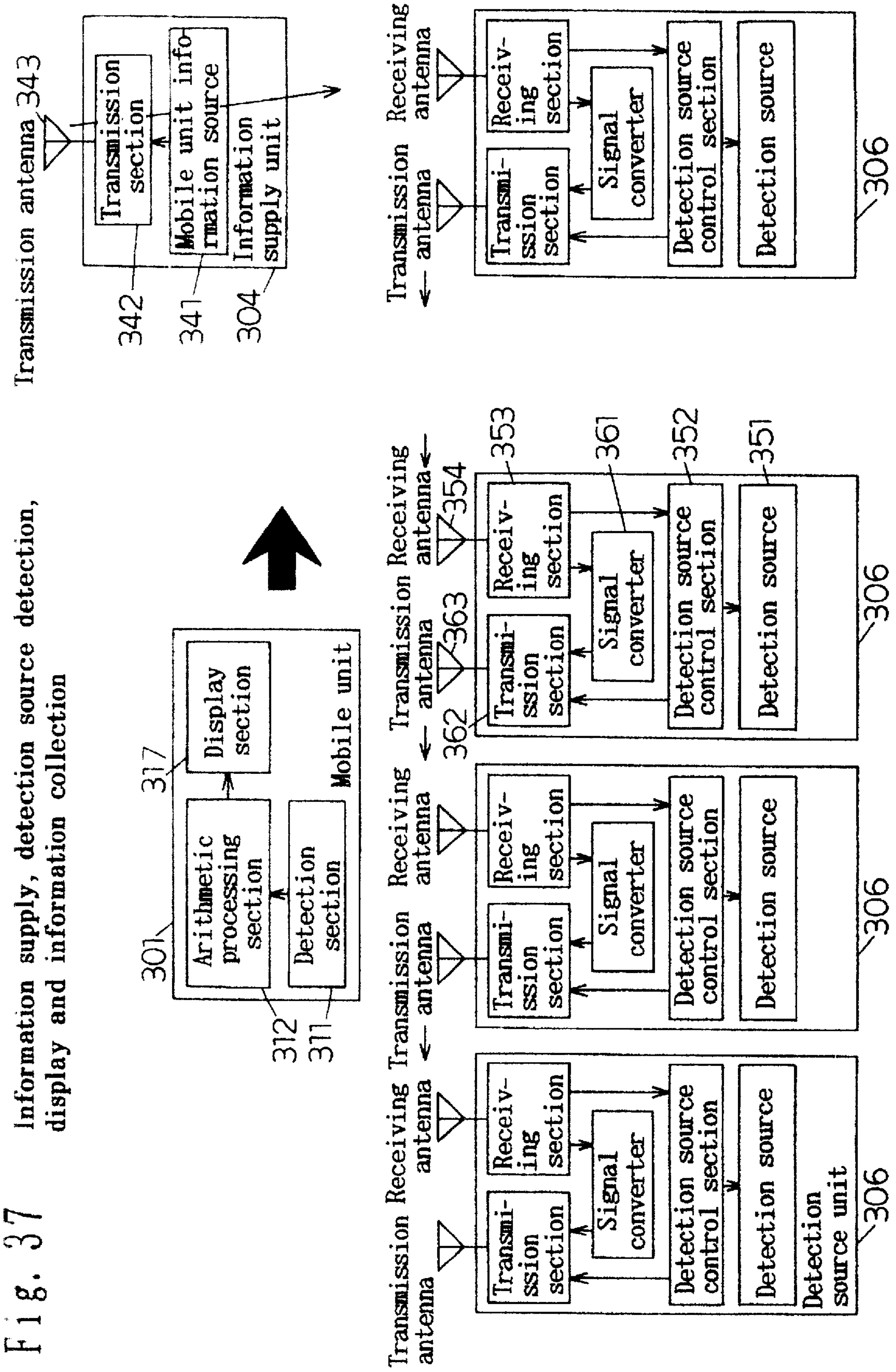

FIG. 37 is a diagram showing a configuration of a mobile unit support system according to a 25th embodiment of the invention. This mobile unit support system is configured of, for example, a mobile unit 301 represented by an automotive vehicle or the like running along a road constituting a route of movement, a plurality of detection source units 306 making up modules installed on the road along the direction in which the mobile unit 301 runs, and an information supply unit 304 for transmitting predetermined information to the detection source units 306. In this case, assume that 300 detection source units 306 located in each zone constituting a unit of control are covered by each information supply unit 304, for example.

In the above-mentioned configuration, the detection source units 306 is each configured of, for example, a detection source 351 for emitting such energy controllable as magnetic fluxes, a receiving antenna 354 and a receiving section 353 for receiving the information signal from the information supply unit 304 or from an adjacent detection source unit 306, a detection source control section 352 for controlling the energy of the detection source 351 on the basis of the information thus received, a signal converter 361 for converting the received signal, and a transmission section 362 and a transmission antenna 363 for transmitting the converted signal and the control signal from the detection source control section 352.

Also, the mobile unit 301 is configured of, for example, a detection section 311 for detecting the detection source 351 of the detection source unit 306, an arithmetic processing section 312 for determining the information on the speed, the position on the road, etc. of the mobile unit using the information stored in a built-in storage section (not shown) on the interval or position at which the detection sources 302 are arranged, on the basis of the detection signal from the detection section 311, and a display section 317 for displaying the output information of the arithmetic processing section 312. Also, the information supply unit 304 is configured of, for example, a mobile unit information source 341 having the information on the point of an accident on the road, etc., and a transmission section 342 and a transmission antenna 343 for transmitting the information from the mobile unit information source 341 to the detection source unit 305. In this connection, a combination of the detection section 311 and the detection source 351 is applicable which uses the magnetic field, radio wave, light, heat, sound wave, atmospheric pressure or the like in terms of energy type. Also, the detection source units 306 are arranged at intervals of, say, about 1 m.

Next, the operation of a mobile unit support system according to the 25th fifth embodiment will be explained with reference to the drawings.

First, assume that the mobile unit 301 is moving in the direction of arrow along a road installed with a plurality of detection source units 305. Then, the detection section 311 of the mobile unit 301 proceeds to detect the detection sources 351 of the detection source units 306 from left to right in the drawing, and outputs the resulting detection signal to the arithmetic processing section 312. The arithmetic processing section 312 arithmetically processes the detection signal input thereto with reference to the layout information of the detection source units 306 stored in advance in a storage section (not shown) such as a memory. This arithmetic processing is executed in such a manner that if the intervals at which the detection source units 306 are arranged is known, the running speed of the mobile unit 301 can be calculated by measuring the temporal intervals of detection. Also, it is possible to determine the present position of the mobile unit 301 from the position information of the detection source units 306. Next, the mobile unit 301 displays the information such as the speed thus obtained on the display section 317.

The information supply unit 304, on the other hand, transmits the information from the mobile unit information source 341 to one of the detection source units 306 through the transmission section 342 and the transmission antenna 343. In the process, it is assumed that the information is transmitted to the detection source unit 306 located at an end of a zone covered by the particular information supply unit 304, and that the information is transmitted in relay to other detection source units 306 in the same zone. Specifically, the detection source unit 306 that has received the information from the information supply unit 304 receives the particular information through the receiving antenna 354 and the receiving section 353, and on the basis of the information thus received, the detection source control section 352 changes the emission energy of the detection source 351. At the same time, the signal converter 361 converts the signal. The signal thus converted and the detection source control information are transmitted to an adjacent detection source unit 306 through the transmission section 362 and the transmission antenna 363. After that, the information is transmitted similarly to each detection source unit 306 in the zone, and each detection source unit 306 changes the emission energy of the detection source on the basis of the received information. In the case where the position information on a point of accident is involved, for example, the energy of a detection source 351 located a predetermined distance on this side from that point is changed. In such a case, the magnetic force or the magnetic polarity is changed if the energy involved is the magnetic force, while if the energy is light, the luminescent light is changed from green to red, for example. Also, the information transmitted has added thereto IDs of the information supply unit 304 and the detection source unit 306 thereby to prevent a recognition error. The information thus transmitted is considered to include the position information on a point of accident, information on a road closed section, information on a slow-down section, information on a congested section or the like information.

Next, the mobile unit 301 detects the change in the detection source 351 by means of the detection section 311 thereof, and the detection result is arithmetically processed by the arithmetic processing section 312. After that, the arithmetic result is displayed on the display section 317. The driver can therefore know in advance the conditions of the portions ahead of the road on which he is proceeding and how to act against it. Further, if arrangement is made to change the energy of the detection source 351 in the process in accordance with the type of the road conditions, then it is possible to determine which has happened, an accident or a congestion.

26th Embodiment

Figure 38:
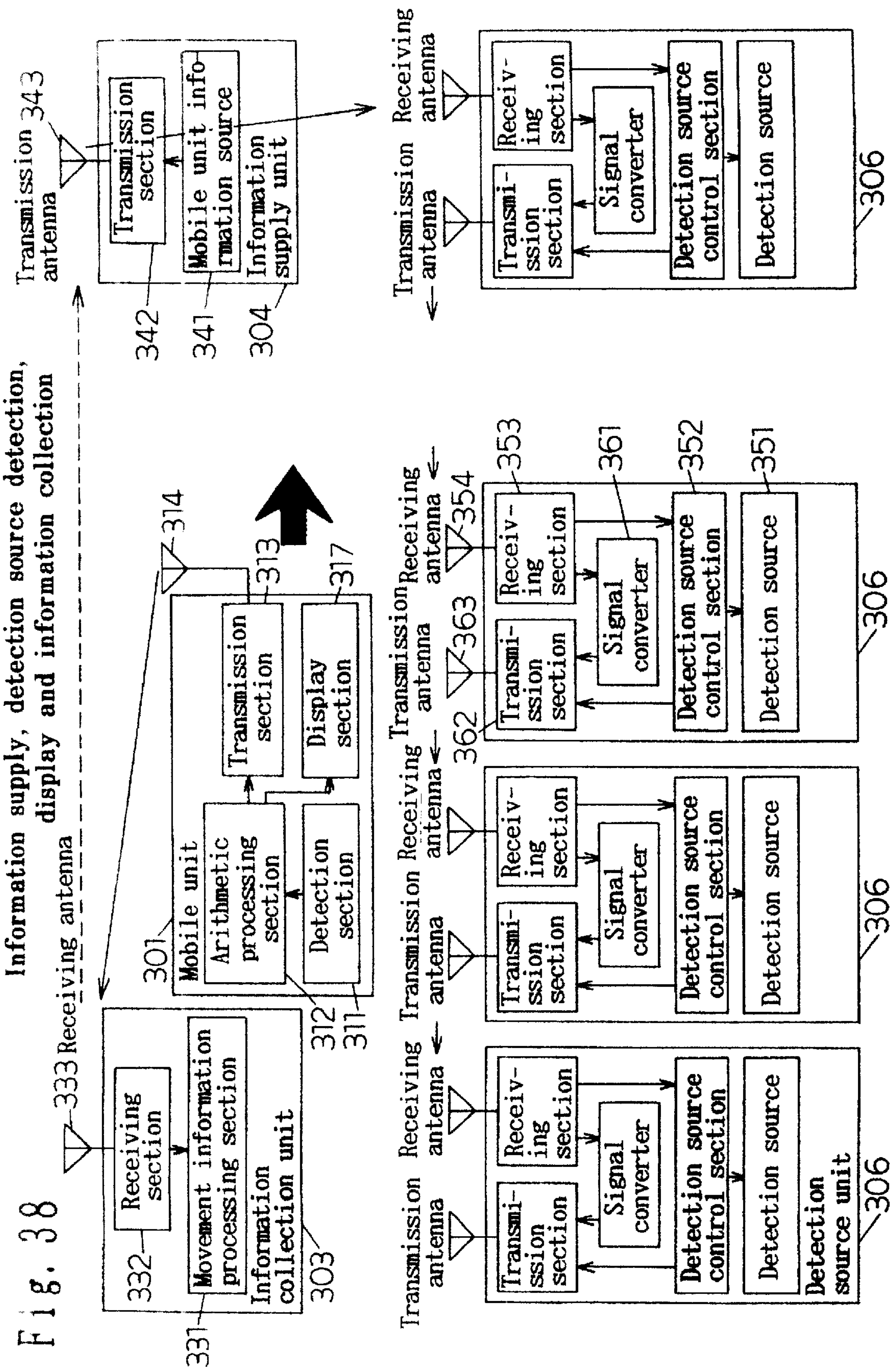

FIG. 38 is a diagram showing a configuration of a mobile unit support system according to a 26th embodiment of the invention. This embodiment is different from the configuration of FIG. 37 described above in that this embodiment includes an information collection unit 303, and that the mobile unit 301 includes a transmission section 313 and a transmission antenna 314 for transmitting the result of processing in the arithmetic processing section 312 to the information collection unit 303. The information collection unit 303, like the corresponding one in FIG. 25, is configured of a receiving antenna 333 and a receiving section 332 for receiving a transmission signal from the mobile unit 301 and a movement information processing section 331 for producing the movement conditions of the mobile unit 301 from the signal thus received. By the way, this embodiment can alternatively be configured in such a manner that it is able to transmit such information as the movement conditions of the mobile unit 301 to the information supply unit 304 from the information collection unit 303.

According to this embodiment, the energy of the detection sources 351 is controlled based on the information transmitted from the information supply unit 304, the change in the movement conditions of the mobile unit 301 that has detected the energy is collected by the information collection unit 303, and further, the result of collection is fed back to the information supply unit 304, thereby making it possible to notify the road information and the like to the mobile unit 301 accurately.

27th Embodiment

FIG. 39 is a diagram showing a configuration of a mobile unit support system according to a 27th embodiment of the invention. This embodiment includes a movement control section 318 for controlling the movement of the mobile unit 301 in place of the display section 317 shown in FIG. 37.

In this embodiment, the process up to the arithmetic processing section 312 is similar to the corresponding process in FIG. 37 described above. According to this embodiment, on the basis of the information obtained by the arithmetic processing section 312, the moving speed of the mobile unit 301 can be decreased or increased or the running direction thereof can be changed or otherwise controlled automatically. As a result, an action can be taken quickly meeting the prevailing traffic conditions, thereby very effectively contributing to traffic safety.

28th Embodiment

FIG. 40 is a diagram showing a configuration of a mobile unit support system according to a 28th embodiment of the invention. This embodiment includes a movement control section 318 for controlling the movement of the mobile unit 301 in place of the display section 317 shown in FIG. 38 described above.

In this case, the process up to the arithmetic processing section 312 is similar to the corresponding process in FIG. 38. According to this embodiment, however, the moving speed of the mobile unit 301 is decreased or increased or the running direction thereof is changed or otherwise controlled automatically on the basis of the information obtained by the arithmetic processing section 312. As a result, an appropriate action can be taken quickly meeting the prevailing traffic conditions, thereby very effectively contributing to traffic safety.

By the way, as for the portion of the relay transmission operation of the detection source units according to the 25-th embodiment described above, the relay transmission system using the modules described above with reference to the first to sixth embodiments is applicable.

Also, although the embodiment is described above with reference to the case where the mobile unit is an automotive vehicle, the invention is not limited to such a case but is applicable to any mobile unit such as a train, a ship, an airplane, a mobile robot or any other mobile object.

Also, although a road is used as a route of movement according to this embodiment, the invention is not limited to it but is equally applicable also to a pass in a building, an internal pass of a factory, a railroad, a bridge, a tunnel path, a ship course, or the like.

The mobile unit support system according to this embodiment described above has the advantage that the moving conditions of the mobile unit can be grasped quickly, accurately and positively.

Another advantage is that since the information on the present conditions of the route of movement can be obtained immediately, the information display and automatic drive can be accurately carried out.

Also, by collecting the information on the moving conditions or the like of the mobile unit, the conditions on the route of movement can be notified to each mobile unit, thereby leading to a great advantage for traffic safety.

29th Embodiment

Figure 41:
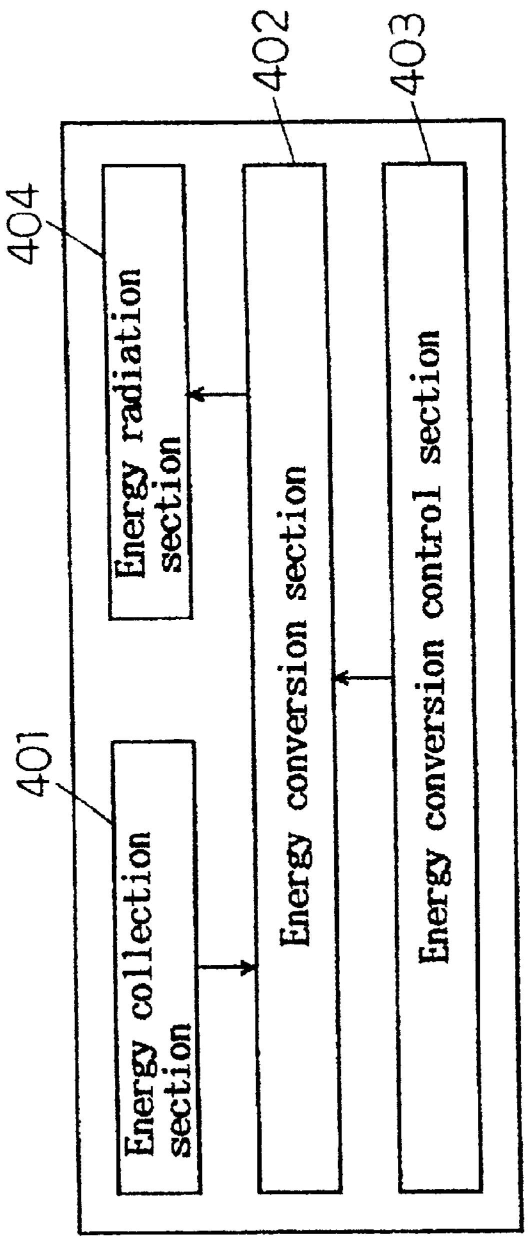

FIG. 41 is a diagram showing a configuration of a mobile unit detection unit according to a 29th embodiment. In FIG. 41, the mobile unit detection unit constituting a module according to the present embodiment is configured of an energy collection section for collecting a predetermined physical amount changing with the approach or passage of the mobile unit, an energy conversion section 402 for detecting the energy thus collected and converting it into the detection result, an energy conversion control section 403 for controlling the conversion in the energy conversion section 402, and an energy radiation section 404 for radiating the energy converted by the energy conversion section 402. In this embodiment, a part of the energy collection section 401 and a part of the energy conversion section 402 make up a detection section, the energy conversion control section 403 makes up a signal processing section, and a part of the energy conversion section 402 and the energy radiation section 404 make up a transmission section.

The predetermined physical amount described above includes magnetism, radio wave, light, heat, sound pressure, wind pressure (atmospheric pressure) or weight as shown in Table 4-1. The energy collection section 401 is a magnetic material when the magnetism is involved, an antenna when the radio wave is involved, and a lens when light is involved. Also, the mobile unit detection section constituting a part of the energy conversion section 402 is a coil, a MR device, a flux gate, a Hall element or the like when magnetism is involved, a level detector or a Doppler frequency detector when radio wave is involved, a CCD when light is involved, bimetal or a Peltier element when heat is involved, a piezoelectric element or magneto-optic converter when sound pressure is involved, a wind mill when wind is involved, and a pressure sensor when weight is involved.

TABLE 1

| Mobile unit energy | Energy collection section | Mobile unit detection section | Data generating section |
|---|---|---|---|
| Magnetism | Magnetic material | Coil<br>MR element<br>flux gate<br>Hall element | Detection unit ID clock information |
| Radio wave | Antenna | Level detector<br>Doppler frequency detector | (speed information) of leading |
| Light | Lens | CCD | mobile unit |
| Heat | | Bimetal<br>Peltier element | Lane ID in-lane |
| Sound pressure | | Piezoelectric element<br>magneto-optic conversion | deflection ID |
| Wind pressure (atmospheric) pressure) | | Wind mill | |
| Weight | | Pressure sensor | |

According to this embodiment, when a mobile unit including a member for radiating magnetism passes above a mobile unit detection unit, for example, the magnetism collected by the energy collection section 401 undergoes a change. The energy conversion section 402 detects this magnetism change thereby to detect the mobile unit. This detection result is modulated or otherwise processed as a signal by the energy conversion control section 403, and converted into the radiation energy by the energy conversion section 402 and radiated from the energy radiation section 404. If a device for detecting this radiation energy is mounted on the mobile unit, the moving conditions or the like of the particular mobile unit and other mobile units can be grasped. The radiation energy emitted from the energy radiation section 404 may be magnetism, radio wave, light, sound wave, etc. Especially, the radio wave and light are advantageous from the viewpoint of the speed of the mobile unit, the rapidity with which information is transmitted, and the high speed signal processing.

Figure 56:
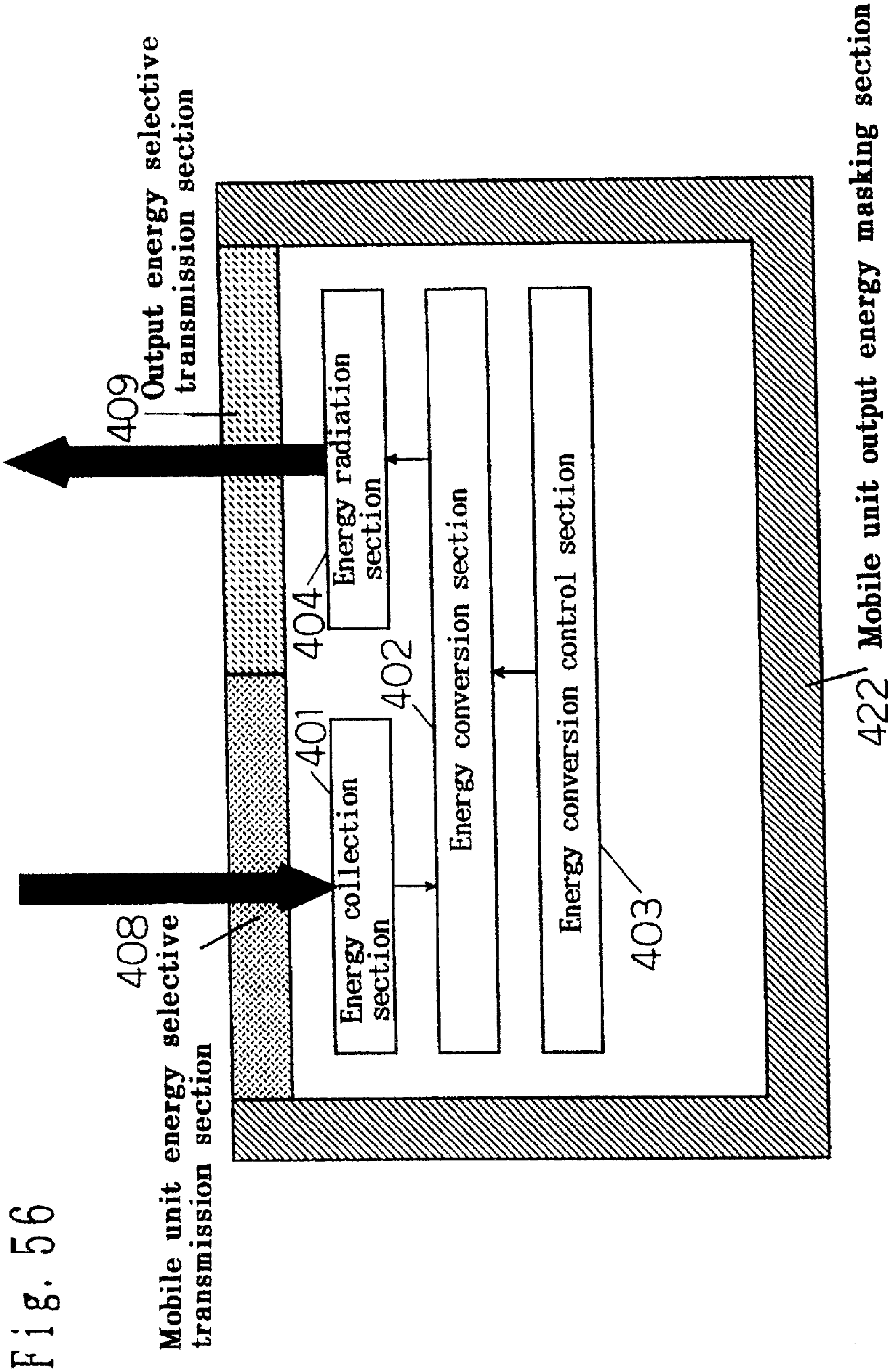

FIG. 56 is a diagram showing a configuration of another example of a mobile unit detection unit according to this embodiment. In this mobile unit detection unit, the component parts of FIG. 41 are covered further by a mobile unit, an output energy masking section. 422, a mobile unit energy selective transmission section 408 and an output energy selective transmission section 409. As a result, the input and output of unnecessary energy can be suppressed for a reduced detection error.

Figure 57:
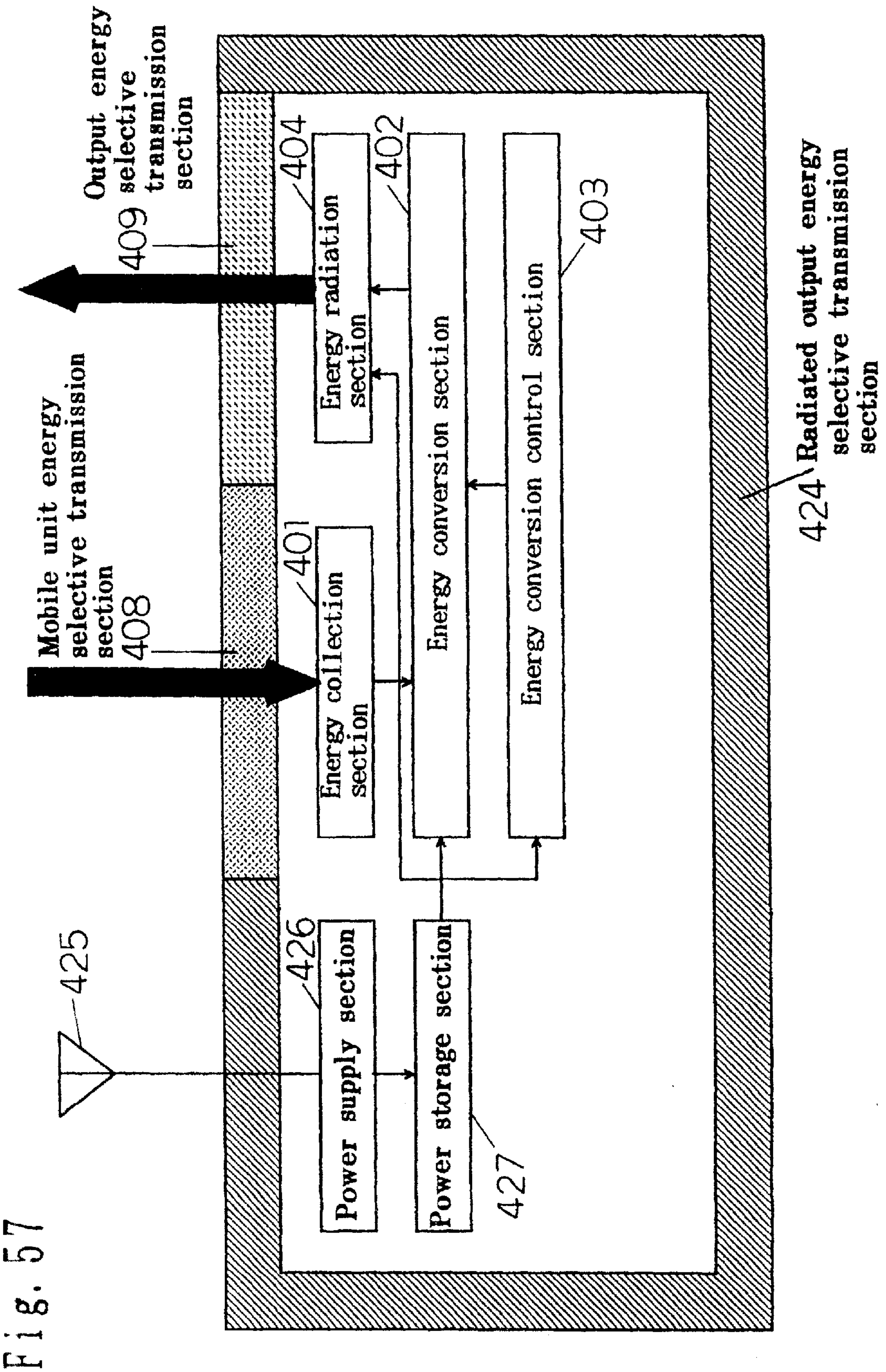

Also, FIG. 57 shows a configuration similar to the configuration of FIG. 56 to which a means is added for supplying the drive power from an external source. Further, the mobile unit and the output energy masking section 422 are replaced by the emission output energy selective transmission section 424. Specifically, the electric power required for driving the mobile unit detection unit is obtained in such a manner that a radio wave is received by a receiving antenna 425, the power is retrieved from the received radio wave by a power supply unit 426, the power thus retrieved is stored in a power storage section 427, and the power is supplied to each part from the power storage section 427. In this example, the radio wave is used for supplying power from an external source. Instead, light or the like other energy can be used.

30th Embodiment

Figure 42:
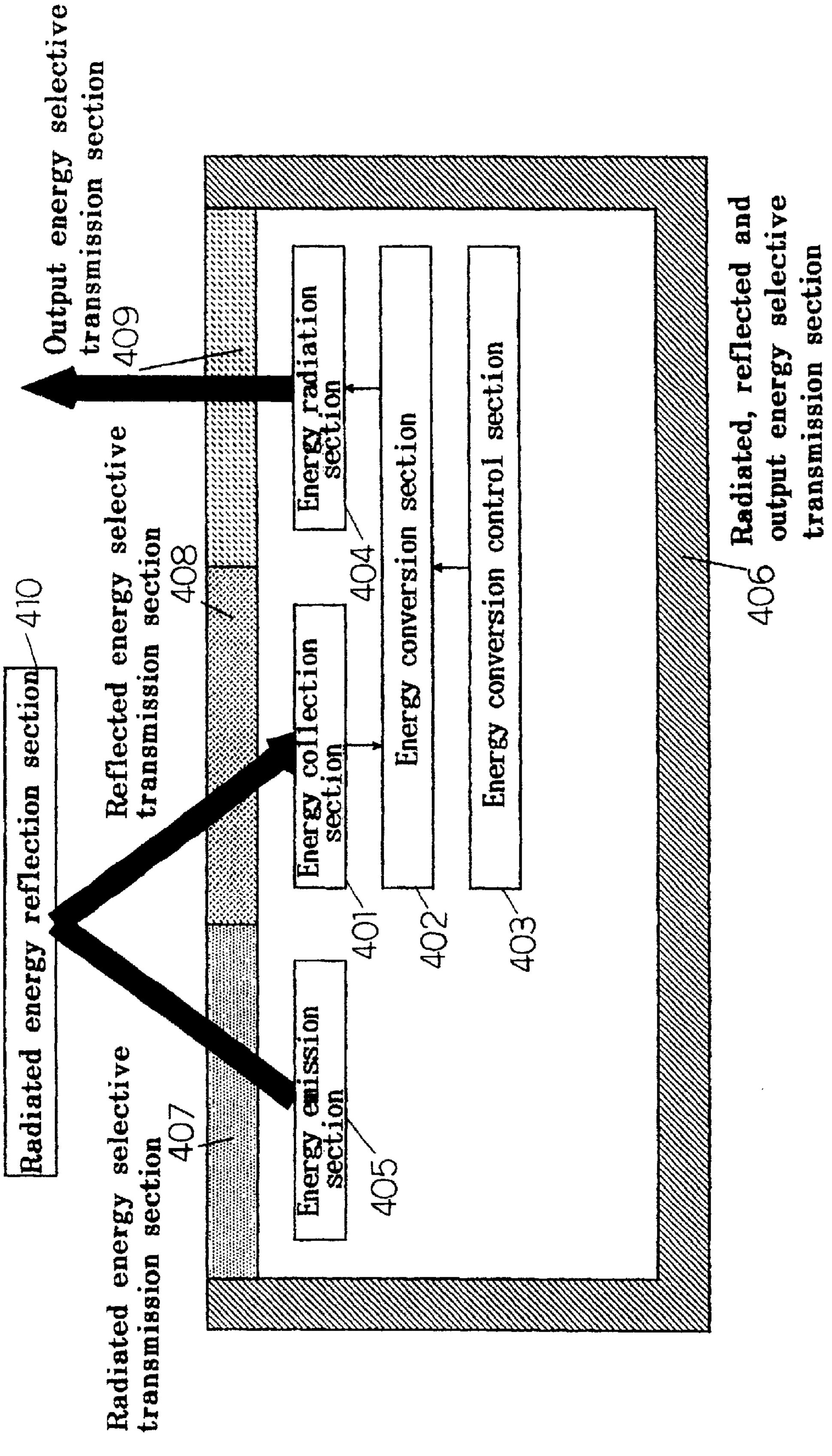

FIG. 42 is a diagram showing a configuration of a mobile unit detection unit according to a 30th embodiment of the invention. The configuration of this embodiment is different from the configuration of FIG. 41 in that the present embodiment has built therein an energy radiation section 405 for radiating the energy for detecting a mobile unit, in that the frame of the unit proper is configured of a radiated, reflected and output energy selective transmission section 406, a radiated energy selective transmission section 407, a reflected energy selective transmission section 408 and an output energy selective transmission section 409. These energy selective transmission sections make up a protective member. On the other hand, the mobile unit includes a radiated energy reflection section 410 for reflecting the energy radiated from the mobile unit detection unit.

With the above-mentioned configuration, energy is radiated toward a mobile unit from the energy radiation section 405, and the energy returned by being reflected on the radiation energy reflection section 410 is collected by the energy collection section 401. The subsequent operation is similar to the corresponding operation of the 29th embodiment. Also, according to this embodiment, each energy transmission section of the energy radiation section 405, the energy collection section 401 and the energy radiation section 404 includes a radiation energy selective transmission section 407, a reflected energy selective transmission section 408 and an output energy selective transmission section 409, respectively. An unnecessary energy output and input can thus be suppressed and a detection error is reduced. This embodiment is also applicable to the energy types shown in Table 1.

Figure 58:
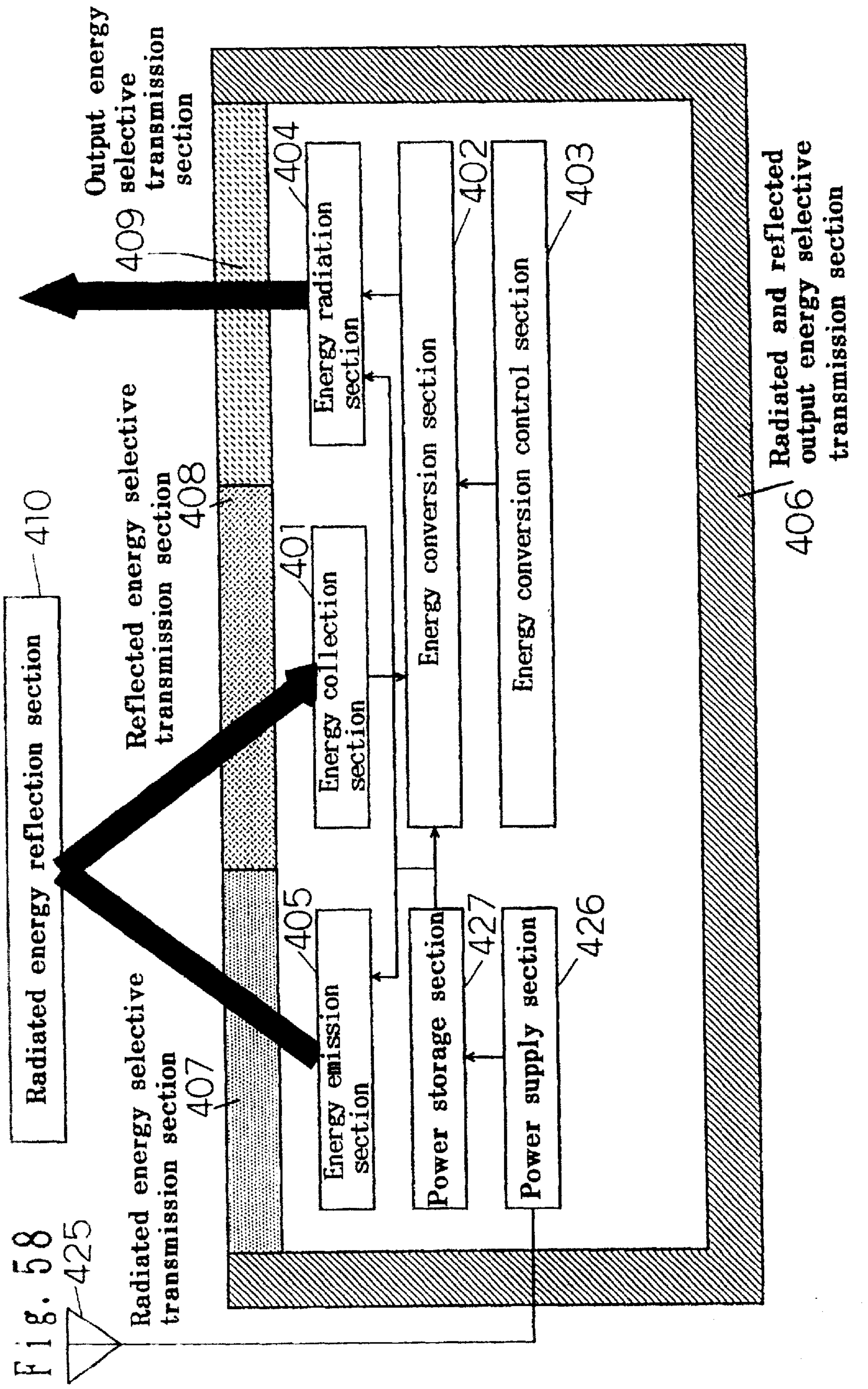

Also, FIG. 58 is a diagram showing a configuration of another example of the present embodiment, in which a means for receiving the drive power from an external source is added to the configuration of FIG. 42. Specifically, the electric power required for driving the mobile unit detection device is supplied in such a manner that a radio wave is received by a receiving antenna 425 and the power is retrieved from the received radio wave by a power supply section 426 and the power thus retrieved is stored in a power storage section 427 from which to supply the power to each part. Although the radio wave is used for supplying the power from an external source in this example, light or other energy can alternatively be used with equal effect.

31st Embodiment

Figure 43:
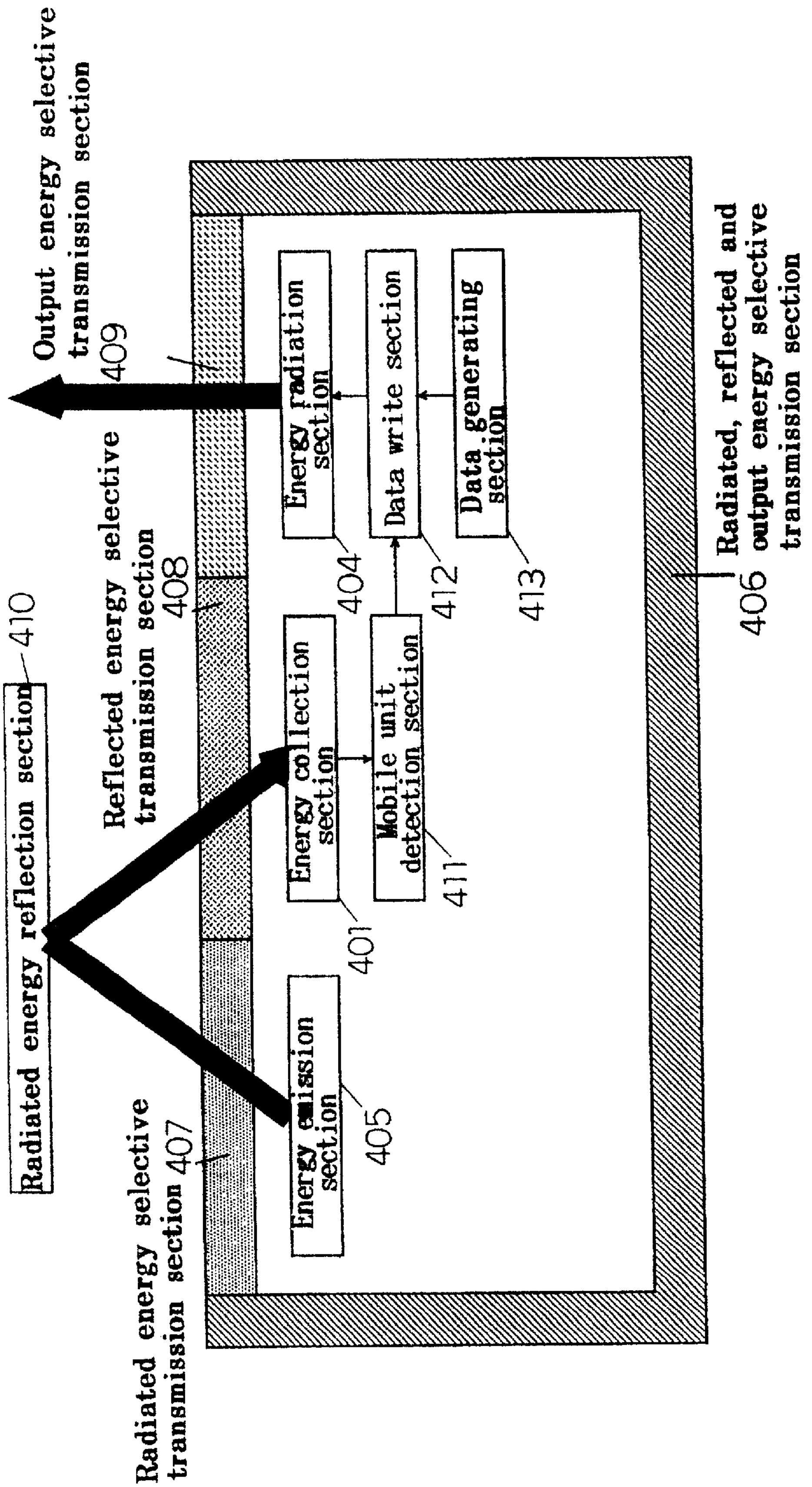

FIG. 43 is a diagram showing a configuration of a mobile unit detection unit according to a 31st embodiment of the invention. The configuration of this embodiment is different from that of FIG. 42 in that the energy conversion section 402 and the energy conversion control section 403 are replaced by a mobile unit detection section 411, a data write section 412 and a data generating section 413.

With the above-mentioned configuration, energy is radiated from an energy radiation section 405 toward the mobile unit, and the energy returned by being reflected from a radiated energy reflection section 410 is collected by an energy collection section 401. A mobile unit detection section 411 detects a mobile unit by the energy thus collected. The data write section 412 writes data from the data generating section 413 in the detection result and radiates it as the information from an energy radiation section 404. In the process, the data generated by the data generating section 413 is, for example, an identifier (ID) of a mobile unit detection device.

Figure 59:
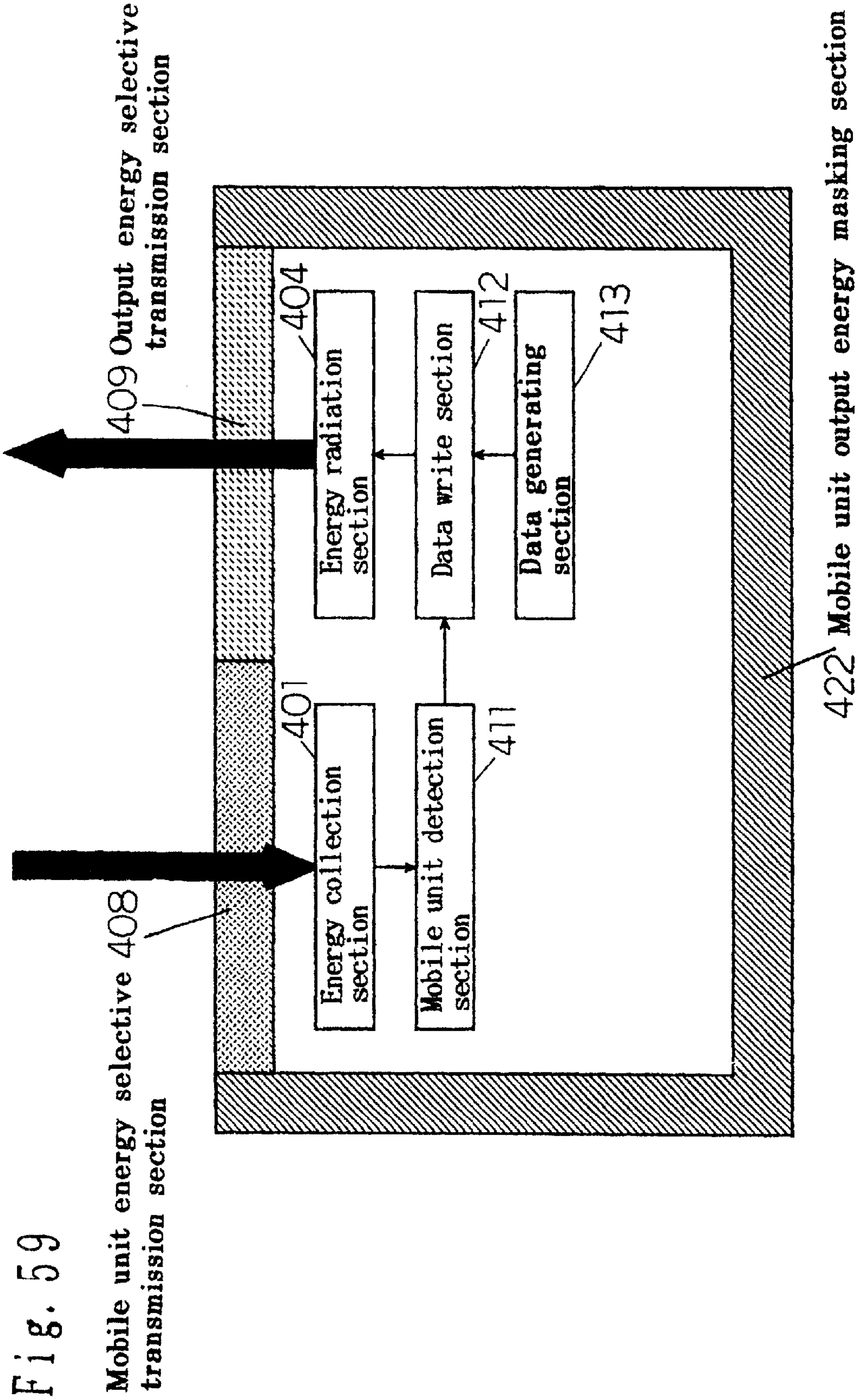

FIG. 59 is a diagram showing another example configuration in which the energy radiation section 405 and the radiated energy selective transmission section 407 are removed from the configuration of FIG. 43, and the radiated, reflected and output energy selective transmission section 406 is changed to a mobile unit output energy masking section 422. Specifically, the energy consumed for detecting a mobile unit is radiated not from a detection device but by a mobile unit.

32nd Embodiment

Figure 44:
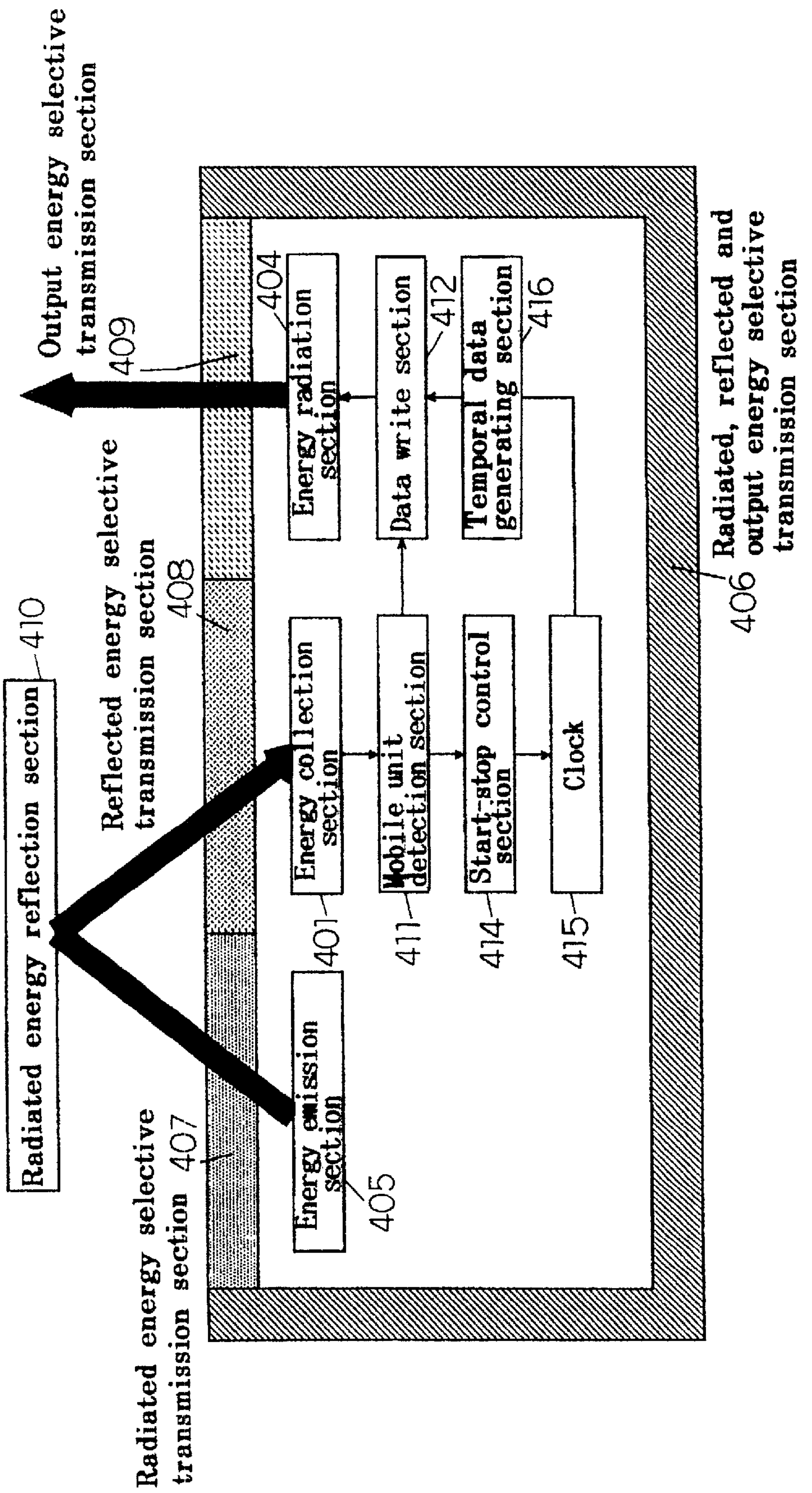

FIG. 44 is a diagram showing a configuration of a mobile unit detection device according to a 32nd embodiment of the invention. The configuration according to this embodiment is different from that of FIG. 43 in that a start-stop control section 414, a clock 415 and a temporal data generating section 416 are provided in place of the data generating section 413 to permit measurement of the distance between mobile units.

With the above-mentioned configuration, the start-stop control section 414 starts the clock 415 by detecting the first mobile unit and stops the clock 415 by detecting the second mobile unit. Using the data of this clock 415, the temporal data generating section 416 generates temporal data on the time required for the two mobile units to pass, which is written by the data write section 12. This information is radiated from the energy radiation section 404 toward the mobile unit.

Figure 45:
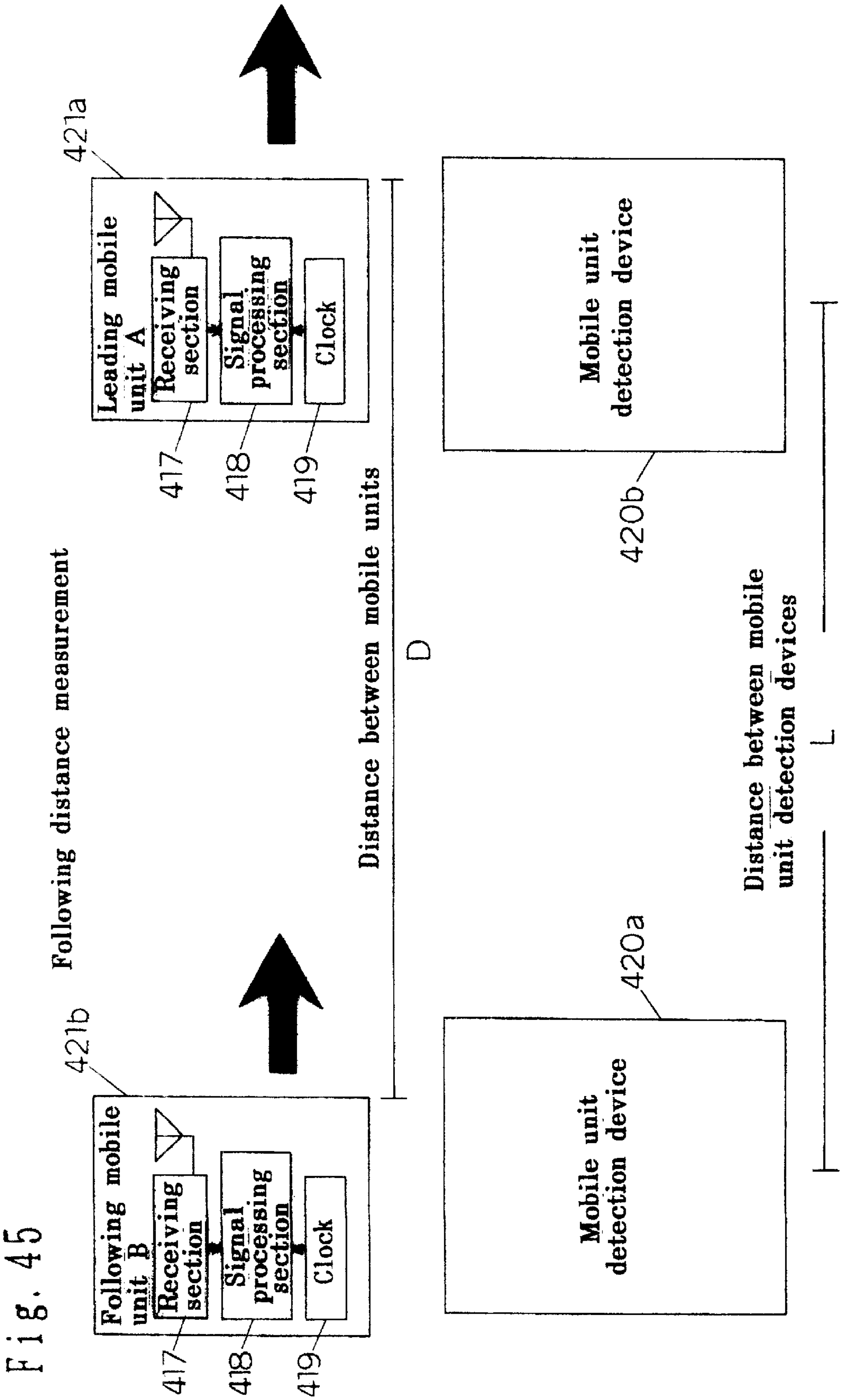

As shown in FIG. 45, assume that mobile unit detection devices 420*a*, 420*b* are arranged at a spatial interval of L, and a leading mobile unit A421*a* and a following mobile unit B421*b* pass over them. In the process, assume that the energy radiation section 404 of each mobile unit detection device radiates the information by a radio wave, and both mobile units are assumed to have a clock 410, a signal processing section 418 and a receiving section 417 for receiving the radio wave from the mobile unit detection devices.

First, when the leading mobile unit A421*a* passes the mobile unit detection device 420*a*, the mobile unit detection section 411 detects it and the start-stop control section 414 starts the clock 414. Then, when the following mobile unit B421*b* passes the mobile unit detection device 420*a*, the mobile unit detection section 411 detects it, so that the start-stop control section 414 stops the clock 415. As a result, the time interval from the passage of the leading mobile unit A421*a* to the passage of the following mobile unit B421*b* is measured, and the measurement result is radiated from the energy radiation section 404. The following mobile unit B421*b* receives the particular information, and on the basis of the data thus received, the signal processing section 418 determines the distance between the mobile units. In the process, if the speed of each mobile unit is known or the distance L between the mobile unit detection devices is not more than the length of the mobile unit, then the distance between the mobile units can be determined by the reverse calculation from the time interval.

33rd Embodiment

Figure 46:
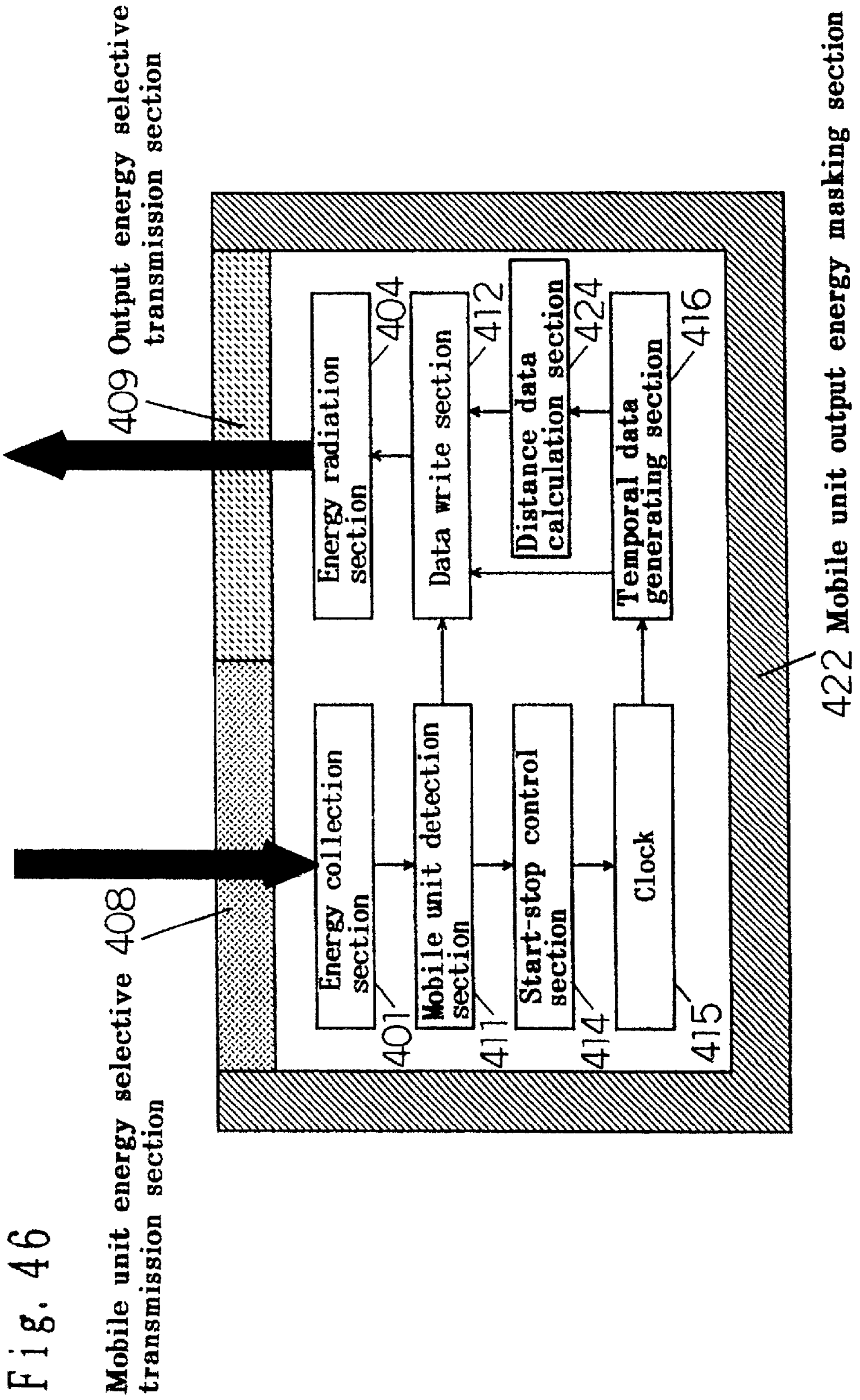
Figure 47:
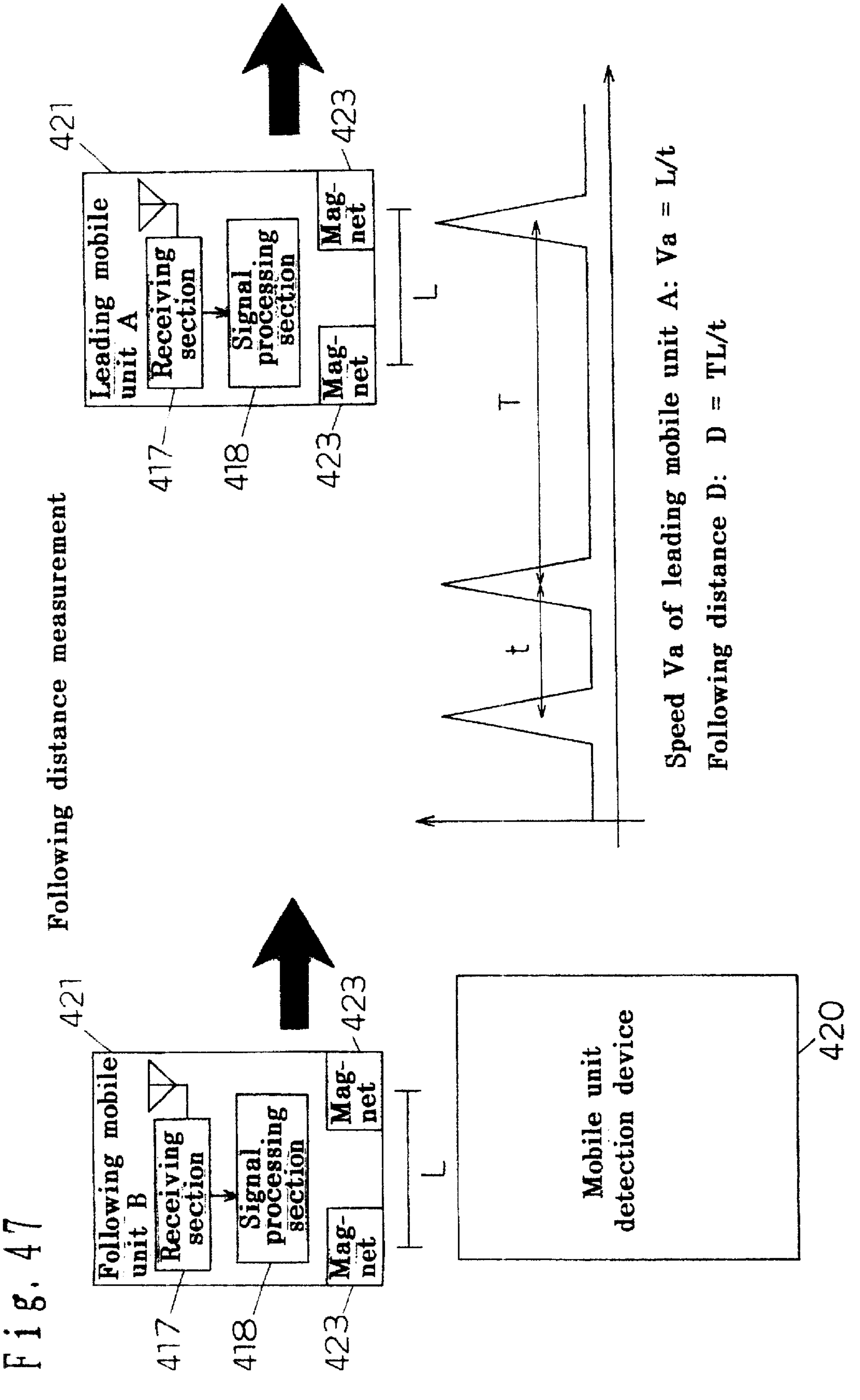

FIG. 46 is a diagram showing a configuration of a mobile unit detection device according to a 33rd embodiment of the invention. The configuration according to the present embodiment is different from that of FIG. 44 in that the present embodiment lacks the energy radiation section 405, but a distance data calculation section 424 is added, and the radiated, reflected and output energy selective transmission section 406 is replaced by a mobile unit output energy masking section 422. Further, as shown in FIG. 47, there are two magnets 423 providing energy sources arranged at spatial interval of L in the mobile unit 421.

With the configuration of the 32nd embodiment described above, the temporal data is transmitted to the mobile unit. According to the present embodiment, however, the mobile unit detection device itself measures and notifies the following distance to the mobile unit. In FIG. 47, when a mobile unit 421 passes a mobile unit detection device 420, a mobile unit detection section 411 detects the time interval t as a result of the mobile unit passing the two magnets. A distance data calculation section 424 calculates the speed Va=L/t of the mobile unit (leading mobile unit A) that has passed just now. Then, upon passage of the following mobile unit B421, the time interval between the passage of the leading mobile unit A421 and the passage of the following mobile unit B421 is measured thereby to determine the following distance D=T×L/t by calculation. The speed and the following distance determined in this way are written by the data write section 412, and the resulting information is radiated from the energy radiation section 404 toward the mobile unit B421.

34th Embodiment

Figure 48:
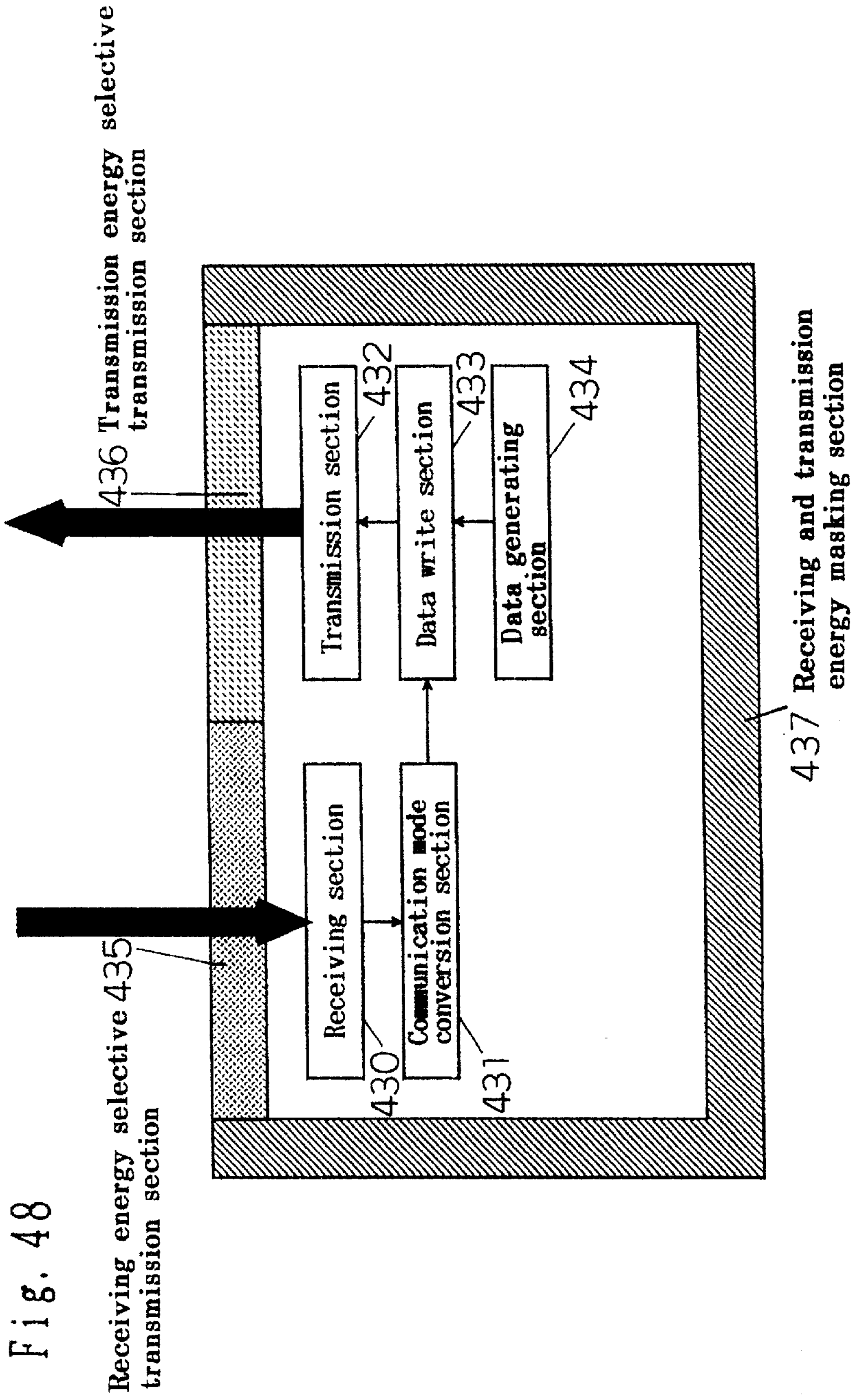

FIG. 48 is a diagram showing a configuration of a mobile unit detection device according to a 34th embodiment of the invention. This mobile unit detection device is configured of a receiving section 430 for receiving the energy radiated from an external source, a communication mode conversion section 431 for converting the communication mode of the received signal, a data generating section 434 for generating data such as an identifier of the mobile unit detection device, a data write section 433 for writing the generated data in the converted communication mode, a transmission section 432 for transmitting the written data, a receiving energy selective transmission section 435 for masking the receiving section 430, a transmission energy selective transmission section 436 for masking the transmission section 432, and a receiving/transmission energy masking section 437 for masking the remaining portions.

The object of receiving and transmission according to this embodiment may be another mobile unit detection device. The detection of a mobile unit becomes possible, however, when the object of receiving and transmission is a mobile unit. Also, although the radio wave is generally advantageously used as the energy for receiving or transmission, various types of energy as shown in Table 1 can alternatively be used with equal effect. In FIG. 48, when the receiving section 430 receives a communication radio wave from a mobile unit, for example, the communication mode conversion section 431 converts the communication mode to the transmission communication mode. On the other hand, the data generating section 434 generates data such an identifier of the mobile unit detection device itself and applies it to the data write section 433. The data write section 433 writes the data from the data generating section 434 in the received data, and transmits it to the transmission section 432. The transmission section 432 transmits the output signal thereof to a mobile unit, for example. The mobile unit that has received the particular signal can determine the current position thereof from the identifier of the mobile unit detection device.

Figure 60:
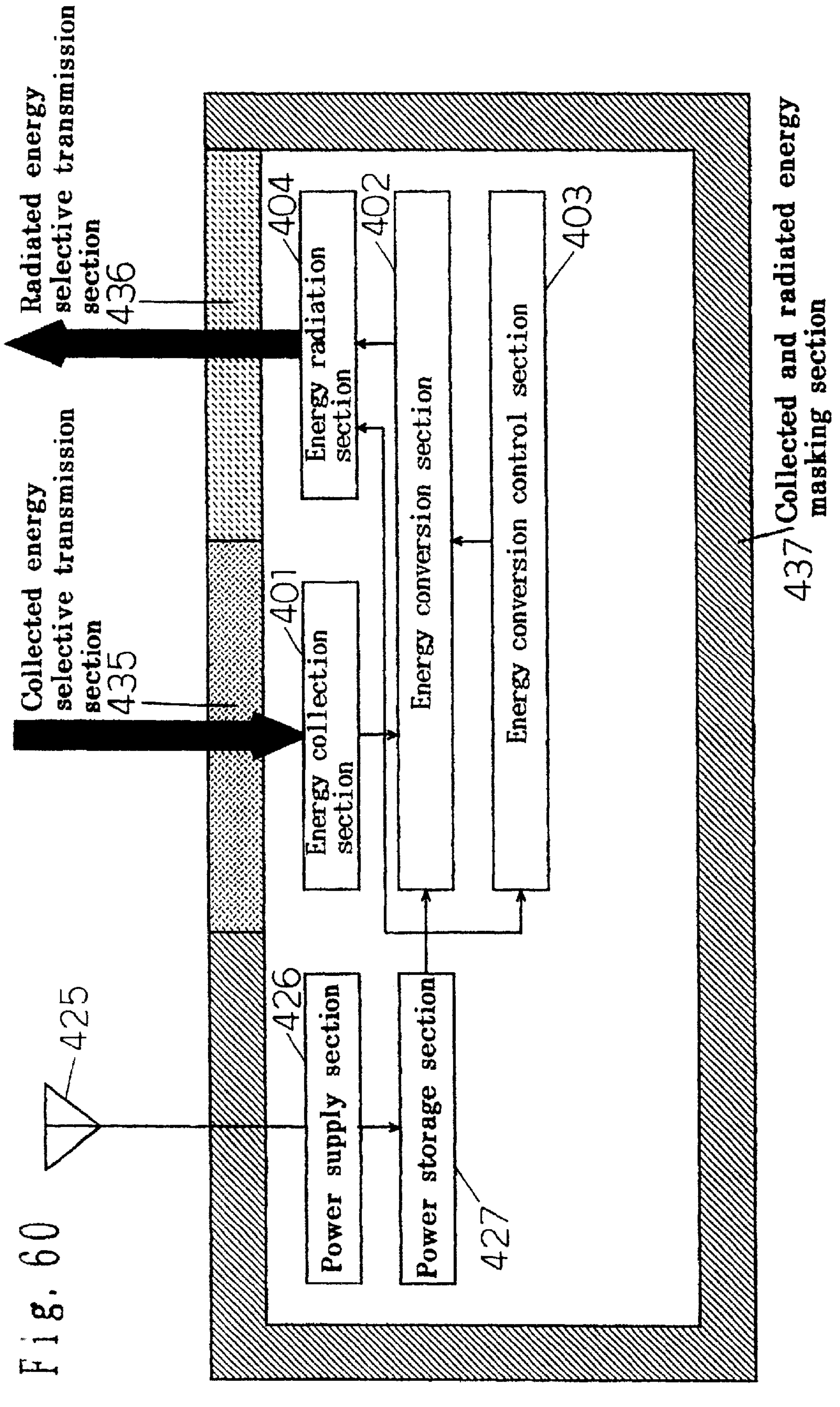

FIG. 60 shows the configuration of FIG. 48 in more basic form as another example which further includes a means for supplying electric power for driving the system body from an external source. Specifically, the receiving section 430, the communication mode conversion section 431, a part of the data write section 433, a part of the data write section 433, the data generating section 434 and the transmission section 432 are replaced by an energy collection section 401, an energy conversion section 402, an energy conversion control section 403 and an energy radiation section 404, respectively. Further, the present embodiment includes a receiving antenna 425 for receiving the radio wave providing energy for supplying electric power from an external source, a power supply section 426 for extracting the electric power from the radio wave received, and a power storage section 427 for storing the electric power thus extracted.

Specifically, the electric power required for driving the mobile unit detection device is supplied in such a manner that a radio wave is received by the receiving antenna 425, the electric power is retrieved from the received radio wave by the power supply section 426, and the electric power thus retrieved is stored in the power storage section 427, from which the electric power is supplied to the parts including the energy radiation section 404, the energy conversion section 402 and the energy conversion control section 403. In this example, the radio wave is used for supplying power from an external source. As an alternative, another energy like light can be used with equal effect. In the case where light is used, for example, a condenser like a lens is used for the receiving antenna, and a solar battery cell as the power supply section.

35th Embodiment

Figure 49:
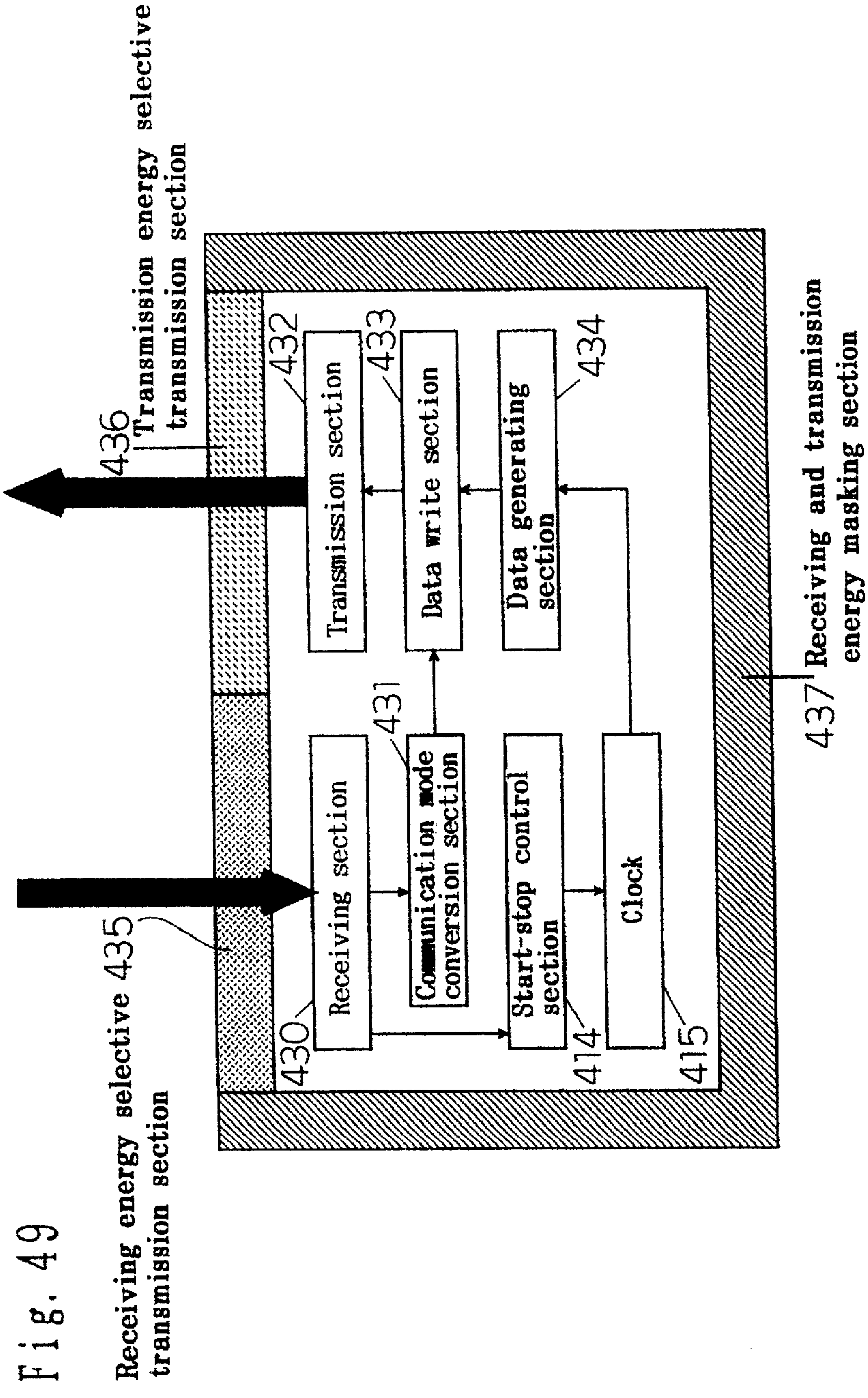

FIG. 49 is a diagram showing a configuration of a mobile unit detection device according to a 35th embodiment of the invention. The configuration of this embodiment is different from that of FIG. 48 in that in this embodiment, a clock 415 for measuring the time elapsed and a start-stop control section 414 for controlling the start and stop of the clock 15 by a received signal are added to the configuration of FIG. 48.

In the above-mentioned configuration, the start-stop control section 414 controls the start and stop operation of the clock 415 by the energy received from a mobile unit. Using the data of this clock 415, the data generating section 434 generates temporal data as to the time when the mobile unit passes and the resulting data is written by the data write section 433. This information is transmitted from the transmission section 432 toward the mobile unit.

Figure 50:
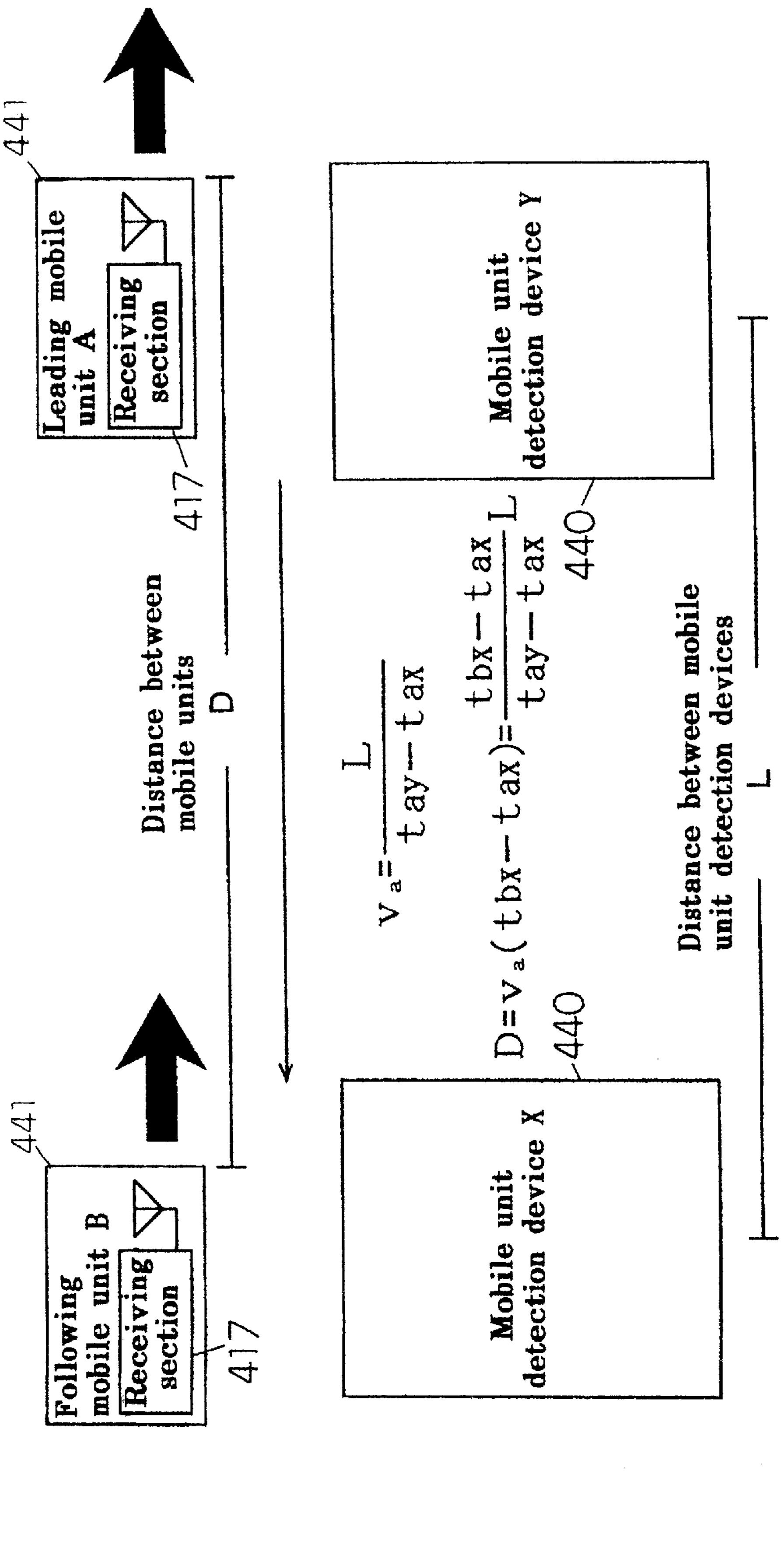

FIG. 50 is a diagram for explaining a method of measuring the distance between mobile units. In FIG. 50, it is assumed that a mobile unit detection device X440 and a mobile unit detection device Y440 are arranged at an interval L therebetween, and that a leading mobile unit A441 and a following mobile unit B441 pass above them. In the process, it is also assumed that the transmission section 432 of each mobile unit detection device radiates information by radio wave, and that both the mobile units include a receiving section 417 for receiving the radio wave from the mobile unit detection devices.

First, when the leading mobile unit A441 passes the mobile unit detection device X440, the receiving section 430 receives the signal, and the time "tax" when the leading mobile unit A441 has passed there is measured by the start-stop control section 414 and the clock 415. The resulting data "tax" is transmitted to the leading mobile unit A441 and the following mobile unit B441 (The data is transmitted to the following mobile unit B441 when the mobile unit detection device X440 is approached. That is to say, it is assumed that the transmission to the following mobile unit B441 is delayed). Then, when the leading mobile unit A441 passes the mobile unit detection device Y440, the time of passage "tay" is measured in the same manner as above, and the resulting data "tay" is transmitted to the leading mobile unit A441 and the following mobile unit B441. (The data is transmitted to the following mobile unit B441 when the mobile unit detection device Y440 is approached. That is to say, it is assumed that the transmission to the following mobile unit B441 is delayed.)

When the following mobile unit B441 passes the mobile unit detection device X440, on the other hand, the time "tbx" when the following mobile unit b441 has passed is measured and the particular data "tbx" is transmitted to the following mobile unit B441. Once these measured time points "tax", "tay" of passage of the leading mobile unit A441 and the measured time point "tbx" of passage of the following mobile unit B441 are obtained by the following mobile unit B441, the distance between the mobile units can be determined according to the following equation.

As described above, the distance between the two mobile unit detection devices is given as L, and therefore the moving speed Va of the leading mobile unit A441 is $$Va=L/(tay-tax)$$

Thus, the distance D between the mobile units is determined as $$D=Va\times(tbx-tax)=(tbx-tax)\times L/(tay-tax)$$

36th Embodiment

Figure 51:
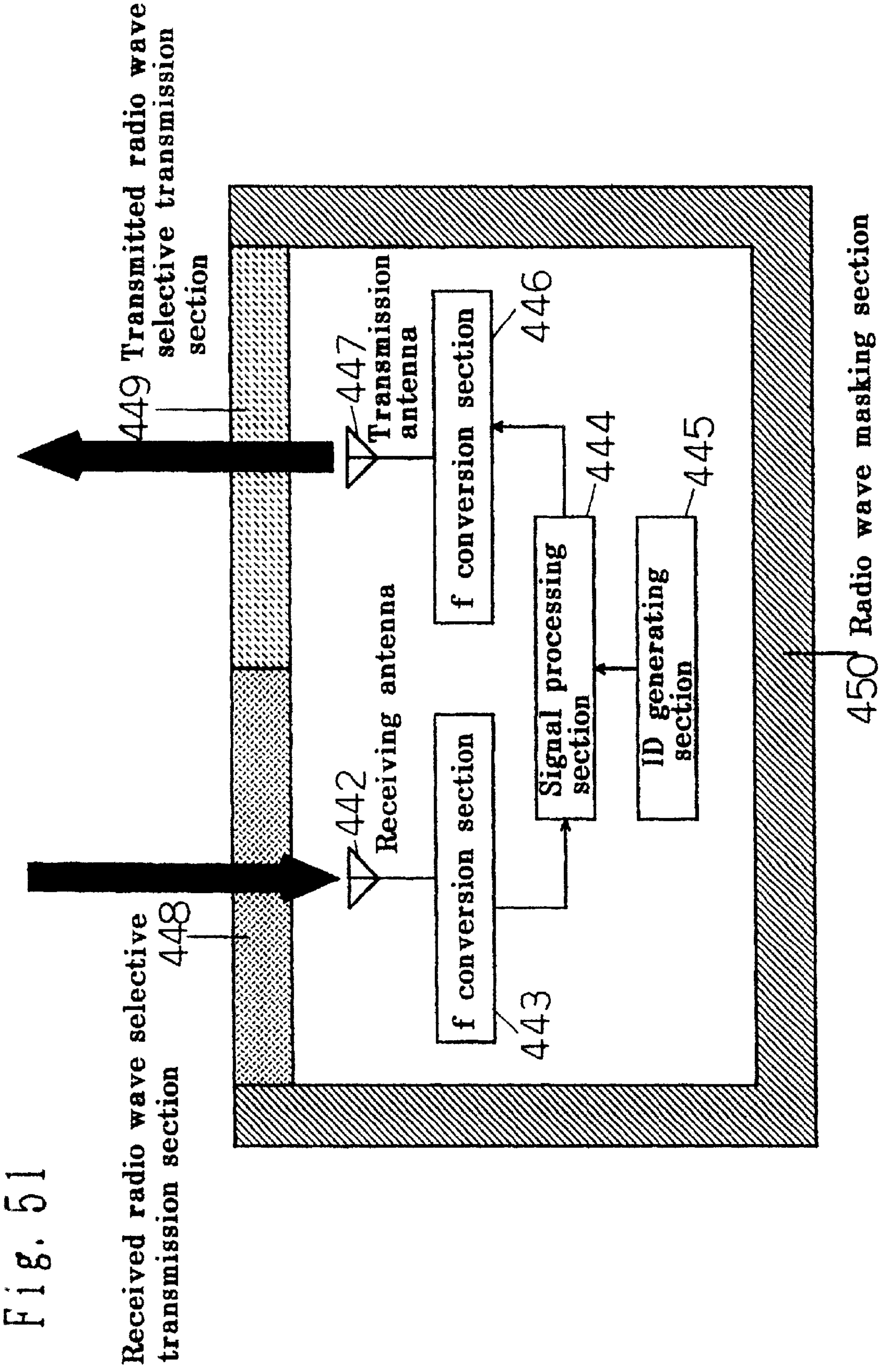

FIG. 51 is a diagram showing a configuration of a mobile unit detection device according to a 36th embodiment of the invention. This mobile unit detection device, which uses a radio wave as the energy for transmission and receiving, is configured of a receiving antenna 442 for receiving a radio wave from an external source, an f conversion section 443 for converting the receiving frequency into a signal processing frequency, an ID generating section 445 for generating a local identifier (ID), a signal processing section 444 for adding the ID thus generated to the receiving signal or otherwise processing signals, an f conversion section 446 for converting the processed signal to a transmission frequency, a transmission antenna 447 for transmitting the converted signal as a radio wave, a received radio wave selective transmission section 448 for transmitting only the received radio wave, a transmission wave selective transmission section 449 for transmitting only the transmission radio wave, and a radio wave masking section 450 for preventing the radio wave interference with the internal parts of the device proper.

With the above-mentioned configuration, the signal transmitted from a mobile unit with the ID of the mobile unit detection device added thereto is transmitted to the particular mobile unit. The mobile unit that has received this signal is in a position to know the present position thereof by extracting the ID of the mobile unit detection device.

Figure 61:
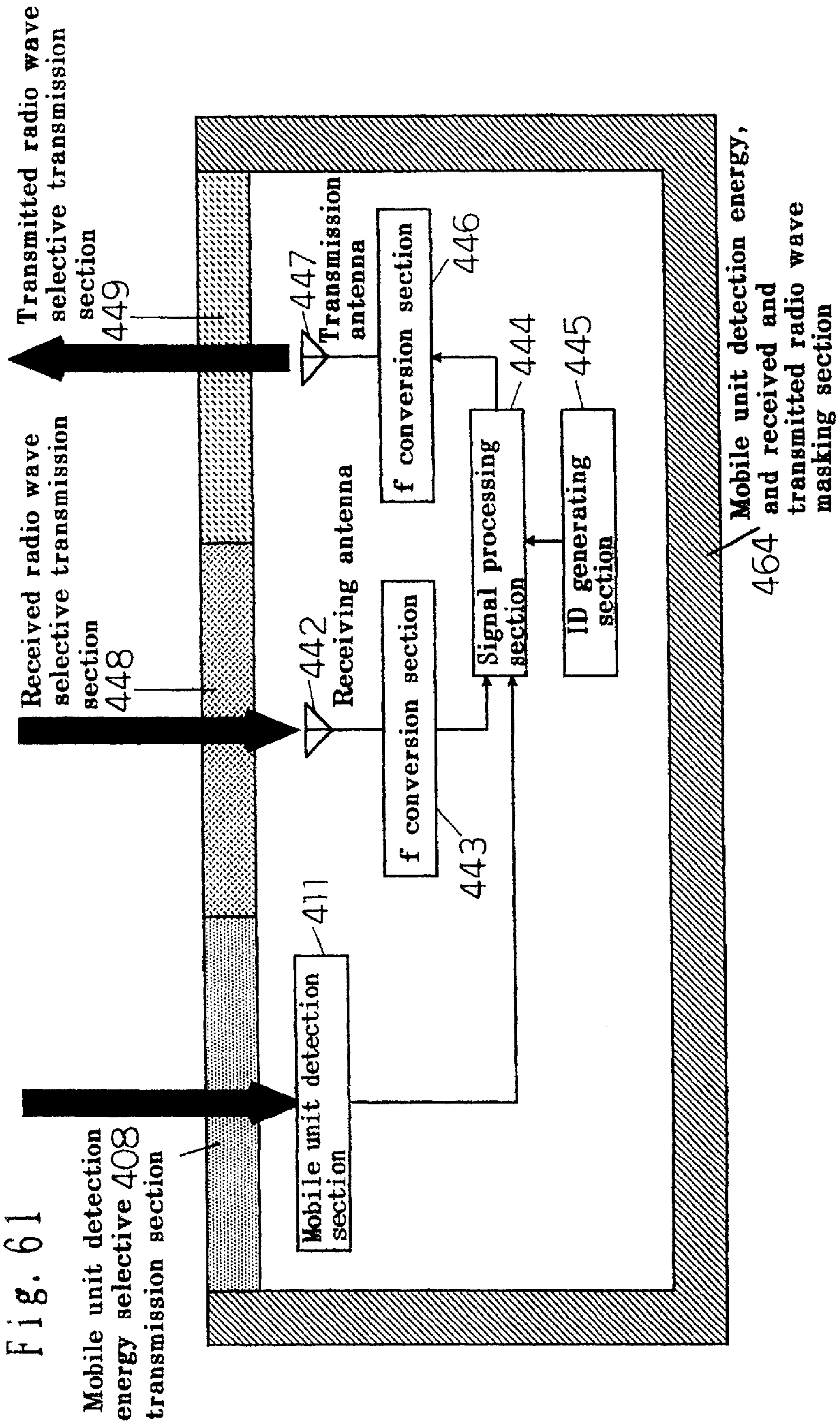

FIG. 61 is a diagram showing a configuration of another example of the present embodiment, in which a mobile unit detection section 411 and a mobile unit detection energy selective transmission section 408 for masking the mobile unit detection section 411 are added to the configuration of FIG. 51, and further, the radio wave masking section 450 is replaced by a mobile unit detection energy receiving/transmission radio wave masking section 464. As a result, the mobile unit detection section 411 is responsible for detection of a mobile unit, so that the receiving and transmission operation can be used exclusively for communication with a mobile unit or an external unit. In the process, the mobile unit detection information is output to the signal processing section 444, and of course added to the transmission signal for transmission.

37th Embodiment

Figure 52:
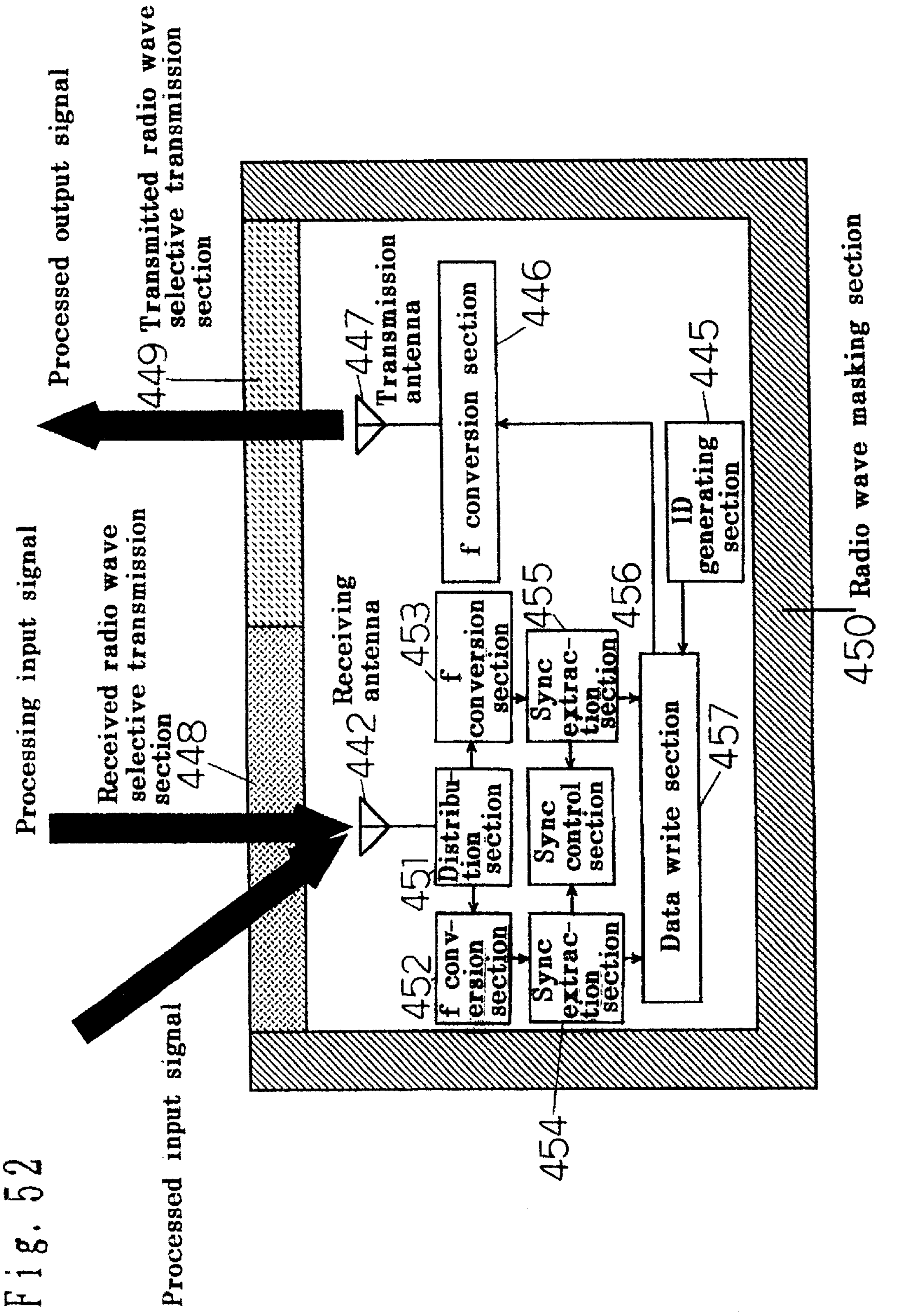

FIG. 52 is a diagram showing a configuration of a mobile unit detection device according to a 37th embodiment of the invention. The configuration of this embodiment is different from that of FIG. 51 in that in this embodiment, the f conversion section 443 and the signal processing section 444 are replaced by a distribution section 451, f conversion section 452, 453, sync extraction sections 454, 455, a sync control section 456 and a data write section 457, and in that the signal received by way of the antenna 442 is of two types including a processing input signal and a processed input signal.

According to this embodiment, when a processing input signal is transmitted from a mobile unit or when the processed signal is transmitted from another device, the two types of signals are received by the receiving antenna 442 and distributed into two signals by the distribution section 451. Each of the signals thus distributed is frequency-converted by the f conversion sections 452, 453, respectively, and further sync signals are extracted therefrom by the sync extraction sections 454, 455. The sync signals thus extracted are output to the sync control section 456 on the one hand and to the data write section 457 at the same time. The ID information from the ID generating section 445 is written by the data write section 457 into the receiving signal. The signal thus processed is transmitted as a processed output signal from the transmission antenna 447 through the f conversion section 446.

Figure 62:
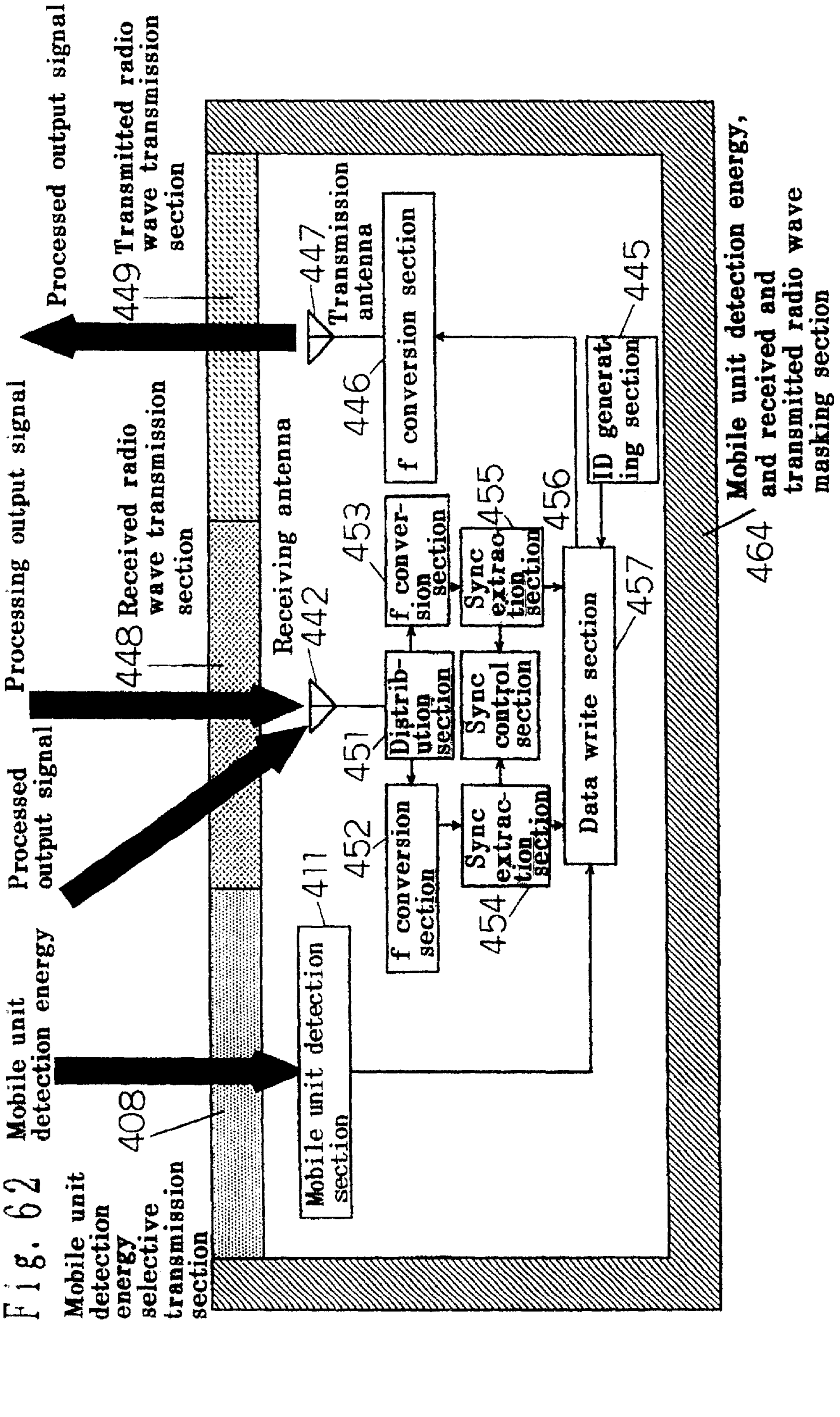

FIG. 62 is a a diagram showing a configuration of another example of this embodiment, in which a mobile unit detection section 411 and a mobile unit detection energy selective transmission section 408 for masking the mobile unit detection section 411 are added to the configuration of FIG. 52, and further, the radio wave masking section 450 is replaced by a mobile unit detection energy receiving/transmission radio wave masking section 464. As a result, the detection of a mobile unit is the responsibility of the mobile unit detection section 411, so that the receiving and transmission operation can be carried out exclusively for communication with a mobile unit or an external device. In the process, the information on the detection of a mobile unit is output to the data write section 457 and added to the transmission signal.

38th Embodiment

Figure 53:
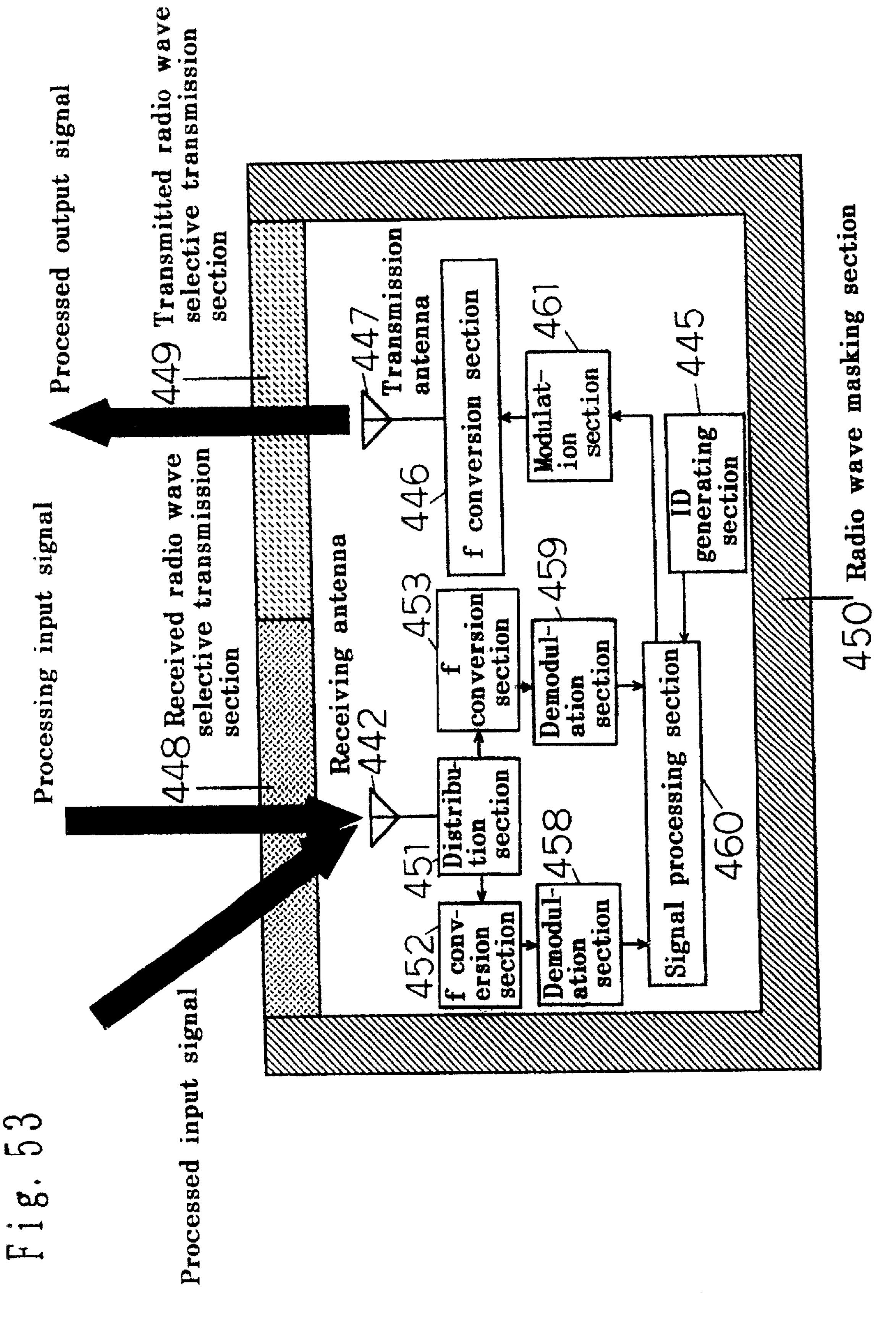

FIG. 53 is a diagram showing a configuration of a mobile unit detection device according to a 38th embodiment of the invention. The present embodiment has such a configuration that the sync extraction sections 454, 455, the sync control section 456 and the data write section 457 in FIG. 52 are replaced by demodulation sections 458, 459, a signal processing section 460 and a modulation section 461.

With this configuration, the two signals into which the receiving signal is distributed by the distribution section 451 are frequency-converted by the f conversion sections 452, 453, respectively, and demodulated by the demodulation sections 458, 459, respectively. The signals thus demodulated have added thereto the ID information of the mobile unit detection device or otherwise processed by the signal processing section 460 and then applied to the modulation section 461. The modulation section 461 modulates the input signal, and further, the signal is frequency-converted by the f conversion section 446 and transmitted as a processed output signal from the transmission antenna 447.

Figure 63:
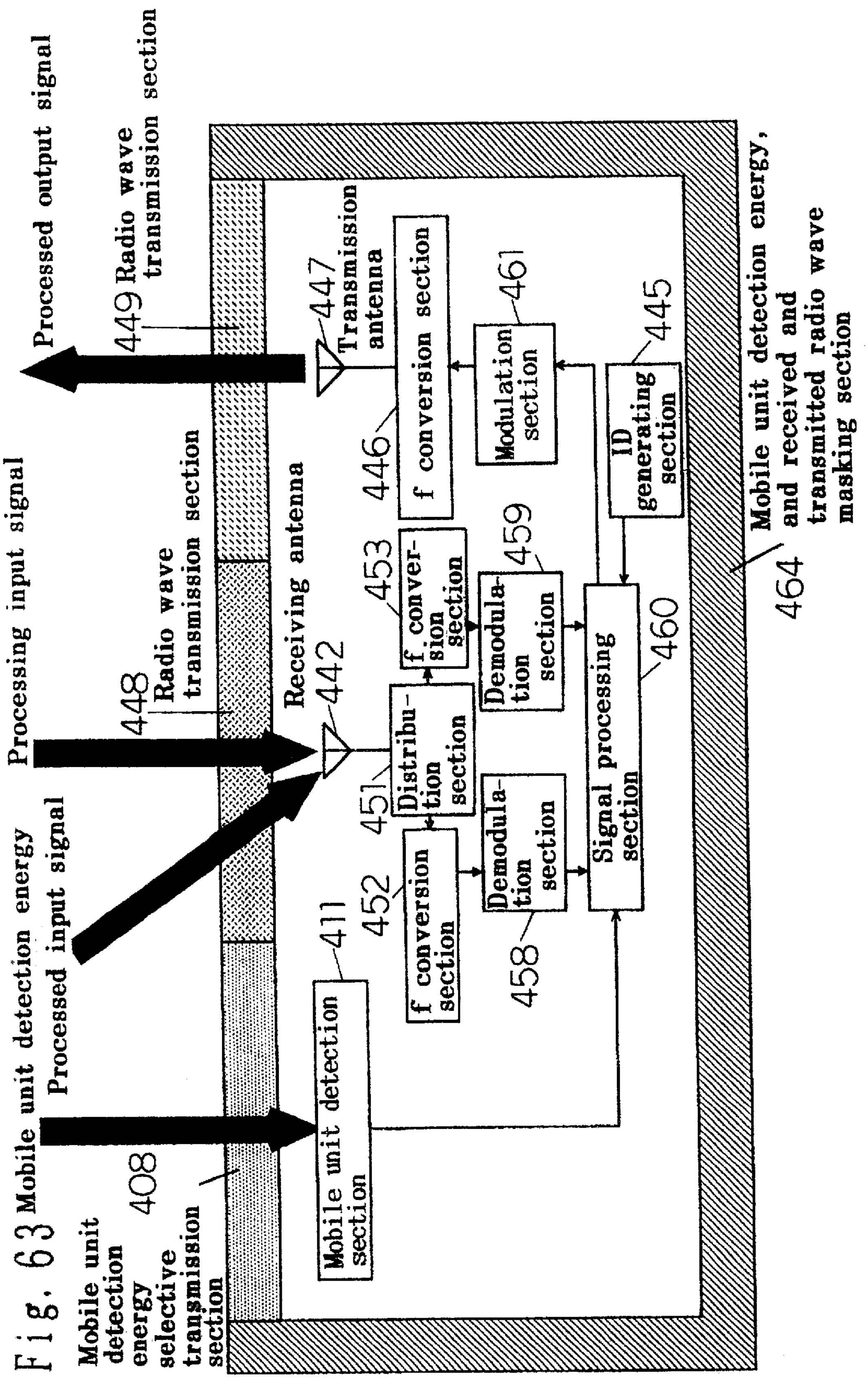

FIG. 63 is a diagram showing a configuration of another example of this embodiment, in which a mobile unit detection section 411 and a mobile unit detection energy selective transmission section 408 for masking the mobile unit detection section 411 are added to the configuration of FIG. 53, and further, the radio wave masking section 450 is replaced by a mobile unit detection energy receiving/transmission radio wave masking section 464. As a result, the detection of a mobile unit is the responsibility of the mobile unit detection section 411, so that the receiving and transmission operation can be used exclusively for communication with a mobile unit or and an external device. In the process, the information on the detection of a mobile unit is output to the signal processing section 460 and added to the transmission signal.

39th Embodiment

Figure 54:
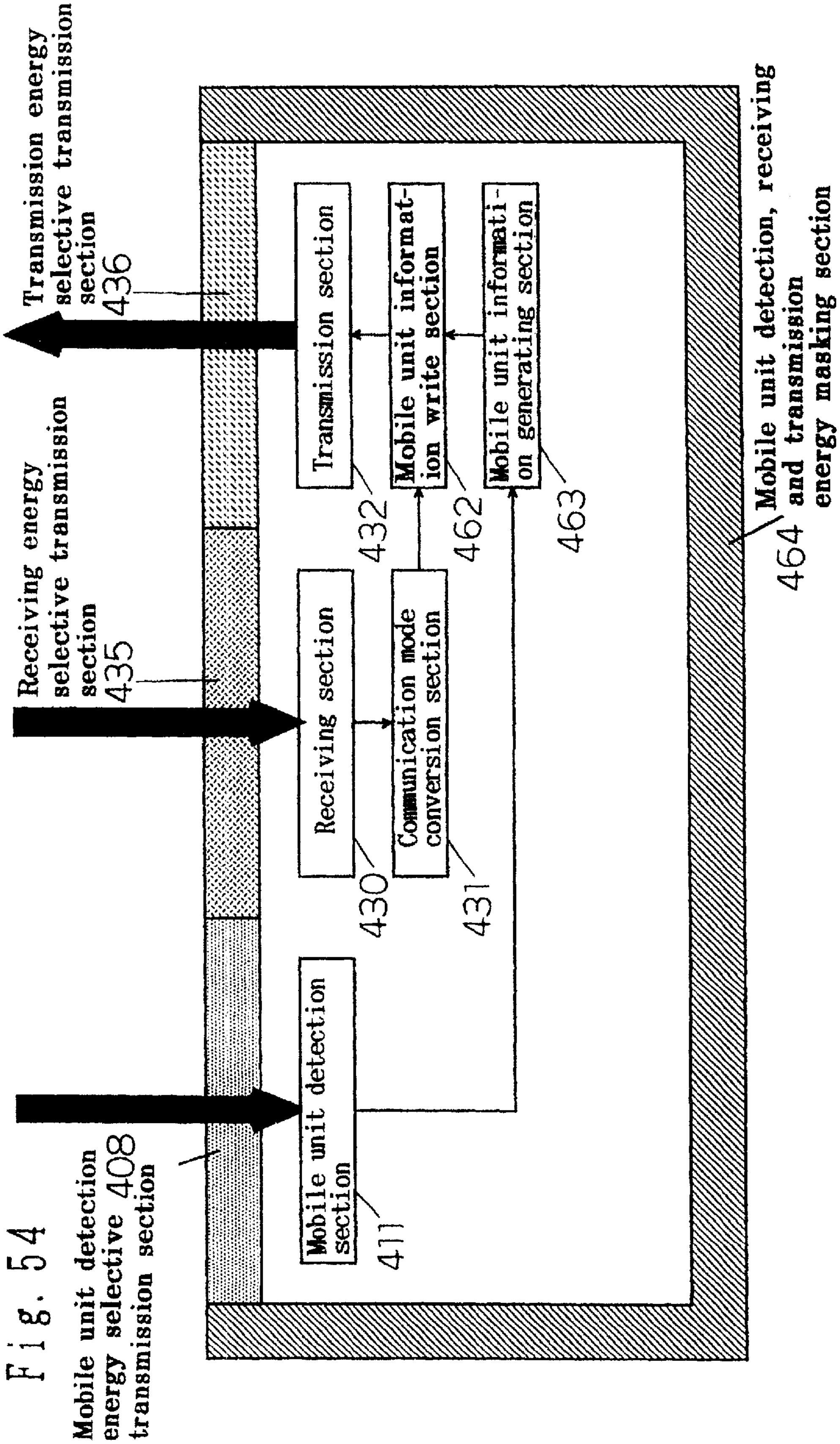

FIG. 54 is a diagram showing a configuration of a mobile unit detection device according to a 39th embodiment of the invention. This mobile unit detection device is configured of a mobile unit detection section 411 for detecting the detection energy radiated from a mobile unit, a mobile unit information generating section 463 for generating information on a mobile unit on the basis of the output of the mobile unit detection section 411, a receiving section 430 for receiving the energy radiated from a mobile unit or an external source, a communication mode conversion section 431 for converting the communication mode of the received signal, a mobile unit information write section 462 for writing the mobile unit information output from the mobile unit information generating section 463 in a converted communication mode, and a transmission section 432 for transmitting the written data. The mobile unit detection device according to this embodiment further includes a mobile unit detection energy selective transmission section 408 for masking the mobile unit detection section 411, a receiving energy selective transmission section 435 for masking the receiving section 430, and a mobile unit detection/receiving/transmission energy masking section 464 for masking the remaining portions.

With this configuration, the mobile unit information generated on the basis of the detection signal detected by the mobile unit detection section 411 is written into the receiving signal and transmitted to a mobile unit or other external units thereby to produce information on a mobile unit.

Figure 64:
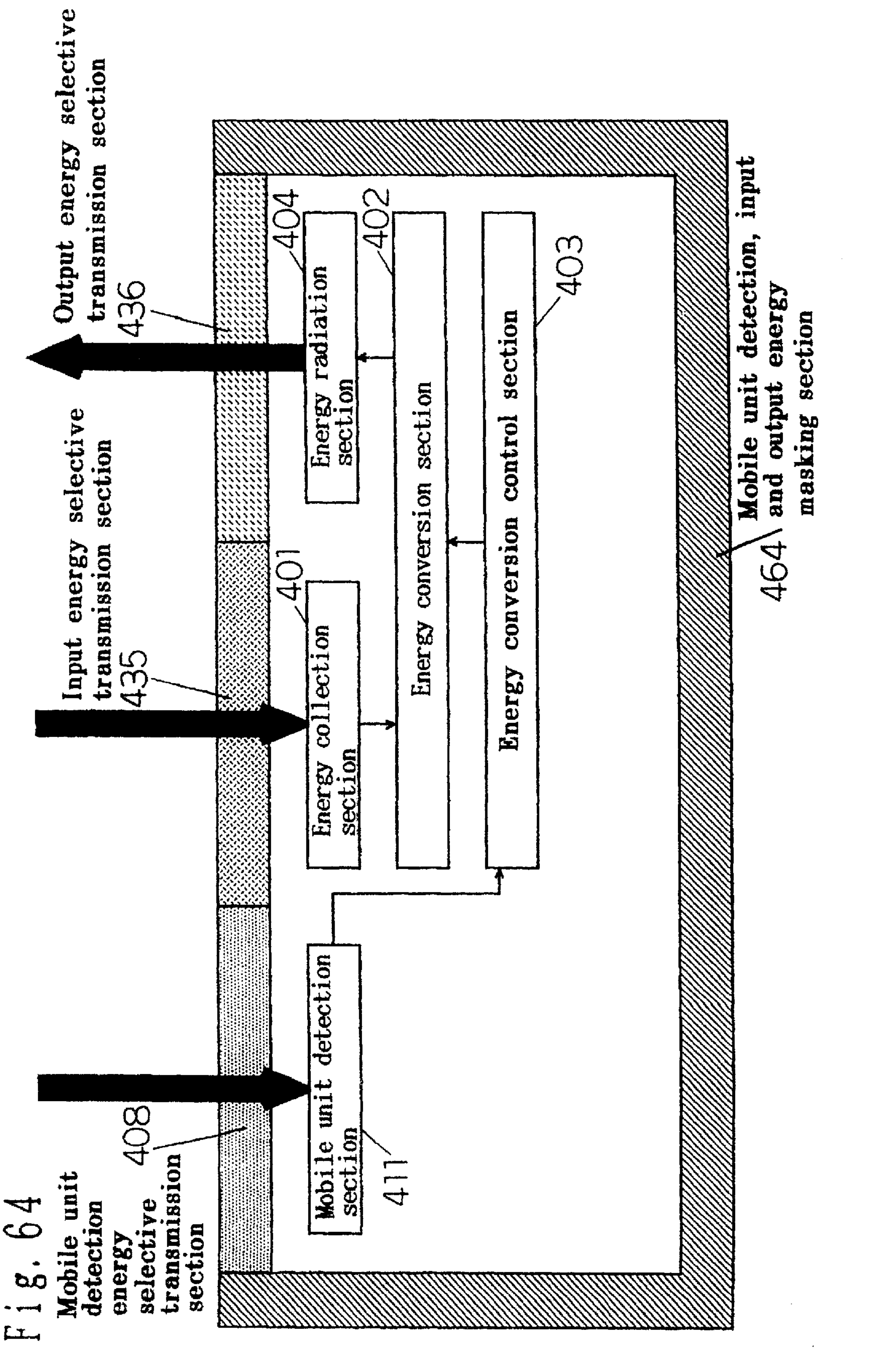

FIG. 64 is a diagram showing a configuration of another example showing the configuration of FIG. 54 in a more basic form. Specifically, in this configuration, the receiving section 430 is replaced by an energy collection section 401, the communication mode conversion section 431 and a part of the mobile unit information write section 462 by an energy conversion section 402, the remaining part of the mobile unit information write section 462 and the mobile unit information generating section 463 by an energy conversion control section 403, and the transmission section 432 by an energy radiation section 404.

Figure 65:
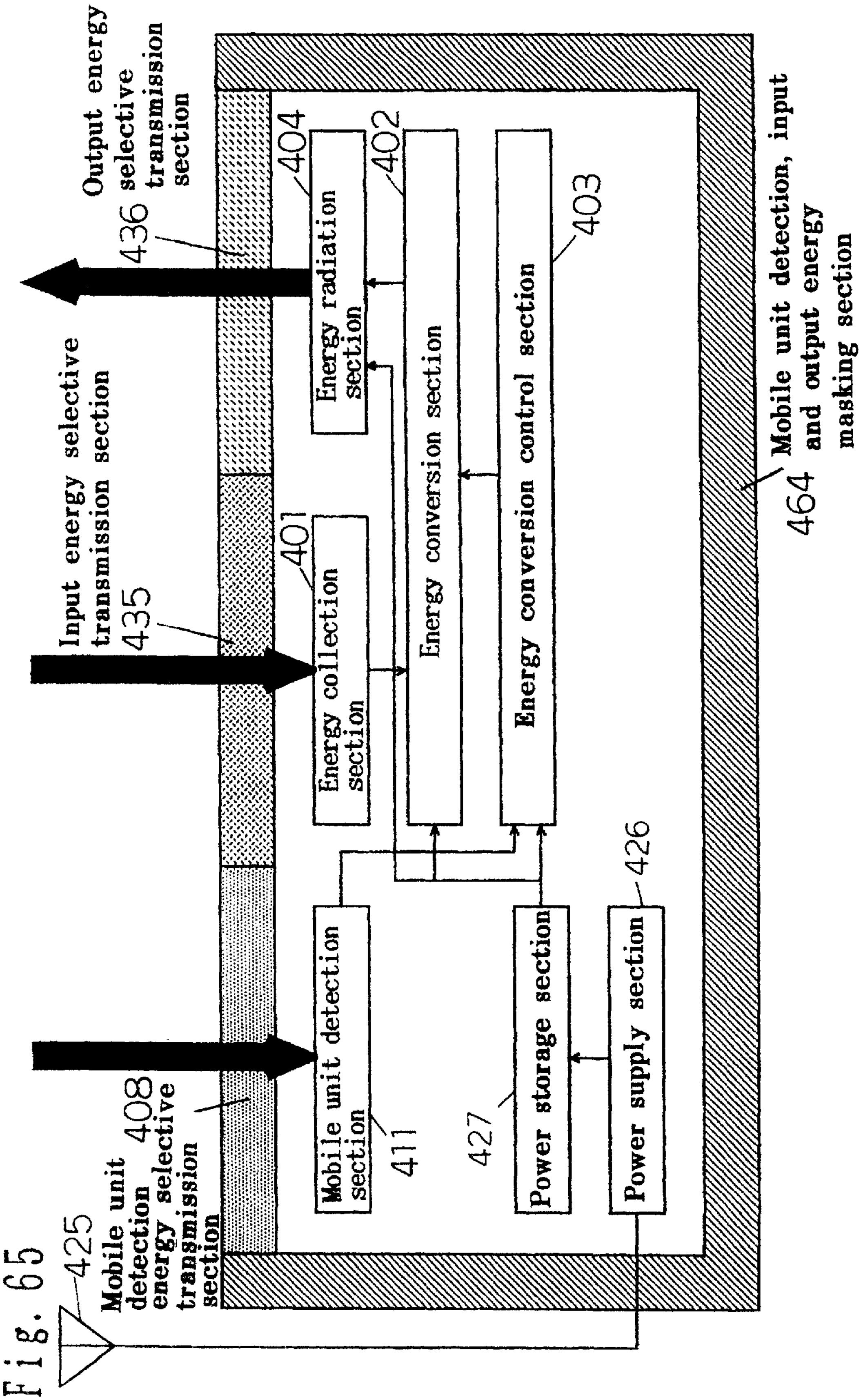

Also, FIG. 65 is a diagram showing a configuration of another example of this embodiment in which a means for supplying the drive power for the system proper from an external source is added to the configuration of FIG. 64 described above. As shown in FIG. 65, a receiving antenna 425, a power storage section 427 and a power supply section 426 are provided. A radio wave radiated from an external unit is extracted, and the power is supplied to the energy radiation section 404, the energy conversion section 402 and the energy conversion control section 403, respectively. With this configuration, the need of a built-in battery of the detection device and the trouble of replacing the battery are eliminated, thereby saving the labor of maintenance and management.

40th Embodiment

Figure 55:
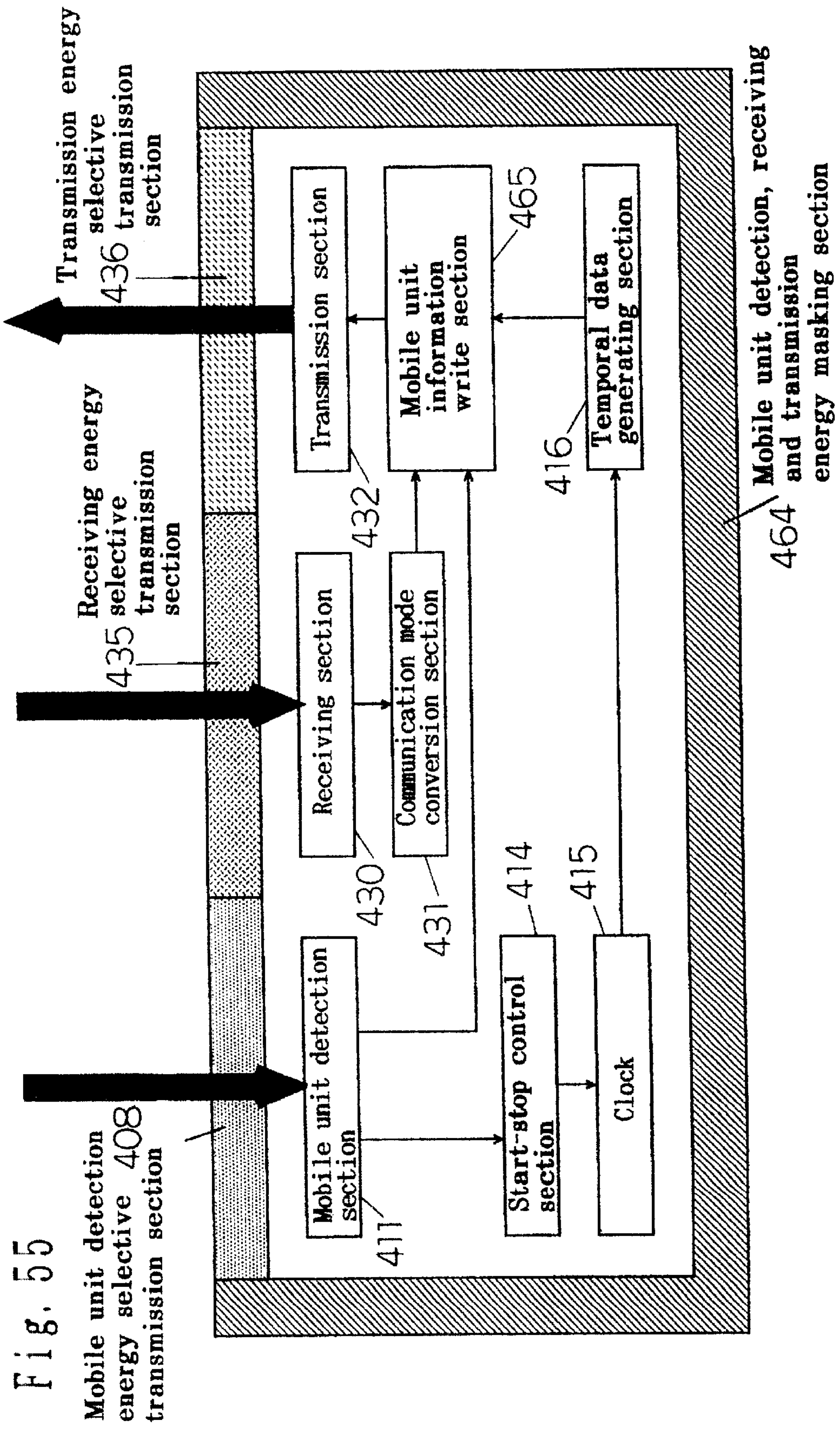

FIG. 55 is a diagram showing a configuration of a mobile unit detection device according to a 40th embodiment of the invention. This mobile unit detection device is configured of a mobile unit detection section 411 for detecting the detection energy radiated from a mobile unit, a receiving section 430 for receiving the energy radiated from a mobile unit or an external device, a communication mode conversion section 431 for converting the communication mode of the signal thus received, a clock 415 for measuring the time, a start-stop control section 414 for controlling the start and stop of the clock 415 by the detection signal of the mobile unit detection section 411, a temporal data generating section 416 for generating the temporal data from the output signal of the clock 415, a mobile unit information write section 465 for writing the detection signal output from the output mobile unit detection section 411 and the output data from the temporal data generating section 416 in the converted communication mode, and a transmission section 432 for transmitting the written data. The mobile unit detection device according to this embodiment further includes a mobile unit detection energy selective transmission section 408 for masking the mobile unit detection section 411, a receiving energy selective transmission section 435 for masking the receiving section 430, a transmission energy selective transmission section 436 for masking the transmission section 432 and a mobile unit detection/receiving/transmission energy masking section 464 for masking the remaining portions.

With this configuration, not only the operation of the 39th embodiment described above can be performed, but also the moving speed of a mobile unit and the distance between mobile units described with reference to the 32nd and 35th embodiments can be determined.

Figure 66:
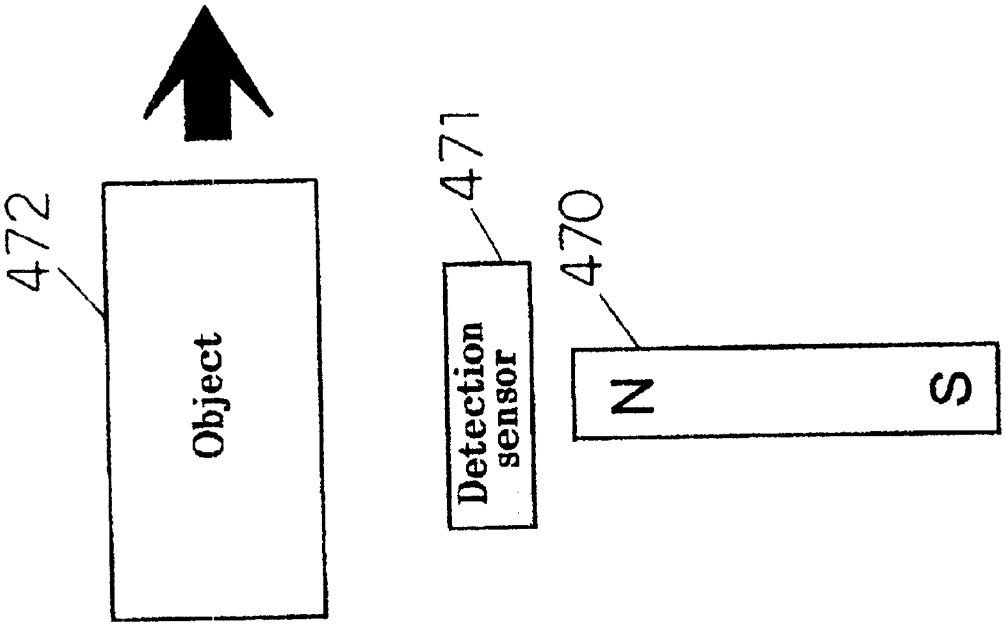

FIG. 66 is a diagram showing the essential parts of an example in which magnetism is used as the detection energy. In FIG. 66, relative positions are set in such a manner as to align the polarities 470 of a magnet, a magnetism detection sensor 471 and an object (moving object) 472 in that order. Especially, the distance between a polarity 470 of the magnet and the object 472 is set within 20 cm.

By reversing the N and S polarities of the magnet, the positive and negative signs of the detection signal can also be reversed, and therefore the detection device can hold information. Also, the detection timing of producing the detection signal from the magnetism detection sensor 471 is set not less than the frequency obtained from the maximum moving speed of the object and the interval at which the detection devices are installed.

41th Embodiment

A plurality of mobile unit detection devices according to any one of the 29th to 40th embodiments described above are installed along a route of movement of a mobile unit, and detection information collection section is installed for collecting the mobile unit detection information from the plurality of the mobile unit detection devices. A plurality of mobile unit detection devices are divided into one group or a plurality of such groups are subdivided into a plurality of subgroups each having at least two mobile unit detection devices. On the basis of the detection pattern of the detection information obtained for each group or subgroup, a fault of a mobile detection device is detected by a fault detection section, thus constituting a mobile unit detection system.

Assume, for example, that a plurality of detection devices are installed in such a manner as to detect a mobile unit by a maximum of four mobile unit detection devices at the same time (i.e., that four detection devices are installed over the distance from the leading end to the trailing end of a mobile unit). Then, the detection pattern of the group made up of the particular four detection devices produces one, two, three and four pieces of detection information progressively with the movement of the mobile unit, followed by the change in the number of pieces of detection information from three to two to one in the order of detection. In the process, if a faulty detection device is included, this detection pattern undergoes a change, thereby making it possible to identify the faulty detection device.

By the way, all the above-mentioned embodiments are shown schematically to have a detection device rectangular in shape. The invention, however, is not limited to such a shape but other shapes such as a cylinder and a cone are also applicable with equal effect.

Further, although only the detection device proper is shown in the above-mentioned embodiments, the invention is not limited to such a configuration, but a base with a wedge-shaped lower end can be mounted on the detection device proper. In such a case, the body and the base of the device are connected to each other by using screws or an adhesive.

Also, according to this embodiment, in order to improve the durability of the device proper, the body can be hermetically sealed in vacuum.

Also, according to the above-mentioned embodiments, a method was explained for supplying the drive power for the detection devices from an external source, but no method was explained for supplying power from an internal power supply means. In the case where the device has an internal power supply, however, such means can be provided by a solar battery cell or an oscillatory battery cell, for example, as well as by a charging battery cell with equal effect.

Also, the above-mentioned embodiments fail to refer to the place of installing the detection devices. The place of installation, however, can be any place where a mobile unit can pass and can be detected, including the center of a road, a side end of a road, a curb, the interior of a tunnel, an underground passage or a wall of a building.

Also, the above-mentioned embodiments can have such a configuration that in the case where the mobile unit detection signal produced by a detection section has a positive feature, reference property information such as a signal pattern of the detection signal is stored in advance in a signal processing section, and is compared with an actual detection signal, so that if there is any difference beyond a predetermined limit, decision is made that the detection section is out of order. In such a case, the fault information can be notified from the transmission section to a mobile unit, an external unit or other detection devices.

Although the embodiments described above refer to a method of transmitting information from and to a mobile unit or from and to an external device, the invention is not limited to such a method. Instead, with a plurality of mobile unit detection devices, i.e., modules installed along a route of mobile unit movement, the whole or part of information can be transmitted by relay between the modules in the manner as described above with reference to a relay transmission system. Such a configuration is applicable to all the embodiments of the transmission system.

The mobile unit detection device according to the above-mentioned embodiment has the advantage that a mobile unit can be detected by a single device and the resulting detection information can be notified to other devices.

Another advantage is that provision of a clock in the detection device can determine the speed of a mobile unit or the distance between mobile units.

Also, if the configuration is such as to supply the drive power from an external source, the labor of maintenance and management can be reduced.

Also, in the case where the surface of the detection section or the transmission section is covered by a protective material having a selective transmissibility, not only the shock resistance and the weatherability are improved, but the unnecessary entry of energy can be suppressed, thereby preventing a detection error.

Also, a configuration capable of detecting a fault of the mobile unit detection device can discriminate a faulty detection device quickly, and permits a quick action against it for proper management.

In the case where a plurality of mobile unit detection devices are installed to make up a transmission system, on the other hand, communication is possible between a mobile unit and an external device, while at the same time making it possible to notify the mobile unit detection information to another mobile unit or other external devices.

42nd Embodiment

Figure 67:
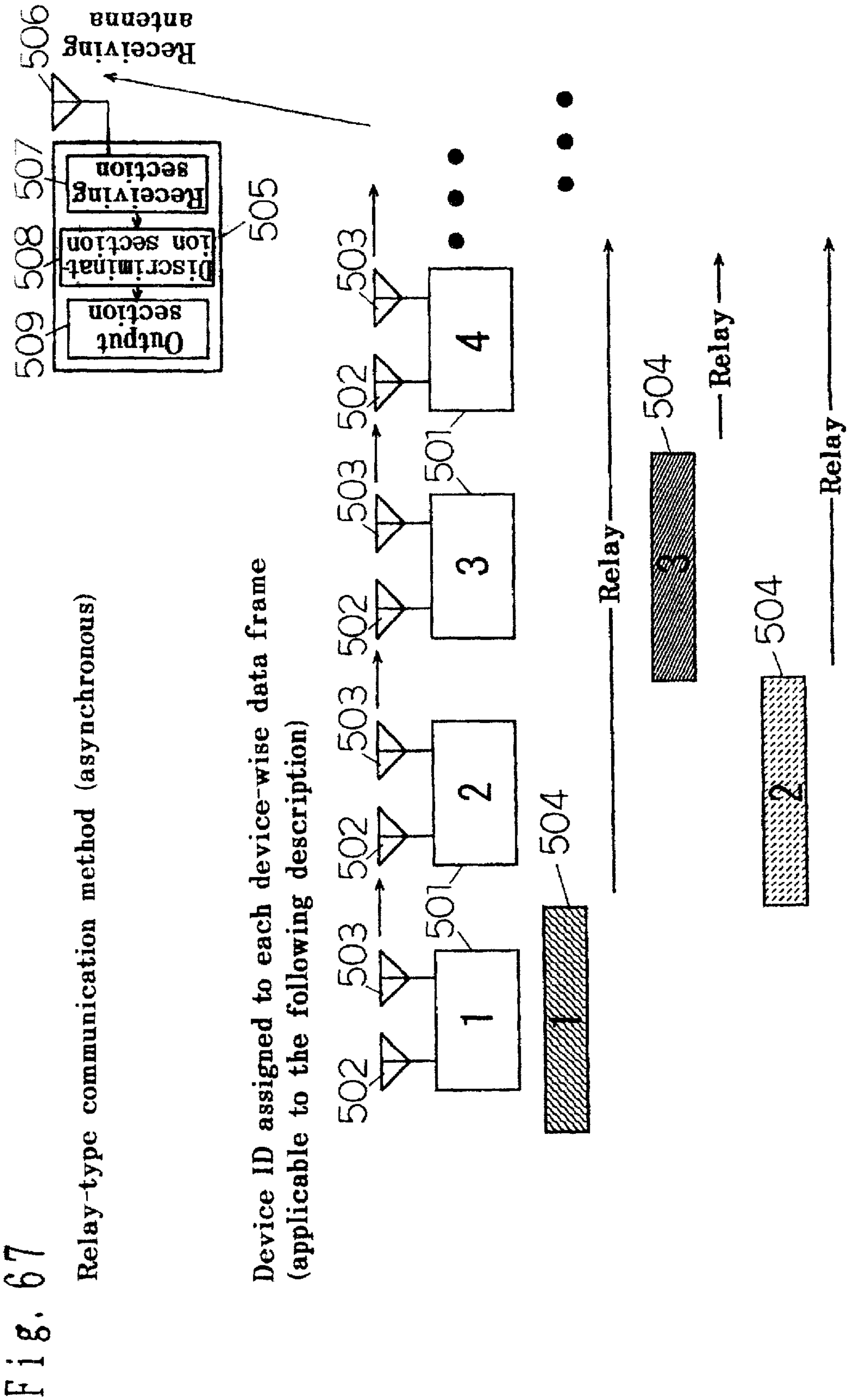

FIG. 67 is a diagram for explaining a communication coding method according to a 42nd embodiment of the invention. A communication method according to this embodiment employs an asynchronous scheme. In FIG. 67, like in the above-mentioned relay transmission system, a plurality of modules 501 are installed at predetermined intervals along a road (or along a route). The modules 501 has identifiers (1), (2), (3), (4) and so on, respectively. Also, a predetermined number of modules 501 are assumed to constitute a unit (which is called a zone), and a signal is assumed to be transmitted from the identifier (1) sequentially in the direction of arrow. The signal from the module 501 located at the tail end is received by a receiving unit 505. This receiving unit 505 is configured of a receiving antenna 506 for receiving the signal from the module 501, a receiving section 507 connected to the receiving antenna 506, a discrimination section 508 for discriminating information such as ID of the module 501 from the receiving signal, and an output section 509 for producing the discrimination information.

In the communication method according to this embodiment, as shown in FIG. 67, assume that a data (1)504 is generated to be transmitted to the module (1)501. Other modules (2), (3), (4) and so on, receive the data (1) by way of the receiving antenna 502 and transmit the data by way of the transmission antenna 503. In this way, the data (1)504 is only relayed, and until the end of the relaying operation, the relaying of any data which may be generated in the local module is prohibited. After the data (1)504 is relayed up to the module at the tail end and received by the receiving unit 505, assume that the data (3)504 is generated in the module (3)501. The data (3)504 is transmitted to the module at the tail end in similar fashion. In the process, the modules including and subsequent to the module (4)501 simply relay the data (3)504. After the data (3)504 is received by the receiving unit 505, assume that the data (2)504 is generated in the module (2)501. The particular data is transmitted in a similar manner and received by the receiving unit 505. The receiving unit 505 extracts the ID of the receiving data by way of the discrimination section 508 and can discriminate a specific module from which the particular data has been transmitted. In this way, data are transmitted in the order of generation. During the transmission of data, the other modules are dedicated to the transmission processing of the data and are prohibited from receiving a new data.

As described above, the asynchronous scheme is simpler as it can select the timing process for synchronism and the data structure arbitrarily. Since the data in a given module restricts all the modules, however, the communication efficiency is deteriorated if data are generated frequently in each module.

43rd Embodiment

Figure 68:
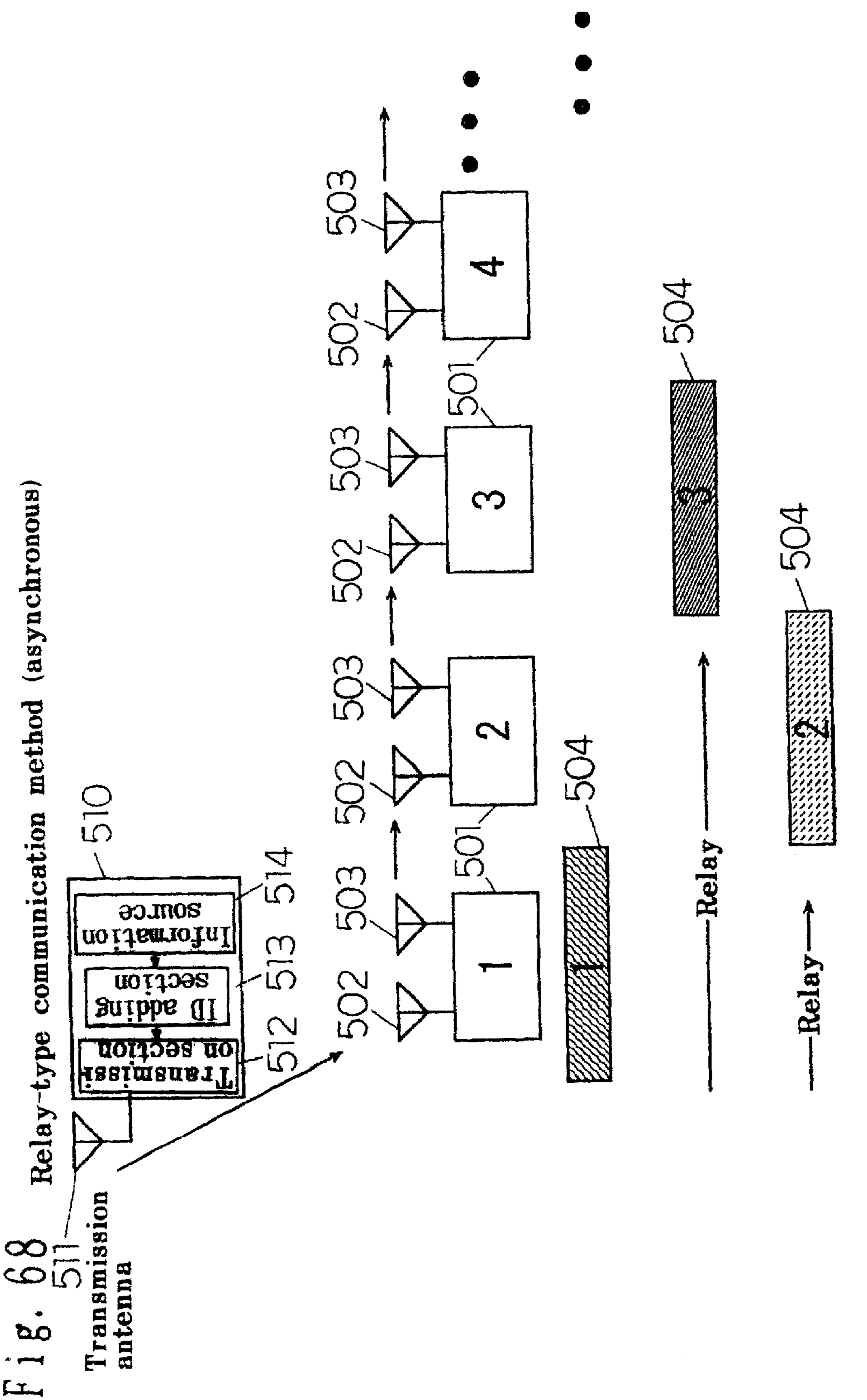

FIG. 68 is a diagram for explaining a communication coding method according to a 43rd embodiment of the invention. The communication method according to this embodiment is also carried out by an asynchronous scheme. In FIG. 68, like in FIG. 67, a plurality of modules 501 are installed at predetermined intervals along a road (or a route). The respective modules have identifiers (1), (2), (3), (4), and so on, respectively. A predetermined number of the modules 502 constitute a unit (which is called a zone). A signal is transmitted in the direction of arrow from the identifier (1) sequentially. Also, a transmission unit 10 is provided for transmitting information to any one of the modules 501. First, a signal is transmitted from the transmission unit 510 to the module (1)501. The transmission unit 510 is configured of an information source 514 having information to be transmitted, an ID adding section 513 for adding an identifier of the module 501 intended for transmission to the information, a transmission section 512 for transmitting the information with the identifier added thereto, and a transmission antenna 511 for transmitting the signal from the transmission section 512 to the module (1)501.

In the communication method according to this embodiment shown in FIG. 68, first, the data (1)504 to be transmitted is transmitted from the transmission unit 510 to the module (1)501. The module (1)501 recognizes the received data as the data addressed to it, and processes the particular data (1)504.

Then, the data (3)504 to be transmitted is transmitted from the transmission unit 510 to the module (3)501. The module (1)501 recognizes that the data is not addressed to it, and transmits the data (3)504 from the transmission antenna 503. The module (2)501, on the other hand, receives the data (3)504 from the transmission antenna 502 thereof, recognizes that it is not addressed to it, and transmits the data (3)504 from the transmission antenna 503 thereof. The module (3)501 receives the data (3)504, and recognizing that it is the data addressed to it, processes the data (3)504.

Then, the data (2)504 to be transmitted is transmitted from the transmission unit 510 to the module (2)501. The module (1)501 recognizes that the data is nod addressed to it, and transmits the data (2)504 by way of the transmission antenna 503 thereof. The module (2)501 receives the particular data (2)504 by way of the receiving antenna 502, and recognizing the data (2)504 is the data addressed to itself, processes it.

Data are relayed in the order of receiving it from the transmission unit, and during the relaying of a given data, the relaying of another data is prohibited. In this way, data are transmitted in the order of generation thereof, and during the transmission thereof, other data are not accepted by other modules, which are thus occupied with the transmission processing of the particular data.

As described above, the asynchronous scheme is simple as the timing process for synchronization and the data structure can be arbitrarily selected. Since the data transmitted to a given module restricts all the modules, however, the communication efficiency is deteriorated when data are frequently transmitted to each module.

44th Embodiment

Figure 69:
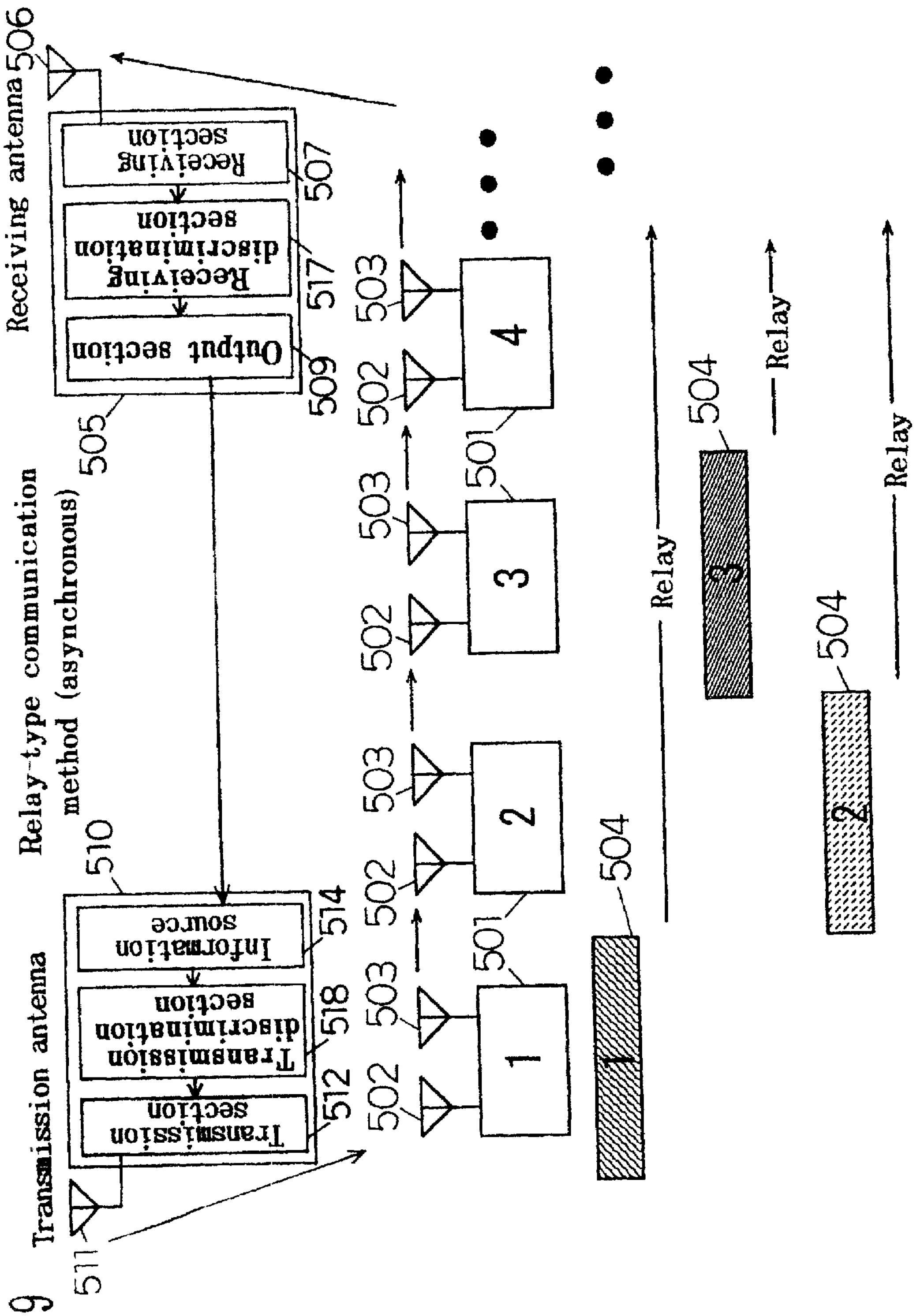

FIG. 69 is a diagram for explaining a communication coding method according to a 44th embodiment of the invention. The communication method according to this embodiment is also executed by an asynchronous scheme. In FIG. 69, like in FIG. 67 described above, a plurality of modules 501 are installed at regular intervals along a road (or a route). The modules 501 are assumed to have identifiers (1), (2), (3), (4) and so on, respectively. A predetermined number of modules 501 constitute a unit (called a zone). A signal is transmitted from the identifier (1) in the direction indicated by arrow sequentially. A receiving unit 505 is provided for receiving a signal from the module 501 located at the tail end of the transmission. This receiving unit 505 is configured of a receiving antenna 506, a receiving section 507, a receiving discrimination section 517 and an output section 509. Also, a transmission unit 510 is provided for transmitting information to any one of the modules 501. First, the signal is transmitted to the module (1)501 from the transmission unit 510. This transmission unit 510 is configured of an information source 514, a transmission discrimination section 518, a transmission section 512 and a transmission antenna 511. The receiving discrimination section 517 of the receiving unit 505 is for identifying whether the received data is further to be transmitted to the transmission unit 510 or not, and the transmission discrimination section 518 of the transmission unit 510 is for identifying the origin or the destination of transmission data.

Further, according to this embodiment, a signal is transmitted from the output section 509 of the receiving unit 505 to the information source 514 of the transmission unit 510, so that information is adapted for circulation in the direction of arrow through the modules 501, the receiving unit 505 and the transmission unit 510 in that order.

With the above-mentioned configuration, the functions of the 42nd and 43rd embodiments are realized. At the same time, transmission of information from the tail end toward the leading end of transmission, or for example, from the module (3)501 to the module (1)501 becomes possible through the receiving unit 505 and the transmission unit 510.

45th Embodiment

Figure 70:
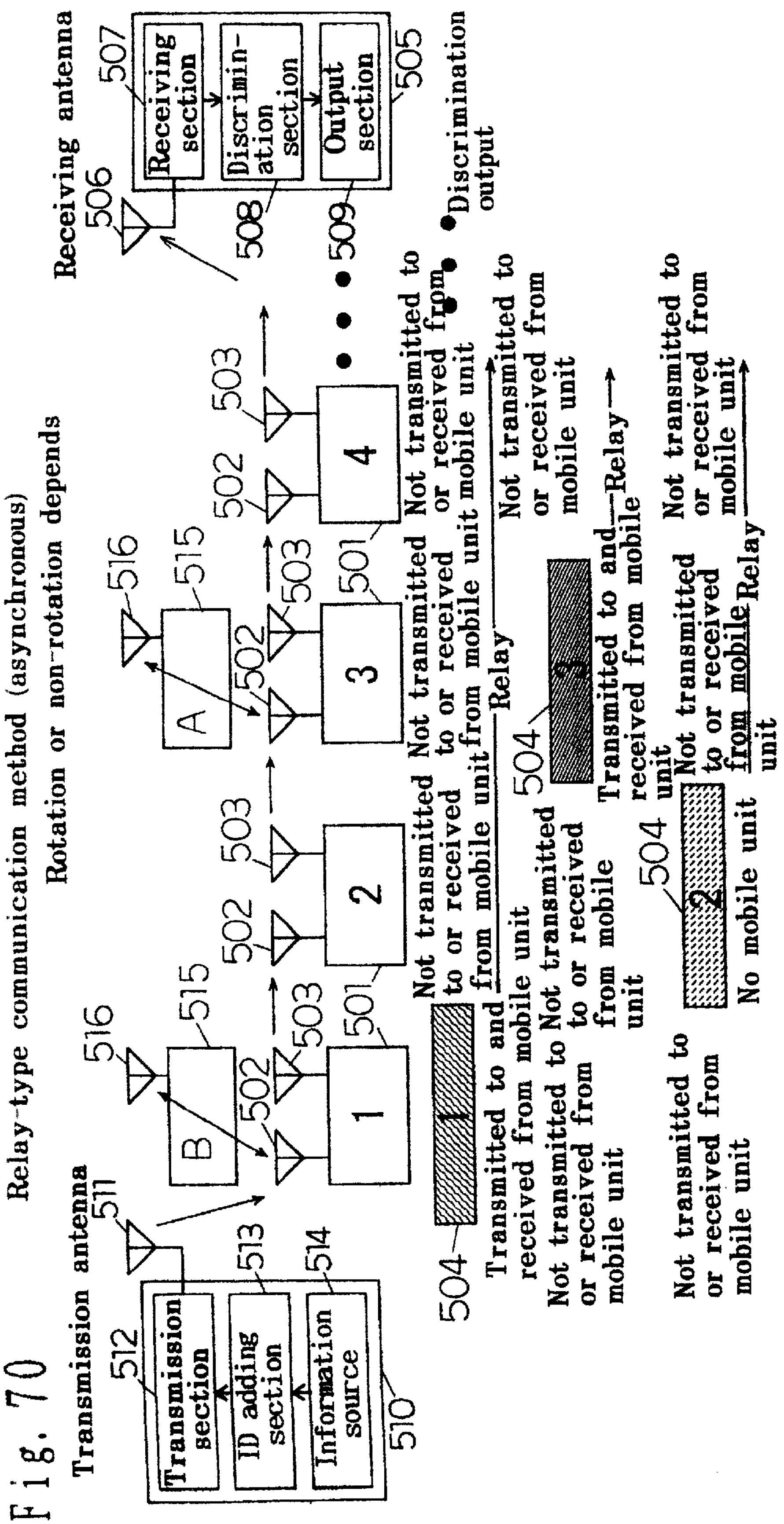

FIG. 70 is a diagram for explaining a communication coding method according to a 45th embodiment of the invention. The communication method according to this embodiment is also implemented in an asynchronous scheme. In FIG. 70, as in FIG. 67 described above, a plurality of modules 501 are installed at predetermined intervals along a road (or a route). The modules 501 are assumed to have identifiers (1), (2), (3), (4), and so on, respectively. A predetermined number of modules 501 make up a unit (which is called a zone). A signal is assumed to be transmitted from the identifier (1) sequentially in the direction of arrow. A receiving unit 505 is provided for receiving the signal from the module 501 at the tail end of transmission. This receiving unit 505, like the corresponding one in FIG. 67, is configured of a receiving antenna 506, a receiving section 507, a discrimination section 508 and an output section 509. Also, a transmission unit 510 is provided for transmitting information to any one of the modules 510. A signal is transmitted first from this transmission unit 510 to the module (1)501. This transmission unit 510, like the corresponding one in FIG. 68, includes an information source 514, an ID adding section 513, a transmission section 512 and a transmission antenna 511.

According to this embodiment, it is further possible that a mobile unit 515 having a transmission/receiving antenna 516 moves while communicating with other modules 501.

In FIG. 70, assume that the mobile unit A515 is located in proximity to and adapted to communicate with the module (3)501, that the mobile unit B515 is located in proximity to and adapted to communicate with the module (1) 501, and that the communication between the mobile unit B515 and the module (1)501 has started earlier than the communication between the mobile unit A515 and the module (3)501. Then, the module (1)501 transmits the data (1)504 for communication with the mobile unit B515 in the direction of arrow. In the process, the communication and data generation in each module 501 is prohibited. In other words, the communication between the mobile unit A515 and the module (3)501 is impossible to execute before complete transmission of the data (1)504 to the receiving unit 505. Next, assume that the data (1)504 is received by the receiving unit 505 and the communication starts between the mobile unit A515 and the module (3)501. Then, the module (3)501 transmits the data (3)504 for communication with the mobile unit A515 in the direction of arrow. During this time, the communication and data generation in each module 501 is prohibited. At the same time, the module (2)501 is prohibited from generating any data even if it becomes desirous of generating one. After that, when the data (3)504 is received by the receiving unit 505, the module (2)501 generates the data (2)504, which is transmitted in the direction indicated by arrow.

In this way, according to this embodiment, all data, regardless of whether they are communicated with the mobile unit 515 or generated in each module 501, are transmitted on first-come first-served basis, and during the transmission of a given data, the processing of the other data is prohibited.

Also, with this configuration, assume that the discrimination section 508 of the receiving unit 505 is replaced by the receiving discrimination section 517 of FIG. 69, the ID adding section 513 of the transmission unit 510 is replaced by the transmission discrimination section 518 of FIG. 69, and further, like in FIG. 69, that a signal is transmitted from the output section 509 of the receiving unit 505 to the information source 514 of the transmission unit 510. Then, information can be circulated in the direction of arrow through the modules 501, the receiving unit 505 and the transmission unit 510 in that order, so that communication becomes possible from a leading mobile unit to a following mobile unit, for example, from the mobile unit A515 to the mobile unit B515.

46th Embodiment

Figure 71:
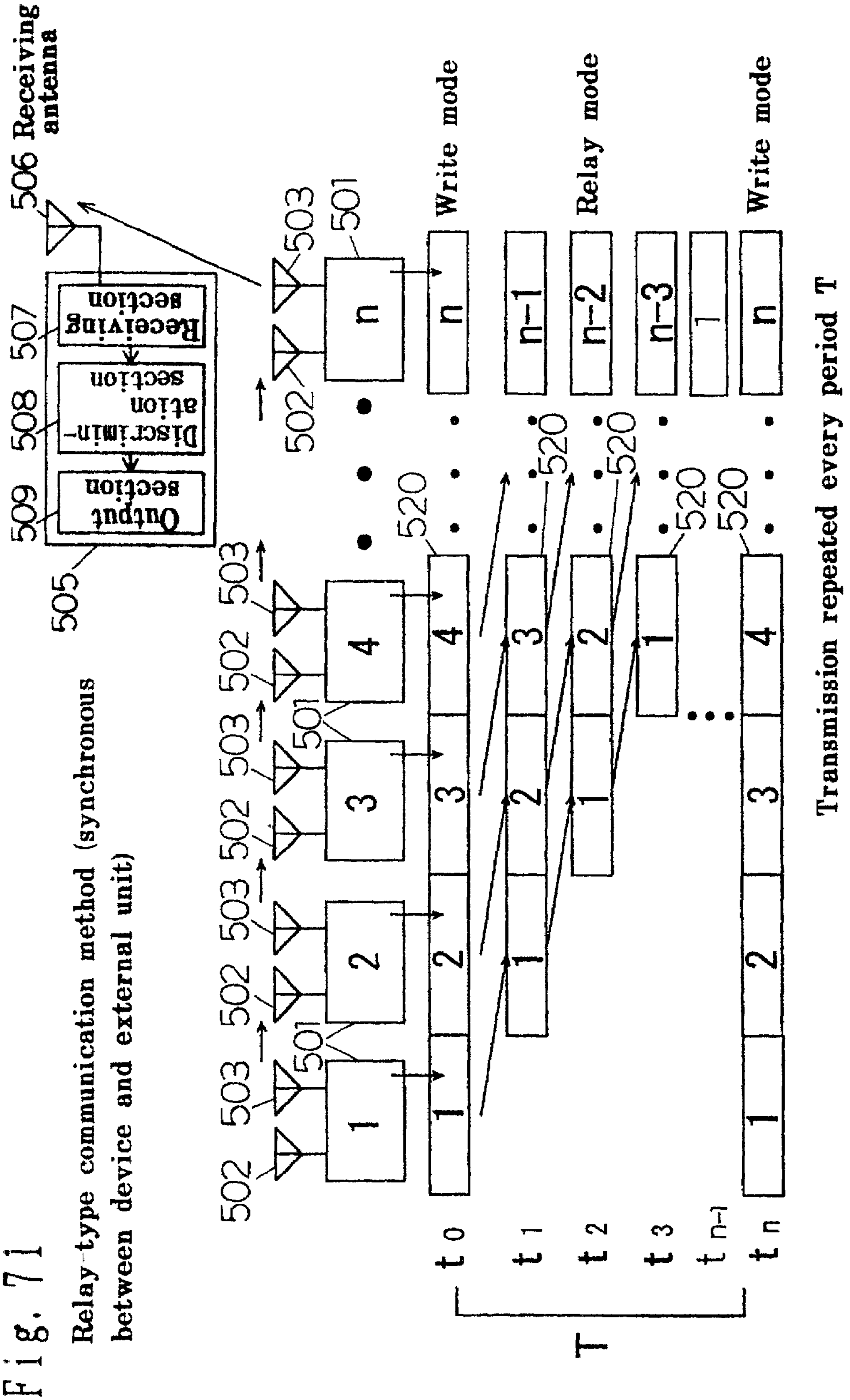

FIG. 71 is a diagram for explaining a communication coding method according to a 46th embodiment of the invention. The communication method according to this embodiment is implemented in a synchronous scheme, and involves the case in which data are sent to other systems. In FIG. 71, a plurality of modules 501 are installed at predetermined intervals along a road (or a route). The modules 501 have identifiers (1), (2), (3), (4), . . . , (n), respectively. Also, in this configuration, n modules 501 constitute a unit (which is called a zone), and signals are transmitted in the direction of arrow from the identifier (1) sequentially. There is provided a receiving unit 505 for receiving the signal from the module (n)501 at the tail end. The receiving unit 505 includes a receiving antenna 506 for receiving a signal from the module (n)501, a receiving section 507 connected to the receiving antenna 506, a discrimination section 508 for discriminating the information such as the ID of the module 501 from the received signal, and an output section 509 for outputting the information thus discriminated.

Figure 77:
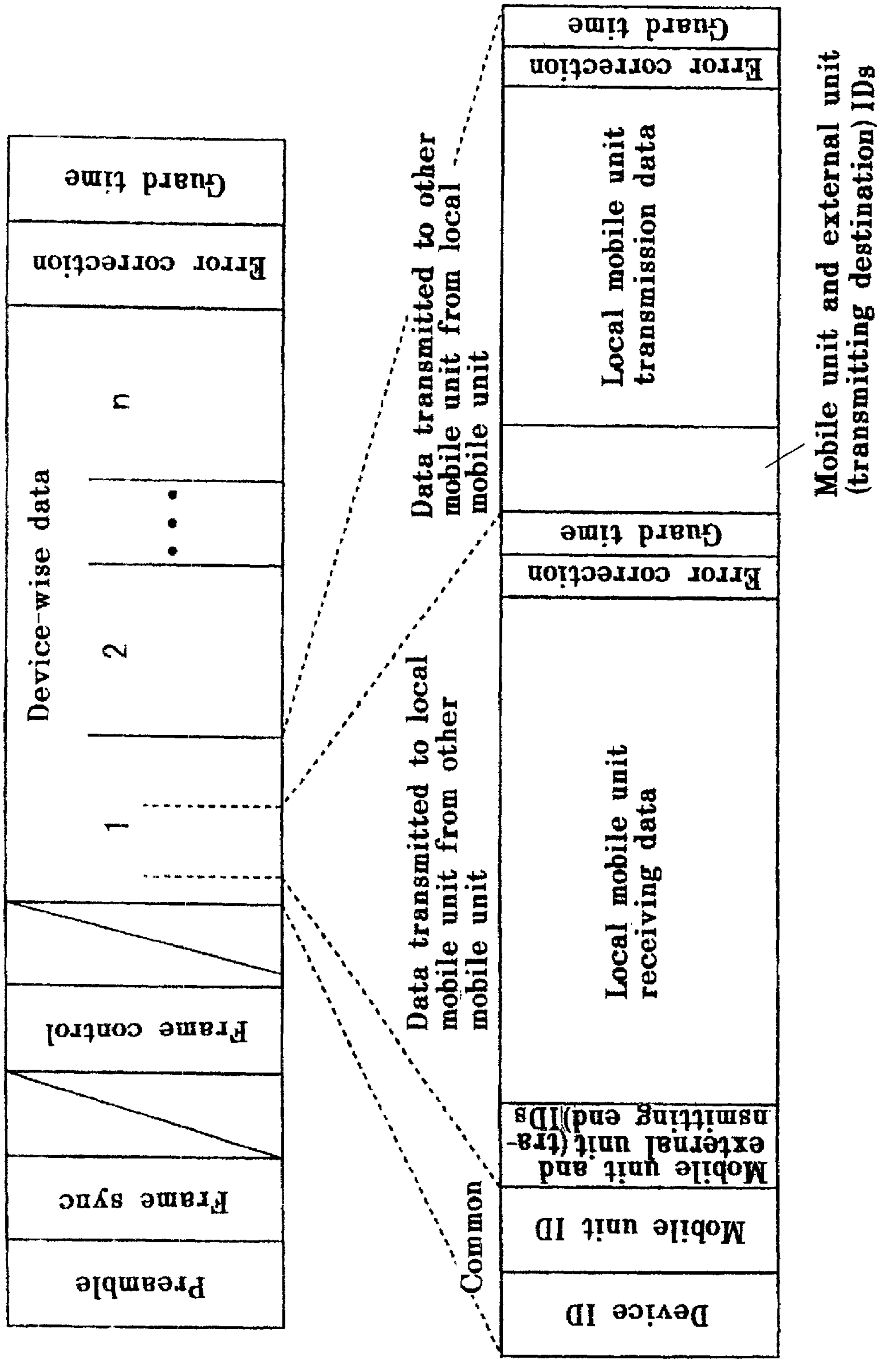

Also, the period T for communication is configured of n time segments t0 to tn−1. The time segment t0 represents a write mode, and the time segments t1 to tn−1 a relay mode. Specifically, during the time segment t0, each module 501 writes data in each frame. This frame structure for intra-zone communication, as shown in FIG. 77, for example, is comprised of fields including a preamble, a frame sync, a frame control, a device-wise data, an error correction and a guard time. The device-wise data further includes n slots 1 to n, each of which has a device ID, a mobile unit ID, data from device to mobile unit, data from mobile unit to device. Further, the data from a device to a mobile unit includes a mobile unit/external device (transmitting end) ID, a local mobile unit receiving data, an error correction and a guard time. The data from a mobile unit to a device, on the other hand, includes a mobile unit/external device (destination) ID, a local mobile unit transmission data, an error correction and a guard time. Consequently, each module 501 writes data in a corresponding slot of the device-wise data of this frame. Also, this embodiment uses slots for the data from a device to a mobile unit.

Next, the frame 520 with data written therein during the time segment t1 is transmitted to an adjacent module 501. The frame (1)520 is sent from the module (1)501 to the module (2)501, the frame (2)520 from the module (2)501 to the module (3)501. The frames 520 are sent subsequently in similar fashion. Specifically, each frame is shifted one by one in the direction of arrow. In similar fashion, during each of the time segments t2 to tn−1, each frame 502 is shifted sequentially. In the process, the frame 520 that has been sent up to the module (n) is transmitted to the receiving unit 505. During the time segment tn−1, the frame (1) 520 is sent up to the module (n) and further transmitted to the receiving unit 505.

Upon complete process of one period in this way, each module 501 again writes data in each frame during the time segment t0 (tn in the drawing). This process is repeated subsequently.

In the above-described manner, data can be written by any module 501 during the write mode. In addition, data can be transmitted and written for every period T. Unlike in the above-mentioned asynchronous scheme, therefore, a long waiting time is not required before a given data is processed.

47th Embodiment

Figure 72:
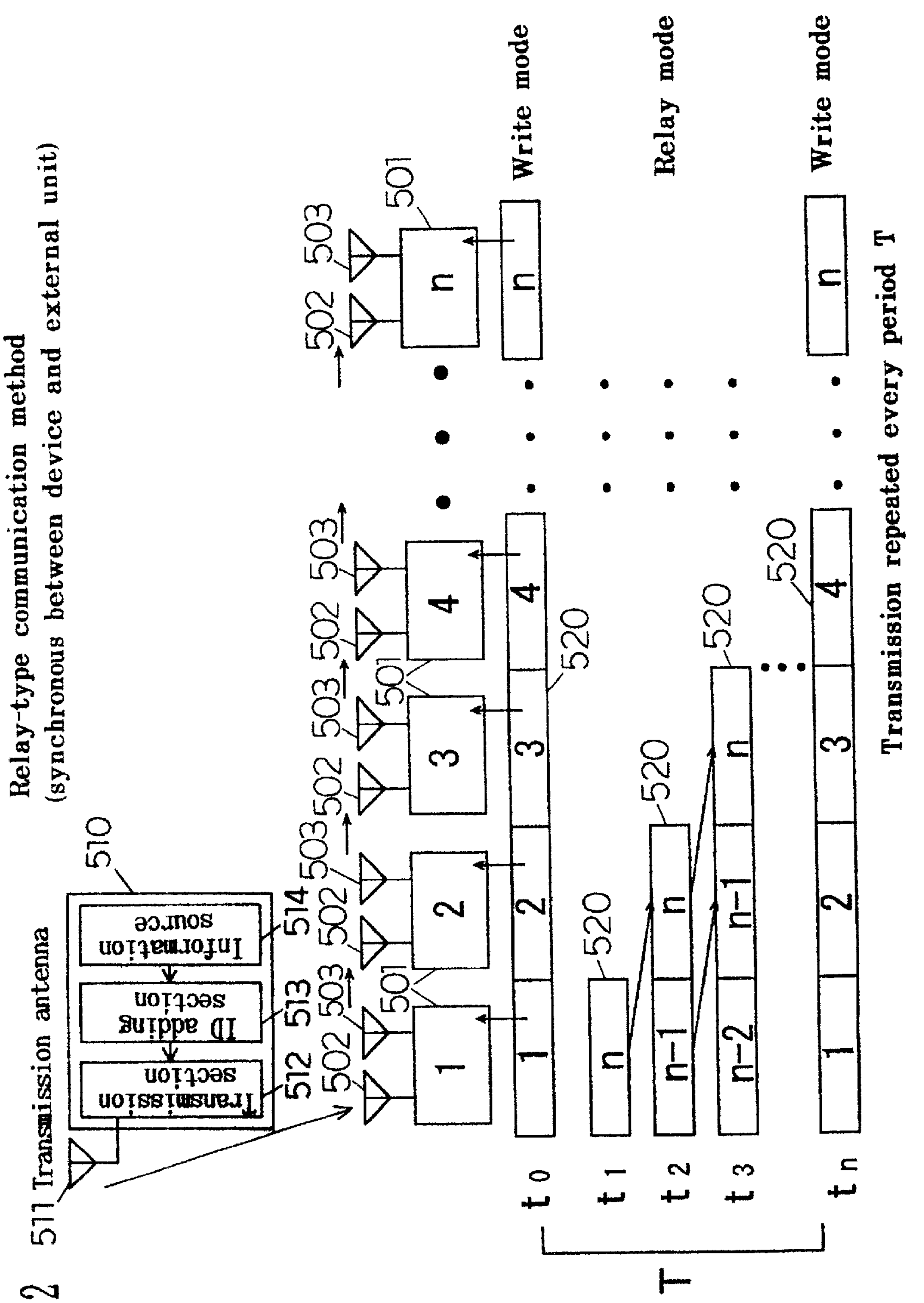

FIG. 72 is a diagram for explaining a communication coding method according to a 47th embodiment of the present invention. A communication method according to this embodiment is implemented by a synchronous scheme, and represents the case in which data are received from another device. In FIG. 72, a plurality of modules 501 are installed at predetermined intervals along a road (or a route). The modules 501 are assigned identifiers (1), (2), (3), (4), . . . , (n), respectively. Also, n modules 501 constitute a unit (called a zone), and a signal is assumed to be transmitted sequentially in the direction of arrow from the identifier (1). Also, there is provided a transmission unit 510 for transmitting information to any one of the modules 501. First, a signal is transmitted from the transmission unit 510 to the module (1)501. This transmission unit 510 is configured of an information source 514 having information to be transmitted, an ID adding section 513 for adding an identifier of the transmitting module 501 to the information, a transmission section 512 for transmitting the information with an identifier added thereto, and a transmission antenna 511 for transmitting a signal from the transmission section 512 to the module (1)501.

Like in the embodiment shown in FIG. 71, the period T for communication is comprised of n time segments t0 to tn−1, in which the time segment t0 represents a write mode and the time segments t1 to tn−1 represents a relay mode. Specifically, during the time segment t0, each module 501 read data from each frame 520. Also, the frame structure for intra-zone communication is similar to that of FIG. 7, in which each module 501 uses the slots of data for transmission from a mobile unit to a device.

Next, during the time segment t1, the frame (n)520 is received from the transmission unit 510, and during the time segment t2, the frame (n)520 is transmitted from the module (1)501 to the module (2)501, while at the same time receiving the frame (n−1)520 from the transmission unit 510. Next, during the time segment t3, the frame (n)520 is transmitted from the module (2)501 to the module (3)501, and the frame (n−1)520 from the module (1)501 to the module (2)501, while at the same time receiving the frame (n−1)520 from the transmission unit 510. In similar fashion, the same condition is assumed during the time segment tn as during the time segment t0, in which each module 501 reads data from each frame 520. After that, the above-mentioned operation is repeated.

As described above, any module 501 can read data in write mode. In addition, data can be transmitted and read for each period T. Therefore, a long time is not required to wait for the processing of a single data unlike in the above-mentioned asynchronous scheme.

48th Embodiment

Figure 73:
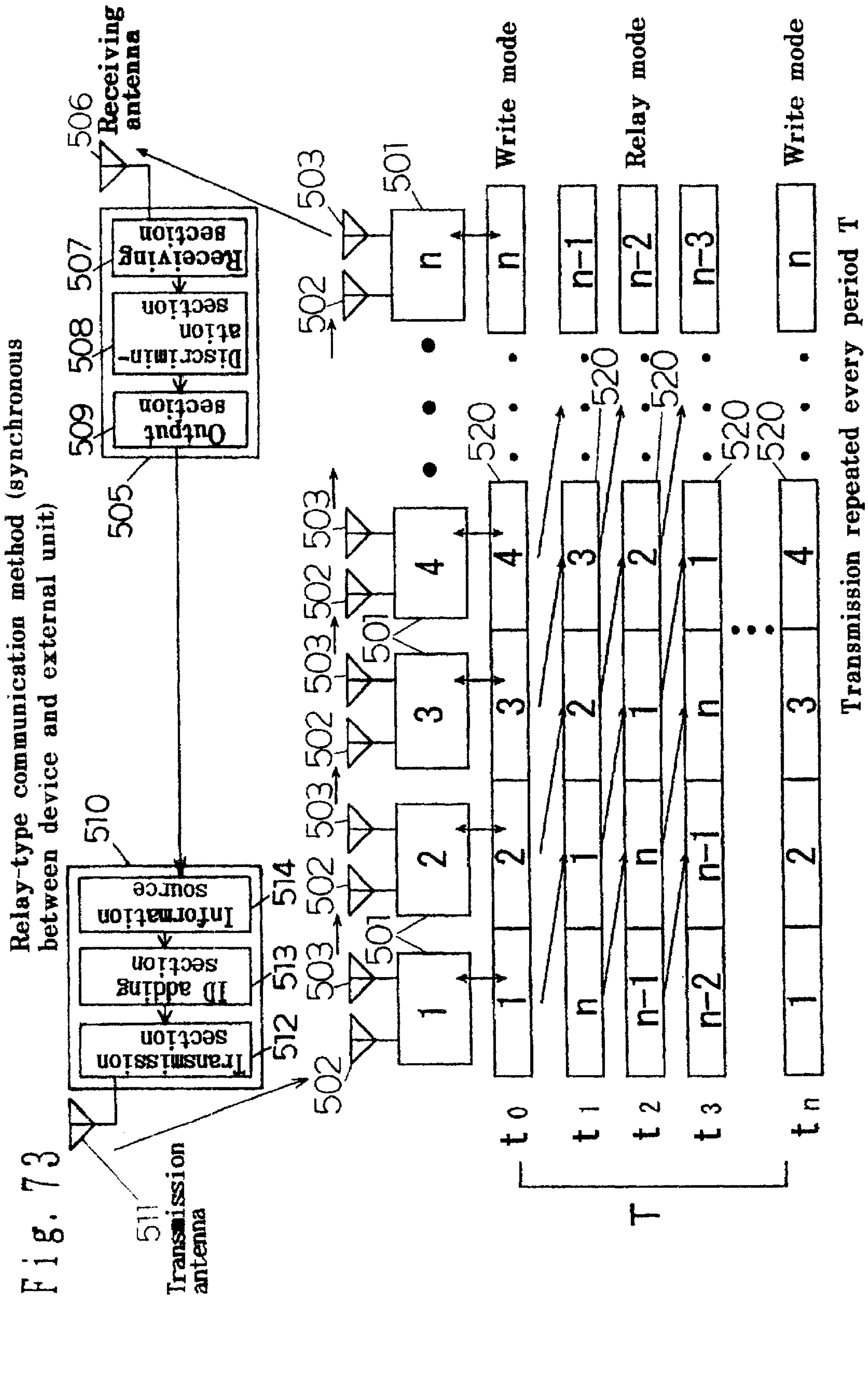

FIG. 73 is a diagram for explaining a communication coding method according to a 48th embodiment of the invention. A communication method according to this embodiment employs a synchronous scheme, and is implemented by a combination of the schemes of FIGS. 71 and 72 described above. The present embodiment, therefore, is applicable to both the case where data is sent to other devices and the case where data is received from other devices. In FIG. 73, a plurality of modules 501 are installed at predetermined intervals along a road (or a route). The modules are assigned identifiers (1), (2), (3), (4), . . . , (n), respectively. Also, n modules 501 constitute a unit (which unit is called a zone). A signal is transmitted from the identifier (1) in the direction of arrow sequentially. There is provided a receiving unit 505 for receiving a signal from the module (n)501 at the tail end. This receiving unit 505 includes, like the corresponding receiving unit in FIG. 71, a receiving antenna 506, a receiving section 507, a discrimination section 508 and an output section 509. Also, there is provided a transmission unit 510 for transmitting information to any one of the modules 501. A signal is transmitted from the transmission unit 510 to the module (1)501. This transmission unit 510, like the corresponding one in FIG. 72, is configured of an information source 514, an ID adding section 513, a transmission section 512 and a transmission antenna 511. Further, a signal is transmitted from the output section 509 of the receiving unit 505 to the information source 514 of the transmission unit 510. Thus information is circulated in the direction of arrow sequentially through the modules 501, the receiving unit 505 and the transmission unit 510 in that order.

According to this embodiment, in the write mode during the time segment t0, each module 501 writes data into the respective frame 520, or reads data from the respective frame 520. In the relay mode during the time segments t1 to tn−1, on the other hand, each frame 520 is shifted to an adjacent module 501 thereby to transmit data. This operation is repeated for every period T. Also, the frame structure for this intra-zone communication is similar to that for the embodiment shown in FIG. 77, in which each module 501 uses both the slots of data for transmission from a mobile unit to a device and the slots for transmission from a device to a mobile unit.

In this way, this embodiment is applicable to both the case of sending data to other devices and the case of receiving data from other devices. In addition, data can be transmitted also to a module 502 located on the side opposite to the direction of data transmission.

49th Embodiment

Figure 74:
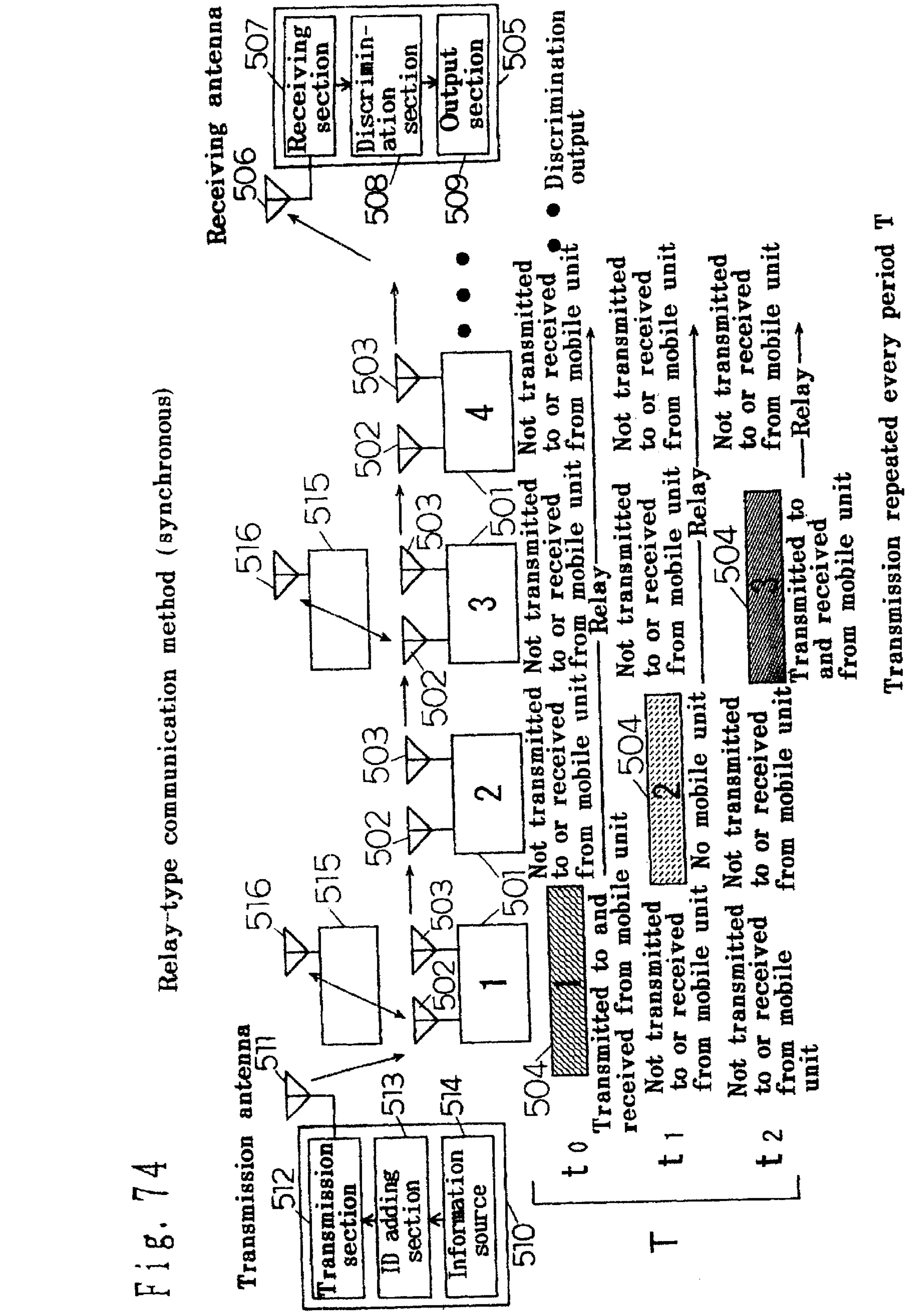

FIG. 74 is a diagram for explaining a communication coding method according to a 49th embodiment of the invention. A communication method according to this embodiment employs a synchronous scheme. The system configuration of this embodiment is identical to that of FIG. 70, the only difference of this embodiment from the embodiment of FIG. 70 being that data is transmitted while securing synchronism for each period T. Specifically, in the case shown in FIG. 70, when a data is generated by a given module 501, the transmission of data generated in other modules 501 is prohibited and held without being transmitted until all the data generated in the first module 501 has been transmitted. As a result, the larger the size of the data transmitted by the first module 501, the longer the waiting time required.

According to this embodiment, in contrast, the data transmission is repeated every period T equal to as many time segments t as modules. As shown in FIG. 74, for example, assuming that communication is effected between the module (1)501 and the mobile unit 515 during the time segment t0, the data involved is of a size capable of being transmitted during the time segment t, so that the particular data is transmitted up to the last module within the time segment t0. Next, assume that data is generated in the module (2)501. This data is also of a size capable of being transmitted during the time segment t, and transmitted up to the last module within the time segment t1. Further, assume that communication is carried out between the module (3)501 and the mobile unit 515. The data is also of a size capable of being transmitted up to the module at the tail end within the time segment t2. A similar process is repeated by the number of modules, and the process is restarted with the module (1)501 after the period T. In the process, if the previous data fails to be transmitted completely at a time, the remaining portion of the data is transmitted during the next period. In other words, the data segmented into sizes capable of being transmitted within the time segment t are transmitted for each period T.

As described above, according to this embodiment, the transmission of the data generated in each module 501 is assigned by period T, and therefore the waiting time is the constant time of period T.

50th Embodiment

Figure 75:
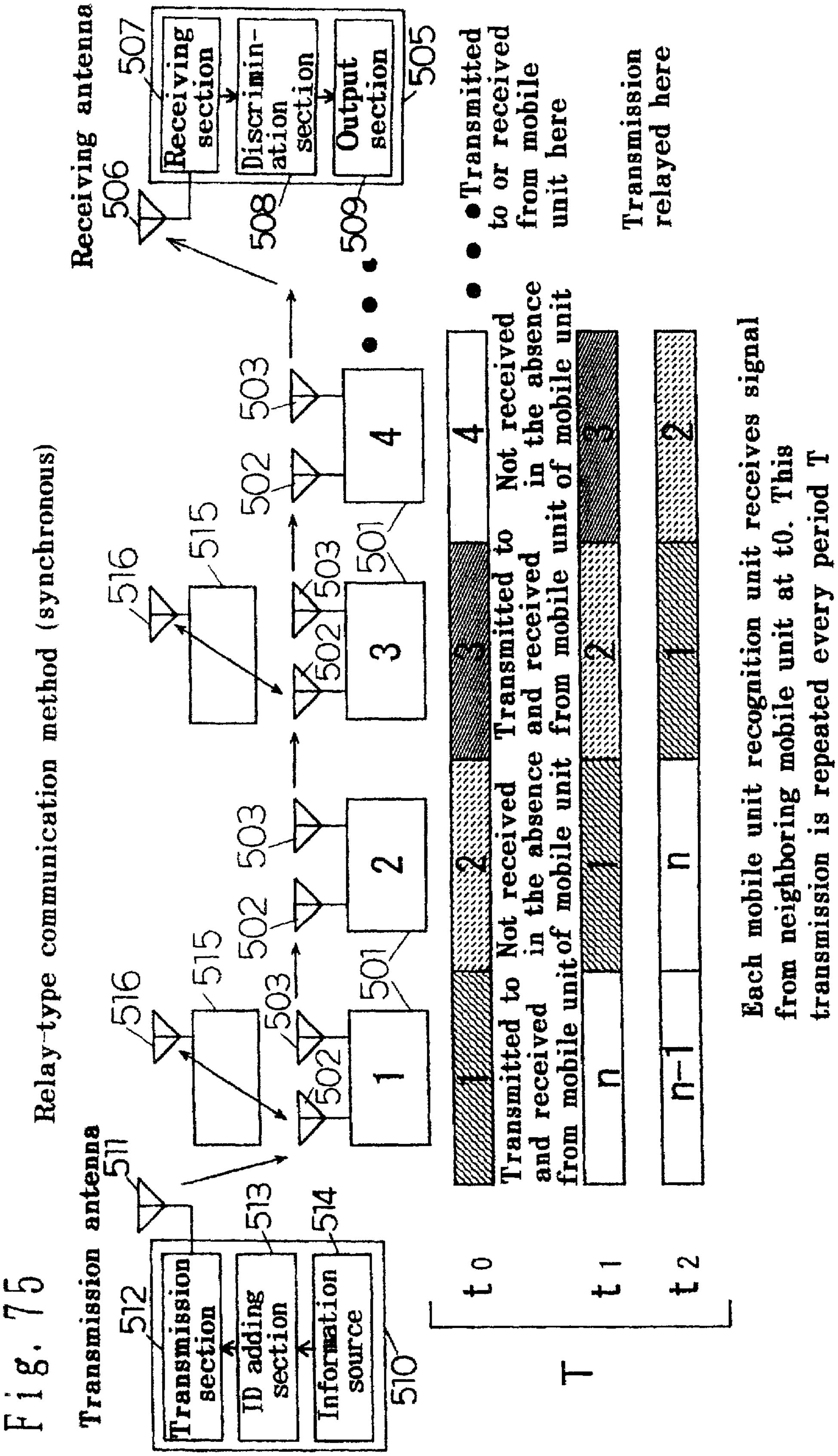

FIG. 75 is a diagram for explaining a communication coding method according to a 50th embodiment of the invention. The communication method according to this embodiment employs a synchronous scheme. The system configuration of this embodiment is similar to that of FIG. 74. This present embodiment is different from the embodiment of FIG. 74, however, in that unlike in the embodiment of FIG. 74 in which the data in a given module is transmitted up to the last module for each time segment t, the present embodiment is such that the communication is effected between the module 501 and the mobile unit 515 or data is generated in the module 501 during the time segment t0, followed by the time segments t1 to tn+1 during which the same data are transmitted to the last module. Also, if there is any data received from the transmission unit 510 in the process, the particular data is also transmitted. This operation is repeated by period T, so that the data exchanged between the module 501 and the mobile unit 515 or the data generated in the module 501 are transmitted to the receiving unit 505 for each period T.

51st Embodiment

Figure 76:
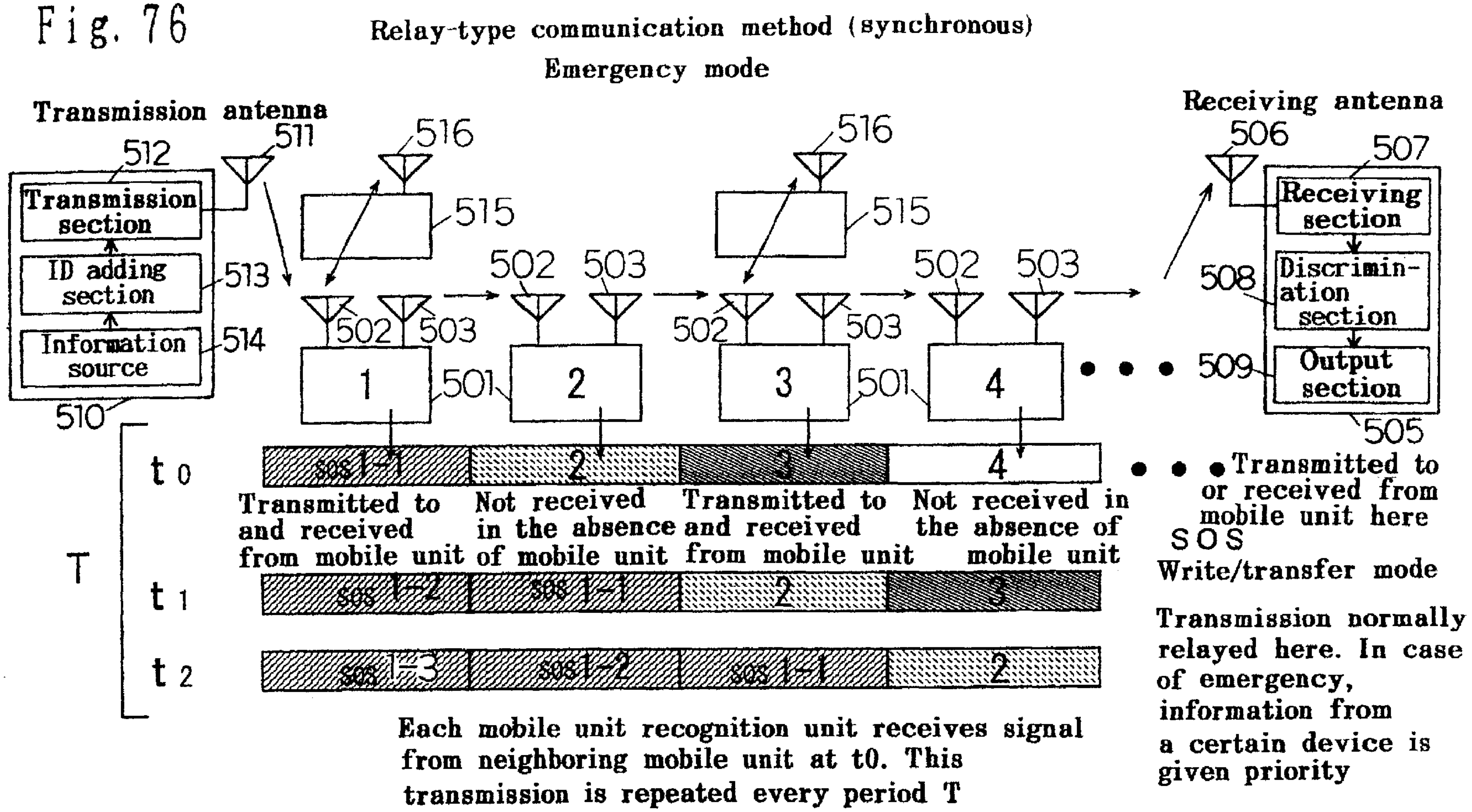

FIG. 76 is a diagram for explaining a communication coding method according to a 51st embodiment of the invention. The communication method according to this embodiment employs a synchronous scheme. The system configuration of this embodiment is similar to that of FIG. 75. However, in the configuration of FIG. 75 in which the communication between the module 501 and the mobile unit 515 is effected or data is generated in the module 501 during the time segment t0, and the data thus generated is transmitted to the last module during the time segments t1 to tn+1, while at the same time transmitting data, if any, received from the transmission unit 510. The present embodiment, in contrast, has an emergency mode meeting the urgent case of receiving an emergency signal. Specifically, upon receipt of an emergency signal by a given module 501 during the time segment t0, only that module 501 enters the write and transfer modes during and after the time segment t1, while the other modules 501 remain only in transfer mode. As a result, the particular module 501 can receive and transmit the following received emergency information successively.

Assume, for example, that the module (1)501 receives an emergency signal (SOS1-1) from the mobile unit 515 during the time segment t0. During and subsequent to the time segment t1, an emergency mode (write/transfer mode) is entered. During the time segment t1, each module 501 transfers data to an adjacent module 501, immediately followed by receiving the emergency information (SOS1-2) transmitted from the mobile unit 515 that has transmitted the emergency signal. Data are transferred in similar fashion during and after the time segment t2, so that the module (2)501 receives the emergency information (SOS1-3, etc).

Figure 80:
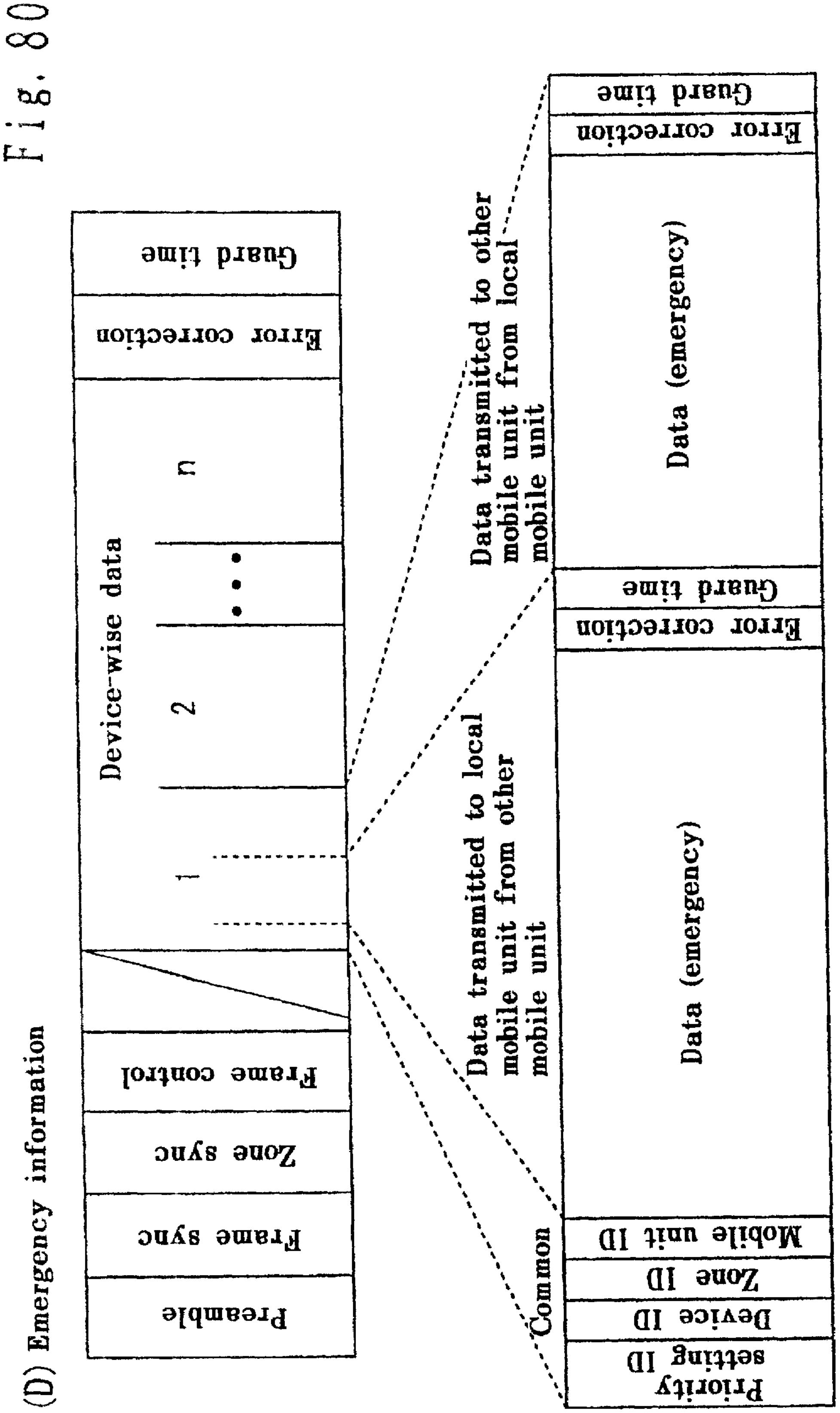

FIG. 80 is a diagram showing an example of a frame structure used for the emergency mode. This frame structure is basically similar to that shown in FIG. 77, but has the feature that it has a priority-setting ID providing emergency priority information for identifying an emergency signal. Also, a zone sync and a zone ID are provided to permit an out-of-zone communication (described later).

As described above, according to this embodiment, assume that the vehicle stops due to an accident or the like, for example, and that an emergency signal is transmitted to the module installed in proximity thereto. An emergency information is immediately transmitted from the particular module to the receiving unit or the like together with the device ID, the zone ID and the mobile unit ID. Thus, the position where the accident has occurred, the specific vehicle involved and the condition of the accident can be quickly grasped and an appropriate action against can be taken against the accident quickly.

Now, another example of the frame structure for the synchronous scheme according to this embodiment will be explained with reference the drawings.

Figure 78:
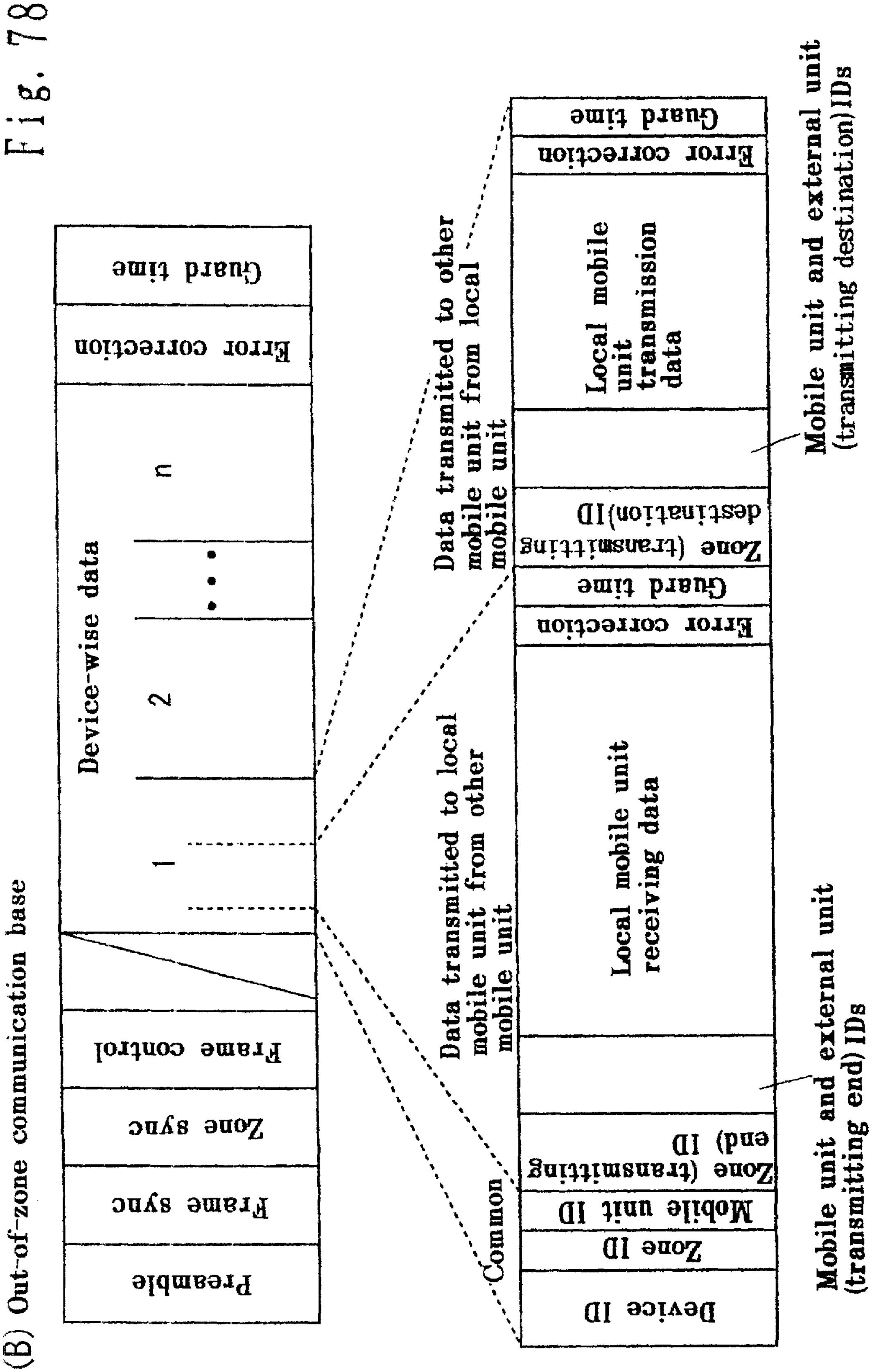

FIG. 78 is a diagram showing a frame structure for out-of-zone communication. The frame structure shown in FIG. 78 includes a zone sync, a zone ID, a zone (transmitting end) ID and a zone (destination) ID added to the frame structure of FIG. 77.

In the case of FIG. 77, synchronism can be secured between zones, and for lack of a zone identifier, the communication is limited in a zone associated with a single transmission unit 510 and a single receiving unit 505 in the system configuration of FIG. 75. In the case of FIG. 78, by contrast, the inter-zone synchronism can be established and in the presence of the zone IDs of the transmitting end and the destination, the zones between which data is transmitted can be identified making possible inter-zone communication. In the process, each module can relay the transmission only within a zone, and therefore the transmission unit or the receiving unit is responsible for inter-zone relay. As a result, the communication between far points can be carried out in the same simple manner as the intra-zone communication.

Figure 79:
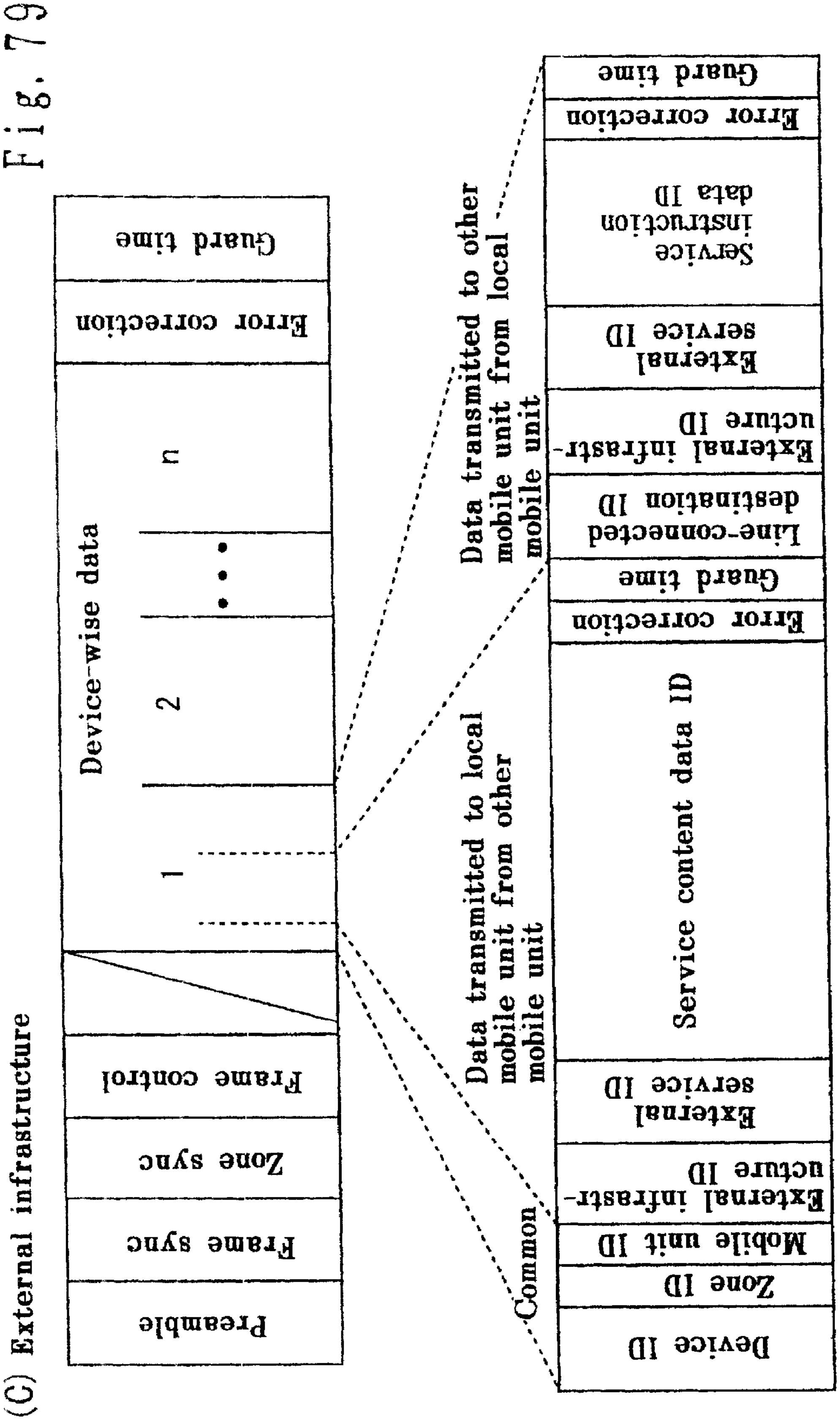

FIG. 79 is a diagram showing an example of a frame structure capable of connecting a mobile unit with an external infrastructure. The frame structure of FIG. 79 is different from that of FIG. 78 in the portion of device-wise data transmitted from a device to a mobile unit and the portion of the data transmitted from a mobile unit to a device. The data portion transmitted from a device to a mobile unit includes an external infrastructure ID, an external service ID, a service content data, an error correction and a guard time. The data portion transmitted from a mobile unit to a device includes a line connection destination ID, an external infrastructure ID, an external service ID, a service instruction data, an error correction and a guard time. Consequently, this embodiment is applicable to an automatic toll collection system for toll roads or the like using a bank name and a transaction number, for example, as an external infrastructure.

Figure 81:
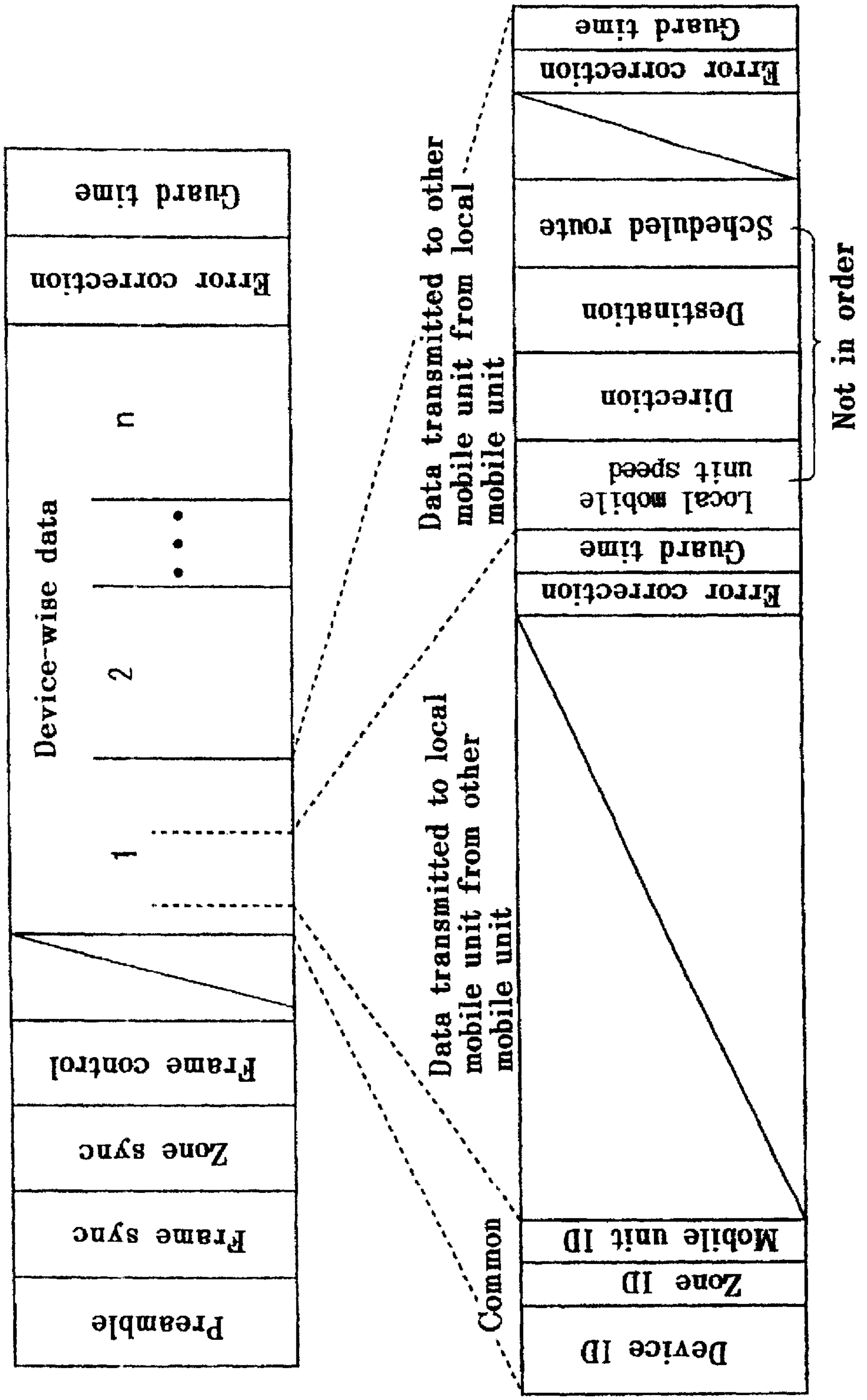

FIG. 81 is a diagram showing an example frame structure used for providing information from an automotive vehicle to a central road management office for centralized management of the overall vehicle traffic on all the roads included in a predetermined wide region. The data portion transmitted from a device to a mobile unit is comprised of an error correction and a time guard, while the data portion transmitted from a mobile unit to a device includes a local mobile unit speed, the direction, a destination, a scheduled route, an error correction and a guard time. In this way, the future traffic flow of automotive vehicles as well as the current vehicle traffic flow on the roads can be predicted.

Figure 82:
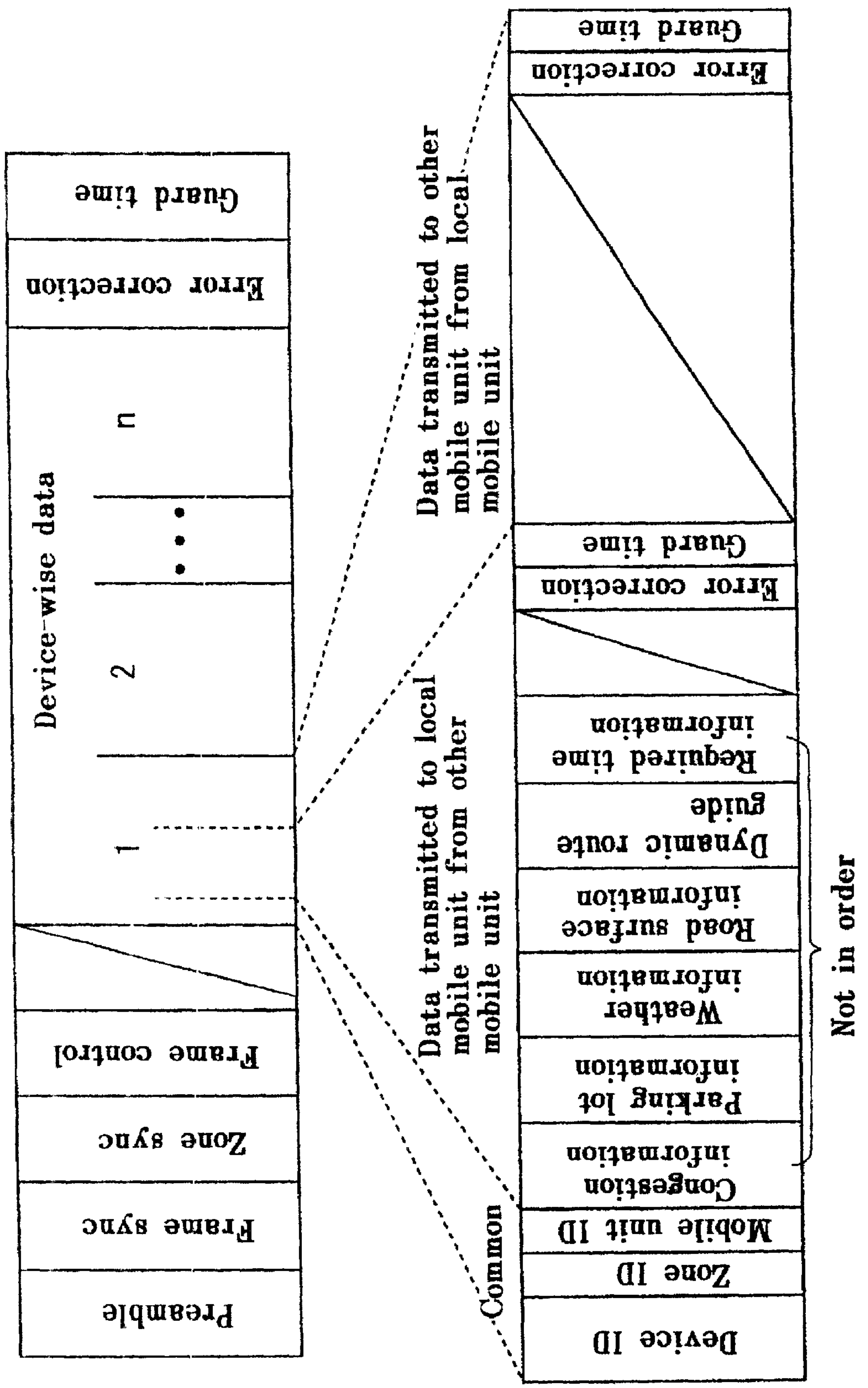

FIG. 82 is a diagram showing an example frame structure used for supplying an automotive vehicle with information for navigation of the vehicle from a central road management office responsible for centralized management of the vehicle traffic of all the vehicles within a predetermined wide region. Specifically, the data portion transmitted from a mobile unit to a device is comprised of an error correction and a guard time, and the data portion transmitted from a mobile unit to a device includes congestion information, parking lot information, weather information, road surface information, dynamic route guide, required time information, error correction and guard time. As a result, the driver can determine which route is the fastest way or the safest way of reaching the destination. Also, since the information required for driving such as the snowfall, rainfall or fog, the closed road or traffic limitation in the areas to be passed can be obtained, the driver can quickly meet the road conditions.

Figure 83:
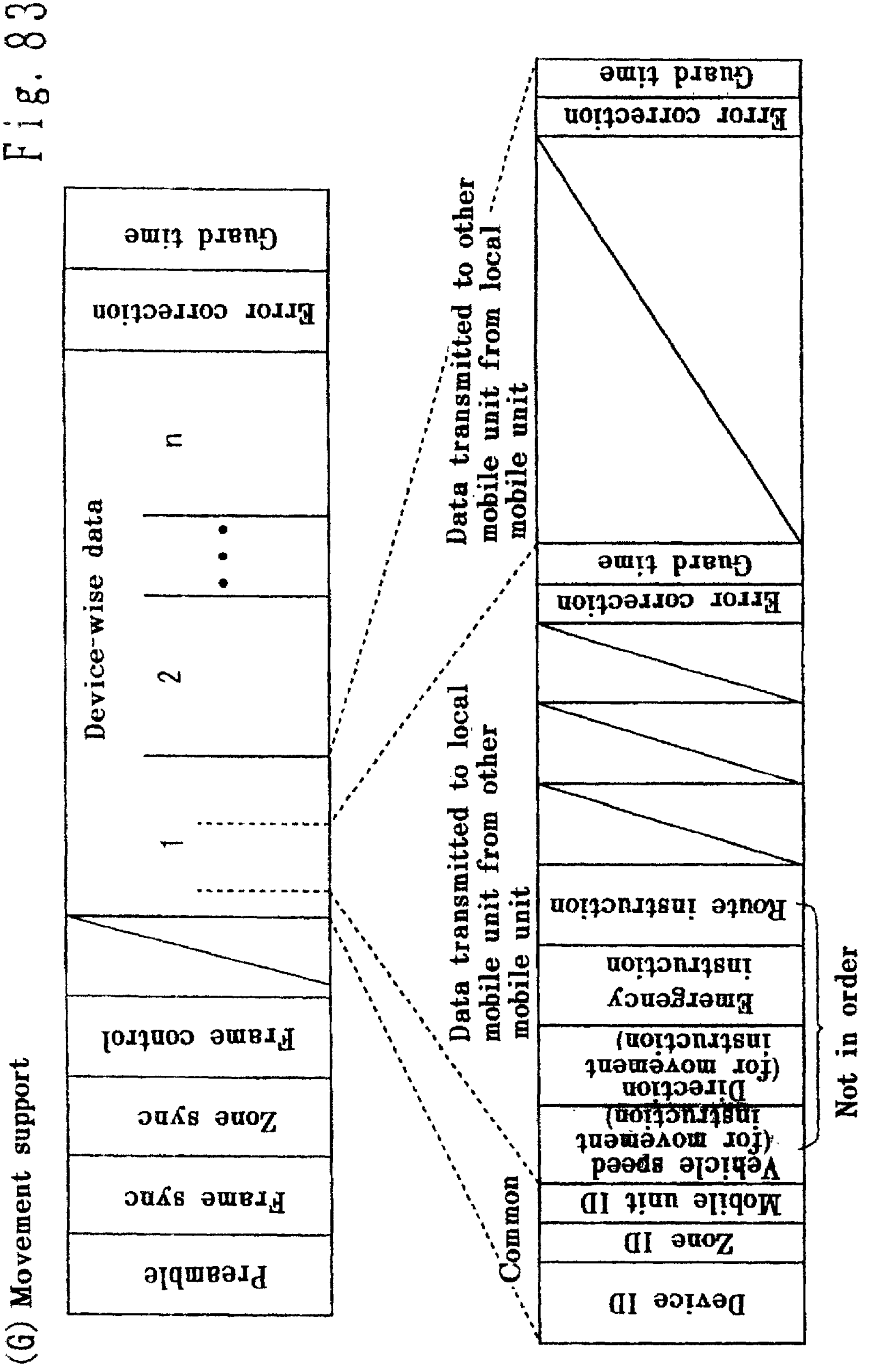

FIG. 83 is a diagram showing an example frame structure used for supplying the drive control information to an automotive vehicle from a centralized road management office responsible for centrally managing the vehicle flow on all the roads in a predetermined wide area, for example. Specifically, the data portion transmitted from a mobile unit to a device includes an error correction and a guard time, while the data portion transmitted from a device to a mobile unit includes the vehicle speed (for movement instruction), direction (for movement instruction), emergency instruction, route instruction, error correction and guard time. As a result, the driver can drive the vehicle safely or optimally without any decision error once the vehicle speed, direction and route are changed in compliance with the received instruction.

Figure 84:
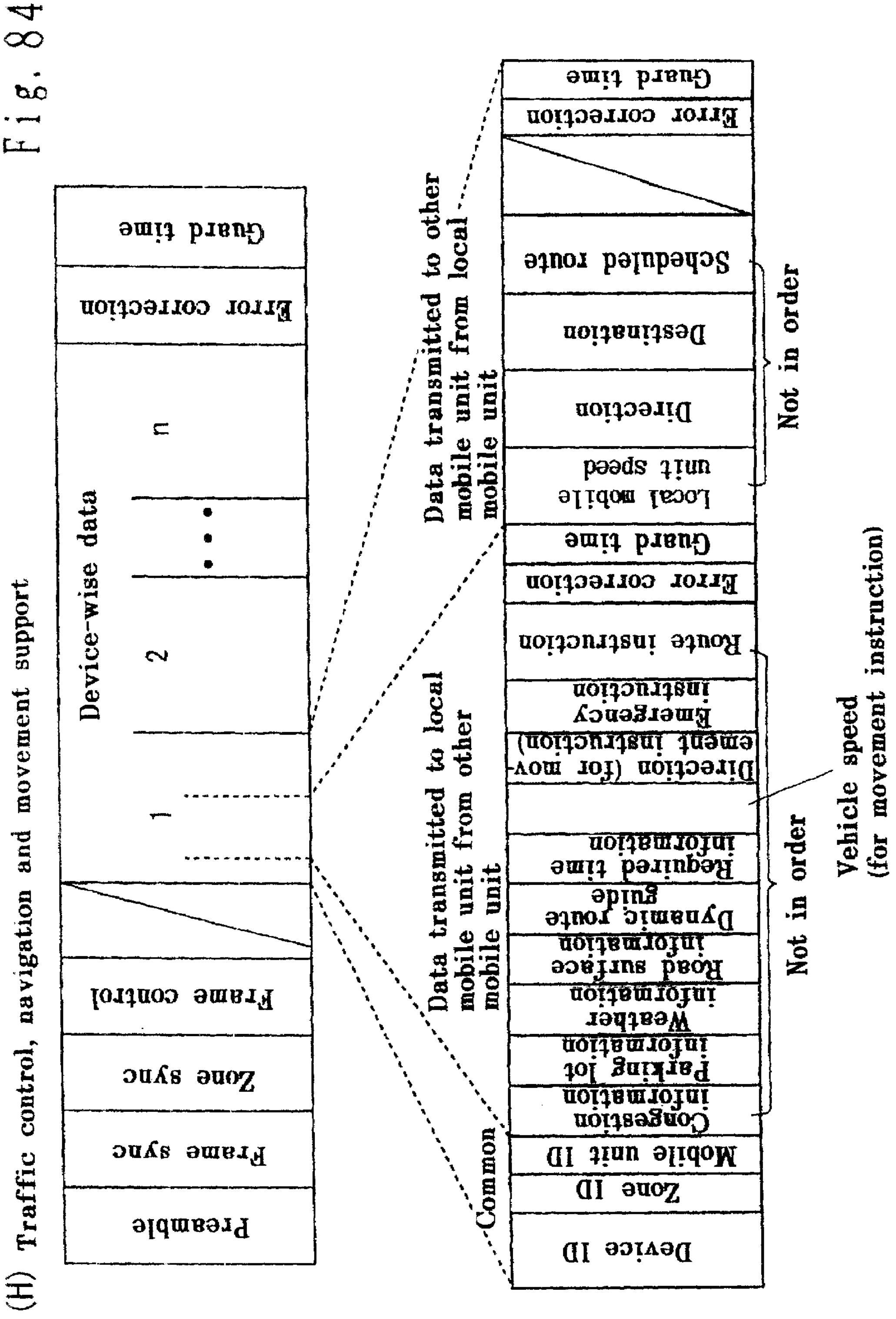
Figure 85:
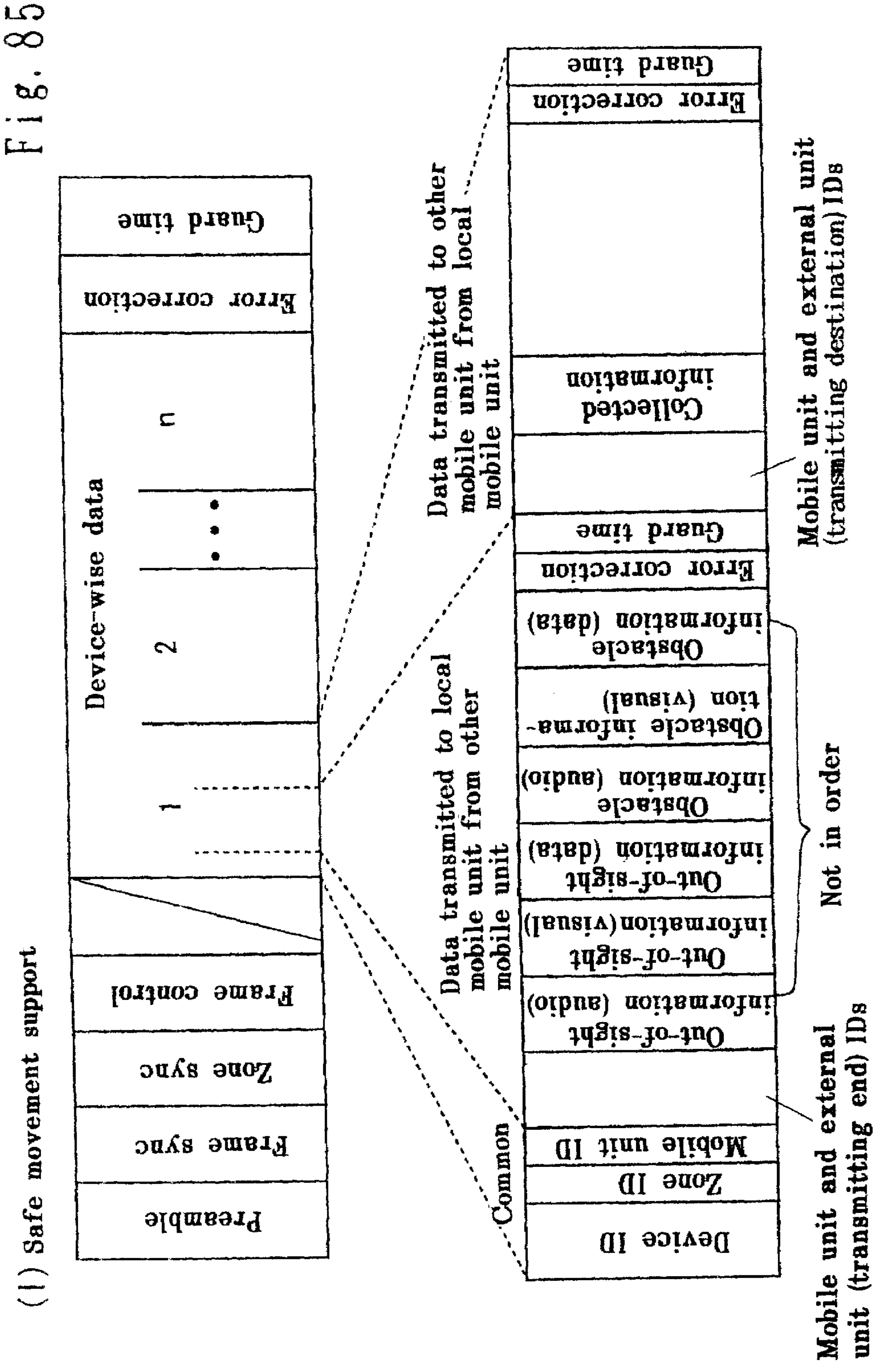

FIG. 84 is a diagram showing an example frame structure used for information exchange between an automotive vehicle and a centralized road management office responsible for centralized management of the vehicle traffic on all the roads in a predetermined wide region. This diagram is a combination of FIGS. 81, 82 and 83. As a result, the present speed of an automotive vehicle is transmitted to the central management office, which, on the basis of this information, supplies the vehicle with the various information required for driving the vehicle. Since the information are fed back in this way, a more accurate, finely detailed traffic control and navigation and movement support can be achieved FIG. 85 is a diagram showing an example frame structure used for information exchange between an automotive vehicle and a centralized road management office responsible for centralized management of the vehicle traffic over all the roads in a predetermined wire region, the transmission and the receiving unit of each zone or other mobile units. Specifically, the data portion transmitted from a device to a mobile unit is configured of a mobile unit/external source (transmitting end) ID, (audio) information out of sight, (picture) information out of sight, out-of-sight information (data), obstacle information (audio), obstacle information (image), obstacle information (data), error correction and a guard time. The data portion to be transmitted from a mobile unit to a device is comprised of a mobile unit/external source (transmitting end) ID, collected information, error correction and a guard time.

In this way, various information are transmitted to the receiving unit and the centralized management office. These information are supplied from cameras or microphones installed in a handicapped place such as on a sharp blind curve, an instrument for measuring the conditions of frozen roads, etc., cameras, microphones or the like installed at the inlet and outlet of a tunnel or along a sharp slope, weight sensors for detecting a stone fall or the like, or camera installed on the leading automobile. The information that could be obtained this way can be transmitted to the automotive vehicles before passing each of the affected places. The automotive driver, therefore, can gasp the road conditions in advance and his drive is safely supported. Even a person or an animal existent on a road out of sight can be detected before reaching the particular place. The vehicle therefore can slow down and stop quickly, thereby securing the safety of pedestrians and the like.

Figure 86:
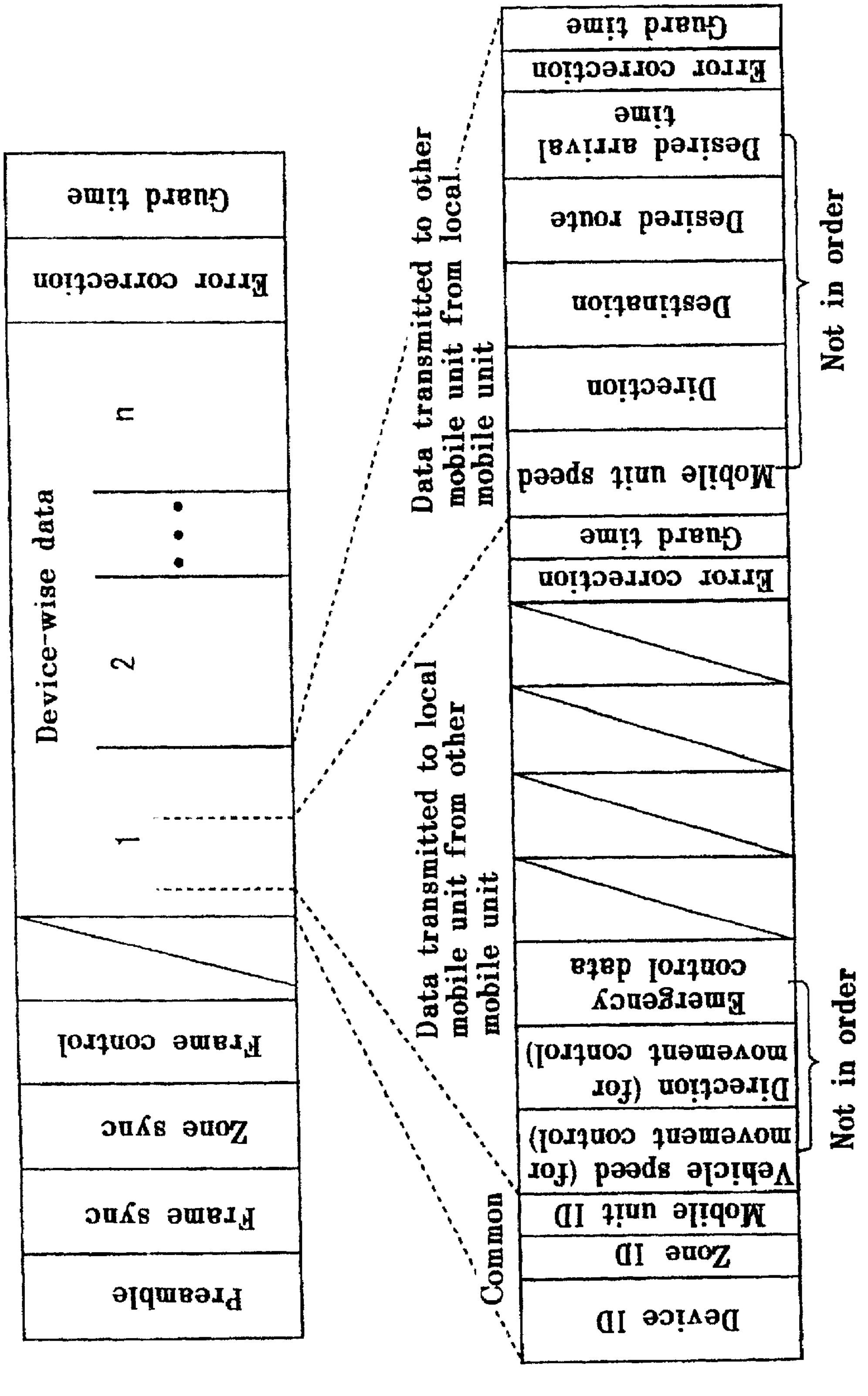

FIG. 86 is a diagram showing an example frame structure used for controlling the vehicle drive and information exchange between an automotive vehicle and a central road management office engaged in centralized management of the vehicle traffic flow over all the roads in a predetermined wide area. Specifically, the data portion transmitted from a device to a mobile unit is comprised of the vehicle speed (for movement control), direction (for movement control), emergency control data, error correction and guard time. The data portion transmitted from a mobile unit to a device, on the other hand, includes the speed of the mobile unit, the direction in which the vehicle is moving, the desired route, desired arrival time, error correction and the guard time.

As a result, on the basis of the information on the destination, the desired route, the desired arrival time, speed and direction of the mobile unit transmitted from a mobile unit, and on the basis of the information on the moving conditions and the road traffic flow supplied from other mobile units, the centralized management office transmits the information for controlling the speed and running direction to the particular mobile unit. The mobile unit that has received the data can thus automatically control the vehicle speed and the direction in which it runs. In the case where an accident occurs ahead of the vehicle or the following distance with an adjacent vehicle is reduced to a dangerous degree, the emergency control data is transmitted, so that the mobile unit can be controlled to avoid the danger based on the particular data.

FIG. 87 is a diagram showing an example frame structure used for exchanging information among a centralized road management office responsible for centralized management of the overall vehicle traffic flow on all the roads in a predetermined wide range, a transmission/receiving unit in each zone, and modules. Specifically, the frame structure, used for fault diagnosis of a module, includes fields of a preamble, frame sync, zone sync, frame control, fault point detour control, device-wise data number control function, device-wise data, error correction and guard time. The device-wise data further includes n slots of 1 to n. Each of the slots includes a device ID, a fault point detection ID, a data transmitted from device to mobile unit, and a data transmitted from a mobile unit to a device. The data portion transmitted from a device to a mobile unit and the data portion transmitted from a mobile unit to a device include only an error correction and a guard time.

Figure 88:
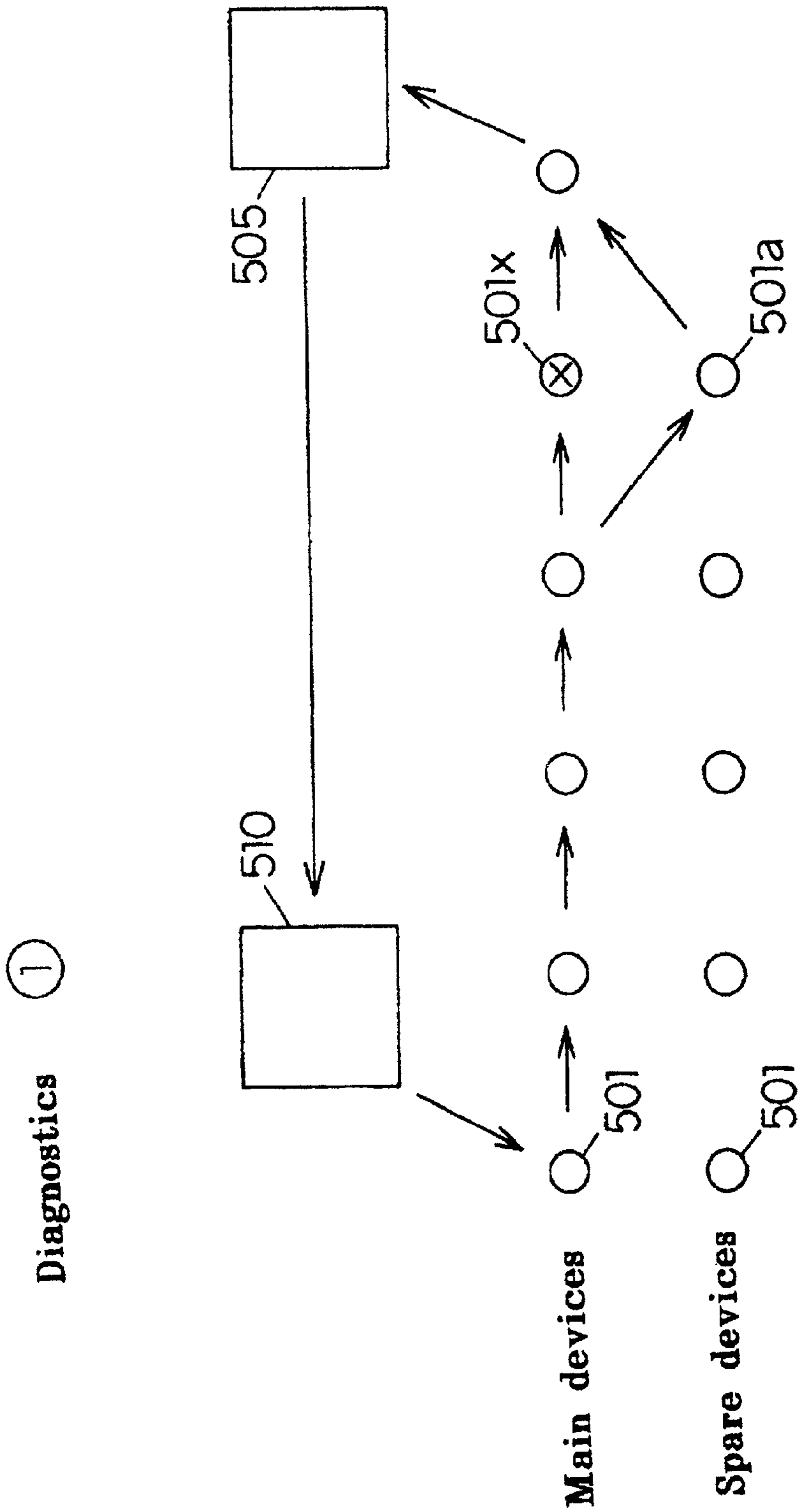

FIG. 88 is a diagram showing a case in which two groups of modules 501 are arranged in a single lane. Specifically, assume that data is transmitted normally by main devices on a road installed with two groups of devices including main devices and spare devices as a relay transmission system including a plurality of modules 501. In this case, assuming that a module 501*x* runs out of order, the information on the faulty module is transmitted to the receiving unit 505, which information in turn is transmitted to the transmission unit 510. After that, the transmission unit 510 transmits the data for circumscribing the fault point to the module 501, and thus secures a data transmission path by use of the module 501*a* of the spare device group as a detour through which data can be transmitted. If a great majority of the modules 501 run out of order, on the other hand, it becomes difficult to secure a detour. In such a case, the modules 501 are switched from the main device group to the spare device group.

Also, although the foregoing description refers to the case in which a transmission path is formed normally using only the main device group, the main device group and the spare device group can alternatively be used concurrently. Further, instead of taking an action against a module fault within the framework of the zone interior as in the foregoing description, a countermeasure can alternatively be taken by a centralized management office.

Figure 89:
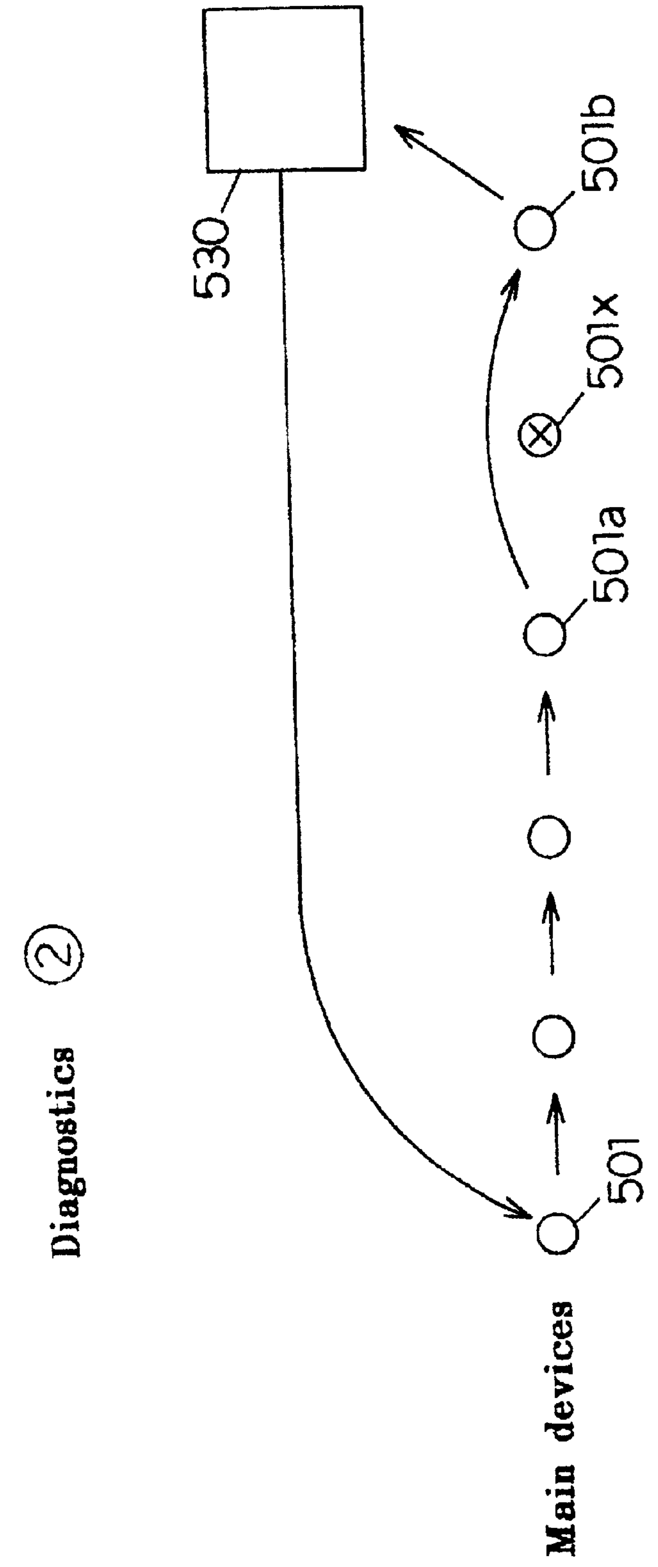

FIG. 89 shows a case in which a group of modules 501 are installed in a single lane. Specifically, assume that a module 501*x* runs out of order on a road installed with a transmission system including a plurality of modules 501. The information of the faulty module is transmitted to a base station 530, and the module control information based on this information is transmitted to each module 501. In the case of a transmission system in which each module 501 uses a different frequency as described above, the information for changing the transmission frequency and the receiving frequency of the module 501*a* and the module 501*b*, respectively, immediately before and after the faulty module 501*x* are transmitted as control information. Then, the data transmission can be skipped from the module 501*a* to the module 501*b*.

In this way, a module that runs out of order or is covered by an object and has become unusable on the transmission path is quickly detected, and a detour route is secured thereby to hold a normal transmission path. The road safety control and drive support reliability are improved. The detection of a faulty module in FIGS. 88 and 89 can use the method of using a detection signal pattern as described above.

Although the data transmission method was not described in detail with the coding communication method according to the above-mentioned embodiment, all the methods associated with the transmission system described above are applicable.

Also, although a reference signal for securing synchronism was not described in the coding communication method according to the above-mentioned embodiments, each of the modules, each of the mobile units, each of the transmission units and each of the receiving units can have an independent identical reference signal. As another alternative, one module can have a reference signal which is transmitted to the modules, the mobile units, etc.

Also, although the coding communication method according to the above-mentioned embodiments limits the detection of a mobile unit to the direction of movement of the mobile unit, the invention is not limited to such a configuration, but the invention may be configured in such a manner that a plurality of lines of modules are installed on each lane to measure the distance of transverse movement or the distance with a vehicle running side by side. In such a case, the distance with an adjacent vehicle can be measured with a higher accuracy (resolution), and therefore a congestion or a crash can be distinguished.

Also, the above-mentioned embodiments include no description about the type of the transmission/receiving antennas installed on a mobile unit. Either an ordinary antenna or an LCX (leakage coaxial cable) antenna can be used with equal effect. In such a case, the communication and resolution are stabilized.

Also, in the above-mentioned embodiments of a coding communication method, the central management station can collect the status information for each zone and can check each zone for a functional stumbling block thereby to relay the information on a natural calamity that may occur. In the process, a snowfall sensor, a rainfall sensor, a pressure sensor or a camera can be installed to grasp the damage.

Also, in the above-mentioned embodiments, a large-capacity memory unit can be installed on a mobile unit or on the central management station to record the past movement and road conditions. Then, the related data can be utilized at the time of next movement.

Also, in the above-mentioned embodiments, the presence or absence of a communication request between a mobile unit and a module can be normally polled. In the case where a communication request occurs, the communication can be carried out using a frame structure having a data slot. The small data capacity of the frame structure used for the polling can shorten the transmission time and hence the waiting time.

Also, although the above-mentioned embodiments refer to the communication mainly between a mobile unit and a receiving unit or between a mobile station and a central management station, the invention is not limited to such a communication, but can be configured to exchange information between mobile units. In such a case, the leading mobile unit generally acquires road information earlier, and therefore communication from the leading vehicle to the following vehicles is emphasized.

According to the asynchronous communication scheme, data can be transmitted along a road in the order of generation with a simple process.

Also, by connecting the starting end and the tail end of a transmission path by an external device, data can be transmitted in circulation. The data can thus be transmitted to the following modules even in the unidirectional communication.

Also, according to the synchronous communication scheme, data can be exchanged and transmitted at regular time intervals.

Also, when the priority information for emergency application is received, an arrangement can be made in which only the module that has received it is capable of receiving such information, while the other modules can only transfer the information, thereby making possible continuous receiving and transmission of the emergency information. As a result, a quick action can be taken against an emergency case.

Also, a frame structure for inter-zone data transmission makes possible a communication in a wide range.

Also, a frame structure that can connect data with an external infrastructure permits various services to be supplied from the external infrastructure.

Also, in the case where the communication data constitutes information on traffic control, information on navigation or information on movement support, the centralized management of a road, a navigation of a mobile unit and a support of movement thereof can be carried out quickly and accurately for an improved reliability.

Also, if the communication data provides information on traffic safety, information for supporting the traffic safety and safe movement support can be supplied accurately.

Also, the communication data can constitute information on automatic drive and control information, thereby making possible a multi-purpose automatic drive covering a wide range.

Also, by making it possible to secure a transmission route by bypassing a faulty module, the transmission route can be secured with high reliability even in the case of an accident or a damage that may happen on a moving route.

As clear from the foregoing description, in a transmission system according to this invention, the receiving means and transmission means belonging to each of a plurality of modules installed along a road can receive an input signal and transmit an output signal, respectively. Therefore, the information contained in the signal can be transmitted along the particular road.

Also, in a transmission system according to the present invention using a plurality of types of modules having carrier frequencies of input/output radio waves varied with modules, the radio wave radiated from each module can be set with a margin and each module can be designed with a margin of design accuracy. Further, each module can be set to a longer processing time.

Also, in a transmission system according to this invention using a module for receiving a plurality of types of input signals and transmitting a plurality of types of output signals, information can be transmitted along a plurality of routes. Especially, in a transmission system according to the invention using a module for receiving two types of input signals and transmitting two types of output signals, information can be transmitted in two directions along a predetermined route.

Also, in a transmission system according to this invention using a module capable of communication with a mobile unit, information can be transmitted along a predetermined route. At the same time, the information received from a mobile unit moving along a route can be transmitted along the same route. Further, information that has been transmitted through a particular route can be transmitted to a mobile unit.

Also, in a transmission system according to this invention using a module for alternating between transfer and communication with a period including a plurality of transfer time zones and a specific or a common communication time zone, information can be transmitted along a predetermined route. At the same time, the information received from a mobile unit moving along the particular route can also be transmitted along the same route. Further, the information that has been transmitted along the particular route can be transmitted to a mobile unit. Especially in a transmission system according to the present invention having a period containing a unique communication time zone for implementing transmission and receiving operation according to a radio communication scheme, no interference occurs even during the transmission or receiving by another adjacent module using a radio wave of the same carrier frequency as other modules in the case where each of a plurality of modules communicates with mobile units using a radio wave of a predetermined carrier frequency.

Also, in a transmission system according to this invention for transmitting or receiving information with priority information added thereto, the information with the priority information added thereto can be transmitted or received in the corresponding order of priority. Especially, the information with the priority information for emergency application added thereto is processed in top priority, and therefore can be transmitted in top priority even when the line is congested.

Also, in a transmission system according to this invention, the use of a directional antenna for communication between a mobile unit and a module makes it possible to set the communication between the mobile unit and the module in one-to-one relationship easily. Also, by adjusting the radio wave output, the carrier frequencies of the radio waves transmitted and received by a plurality of modules can be equalized. Further, the carrier frequency of the radio wave used for transmission and receiving between modules can be equalized with the carrier frequency of the radio wave used for communication between a module and a mobile unit.

Also, in a transmission system according to the invention using a mobile unit identifier and a module identifier, the transmission of unnecessary information that has already been received can be eliminated, and the inter-module transmission can be optimized. Also, even in the case where a response is required to the information transmitted by a mobile unit, the responding party can send a response with a mobile unit identifier added thereto.

Also, in a transmission system according to the invention using the mobile unit detection information, the conditions along a predetermined route can be positively grasped by collecting the mobile unit detection information.

Further, in a transmission system according to the present invention for transmitting the mobile unit detection information, each mobile unit moving along a predetermined route installed with a plurality of modules can measure the speed of another mobile unit based on the mobile unit detection information, and also can measure the following distance at the same time.

Further as obvious from the foregoing description, in an asynchronous communication scheme according to the other present invention, data can be transmitted along a road in the order of generation thereof with a simple process.

Also, by connecting the starting end and the tail end of a transmission route to an external unit, data can be transmitted in circulation. Even in a unidirectional communication, therefore, data can be transmitted to a module behind.

Also, according to a synchronous communication scheme, data can be communicated and transmitted at regular intervals of time.

Also, an arrangement can be made in which the priority information for emergency applications can be received only by a module that has received the particular priority information while the other modules can only operate in transfer mode, thereby making it possible to continuously receive and transfer emergency information. As a result, a quick remedial action is possible in case of emergency.

Also, a frame structure for inter-zone data transmission permits a communication over a wide range.

Also, a frame structure capable of connecting data to an external infrastructure makes it possible to receive various services offered by the external infrastructure.

Also, in the case where the communication data constitute information on traffic control, information on navigation or information on movement support, the centralized road management and the support of navigation and movement of mobile units can be accomplished quickly and accurately for an improved reliability.

Also, in the case where the communication data constitute information on traffic safety, the information on traffic safety and safe movement support can be accurately supplied.

Also, in the case where the communication data constitute information on automatic drive and control information, the automatic drive applicable over wide fields is made possible.

Also, by making an arrangement to secure a transmission route bypassing a faulty module, a highly reliable transmission route can be secured even in case of an accident or a disaster occurring on the route of movement.

What is claimed is:

1. A transmission system for use with a mobile unit along a predetermined route, comprising:

a plurality of modules installed at different positions along the predetermined route, each of the plurality of modules includes i) receiving means of receiving an input signal containing information, ii) transmission means of transmitting an output signal based on said input signal in accordance with a predetermined radio scheme, iii) mobile unit detection means of detecting the presence of the mobile unit along said predetermined route;

wherein said output signal from each of the plurality of modules contains at least a portion of the information contained in said input signal and said output signal is transmitted along at least a portion of said predetermined route through two or more of the plurality of modules.

2. The system of claim 1 in which the mobile unit detection means includes a weight measuring section for measuring weight of the mobile unit moving along said predetermined route; and a decision section for determining that the mobile unit is present if the measured weight is one of (1) exceeds a predetermined threshold value and (2) within a predetermined range of values.

3. The system of claim 1 in which a module identifier of a respective module is included in the information contained in said signal transmitted along said predetermined route, if the respective module detects the presence of the mobile unit.

4. The system of claim 1 in which the mobile unit detection means includes a magnetic field generating section for generating a magnetic field along said predetermined route; and a magnetic field change detection section for detecting a change in the magnetic field, when the mobile unit moves along the predetermined route to pass through the magnetic field.

5. The system of claim 1 in which the mobile unit detection means includes a laser radiation section for transmitting a laser beam toward the mobile unit moving along said predetermined route; and a laser detection section for detecting the laser beam reflected from the mobile unit.

6. The system of claim 1 in which the mobile unit detection means includes a receiving section for receiving a first identifier transmitted from the mobile unit moving along said predetermined route, and a module identifier generating unit for generating a second identifier and adding the second identifier to the information contained in said signal transmitted along said predetermined route, when the first identifier is received by the receiving section.

7. A communication coding method for a transmission system for use with a mobile unit along a predetermined route the method comprising the steps of:

a) detecting if the mobile unit is moving along said predetermined route, b) receiving an input signal containing information asynchronously or synchronously in accordance with a predetermined radio scheme using receiving means contained in one of a plurality of modules installed at different positions along the predetermined route, and C) transmitting an output signal containing at least a portion of the information contained in said signal through two or more of the plurality of modules along at least a portion of said predetermined route asynchronously or synchronously using transmission means contained in the two or more modules in accordance with the predetermined radio scheme;

wherein each of the plurality of modules includes at least one of (i) a weight measuring section for measuring weight of the mobile unit moving along said predetermined route, (ii) a magnetic field generating section for generating a magnetic field along said predetermined route, or (iii) a laser radiation section for transmitting a laser beam toward the mobile unit moving along said predetermined route.

8. In a transmission system having a plurality of modules installed at different positions along a predetermined route, a method of communicating a presence of a mobile unit moving along the predetermined route comprising the steps of:

(a) receiving in a respective one of the plurality of modules a first input signal containing first information from another module installed along the route;

(b) receiving in the respective one of the modules a second input signal containing second information from a mobile unit moving along the route; and (c) receiving in the respective one of the modules a third input signal containing third information indicating the presence of the mobile unit moving along the route, the third input signal separate and independent from the first and second input signals and the third information separate and independent from the first and second information;

wherein the respective one of the modules includes at least one of (i) a weight measuring section for measuring weight of the mobile unit moving along said predetermined route, (ii) a magnetic field generating section for generating a magnetic field along said predetermined route, or (iii) a laser radiation section for transmitting a laser beam toward the mobile unit moving along said predetermined route.

9. The method of claim 8 in which step (c) of receiving the third input signal includes:

(i) generating a magnetic field along the predetermined route;

(ii) detecting, by the respective one of the modules, a change in the magnetic field;

(iii) deciding, by the respective one of the modules, the presence of the mobile unit based on the detection of the change in the magnetic field in step (ii); and (iv) forming the third input signal after the decision in step (iii).

10. The method of claim 8 in which step (c) of receiving the third input signal includes:

(i) transmitting a laser beam from the respective one of the modules;

(ii) receiving, by the respective one of the modules, the laser beam reflected from the mobile unit;

(iii) deciding, by the respective one of the modules, the presence of the mobile unit based on the received laser beam in step (ii); and (iv) forming the third input signal after the decision in step (iii).

11. The method of claim 8 in which step (c) of receiving the third input signal includes:

(i) weighing, by the respective one of the modules, a unit moving along the route;

(ii) determining, by the respective one of the modules, that the weight of the unit moving along the route in step (i) is one of (1) exceeds a predetermined threshold value and (2) within a predetermined range of values;

(iii) deciding, by the respective one of the modules, that the unit moving along the route is a mobile unit based on the determination of step (ii); and (iv) forming the third input signal after the decision in step (iii).

12. The method of claim 11 further comprising the step of:

(d) transmitting an output signal from the respective one of the modules to another module installed along the route, the output signal containing a portion of the first, second and third information.

13. A transmission system for use with a mobile unit along a predetermined route, comprising:

a plurality of modules installed at different positions along the predetermined route, each of the plurality of modules includes i) receiving means of receiving an input signal containing information, ii) transmission means of transmitting an output signal based on said input signal in accordance with a predetermined radio scheme, iii) mobile unit detection means of detecting the presence of the mobile unit along said predetermined route;

wherein said output signal from each of the plurality of modules contains at least a portion of the information contained in said input signal and said output signal is transmitted along at least a portion of said predetermined route through two or more of the plurality of modules;

wherein each of the mobile units have a length and wherein said plurality of modules are spaced such that the distance between adjacent modules is less than the length of each of the mobile units.

14. A transmission system for use with a mobile unit along a predetermined route, comprising:

a plurality of modules installed at different positions along the predetermined route, each of the plurality of modules includes i) receiving means of receiving an input signal containing information, ii) transmission means of transmitting an output signal based on said input signal in accordance with a predetermined radio scheme, iii) mobile unit detection means of detecting the presence of the mobile unit alone said predetermined route;

wherein said output signal from each of the plurality of modules contains at least a portion of the information contained in said input signal and said output signal is transmitted along at least a portion of said predetermined route through two or more of the plurality of modules;

wherein a minimum following distance is established for mobile units along the predetermined route and wherein the plurality of modules are spaced such that adjacent modules are separated by less than the minimum following distance.

* * * * *

UNITED STATES PATENT AND TRADEMARK OFFICE

CERTIFICATE OF CORRECTION

PATENT NO. : 7,031,655 B2
APPLICATION NO. : 09/953085
DATED : April 18, 2006
INVENTOR(S) : Nomura et al.

It is certified that error appears in the above-identified patent and that said Letters Patent is hereby corrected as shown below:

Title Page, Item (56) References Cited, U.S. PATENT DOCUMENTS

Add

--5,434,490 7/1995 Ishida et al.--
--5,408,679 4/1995 Masuda--
--5,784,005 7/1998 Akutsu et al.--

Title Page, Item (56) References Cited, OTHER PUBLICATIONS

Add

--European Search Report dated November 5, 1997--

--Fukui R et al: "Individual Communication Function of RACs: Road Automobile Communication System" Proeedings of the Vehicle Navigation and Information Systems Conference. (VNIS) Toronto, Sept. 11-13, 1989, No. Conf. 1, Reekie D; Case E; Tsai J; Pages 206-213--

--Catling I et al.: "Socrates: Systems of Cellular Radio for Traffic Efficiency and Safety" Proceedings of Vehicle Navigation and Information Systems Conference, Dearborn, Oct. 20-23, 1991 Vol. 1, No., of Electrical and Electronics Engineers, Pages 147-150--

--Lewis Sabounghi R: "Intelligent Vehicle Highway System - The Universal Close-Range Road/Vehicle Communication System Concept - The Enhanced AVI and its CVO Applications" Proceeding of the Vehicle Navigation and Information Systems Conference, Dearborn, October 20-23, 1991 Vol. Part 2, Institute of Electrical and Electronics Engineers, Pages 957-967--

UNITED STATES PATENT AND TRADEMARK OFFICE

CERTIFICATE OF CORRECTION

PATENT NO. : 7,031,655 B2
APPLICATION NO. : 09/953085
DATED : April 18, 2006
INVENTOR(S) : Nomura et al.

It is certified that error appears in the above-identified patent and that said Letters Patent is hereby corrected as shown below:

<u>Column 84</u>
Line 34, change "C)" to --c)--

<u>Column 86</u>
Line 34, change "alone" to --along--

Signed and Sealed this

Twenty-seventh Day of May, 2008

JON W. DUDAS
*Director of the United States Patent and Trademark Office*